United States Patent
Boduch et al.

(10) Patent No.: US 8,190,027 B2
(45) Date of Patent: *May 29, 2012

(54) MULTIFUNCTIONAL AND RECONFIGURABLE OPTICAL NODE AND OPTICAL NETWORK

(75) Inventors: Mark E. Boduch, Geneva, IL (US);
Kimon Papakos, Chicago, IL (US);
Gilbert A. Buescher, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1171 days.

This patent is subject to a terminal disclaimer.

(21) Appl. No.: 11/697,527

(22) Filed: Apr. 6, 2007

(65) Prior Publication Data
US 2008/0013954 A1   Jan. 17, 2008

Related U.S. Application Data

(60) Provisional application No. 60/830,216, filed on Jul. 12, 2006.

(51) Int. Cl.
*H04J 14/02* (2006.01)

(52) U.S. Cl. ............. 398/83; 398/79; 398/59; 398/48; 398/50; 398/56; 385/24; 385/37; 385/16; 385/17; 385/18

(58) Field of Classification Search ............ 398/79, 398/82, 83, 158, 159, 45, 46, 47, 48, 49, 398/50, 52, 54, 55, 56, 57, 58, 59, 61, 62, 398/63, 64, 84, 85; 385/24, 16, 17, 18, 37
See application file for complete search history.

(56) References Cited

U.S. PATENT DOCUMENTS

| 5,500,756 | A | 3/1996 | Tsushima et al. ............. 398/181 |
| 5,864,414 | A | 1/1999 | Barnsley et al. ............... 398/71 |
| 6,525,852 | B1 * | 2/2003 | Egnell ............................ 398/83 |
| 6,868,201 | B1 | 3/2005 | Johnson et al. ............... 385/24 |
| 7,133,616 | B2 * | 11/2006 | Caroli ............................ 398/83 |
| 7,751,714 | B2 * | 7/2010 | Zhong et al. .................. 398/83 |
| 2002/0057477 | A1 | 5/2002 | Rocca et al. .................. 359/141 |
| 2004/0028407 | A1 | 2/2004 | Noheji ........................... 398/59 |
| 2004/0190901 | A1 * | 9/2004 | Fang .............................. 398/59 |

(Continued)

FOREIGN PATENT DOCUMENTS

EP   1 202 595   5/2002

(Continued)

OTHER PUBLICATIONS

PCT International Search Report and Written Opinion of International Search Authority in PCT/JP2007/015541 issued Jun. 5, 2008.

(Continued)

*Primary Examiner* — Hanh Phan
(74) *Attorney, Agent, or Firm* — Fitzpatrick, Cella, Harper & Scinto

(57) ABSTRACT

An optical node includes a reconfigurable optical add drop multiplexer (ROADM) core configured to transmit optical signals of multiple wavelengths to and receive optical signals of multiple wavelengths from another optical node. The ROADM core is also configured to add optical signals thereto and to drop optical signals therefrom. The node also includes two different types of add-on devices, each connected to the ROADM core device and configured to process optical signals of multiple wavelengths. As a result, a multifunctional and reconfigurable optical node can be provided.

29 Claims, 66 Drawing Sheets

U.S. PATENT DOCUMENTS

| | | | |
|---|---|---|---|
| 2005/0281558 A1 | 12/2005 | Wang et al. | 398/85 |
| 2006/0034610 A1* | 2/2006 | Akiyama et al. | 398/83 |
| 2006/0133804 A1 | 6/2006 | Boduch et al. | 398/5 |
| 2006/0133807 A1 | 6/2006 | Jenkins et al. | 398/59 |
| 2007/0237524 A1* | 10/2007 | Gerstel et al. | 398/83 |
| 2008/0008474 A1 | 1/2008 | Boduch et al. | 398/83 |
| 2008/0013953 A1 | 1/2008 | Boduch et al. | 398/83 |
| 2008/0013954 A1* | 1/2008 | Boduch et al. | 398/83 |

FOREIGN PATENT DOCUMENTS

| | | |
|---|---|---|
| EP | 1 434 374 | 6/2004 |
| EP | 1 628 424 | 2/2006 |

OTHER PUBLICATIONS

European Search Report dated Nov. 29, 2010, in European Application No. 07 796 705.7-2415.

M.P. Earnshaw et al., "Planar Lightwave Circuit Based Reconfigurable Optical Add-Drop Multiplexer Architectures and Reusable Subsystem Module, IEEE Journal of Selected Topics in Quantum Electronics", vol. 11, No. 2, Mar./Apr. 2005, pp. 313-322.

European Office Action dated May 3, 2011, in counterpart European Application No. 07 796 705.7-2415.

* cited by examiner

Light Distributor (Type 3)

1 to *k* Optical Switch

Light Combiner (Type 3)

*k* to 1 Optical Switch

MULTIFUNCTIONAL AND RECONFIGURABLE OPTICAL NODE AND OPTICAL NETWORK

CROSS-REFERENCE TO RELATED APPLICATION

This application claims the benefit of U.S. Provisional Application No. 60/830,216, filed Jul. 12, 2006.

BACKGROUND OF THE INVENTION

1. Field of the Invention

This invention relates in general to the field of wavelength division multiplexing and more particularly to a multifunctional and reconfigurable Dense Wavelength Division Multiplexing (DWDM) optical node. This invention also relates to an optical node and an optical network including a reconfigurable optical add drop multiplexer core device.

2. Description of Related Art

Wavelength Division Multiplexing (WDM) and Dense Wavelength Division Multiplexing (DWDM) are technologies that enable a multitude of optical wavelengths of differing frequencies to be transported over a single optical fiber. A DWDM network is constructed by interconnecting multiple DWDM network elements. Each network element typically includes, for example, optical multiplexing equipment, optical de-multiplexing equipment, optical amplifiers, optical power monitors, optical supervisory channel processors, network element control processors, and optical converters.

First generation DWDM network equipment provided the ability to transport a multitude of optical wavelengths between two points over a single pair of optical fibers. These systems are referred to as DWDM point-to-point systems. Second generation DWDM network equipment provided the ability to interconnect DWDM network elements in a "ring" configuration. These elements included two DWDM network interfaces and multiple single wavelength ports used to add and drop wavelengths to and from the DWDM network interfaces. Second generation DWDM network elements provided the ability to "pass" wavelengths directly between their two DWDM network interfaces. However, in order to do this, fiber cables had to be manually interconnected within a system each time a "pass-through" connection was required.

Third generation DWDM network elements included Reconfigurable Optical Add Drop Multiplexers, referred to as ROADMs. ROADMs provided the ability to remotely reconfigure the DWDM network element. For these systems, wavelengths could be remotely configured to pass through the network element without manual intervention. Since these "third generation" DWDM network elements also included only two DWDM network interfaces, they are referred to as 2-degree network elements. But these "third generation" DWDM network elements connect only a single add-on device to the ROADMs. As a result, while they are reconfigurable, they are not multifunctional, which limits their usefulness.

Thus, it is useful to have a fourth generation DWDM optical node that is a multifunctional in addition to being reconfigurable. In addition, it is useful to have a multifunctional and reconfigurable DWDM node employing a ROADM connected to more than one add-on device to provide multifunctionality. Further, it is useful to have an optical network including a plurality of such optical nodes.

SUMMARY OF THE INVENTION

The foregoing is overcome by an optical node including a ROADM core, which is a reconfigurable optical add drop multiplexer core device configured to transmit optical signals of multiple wavelengths to and receive optical signals of multiple wavelengths from another optical node, and to add optical signals thereto and to drop optical signals therefrom. The node also includes at least two different types of add-on devices, each connected to the ROADM core. The add-on devices are configured to process optical signals of multiple wavelengths.

By providing at least two add-on devices to a ROADM core, a multifunctional and reconfigurable optical node and optical network can be provided.

BRIEF DESCRIPTION OF THE DRAWINGS

FIG. 13 is a block diagram of an example of a type-3 ROADM core device connected to an external colored add/drop add-on module, specifically a type-1 ROADM add-on.

FIG. 14 is a block diagram of an example of paired type-3 ROADM core devices each connected to an external colored add/drop add-on module, specifically a type-1 ROADM add-on.

FIG. 59A is a block diagram of an example of a spur main node connected to a spur end node, the spur main node including two type-4 ROADM core devices, each including a colored add-on module therein and each externally connected to a spur add-on module, and a colorless add/drop module;

FIG. 59B is a block diagram of an example of an optical node, the node including three type-4 ROADM core devices each connected to each other, and each connected to a colorless add/drop module;

FIG. 59C is a block diagram of an example of a spur main node, the spur main node including three type-4 ROADM core devices, two colorless add/drop modules, and a spur add-on module;

FIG. 59D is a block diagram of an example of a spur main node, the spur main node including three type-4 ROADM core devices, one colorless add/drop module, and two spur add-on modules;

FIG. 59E is a block diagram of an example of a spur main node, the spur main node including three type-4 ROADM core devices, and three spur add-on modules;

FIG. 59F is a block diagram of an example of a spur main node, the spur main node including two type-4 ROADM core devices, three colorless add/drop modules, and a spur add-on module;

FIG. 59G is a block diagram of an example of a spur main node, the spur main node including two type-4 ROADM core devices, and four colorless add/drop modules; and FIG. 59H is a block diagram of an example of a spur main node, the spur main node including two type-4 ROADM core devices, and four spur add-on modules.

Figure 1:
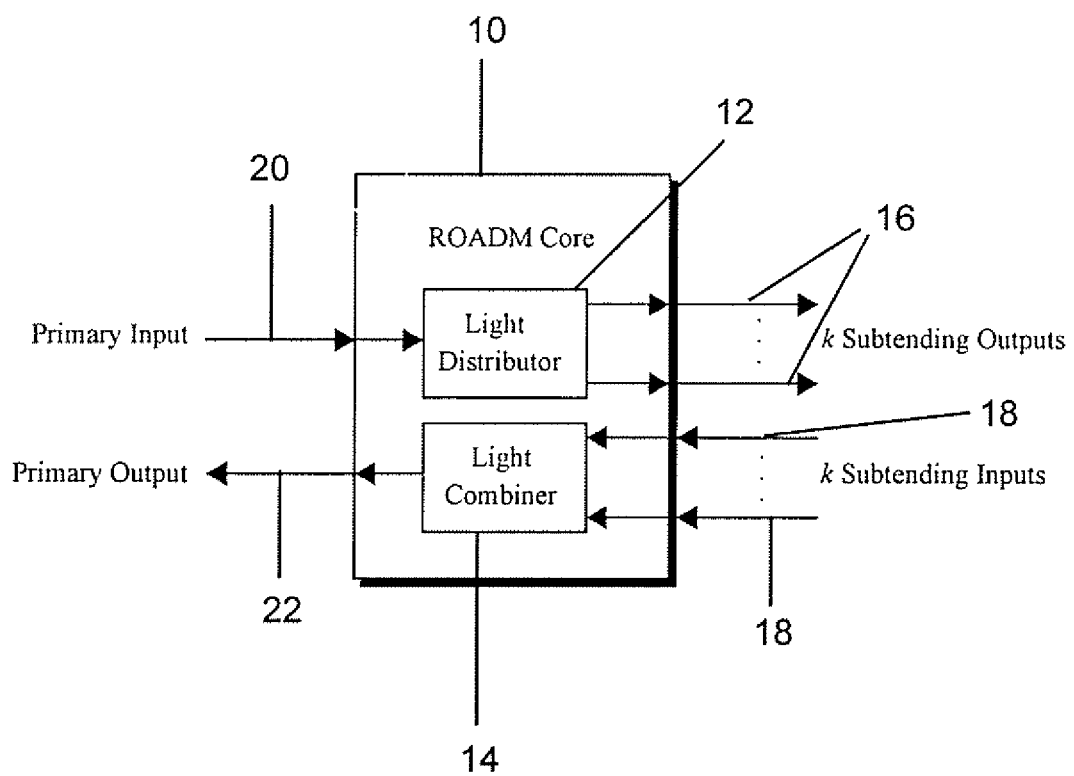
FIG. 1 is a block diagram of an example of a ROADM device.

To provide a more complete understanding of the invention and features and advantages thereof, reference is made to the following description of examples of embodiments of the invention, taken in conjunction with the accompanying figures.

DETAILED DESCRIPTION OF THE INVENTION

The example embodiments disclosed herein are discussed with respect to a DWDM environment. However, it should be understood to one ordinarily skilled in the art that the inventive techniques illustrated by the examples of the disclosed embodiments could be used in other WDM environments, such as a Coarse Wavelength Division Multiplexing environment, without limitation.

As used in this application, the term "ROADM" is defined as a reconfigurable optical add drop multiplexer that is configurable to transmit and receive optical signals of single and multiple wavelengths to and from other optical devices. In some example embodiments, as will be discussed below, a ROADM is configurable to receive an optical signal or signals from an add port thereof and to drop an optical signal or signals at a drop port thereof, although it is not limited thereto. In other example embodiments, as will be discussed below, a ROADM is configurable to receive an optical signal or signals from an add port of a device coupled to the ROADM within the same optical node and to drop an optical signal or signals at a drop port of the coupled device, although it is not limited thereto. In still other example embodiments, as will be discussed below, a ROADM is configurable to transmit a multiple wavelength signal on a subtending output thereof and to receive a multiple wavelength signal on a subtending input thereof, although it is not limited thereto. The subtending inputs and outputs are coupleable to another optical device in the same optical node. But it should be understood that ROADMs are not limited to transmitting multiple wavelength signals to optical devices within the same optical node and to receiving multiple wavelength signals from optical devices within the same optical node. Accordingly, in other example embodiments that will be discussed below, a ROADM receives a multiple wavelength signal from and transmits a multiple wavelength signal to a network node interface that connects to another node. In addition, as used in this application, the term "ROADM core device" or "ROADM core" is a type of ROADM that can be used in an optical network and has a sufficient number of subtending inputs and outputs so as to connect at least two add-on devices thereto. Such a ROADM core device enables the formation of a multifunctional and reconfigurable optical node if the two add-on devices are of different types, thereby providing a plurality of different functions to the ROADM core device. As also used in this application, an add-on device or module, also called a ROADM add-on, is an optical device connectable to a ROADM, via at least one subtending input and one subtending output of the ROADM, and that is configured to transmit optical signals of multiple wavelengths to the ROADM and to receive optical signals of multiple wavelengths from the ROADM. In addition, as used in this application, the terms "network node interface", "network interface", "input line interface", and "DWDM line interface" are used interchangeably and are used to denote the interface between a ROADM in one node and another node to permit optical communication between the two nodes. Various example embodiments of the invention described below provide a ROADM and a ROADM core with additional functionality. For example, according the various embodiments of the invention, a ROADM may also be configurable and reconfigurable to 1)

receive optical signals of single and multiple wavelengths, divide the received optical signals into a plurality of optical signals and output the plurality of optical signals, 2) combine received optical signals into a single optical signal, and output the single optical signal, 3) receive and process signals of a single wavelength or multiple wavelengths at an add port thereof and/or drop signals of a single wavelength or multiple wavelengths from a drop port thereof, and/or 4) change the subtending output or drop port from which a single-wavelength optical signal is output or dropped and/or change the selection of single-wavelength optical signals originating on different subtending inputs or add ports thereof that are output from subtending outputs or drop ports thereof. But it should be understood that ROADMs are not limited to these functions or the additional functions discussed below, and that it is within the scope of the invention for the ROADMs described herein to include additional and/or alternative functions. It should also be understood that ROADMs are not limited to performing all of the functions noted above and discussed below, but are configurable to perform any subset of the above and below discussed functions.

FIG. 1 illustrates an example of a ROADM 10 in accordance with an example of an embodiment of the invention. The ROADM 10 includes a light distributor 12, a light combiner 14, a plurality of subtending outputs 16, and a plurality of subtending inputs 18. However, it is within the scope of the invention, in an example embodiment, for the ROADM 10 to include a plurality of light distributors 12 and a plurality of light combiners 14. The light distributor 12 can include a primary input interface 20, also called a primary input 20, while the light combiner 14 can include a primary output interface 22, also called a primary output 22. The ROADM 10 can constitute part of or an entire optical node. In these cases, the primary input interface 20 of the light distributors 12 can receive optical signals from a primary output of the ROADM of another optical node and the primary output interface 22 of the light combiners 14 can transmit optical signals to a primary input of the ROADM of another optical node. The light distributors 12 can be used to distribute (in some manner as known to those skilled in the art) the light arriving on the primary input 20 to the subtending outputs 16. The light combiners 14 can be used to combine (in some manner as known to those skilled in the art) the light arriving on the subtending inputs 18 to the primary output 22. Any of multiple types of light combiners, and any of multiple types of light distributors can be used in accordance with example embodiments of the invention, as will be described below. ROADM 10 can be provided with a network node interface (not shown) through which it transmits multiple-wavelength optical signals to and receives multiple-wavelength signals from another optical node.

Types of Light Combiners and Light Distributors

Figure 2A:
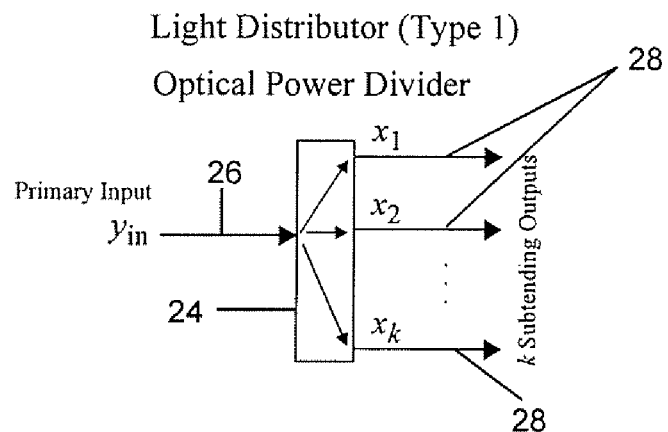
FIG. 2A is a block diagram of an example of a type-1 light distributor.

FIG. 2A shows an example of a type-1 light distributor 24 in accordance with an embodiment of the invention. The type-1 light distributor 24 can route a portion of the total amount of light entering at a primary input $y_{in}$ 26 to each of subtending outputs 28, which are individually denoted as $x_1, x_2 \ldots x_k$, where k is the total number of subtending outputs. Expressed in another way, $x_i$ represents the ith subtending output, where "i" ranges from 1 to k. For the case of an "even" distributor, an equal amount of light is diverted from the primary input $y_{in}$ 26 to each of the subtending outputs ($x_1, x_2 \ldots x_k$) 28. For instance, for the case of an "even" 1-to-2 light distributor having two subtending outputs $x_1$ and $x_2$, half of the light at the primary input $y_{in}$ 26 is diverted to subtending output $x_1$, and half of the light is diverted to subtending output $x_2$. In general, the amount of optical power $P_{x_i}$ at any given output $x_i$ of k total outputs can be determined by the formula $P_{x_i} = b_i P_{y_{in}}$ (where $P_{y_{in}}$ is the amount of optical power applied to primary input $y_{in}$, $b_i$ represents the scaling coefficient of the light distributor for output $x_i$, and $$\sum_{i=1}^{k} b_i = 1).$$

Thereof, for the case of an 50/50 light distributor, 50 percent of the light is sent to output $x_1$ ($b_1$=0.5) and 50 percent of the light is sent to output $x_2$ ($b_2$=0.5). In reality, an actual light distributor is not ideal and the light from the primary input $y_{in}$ 26 may not always be perfectly coupled into the subtending outputs 28, so that a small error term ($e_i$) may be associated with each output $x_i$ of the type-1 light distributor. Therefore, for the non-ideal light distributor, $P_{x_i} = b_i P_{y_{in}} - e_i$. It is within the scope of the invention, in an example embodiment, for the type-1 light distributor 24 to be constructed such that an uneven proportion of light from the primary input $y_{in}$ 26 is directed to each of the subtending outputs 28 so that the amount of light output on each subtending output 28 is not identical. Therefore, for the case of an ideal 80/20 light distributor, 80 percent of the light is sent to output $x_1$ ($b_1$=0.8) and 20 percent of the light is sent to output $x_2$ ($b_2$=0.2). It is also within the scope of the invention, in an example embodiment, for the type-1 light distributor 24 to operate without being programmed with the knowledge of the frequencies (wavelengths) associated with the light upon which it operates. The type-1 light distributor 24 is also called an optical power divider or an optical splitter.

Figure 2B:
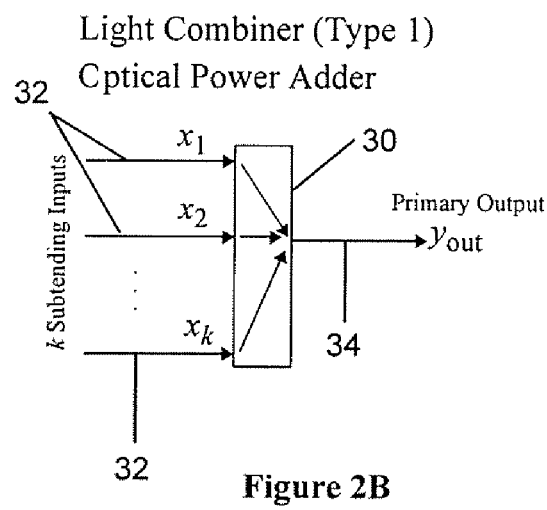
FIG. 2B is a block diagram of an example of a type-1 light combiner.

FIG. 2B shows a type-1 light combiner 30 in accordance with an example of an embodiment of the invention. The type-1 light combiner 30 shown in FIG. 2B can be configured to combine the light from subtending inputs 32 and direct the optical power associated with those subtending inputs 32 to a primary output, $y_{out}$ 34. The subtending inputs 32 are individually identified as $x_1, x_2 \ldots x_k$, k in this case being the total number of subtending inputs 32. Expressed in another way, $x_i$ in this example represents the ith subtending input, where "i" ranges from 1 to k. In an example of a ROADM core device including a type-1 light combiner 30, the total number of subtending inputs can be the same as the total number of subtending outputs. But it is within the scope of the invention, in an example embodiment, for the total number of subtending inputs to be different than the total number of subtending outputs. In addition, in one example embodiment, the light combiner 30 can be an "even" combiner, in which the percentage of light sent to the primary output $y_{out}$ 34 from each of the subtending inputs 32 is equal. For the case of an "even" 1-to-2 light combiner 30, half of the light output from the primary output $y_{out}$ 34 comes from the subtending input $x_1$, and half of the light output from the primary output $y_{out}$ 34 comes from the subtending input $x_2$. In general, for the case of a k input light combiner, the amount of optical power $P_{y_{out}}$ at output $y_{out}$ can be determined by the formula $$P_{y_{out}} = \sum_{i=1}^{k} b_i P_{x_i}$$

(where $b_i$ represents the scaling coefficient of the light combiner for input $$x_i, \sum_{i=1}^{k} b_i = 1,$$

and Phd $x_i$ is the power applied to input $x_i$). In reality, though, for a non-ideal light combiner, the light from the subtending inputs 32 may not always be perfectly coupled into the primary output 34, so that a small error term (e) may be associated with the type-1 light combiner 30. Therefore, for the non-ideal light combiner $$P_{y_{out}} = \sum_{i=1}^{k} b_i P_{x_i} - e.$$

It is within the scope of the invention, in an example embodiment, for the type-1 light combiner 30 to be also constructed such that an uneven proportion of light is directed from each of the subtending inputs 32 to the light combiner output 34. As a result, the primary output may receive a different percentage of light from each subtending input. Therefore, for the case of an ideal 70/30 light combiner, 70 percent of the light from input $x_1$ is coupled to $y_{out}$ ($b_1$=0.7) and 30 percent of the light from input $x_2$ is coupled to $y_{out}$ ($b_2$=0.3). It is also within the scope of the invention, in an example embodiment, for the type-1 light combiner 30 to operate without being programmed with the knowledge of the frequencies (wavelengths) associated with the light upon which it operates. The type-1 light combiner 30 is also called an optical power adder or an optical coupler.

Figure 3A:
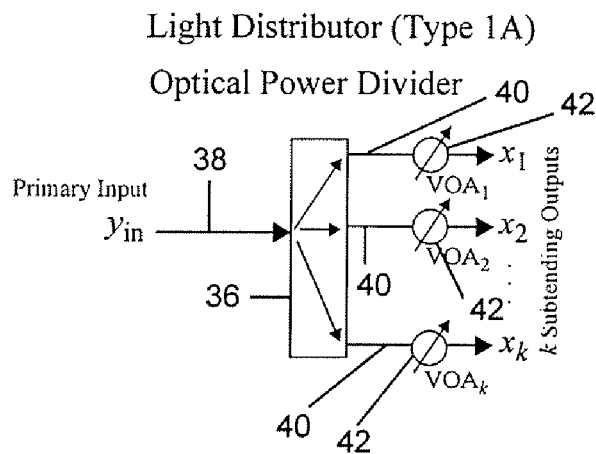
FIG. 3A is a block diagram of an example of a type-1A light distributor.

FIG. 3A shows an example of a type-1A light distributor 36. The type-1A light distributor 36 can route a portion of the total amount of light entering at a primary input $y_{in}$ 38 to each of subtending outputs 40, which are individually denoted as $x_1, x_2 \ldots x_k$, k being the total number of subtending outputs. Expressed in another way, $x_i$ in this case represents the ith subtending output, where "i" ranges from 1 to k. Each subtending output 40 includes a variable optical attenuator (VOA) 42. Each VOA 42 can enable the light exiting a given subtending output to be further attenuated by some adjustable amount denoted by $a_i$, where "a" represents a coefficient of attenuation and "i" represents a particular subtending output 40 and ranges from 1 to k, where k is the total number of subtending outputs. Thus, for example, $a_1$ is the coefficient of attenuation applied to the $1^{st}$ subtending output 40, which is denoted by $x_1$. Each VOA 42 can also allow the light exiting a given subtending output to be completely extinguished. In this case, the coefficient of attenuation takes the value of 0. Each VOA 42 can be adjusted independently from all other VOAs 42, although it is within the scope of the invention, in an example embodiment, to provide interdependent control of the VOAs 42. A control signal associated with each subtending output 40 of the type-1A light distributor 36 can be used to set the attenuation value of each VOA 42, as is known to those skilled in the art. It is within the scope of the invention, in an example embodiment, for each subtending output 40 to include a VOA 42, and it is within the scope of the invention, in an example embodiment, for less than all of the subtending output 40 to include a VOA 42 and for any number of subtending outputs 409 to include a VOA 42. For the case of an "even" light distributor, an equal amount of light is diverted from the primary input $y_{in}$ 38 to each of the subtending outputs $x_1, x_2 \ldots x_k$. For instance, for the case of an "even" 1-to-2 light distributor having two subtending outputs $x_1$ and $x_2$, half of the light at the primary input $y_{in}$ 38 is diverted to subtending output $x_1$, and half of the light is diverted to subtending output $x_2$. In general the amount of optical power $P_{x_i}$ at any given output $x_i$ of k total outputs can be determined by the formula $P_{x_i}=a_i b_i P_{y_{in}}$ (where $P_{y_{in}}$ is the amount of optical power applied to primary input $y_{in}$, $b_i$ represents the scaling coefficient of the light distributor for output $x_i$, $a_i$ represents the coefficient of attenuation for output $x_i$, $0 \leq a_i \leq 1$, and $$\sum_{i=1}^{k} b_i = 1).$$

Therefore, for the case of an 50/50 light distributor (k=2) with the VOA of output $x_1$ set to attenuate its input signal by 60% and with the VOA of output $x_2$ set to attenuate its input signal by 70%, 20 percent of the light from $P_{y_{in}}$ is sent to output $x_1$ ($b_1$=0.5, $a_1$=0.4) and 15 percent of the light from $P_{y_{in}}$ is sent to output $x_2$ ($b_2$=0.5, $a_2$=0.3). In reality, an actual light distributor is not ideal and the light from the primary input $y_{in}$ 38 may not always be perfectly coupled into the subtending outputs 40, so that a small error term ($e_i$) may be associated with each output of the type-1A light distributor 36. Therefore, for the non-ideal light distributor, $P_{x_i}=a_i b_i P_{y_{in}}-e_i$. It is within the scope of the invention, in an example embodiment, for the type-1A light distributor 36 to be constructed such that an uneven proportion of light from the primary input $y_{in}$ 38 is directed to each of the subtending outputs 40 so that the amount of light output on each subtending output 40 is not identical (assuming the attenuation coefficients $a_i$ are the same). It is also within the scope of the invention, in an example embodiment, for the type-1A light distributor 36 to operate without being programmed with the knowledge of the frequencies (wavelengths) associated with the light upon which it operates. It is further within the scope of the invention, in an example embodiment, for the type-1A distributor 36 to be identical to its type-1 equivalent, except that the VOA 42 is inserted in each subtending output. And it also within the scope of the invention, in an example embodiment, for the type-1A distributor 36 to be different from its type-1 equivalent in ways in addition to the use of the VOA. The type-1A light distributor 36 is also called an optical power divider with VOAs or an optical splitter with VOAs.

Figure 3B:
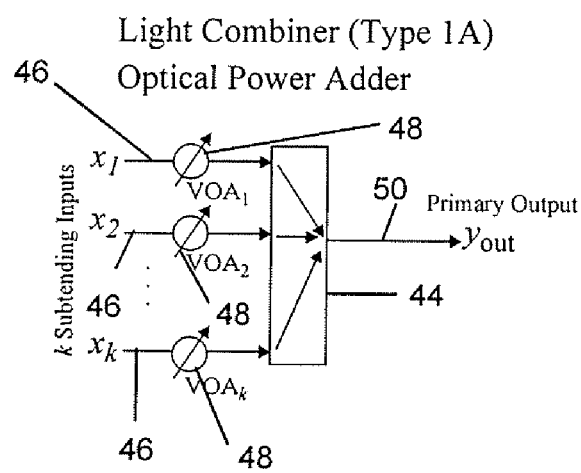
FIG. 3B is a block diagram of an example of a type-1A light combiner.

FIG. 3B shows an example of a type-1A light combiner 44 in accordance with another embodiment of the invention. The type-1A light combiner shown in FIG. 3B can be configured to attenuate light from subtending inputs 46 using variable optical attenuators (VOAs) 48, combine the attenuated light from the subtending inputs 46, and direct the optical power associated with those subtending inputs 46 to a primary output, $y_{out}$ 50. Each VOA 48 can enable the light entering the light combiner 44 on a given subtending input to be attenuated by some adjustable amount denoted by $a_i$, where "a" represents a coefficient of attenuation and "i" represents a particular subtending input 46 and ranges from 1 to k, where k is the total number of subtending inputs; thus, for example, $a_1$ is the coefficient of attenuation applied to the $1^{st}$ subtending input 46, which is denoted by $x_1$, and $a_2$ is the coefficient of attenuation applied to the $2^{nd}$ subtending input 46, which is denoted by $x_2$. Expressed in another way, $x_i$ in this case represents the ith subtending input, where "i" ranges from 1 to k. Each VOA 48 can also enable the light entering the light combiner 44 on a given subtending input to be completely extinguished. In this case, the coefficient of attenuation takes the value of 0. Each VOA 48 can be adjusted independently from all other VOAs 48, although it is within the scope of the invention, in an example embodiment, to provide interdependent control of the VOAs 48. A control signal associated with each subtending input 46 of the type-1A light combiner 44 can be used to set the attenuation value of each VOA 48. It is within the scope of the invention, in an example embodiment, for each subtending input 46 to include a VOA 48, and it is within the scope of the invention, in an example embodiment, for less than all of the subtending inputs 46 to include a VOA 48 and for any number of subtending inputs 46 to include a VOA 48. In addition, in a ROADM core device including a type-1A light combiner 44, the total number of subtending inputs can be the same as the total number of subtending outputs. But it is within the scope of the invention, in an example embodiment, for the total number of subtending inputs in a ROADM core device to be different than the total number of subtending outputs. In addition, the light combiner 44 can be an "even" combiner, in which the percentage of light sent to the primary output $y_{out}$ 50 from each of the subtending inputs 46 is equal. For the case of an "even" 2-to-1 light combiner 44, half of the light output from the primary output $y_{out}$ 50 comes from the subtending input $x_1$, and half of the light output from the primary output $y_{out}$ 50 comes from the subtending input $x_2$. In general, for the case of a k input type 1A light combiner, the amount of optical power $P_{y_{out}}$ at output $y_{out}$ can be determined by the formula $$P_{y_{out}} = \sum_{i=1}^{k} b_i a_i P_{x_i}$$

(where $b_i$ represents the scaling coefficient of the light combiner for input $x_i$, $a_i$ represents the coefficient of attenuation for input $x_i$, $0 \leq a_i \leq 1$, $$\sum_{i=1}^{k} b_i = 1,$$

and $P_{x_i}$ is the power applied to input $x_i$). In reality though, for a non-ideal light combiner, the light from the subtending inputs 46 may not always be perfectly coupled into the primary output 50, so that a small error term (e) may be associated with the type-1A light combiner 44. Therefore, for the non-ideal type 1A light combiner $$P_{y_{out}} = \sum_{i=1}^{k} b_i a_i P_{x_i} - e.$$

It is within the scope of the invention, in an example embodiment, for the type-1A light combiner 44 to be also constructed such that an uneven proportion of light is directed from each of the subtending inputs 46 to the light combiner output 50. As a result, in this example embodiment, the primary output may receive a different percentage of light from each subtending input. It is also within the scope of the invention, in an example embodiment, for the type-1A light combiner 44 to operate without being programmed with the knowledge of the frequencies (wavelengths) associated with the light upon which it operates. It is further within the scope of the invention, in an example embodiment, for the type-1A light combiner 44 to be identical to its type-1 equivalent shown in FIG. 2B, except that the VOA 48 is inserted in each subtending input 46 in the type-1A light combiner 44. In addition, it is within the scope of the invention, in an example embodiment, for the type-1A light combiner 44 to be different from its type-1 equivalent shown in FIG. 2B in ways in addition to the use of the VOA. The type-1A light combiner 44 is also called an optical power adder with VOAs or an optical coupler with VOAs.

Figure 4A:
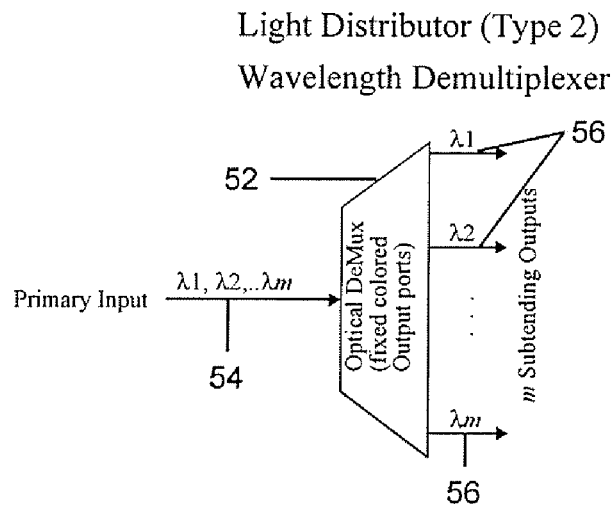
FIG. 4A is a block diagram of an example of a type-2 light distributor.

FIG. 4A shows an example of a type-2 light distributor 52. The type-2 light distributor 52 can be configured to demultiplex individual wavelengths from a composite wavelength division multiplexed light stream including m multiple wavelengths denoted as $\lambda_1, \lambda_2, \ldots \lambda_m$, where m represents the total number of wavelengths in the stream. A wavelength division multiplexed (WDM) light stream or a dense wavelength division multiplexed (DWDM) light stream can be applied to the primary input 54 of the type-2 light distributor 52. The type-2 light distributor 52 is then able to divert particular wavelengths to particular subtending outputs 56, depending upon its design. In the FIG. 4A example, a DWDM signal including wavelengths $\lambda_1$ to $\lambda_m$ is applied to the type-2 light distributor 52, and the light distributor 52 directs wavelength $\lambda_1$ to subtending output 1, wavelength $\lambda_2$ to subtending output 2, and more generally, directs wavelength $\lambda_m$ to subtending output m. For the type-2 light distributor 52, a given wavelength is directed to a pre-defined and predetermined subtending output 56. There may be an inherent insertion power loss associated with the path each wavelength takes from the primary input 54 to its corresponding subtending output 56. While one example embodiment employs the same number of wavelengths as the number of subtending outputs 56, it is within the scope of the invention, in an example embodiment, for the number of wavelengths to differ from the number of subtending outputs 56.

Figure 4B:
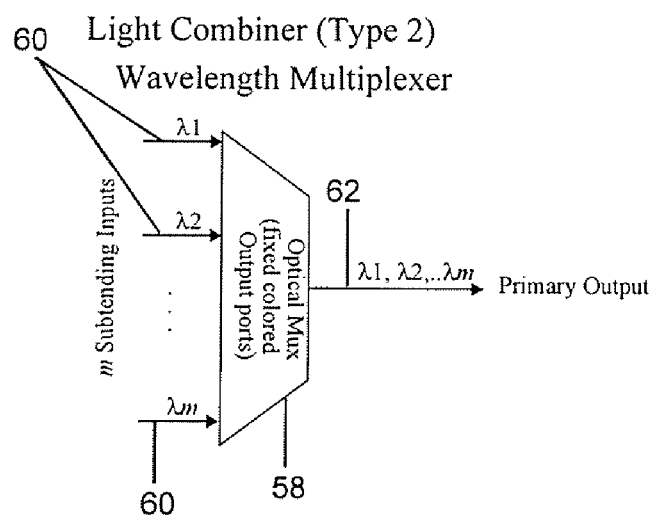
FIG. 4B is a block diagram of an example of a type-2 light combiner.

FIG. 4B shows an example of a type-2 light combiner 58, which can be used to multiplex individual wavelengths, such as $\lambda_1, \lambda_2, \ldots, \lambda_m$, arriving on individual subtending inputs 60 in order to form a composite wavelength division multiplexed light stream on primary output 62 including light of the multiple wavelengths $\lambda_1, \lambda_2, \ldots, \lambda_m$ (m in this case being an integer representing the total number of wavelengths input into the light combiner 58). A single predefined wavelength is applied to each subtending input 60 of the type-2 light combiner 58. In the FIG. 4B example, wavelength $\lambda_1$ is applied to subtending input 1, wavelength $\lambda_2$ is applied to subtending input 2, and wavelength $\lambda_m$ is applied to subtending input m. The resulting light stream exiting from the primary output 62 then includes a DWDM signal including wavelengths $\lambda_1$ through $\lambda_m$. There may be an inherent insertion power loss associated with the path each wavelength takes from its subtending input 60 to the primary output 62. An example of a physical component that performs wavelength multiplexing or wavelength demultiplexing is an Arrayed Waveguide Grating (AWG). While one example embodiment employs the same number of wavelengths as the number of subtending inputs 60, it is within the scope of the invention, in an example embodiment, for the number of wavelengths to differ from the number of subtending inputs 60. In another example embodiment, in a ROADM core device including a type-2 light combiner 58, the total number of subtending inputs can be the same as the total number of subtending outputs. But it is within the scope of the invention, in an example embodiment, for the total number of subtending inputs of such a ROADM core device to be different than the total number of subtending outputs.

Figure 5A:
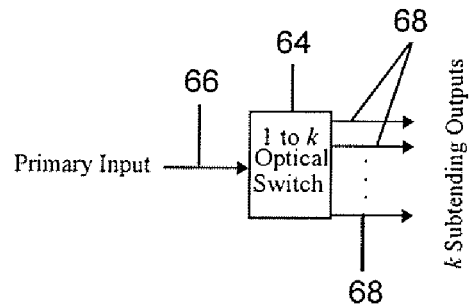
FIG. 5A is a block diagram of an example of a type-3 light distributor.

FIG. 5A shows an example of a type-3 light distributor 64. The type-3 light distributor 64 can be configured to direct the light arriving on the primary input 66 to only one of the k subtending outputs 68 (in this instance, k is an integer denoting the total number of subtending outputs 68). The type-3 light distributor 64 can be programmed in a manner known to those skilled in the art to direct the light arriving at the primary input 66 to any of the k subtending outputs 68. For instance, all the light arriving at the primary input 66 could first be directed to subtending output 1, and then at some time later, the distributor 64 could be programmed or reconfigured such that all the light arriving at the primary input 66 could then be directed to subtending output 2. To accomplish this task, a control signal can be associated with the type-3 light distributor 64 to program the type-3 light distributor 64 to direct the light arriving on the primary input 66 to a selected one of the subtending outputs 68. This type-3 light distributor 64 is also called a 1-to-k optical switch.

Figure 5B:
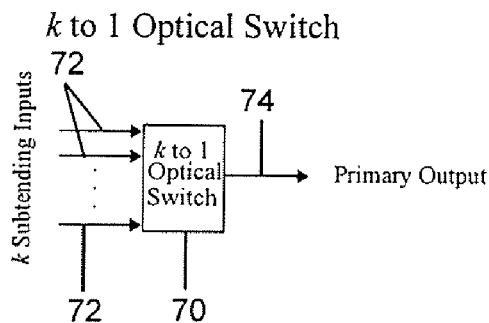
FIG. 5B is a block diagram of an example of a type-3 light combiner.

FIG. 5B shows an example of a type-3 light combiner 70 that can be configured to direct the light from only one of its subtending inputs 72 to its primary output 74. The type-3 light combiner 70 can be programmed in ways known to those skilled in the art to direct the light arriving on any of its k subtending inputs 72 to its primary output 74 (in this example embodiment, k is an integer denoting the total number of subtending inputs 72). For instance, all the light arriving on subtending input 1 could first be directed to the primary output 74, and then at some time later, the light arriving on subtending input 1 can be prevented from being directed to the primary output 74, and instead, all the light arriving on subtending input 2 can be directed to the primary output 74. To accomplish this task, a control signal can be associated with a type-3 light combiner, as is known to those skilled in the art. The control signal is used to program or reconfigure the combiner 70 to direct the light arriving on one of the subtending inputs 72 to the primary output 74. This type-3 light combiner is also called a k-to-1 optical switch. Both the type-3 light distributor 64 and the type-3 light combiner 70 may have an inherent optical insertion loss (IL) associated with the paths through them. In one example embodiment, in a ROADM core device including a type-3 light combiner 70, the total number of subtending inputs is the same as the total number of subtending outputs. But it is within the scope of the invention, in an example embodiment, for the total number of subtending inputs to be different than the total number of subtending outputs.

Figure 6:
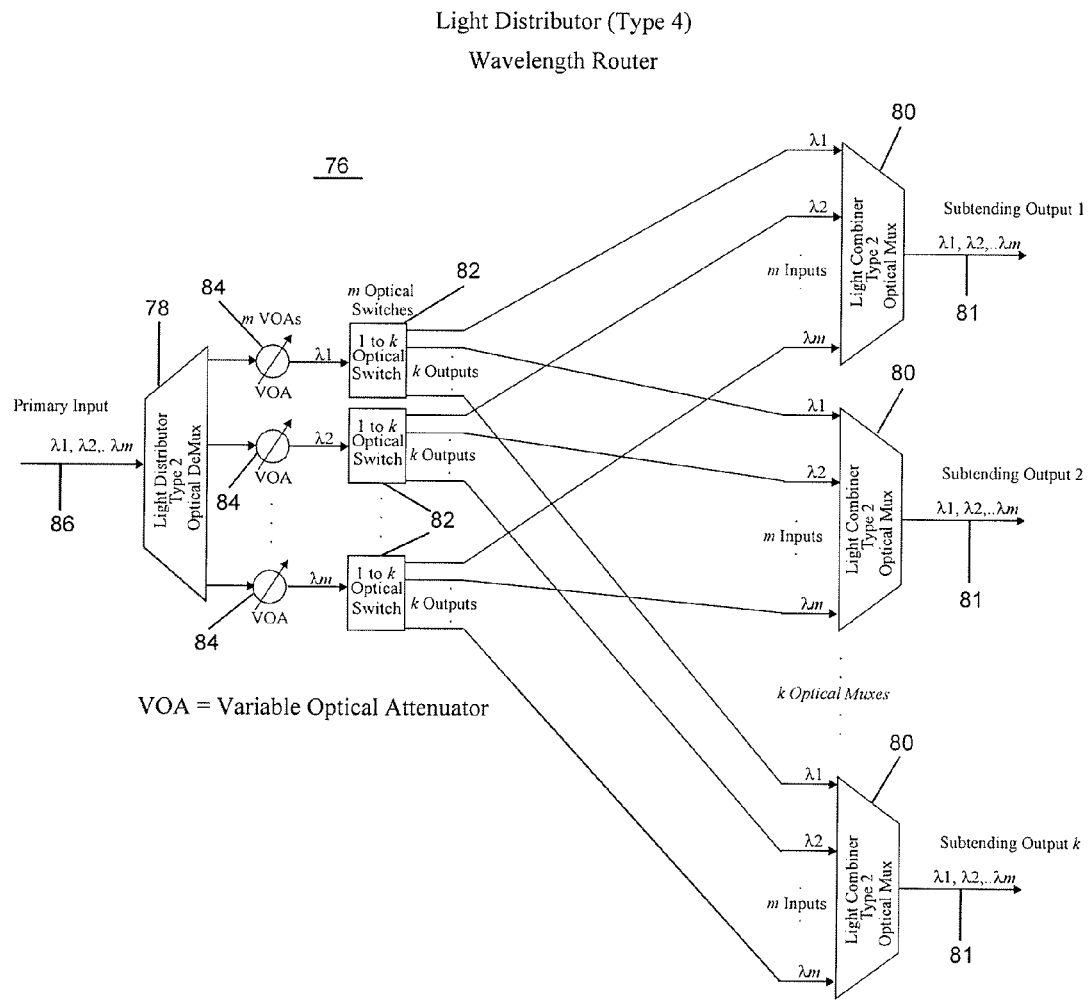
FIG. 6 is a block diagram of an example of a type-4 light distributor.
Figure 7:
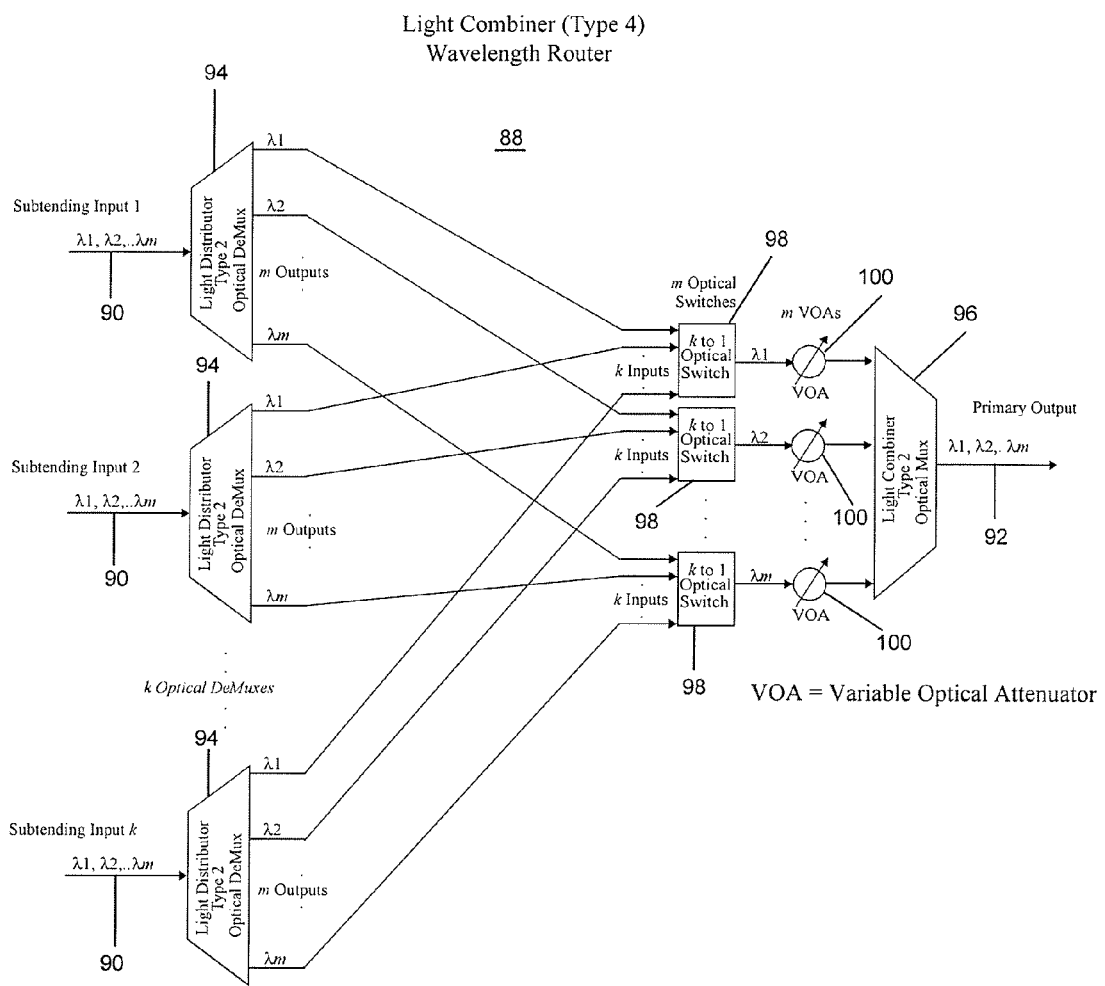
FIG. 7 is a block diagram of an example of a type-4 light combiner.

The functions provided by the type 1, 2, and 3 light distributors and by the type 1, 2, and 3 light combiners can be further combined to form more complex light distributors and light combiners. FIGS. 6 and 7 illustrate examples of such elements.

FIG. 6 shows an example of a type-4 light distributor 76. The type-4 light distributor 76 can include a type-2 light distributor 78, type-2 light combiners 80, type-3 light distributors 82, and VOAs 84 positioned between the type-2 light distributor 78 and the type-3 light distributors 82. The type-2 light distributor 78, the type-2 light combiners 80, the type-3 light distributors 82, and the VOAs 84 can be the same as, for example, the type-2 light distributor 52, the type-2 light combiner 58, the type-3 light distributor 64, and the VOAs 42, respectively, shown in FIGS. 4A, 4B, 5A, and 3A, although they are not limited thereto. In addition, a control signal associated with each VOA 84 can be used to set the attenuation value of each VOA 84. The type-4 light distributor 76 can be configured and programmed to direct each wavelength arriving in the light stream entering the primary input 86 to only one of the type-2 light combiners 80 and its associated subtending output 81, which are individually denoted by 1 through k (k being an integer representing the total number of subtending outputs in this case). This is accomplished by 1) receiving a multiple-wavelength signal, composed of multiple wavelengths up to m wavelengths ($\lambda_1, \lambda_2, \ldots \lambda_m$), with the type-2 light distributor 78 on the primary input 86 (m representing the total number of wavelengths within the light stream entering the primary input 86), 2) separating the multiple-wavelength signal into a plurality of single-wavelength optical signals with the type-2 light distributor 78, 3) individually attenuating each single-wavelength optical signal output from the type-2 light distributor 78 with a corresponding VOA 84, 4) directing each attenuated single-wavelength optical signal to a different and corresponding type-3 light distributor 82, 5) assigning each attenuated single-wavelength optical signal to only one of the type-2 light combiners 80 using its corresponding type-3 light distributor 82, so that different sets of attenuated single-wavelength optical signals can be directed to different type-3 light combiners 80, 6) combining optical signals in each set of assigned, attenuated, single-wavelength optical signals output from the type-3 light distributors 82 into a single output signal with one of the type-2 light combiners 80, and 7) outputting each single output signal from the type-2 light combiner 80 on its associated subtending output 81. The 1-to-k optical switches 82 can be programmable to direct an optical signal input thereinto to any one of the type-2 light combiners 80 and their associated subtending outputs 81. As illustrated in FIG. 6, up to m wavelengths can be included within the light stream entering the primary input 86, and up to m wavelengths can exit any given subtending output 81. The subtending outputs 81 are individually denoted by the phrase "subtending output 1", "subtending output 2", ... "subtending output k", where k denotes the total number of subtending outputs. As noted above, the 1-to-k optical switches 82 can direct a given wavelength applied thereto to only one type-2 light combiner 80 and only one subtending output 81. Therefore, for example, if wavelength $\lambda_2$ is directed to subtending output 1, then it cannot simultaneously be directed to subtending output 2, for instance, or any other subtending output. In addition, the light distributor 76 can be programmed to attenuate the optical power of each wavelength using the VOA 84 associated with that wavelength before it is directed to a given subtending output 81 by one of the 1-to-k optical switches 82. It is also within the scope of the invention, in an example embodiment, for the VOA 84 associated with a given wavelength to be programmed such that the wavelength is blocked from exiting any of the subtending outputs. Further, it is within the scope of the invention, in an example embodiment, for the type-4 light distributor 76 not to include the VOAs 84. And it is within the scope of the invention, in an example embodiment, for the light distributor 76 to include more or less than the number of type-2 light distributors 78, VOAs 84, type-3 light distributors 82, and type-2 light combiners 80 shown in FIG. 6. It is also within the scope of the invention, in an example embodiment, for the type-4 light distributor to include additional elements not shown in FIG. 6. It is further within the scope of the invention, in an example embodiment, for any of the type-2 light distributor 78, the VOAs 84, the type-3 light distributors 82, and the type-2 light combiners 80 of the type-4 light distributor 76 shown in FIG. 6 to be replaced by any other suitable component that performs the functions of these elements discussed above. As an example, a single VOA function and a single 1 to k optical switch function may be implemented with a single mirror device (MEMs) which can both switch light and attenuate light simultaneously. Alternatively, both the VOA function and the 1 to k optical switch function may be implemented using liquid crystal technology in another example embodiment.

In summary, the path through the type-4 light distributor 76 is as follows. A WDM or DWDM light stream is applied to the primary input 86 of the distributor 78. The type-2 light distributor 78 then demultiplexes the WDM/DWDM light stream into its individual wavelengths. Each of the individual wavelengths is attenuated by some programmable amount via a corresponding VOA 84. Each wavelength is then directed to its corresponding type-2 light combiner 80 and its corresponding k subtending output 81 via its corresponding type-3 light distributor 82 (1-to-k optical switch). At each type-2 light combiner 80, the combiner 80 multiplexes up to m wavelengths into a WDM/DWDM signal on a corresponding subtending output 81.

The light distributor 76 is a 1-to-k, type-4 light distributor configured to operate upon m wavelengths and using m VOA control signals, and m 1-to-k optical switch control signals. The type-4 light distributor 76 is also called a wavelength router or a wavelength selective switch (WSS).

FIG. 7 shows an example of a type-4 light combiner 88. The type-4 light combiner 88 processes optical signals similarly to the type-4 light distributor 76, except that the flow of light is from the subtending inputs 90 to the primary output 92.

As can be seen in FIG. 7, the type-4 light combiner 88 uses type-2 light distributors 94 and a type-2 light combiner 96, type-3 light combiners 98, and VOAs 100 positioned between the type-3 light combiners 98 and the type-2 light combiner 96. The type-2 light distributors 94, the type-2 light combiner 96, the type-3 light combiners 98, and the VOAs 100 can be the same as, for example, the type-2 light distributor 52, the type-2 light combiner 58, the type-3 light combiner 70, and the VOAs 42, respectively, as shown in FIGS. 4A, 4B, 5B, and 3A, although they are not limited thereto. In addition, a control signal associated with each VOA 100 can be used to set the attenuation value of each VOA 100. The subtending inputs 90 are individually denoted by the phrase "subtending input 1", "subtending input 2", . . . "subtending input k", where k denotes the total number of subtending inputs. The type-4 light combiner 88 can be configured and programmed to direct each wavelength arriving in the light stream entering the subtending inputs 1 through k through a particular path to the primary output 92. This is accomplished by 1) receiving different multiple-wavelength signals, each composed of multiple wavelengths up to m wavelengths ($\lambda_1, \lambda_2, \ldots \lambda_m$), with the type-2 light distributors 94 on the subtending inputs 90 (m representing the total number of wavelengths within the light stream entering the primary inputs 90), 2) separating each multiple-wavelength signal into a plurality of single-wavelength optical signals with a different one of the type-2 light distributors 94, 3) directing single-wavelength optical signals of the same wavelength from the type-2 light distributors 94 to the same type-3 light combiner 98, 4) using the type-3 light combiners 98 to select only one of the received single-wavelength optical signals of the same wavelength for outputting towards the primary output 92, 5) individually attenuating each selected single-wavelength optical signal output from the type-3 light combiners 98 with a corresponding VOA 100, and 6) combining the attenuated, selected single-wavelength optical signals with the type-2 light combiner 96 into a combined multiple-wavelength optical signal and outputting the combined multiple-wavelength optical signal on the primary output 92. As illustrated in FIG. 7, up to m number of wavelengths can be included within the light stream entering each subtending input 90, and up to m wavelengths can exit the primary output 92. As noted above, the k-to-1 optical switches 98 can be configured so that only one wavelength from each subtending input 90 can be directed to the primary output 92. Therefore, for example, if wavelength 2 from subtending input 1 is directed to the primary output 92, then wavelength 2 from subtending input 2 (or any other input) cannot simultaneously be directed to the primary output 92. The k-to-1 optical switches 98 are programmable to select any of the single-wavelength optical signals of the same wavelength received by each type-3 light combiner 98 for outputting towards the primary output 92. It can also be noted that once a given wavelength is directed to the primary output 92, the optical power of that wavelength can be attenuated by some programmable amount via the VOA 100 associated with that output wavelength, although it is not required to do so. It can also be noted that the VOA 100 associated with a given wavelength can be programmed such that the wavelength is blocked from exiting the primary output 92 completely. Further, it is within the scope of the invention, in an example embodiment, for the type-4 light combiner 88 to not include the VOAs 100. It is also within the scope of the invention, in an example embodiment, for the light combiner 88 to include more or less than the number of type-2 light distributors 94, VOAs 100, type-3 light combiners 98, and type-2 light combiners 96 shown in FIG. 7. It is also within the scope of the invention, in an example embodiment, for the type-4 light combiner 88 to include additional elements. It is further within the scope of the invention, in an example embodiment, for any of the type-2 light distributors 94, VOAs 100, type-3 light combiners 98, and type-2 light combiner 96 of the type-4 light combiner 88 shown in FIG. 7 to be replaced by any other suitable component that performs the functions thereof discussed above. As an example, a single VOA function and a single k to 1 optical switch function may be implemented with a single mirror device (MEMs) which can both switch light and attenuate light simultaneously. Alternatively, both the VOA function and the k to 1 optical switch function may be implemented using liquid crystal technology, in another example embodiment.

In summary, the path through the type-4 light combiner is as follows. A WDM or DWDM light stream is applied to each of the subtending inputs 90 of the combiner 88. The light stream of each input can include up to m wavelengths simultaneously. The type-2 light distributor 94 at each subtending input 90 then demultiplexes the WDM/DWDM light streams into their individual wavelengths. The k-to-1 optical switch 98 associated with each wavelength is then used to select a wavelength from one of the k subtending inputs thereof. Each of the selected individual wavelengths is attenuated by some programmable amount via its corresponding VOA 100. The type-2 light combiner 96 then multiplexes up to m wavelengths into a WDM/DWDM signal and outputs the result on the primary output 92.

As can be seen from FIG. 7, the type-4 light combiner 88 is a k-to-1, type-4 light combiner operating upon m wavelengths that requires m VOA control signals, and m k-to-1 optical switch control signals. This type-4 light combiner is also called a wavelength router or a wavelength selective switch (WSS).

Types of ROADMs

Figure 8:
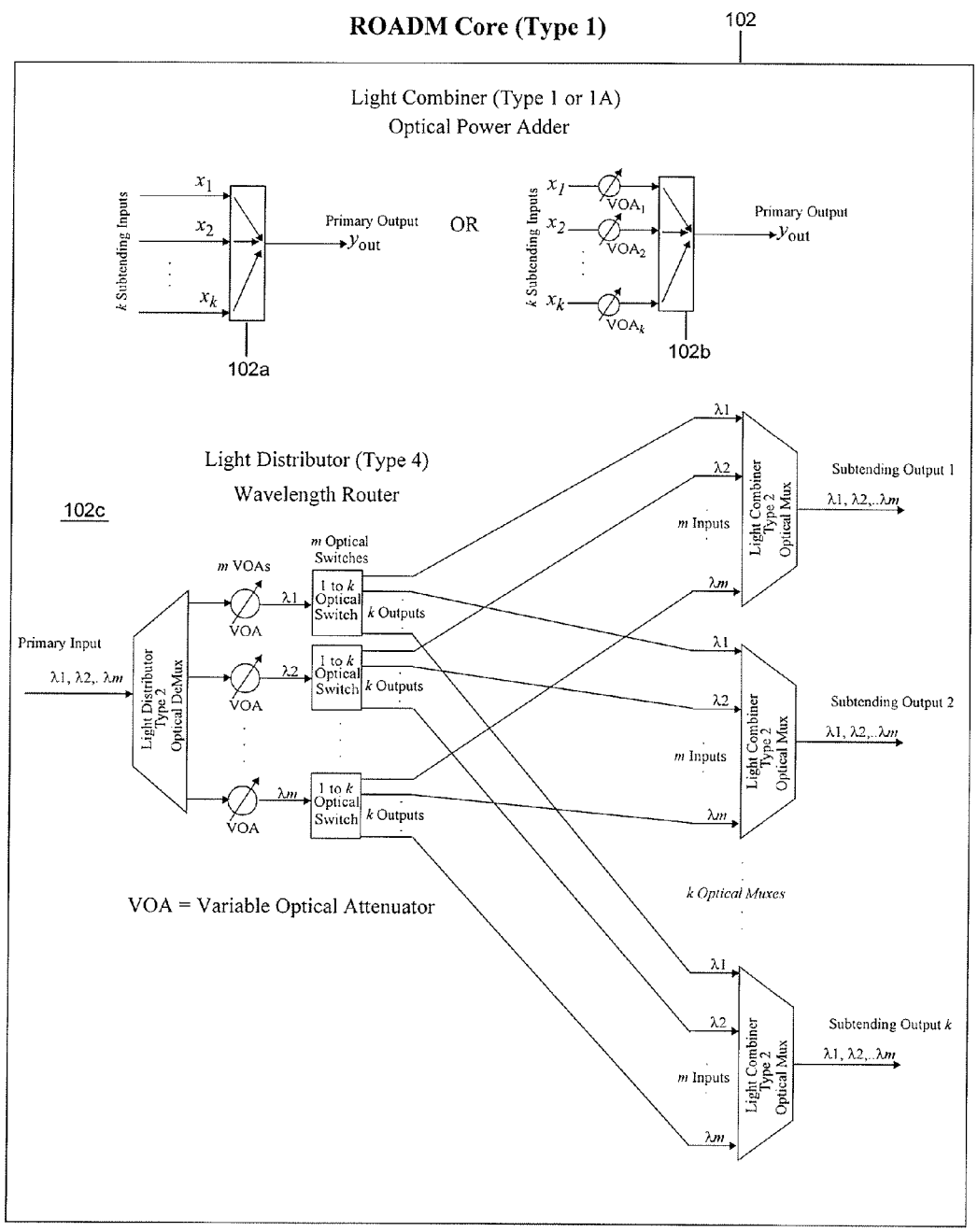
FIG. 8 is a block diagram of an example of a type-1 ROADM core device.

FIG. 8 shows an example of an embodiment of a type-1 ROADM core device 102. It includes a type-1 light combiner 102a or a type-1A light combiner 102b and a type-4 light distributor 102c. The type-1 light combiner 102a, the type-1A light combiner 102b, and the type-4 light distributor 102c can be the same as, for example, the type-1 light combiner 30, the type-1A light combiner 44, and the type-4 light distributor 76, respectively, as shown in FIGS. 2B, 3B, and 6, although they are not limited thereto. It is within the scope of the invention, in an example embodiment, for the type-1 ROADM core device 102 to include more than the number of components (i.e., one type-1 light combiner 102a, one type-1A light combiner 102b, and one type-4 light distributor 102c) shown in FIG. 8. It is further within the scope of the invention, in an example embodiment, for any of the type-1 light combiner 102a or the type-1A light combiner 102b, and the type-4 light distributor 102c shown in FIG. 8 to be replaced by any other suitable component (or components) that performs (or perform) the functions thereof, as discussed above.

Figure 9:
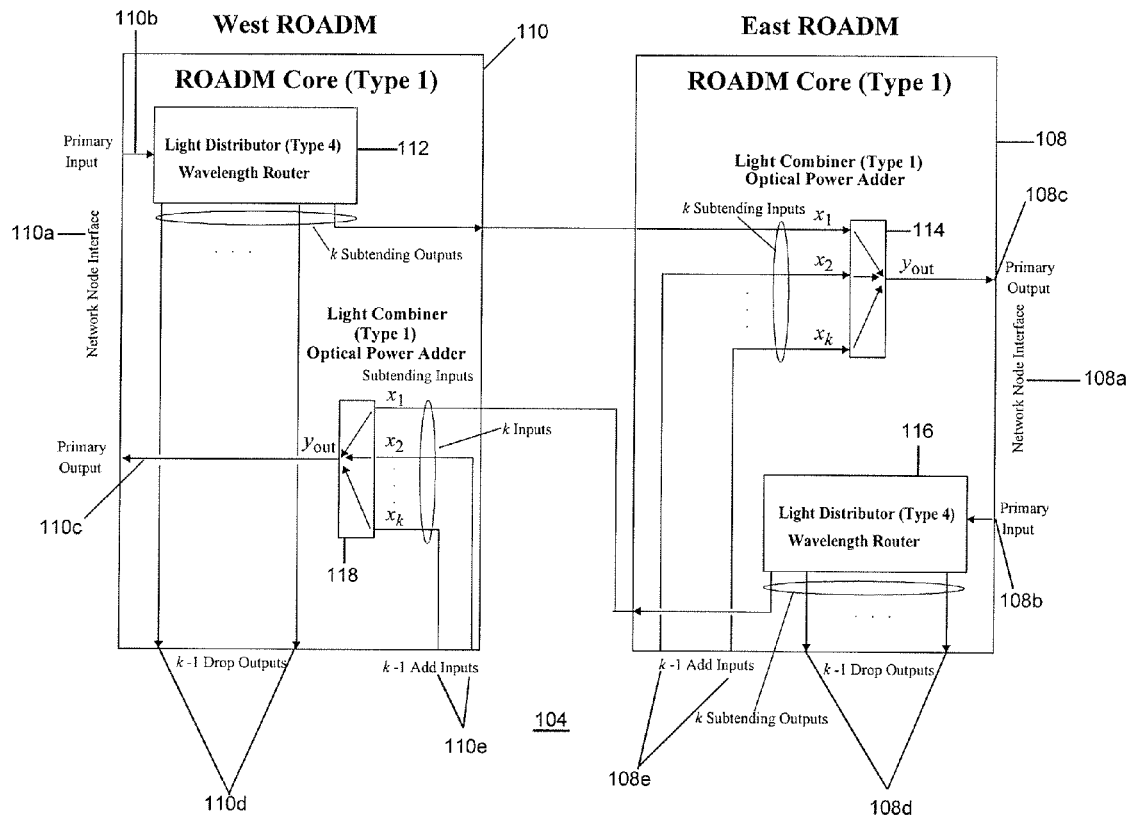
FIG. 9 is a block diagram of an example of two paired type-1 ROADM core devices making up a 2-degree optical node.

FIG. 9 shows how two type-1 ROADM core devices can be configured to build the multiplexing and demultiplexing functions associated with a 2-degree ROADM based optical node including two DWDM line interfaces, according to an example of an embodiment of the invention.

FIG. 9 is a block diagram of an example of a DWDM network element 104 including an optical node that is used to add and drop wavelengths to and from a DWDM network ring or other type of network. The network element 104 includes two type-1 ROADM core devices, including an east ROADM core device 108 and a west ROADM core device 110, each including a bidirectional DWDM line interface 108a, 110a, respectively. The bidirectional DWDM line interface is also called an input line interface, a network node interface, or a network interface. The type-1 ROADM core devices 108, 110 can be the same as, for example, the type-1 ROADM core device 102 shown in FIG. 8, although they are not limited thereto. It is within the scope of the invention, in an example embodiment, for the network element 104 to include more than the number of type-1 ROADM core devices shown in FIG. 9. It is further within the scope of the invention, in an example embodiment, for any of the type-1 ROADM core devices 108, 110 to be replaced by any other suitable component (or components) that performs (or perform) the functions thereof discussed below. It is also within the scope of the invention, in one example embodiment, to connect to each primary input 108b, 110b of each ROADM core device 108, 110 an input optical amplifier (not shown). The input optical amplifier can be used to compensate for any loss associated with the length of fiber connected to the primary input 108b, 110b of the ROADM core device 108, 110. Similarly, it is within the scope of the invention in one example embodiment to connect to the primary output 108c, 110c of the each ROADM core device 108, 110 an output optical amplifier (not shown). The output optical amplifier could be used to compensate for any insertion loss of the two ROADMs 108, 110 located between a primary input (for example, the primary input 110b on the west ROADM core device 110) and a primary output (for example, the primary output 108c on the east ROADM core device 108 for instance). The input optical amplifier (not shown) could have the ability to adjust its optical gain, based upon the length of fiber connected to it. The output optical amplifier, however, may be of the fixed-gain type, since insertion loss of the two ROADMs 108 and 110 is normally a fixed non-changing value. Alternatively, however, the output optical amplifier can be of the varying gain type, in order to accommodate different types of ROADMs of differing insertion losses. It is within the scope of the invention for any of the other example embodiments disclosed herein to include such optical amplifiers. It is also within the scope of the invention, in an example embodiment, for network element 104 to include more than the number of type-1 ROADM core devices shown in FIG. 9. It is further within the scope of the invention, in an example embodiment, for any of the type-1 ROADM core devices 108, 110 shown in FIG. 9 to be replaced by any other suitable component (or components) that performs (or perform) the functions thereof.

The processing of a signal entering the network element 104 will now be described. A DWDM signal can enter a DWDM line interface 108a, 110a of the network element 104 at the primary input 110b on the west side of the network element, for example, at the west ROADM 110, as shown in FIG. 9. At the DWDM line interface 110a, the optical supervisory channel of the DWDM signal is filtered out from the other optical wavelengths and forwarded to an associated optical supervisory channel processor (not shown) for further processing. It is within the scope of the invention for any of the other example embodiments discussed herein to include such filtering and supervisory channel processing. In the example embodiment in which the network element includes an optical input amplifier (not shown), the remaining optical wavelengths can be forwarded to the associated optical input amplifier (not shown), which simultaneously amplifies all the wavelengths as they pass through it. Following amplification, the amplified wavelengths can be sent to the type-4 light distributor unit 112 within the west ROADM 110 (or, in example embodiments in which there is no amplification, after the optical supervisory channel is filtered out, the DWDM signal is forwarded directly to the type-4 light distributor unit 112 within the west ROADM 110). The light distributor unit 112 can be used to isolate individual wavelengths in order to allow them to be "dropped" to individual optical converters (not shown) at drop outputs 110d, also called drop output ports, of the west ROADM 110 (the east ROADM 108 has corresponding drop outputs 108d, to which individual wavelengths can be dropped when a signal is input on the primary input 108b). A wavelength dropped to an optical converter is converted by the converter to either a non-colored optical signal (e.g., a 1310 or 850 nm signal) or an electrical signal. The converted signal is then passed out a client interface of the converter. In FIG. 9, the optical converters would be connected to the drop outputs 110d of the ROADM core device 110. Any optical wavelengths from the input amplifier (not shown) that are not dropped to an optical converter (in west ROADM 110, for example) can be passed though to the light combiner unit 114 (to the east ROADM 108, for example). In FIG. 9, these wavelengths that are "passed through" in the west to east direction follow the path from the light distributor 112 of the west ROADM 110 to the light combiner 114 in the east ROADM 108. The light combiner unit 114 in the east ROADM can be used to multiplex signals from the west ROADM 110 with the input signals from the optical line converters (not shown) connected to the east ROADM 108 at add inputs thereof 108e (the west ROADM 110 includes corresponding add inputs or ports 110e which can add wavelengths to light combiner 118 that can be combined with a signal from light distributor 116 in the east ROADM 108 when a signal is input on primary input 108b of the east ROADM 108). In one example embodiment, once these signals are combined into a single DWDM signal by the light combiner unit 114, a single DWDM signal is output from the primary output 108c to the network node interface 108a of the east ROADM 108. In another example of an embodiment of the invention, after leaving the light combiner unit 114 and before being output on the primary output, the single DWDM signal is forwarded to an associated output optical amplifier (not shown) in order to be amplified by some predetermined amount, and prior to exiting the network element 104, an OSC filter (not shown) is used to combine an output optical supervisory channel signal with the wavelengths of the DWDM signal from the output amplifier. It is within the scope of the invention, in an example embodiment, for the other embodiments disclosed herein to include such an output amplifier and OSC filter.

Optical converters (not shown) connected to the add inputs 108e, 110e of the ROADM core devices 108, 110 convert client signals (either electrical or optical) to "colored" optical signals of some predetermined frequency and wavelength. For instance, a client signal could be converted to the wavelength associated with wavelength 1 of the m wavelengths supported by the ROADMs 108, 110, or alternatively a client signal could be converted to any of the wavelengths associated with any of the m wavelengths supported by the ROADMs 108, 110.

DWDM signals arriving at the primary input 108*b* of the east ROADM 108 can be forwarded to the light distributor unit 116 of the east ROADM 108, which separates the DWDM signals into single-wavelength signals and transmits certain single-wavelength signals to the drop outputs 108*d* of the east ROADM 108 and transmits other single-wavelength signals to the light combiner unit 118 in the west ROADM 110, in the same manner that is described for those signals arriving at the primary input 110*b* of the west ROADM 110.

The FIG. 9 network element 104 can be considered to be a "two degree" network element or node, since it is capable of connecting to two DWDM line interfaces, which can connect to two other optical nodes. Since the light distributors 112 and 116 can direct any received wavelength to any subtending output thereof, and since the add inputs 108*e*, 110*e*, which are connected to the subtending inputs of the light combiners 114, 118, can receive any wavelength directed thereto, the ROADMs 108 and 110 in FIG. 9 are said to have "colorless" add/drop ports. A colorless add/drop port is not assigned a particular frequency or wavelength so that any frequency or wavelength can be used with the port (e.g., any wavelength can be added to any of the colorless add ports and any wavelength can be dropped from any of the colorless drop ports). Thus, drop outputs 108*d*, 110*d*, and add inputs 108*e* and 110*e* are colorless ports. In the FIG. 9 network element 104, each of the outputs of the optical converters (not shown) connected to the add inputs 108*e*, 110*e*, could have VOAs (not shown). These VOAs could be used to adjust the power levels of each added wavelength to match the power levels of the "pass-through" wavelengths, before all the combined wavelengths exit the ROADMs via the primary outputs 108*c*, 110*c*. The optical power of the pass-through wavelengths can be adjusted via the VOAs within the type-4 light distributors 112, 116, although it is not required to do so.

Figure 10:
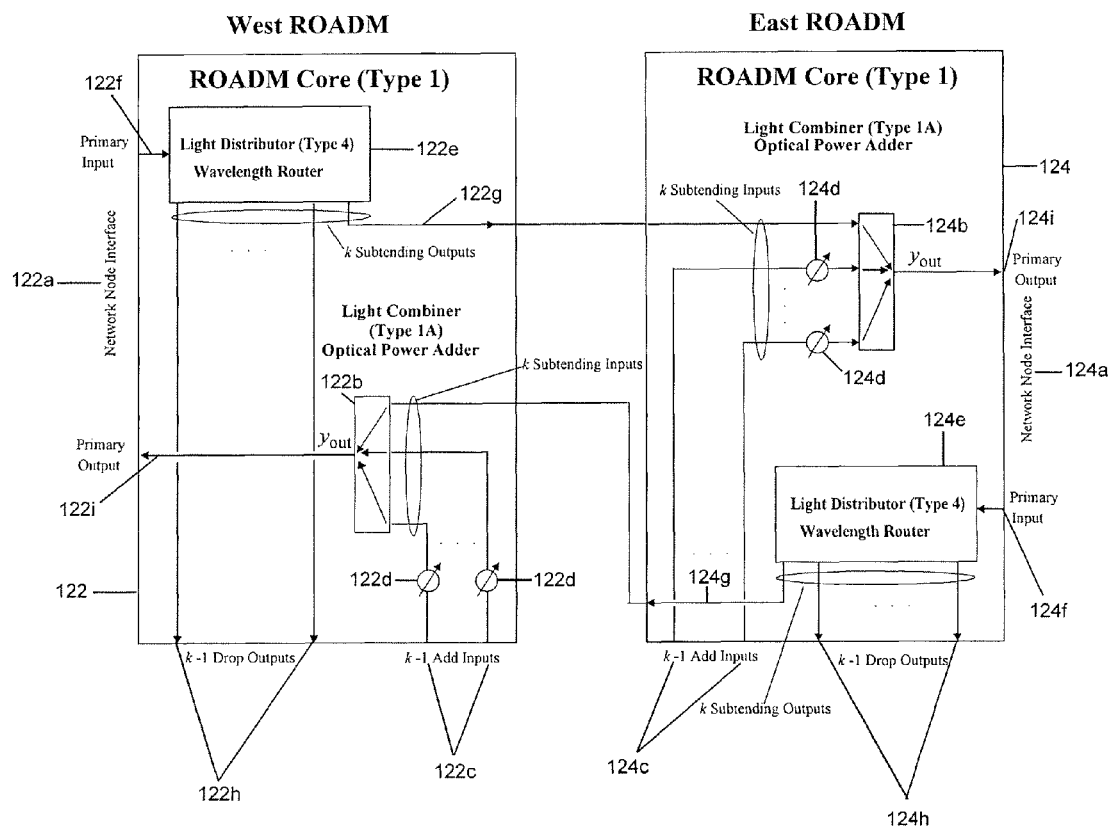
FIG. 10 is a block diagram of an example of two paired type-1 ROADM core devices including type-1A light combiners making up a 2-degree optical node.

FIG. 10 shows a ROADM based network element 120 including two type-1 ROADM core devices 122 and 124 having two DWDM line interfaces 122*a*, 124*a*, respectively, and using type-1A light combiners 122*b*, 124*b*, according to an example of an embodiment of the invention. The type-1A light combiners 122*b*, 124*b* can be the same as, for example, the type-1A light combiner 44 shown in FIG. 3B, although they are not limited thereto. Except for the replacement of type-1 light combiners 114 and 118 with type-1A light combiners 122*b*, 124*b*, the ROADM core devices 122 and 124 can be the same as, for example, the ROADM core devices 108, 110 shown in FIG. 9, although they are not limited thereto. It is within the scope of the invention, in an example embodiment, for network element 120 to include more than the number of type-1 ROADM core devices shown in FIG. 10. It is further within the scope of the invention, in an example embodiment, for any of the type-1 ROADM core devices 122, 124 to be replaced by any other suitable component (or components) that performs (or perform) the functions of thereof. The type-1A light combiners 122*b*, 124*b* allow wavelengths applied to the add inputs 122*c*, 124*c* of the ROADM core devices 122, 124 to have their optical power levels adjusted by the VOAs 122*d*, 124*d* included within the type-1A light combiners 122*b*, 124*b*, thus eliminating the need to have VOAs on the outputs of the optical converters (not shown) connected to the add inputs 122*c*, 124*c* of the ROADM core devices 122, 124. With the type-1 ROADM core devices 122, 124, the type-4 light distributors 122*e*, 124*e* provide the ability to "block" wavelengths from propagating from the primary inputs 122*f*, 124*f* of the ROADMs 122, 124 to subtending outputs 122*g*, 124*g* connected to the paired ROADM core device, since the type-4 light distributors 122*e*, 124*e* contain VOAs (not shown) whose attenuation coefficient can be set to 0 for those wavelengths. Therefore, when a given wavelength entering a type-1 ROADM core device 122, 124 (in a node having paired type-1 ROADM core devices) is diverted to a drop port 122*h*, 124*h* thereof, that wavelength can be prevented from being passed to its companion ROADM core device, and therefore an optical signal of the same wavelength can be added to the primary output 122*I*, 124*I* of the companion ROADM core device without any interference from an optical signal of the same wavelength arriving at the light combiner 122*b*, 124*b* of the companion ROADM core device.

Figure 11:
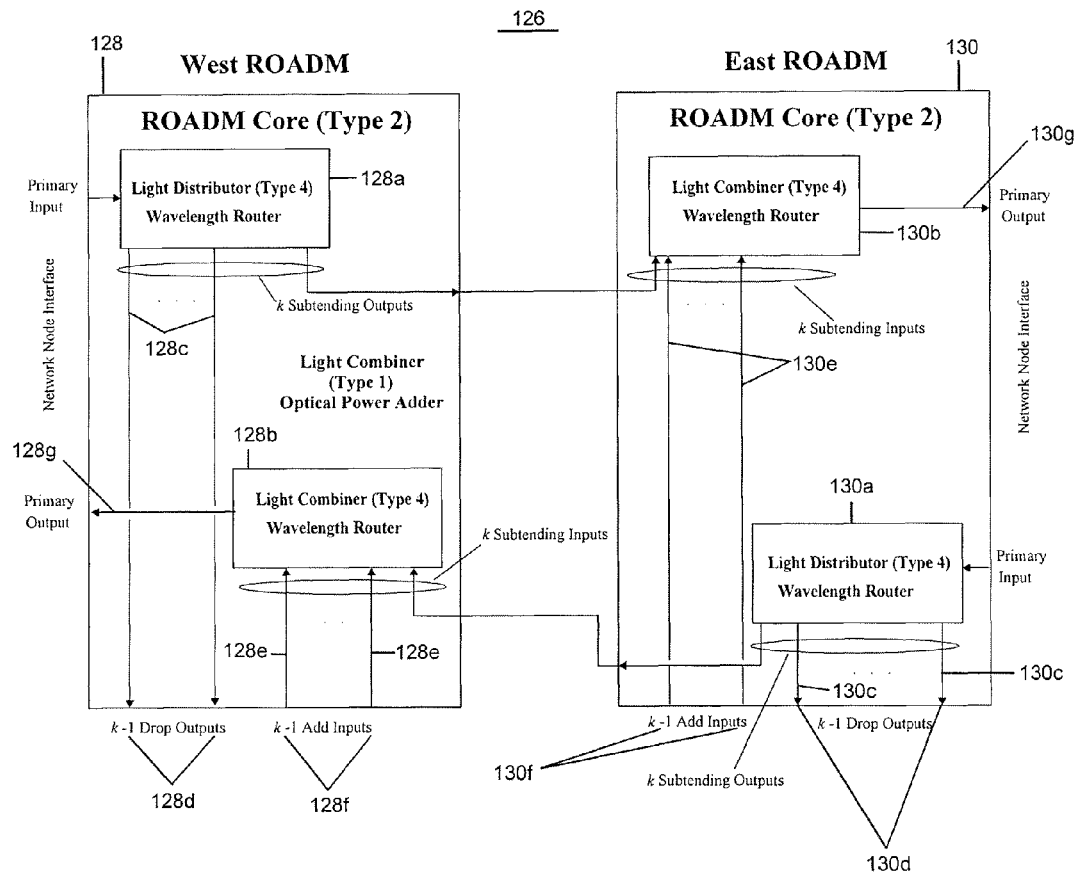
FIG. 11 is a block diagram of an example of two paired type-2 ROADM core devices making up a 2-degree optical node.

FIG. 11 illustrates an example of a two-degree ROADM based network element 126 including two connected type-2 ROADM core devices 128 and 130, according to an example of an embodiment of the invention. It is within the scope of the invention, in an example embodiment, for network element 126 to include more than the number of type-2 ROADM core devices shown in FIG. 11. It is further within the scope of the invention, in an example embodiment, for any of the type-2 ROADM core devices 128, 130 shown in FIG. 11 to be replaced by any other suitable component (or components) that performs (or perform) the functions thereof discussed below. These type-2 ROADM core devices 128, 130 each can include a type-4 light distributor (128*a*, 130*a*) and a type-4 light combiner (128*b*, 130*b*). The type-4 light distributors 128*a*, 130*a* and the type-4 light combiners 128*b*, 130*b* can be the same as, for example, the type-4 light distributor 76 and the type-4 light combiner 88, respectively, shown in FIGS. 6 and 7, although they are not limited thereto. Since any wavelength can be directed to any of the subtending outputs on a type-4-light distributor (for example, subtending outputs 128*c*, 130*c*), a type-2 ROADM core device in general, and the type-2 ROADM core devices 128, 130, in particular, are considered to have "colorless" drop ports, such as, colorless drop ports 128*d*, 130*d* in this example embodiment. Similarly, since any wavelength can be applied to any subtending input of a type-4 light combiner (for example, subtending inputs 128*e*, 130*e* in this example embodiment), the type-2 ROADM core device in general, and the type-2 ROADM core devices 128, 130, in particular, are considered to have "colorless" add ports, such as colorless add ports 128*f*, 130*f* in this example embodiment. The VOAs (not shown) within the type-4 light combiners 128*b*, 130*b* of each type-2 ROADM core device 128, 130 can be used to equalize the optical power of wavelengths exiting therefrom on the primary outputs 128*g*, 130*g*, respectively, although it is within the scope of the invention, in an example embodiment, for no such equalizing to be performed. In addition, the VOAs (not shown) within the type-4 light distributors 128*a*, 130*a* of the type-2 ROADMs 128, 130 can be used to attenuate the power of wavelengths that are diverted to the drop outputs 128*d*, 130*d*, although it is within the scope of the invention, in an example embodiment, for no such attenuation to be performed. This attenuation function is useful in that it can protect the receiver circuitry on the optical converters (not shown) attached to the drop outputs 128*d*, 130*d* of the ROADM core devices 128, 130, assuming that the receiver circuitry of the optical converters do not include VOAs. If the receivers on the optical converters include VOAs, then there is no need for the type-4 light distributors 128*a*, 130*a* within the type-2 ROADM core devices 128, 130 to include VOAs.

Figure 12:
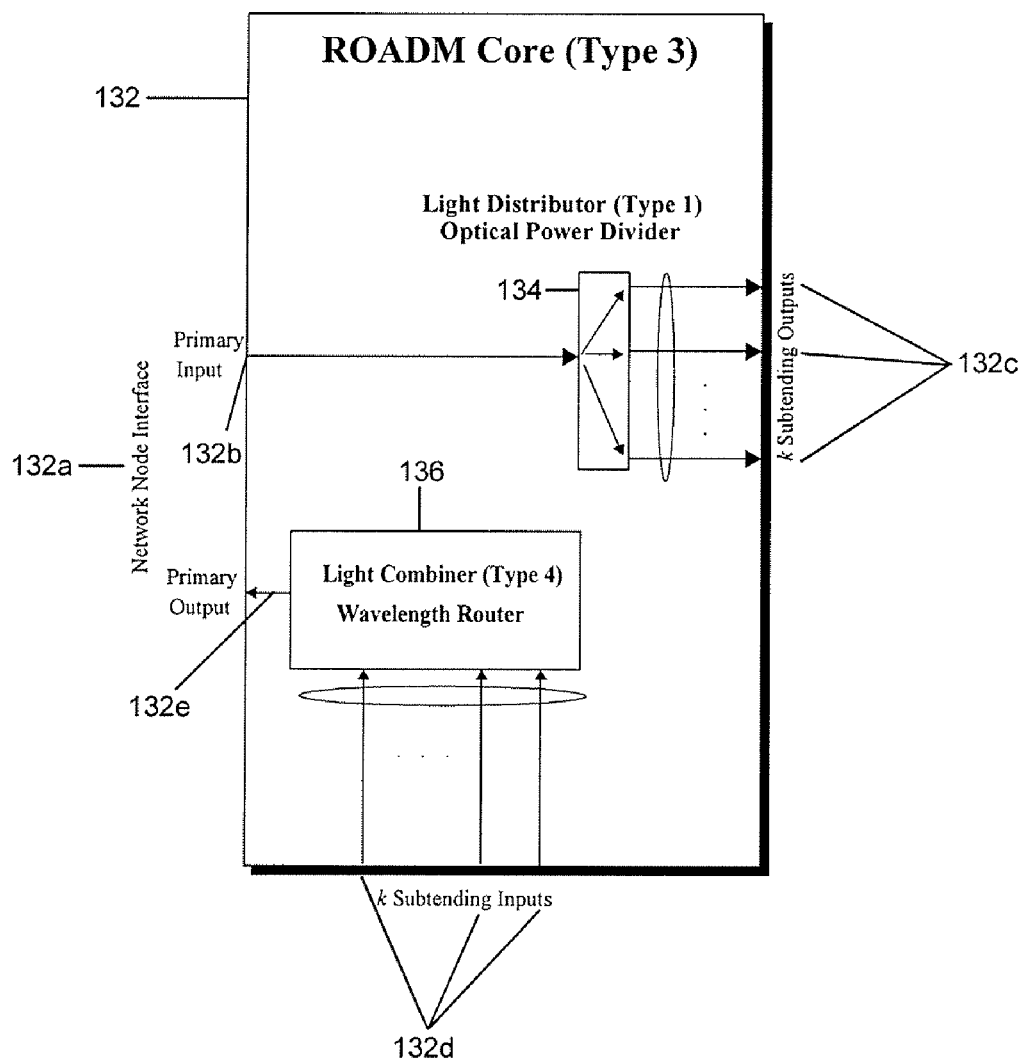
FIG. 12 is block diagram of an example of a type-3 ROADM core device.

FIG. 12 depicts an example of an embodiment of a type-3 ROADM core device 132. The type-3 ROADM core device 132 can include a type-1 light distributor 134, and a type-4 light combiner 136. (Alternatively, the type-3 ROADM core device 132 could include a type-1A light distributor.) The type-1 light distributor 134, the type-1A light distributor (not shown), and the type-4 light combiner 136 can be the same as, for example, the type-1 light distributor 24, the type-1A light distributor 36, and the type-4 light combiner 88, respectively, shown in FIGS. 2A, 3A, and 7 although they are not limited thereto. Since the type-3 ROADM core device 132 includes a type-1 light distributor 134 and a type-4 light combiner 136, it can be configured to: 1) divide an optical signal received from another optical node from the network node interface 132a on its primary input 132b into a plurality of optical-power-divided output signals and output the optical-power-divided output signals on a plurality of subtending outputs 132c with the type-1 light distributor 134; 2) receive first and second multiple-wavelength optical signals from first and second subtending inputs 132d, respectively, with the type-4 light combiner 136; 3) separate the first and second multiple-wavelength optical signals into a first plurality of single-wavelength optical signals originating from the first multiple-wavelength signal and a second plurality of single-wavelength optical signals originating from the second multiple-wavelength optical signal with the type-4 light combiner 136; 4) for single-wavelength optical signals in the first and second plurality of single-wavelength optical signals having the same wavelength, select for outputting only one single-wavelength optical signal from one of the first and second plurality of single-wavelength optical signals with the type-4 light combiner 136; 5) attenuate each selected single-wavelength optical signal with the type-4 light combiner 136; and 6) combine the attenuated, selected single-wavelength optical signals into a single primary output optical signal to be output on the primary output 132e of the ROADM core device 132 to the network node interface 132a to another node, with the type-4 light combiner 136.

Figure 13:
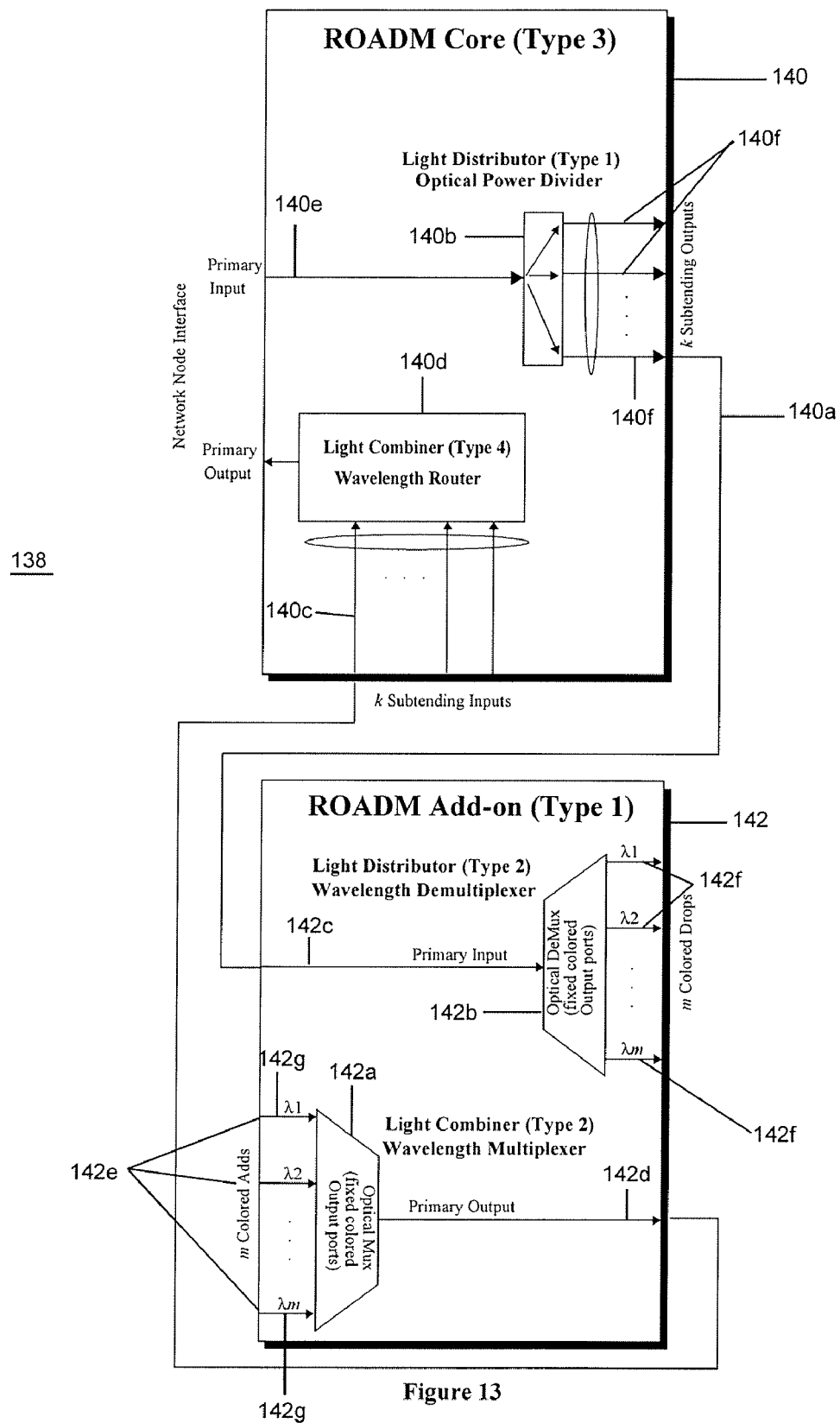

FIG. 13 shows a network element 138 including a type-3 ROADM core device 140 that is paired with a ROADM add-on. The ROADM add-on to which the type-3 ROADM core device 140 is paired is ROADM add-on 142, which has a type-2 light combiner 142a and a type-2 light distributor 142b. The primary input 142c and the primary output 142d of the ROADM add-on 142, are connected, respectively, to a subtending output 140a of a type-1 light distributor 140b, and a subtending input 140c of a type-4 light distributor 140d of the type-3 ROADM core device 140, rather than to a network node interface. The type-2 light combiner 142a, the type-2 light distributor 142b, the type-1 light distributor 140b, and the type-4 light combiner 140d can be the same as, for example, the type-2 light combiner 58, the type-2 light distributor 52, the type-1 light distributor 24, and the type-4 light combiner 88, respectively, as shown in FIGS. 4A, 4B, 2A, and 7, although they are not limited thereto. The ROADM add-on 142 is called a type-1 ROADM add-on, since it is added onto another ROADM to improve that other ROADM's functionality. It should be noted that a type-1 ROADM add-on is different from a type-1 ROADM core device in two ways. First, the type-1 ROADM core device has a type-4 light distributor and a type-1 light combiner, while a type-1 ROADM add-on has a type-2 light distributor and a type-2 light combiner. Second, the primary input and the primary output of a type-1 ROADM core device are connected to a network node interface to communicate with another node, while the primary input and the primary output of a type-1 ROADM add-on are connected to a subtending input and a subtending output of another ROADM core device within the node containing the type-1 ROADM add-on. Connecting the type-3 ROADM core device 140 to the type-1 ROADM add-on 142 creates a fully functional ROADM interface, also called a network element or a ROADM configuration, with "colored" add/drop ports. A colored port is pre-assigned only one particular frequency or wavelength. No other wavelengths or frequencies can be used with such a "colored" port. As a result, only the pre-assigned wavelength for a particular add port can be added at that add port, and only the pre-assigned wavelength for a particular drop port can be dropped from that drop port. As shown in FIG. 13, the colored add ports 142e and the colored drop ports 142f are on the type-1 ROADM add-on 142. It is within the scope of the invention, in an example embodiment, for the network element 138 to include additional optical elements and it is within the scope of the invention, in an example embodiment, for the type-3 ROADM core device 140 and the type-1 ROADM add-on 142 to include additional components to those shown in FIG. 13. It is further within the scope of the invention, in an example embodiment, for any of the type-3 ROADM core device 140 and the type-1 ROADM add-on 142 shown in FIG. 13 to be replaced by any other suitable component (or components) that performs (or perform) the functions thereof.

All m wavelengths entering the primary input 140e of the type-3 ROADM core device 140 can be sent through the type-1 light distributor 140b to the type-2 light distributor 142b of the type-1 ROADM add-on 142, as well as to all other subtending outputs 140f of the type-1 light distributor 140b within the type-3 ROADM core device 140. Therefore, all m wavelengths can be directed to the m drop ports 142f (also called colored drops 142f) of the network element 138 (which are on the type-1 ROADM add-on 142), while at the same time being directed to all other subtending outputs 140f of the type-1 light distributor 140b, which are also the subtending outputs of the type-3 ROADM core device 140. (This configuration enables an optical "drop and continue" operation, as will be illustrated in FIG. 14.) The ROADM configuration 138 shown in FIG. 13 assumes the use of VOAs (not shown) on the receivers of the optical converters (not shown) attached to the drop outputs 142f thereof. Alternatively these VOAs could be provided to the outputs of the type-2 light distributor 142b of the type-1 ROADM add-on 142, or no VOAs need to be used at all. Since the type-2 light distributor 142b directs a given wavelength to a particular drop output 142f thereof, the ROADM configuration 138 of FIG. 13 is said to include "colored" drop ports. Accordingly, only a single pre-assigned wavelength is output from each drop port 142f and each drop port 142f outputs only a single pre-assigned wavelength that does not change over the course of the use of the type-2 light distributor 142b.

Similarly, since a particular wavelength must be directed to a particular subtending input 142g of the type-2 light combiner 142a within the type-1 ROADM add-on 142, the ROADM configuration 138 shown in FIG. 13 is said to include "colored" add ports 142e, which are connected to the subtending inputs 142g of the type-2 light combiner 142a. However, as can be seen from FIG. 13, all m wavelengths can be inserted into the add ports 142e of the type-1 ROADM add-on 142.

Up to m wavelengths input into the colored add ports 142e of the type-1 ROADM add-on 142 can be multiplexed into a single DWDM light stream by the type-2 light combiner 142a of the type-1 ROADM add-on 142. This light stream is then forwarded via the primary output 142d of the type-1 ROADM add-on 142 to one of the subtending inputs 140c of the type-4 light combiner 140d of the type-3 ROADM core device 140. The type-4 light combiner 140d can then be used to power equalize any added wavelengths which can be forwarded to the primary output of the type-3 ROADM core device 140, although in other example embodiments no power equalization is required.

Figure 14:
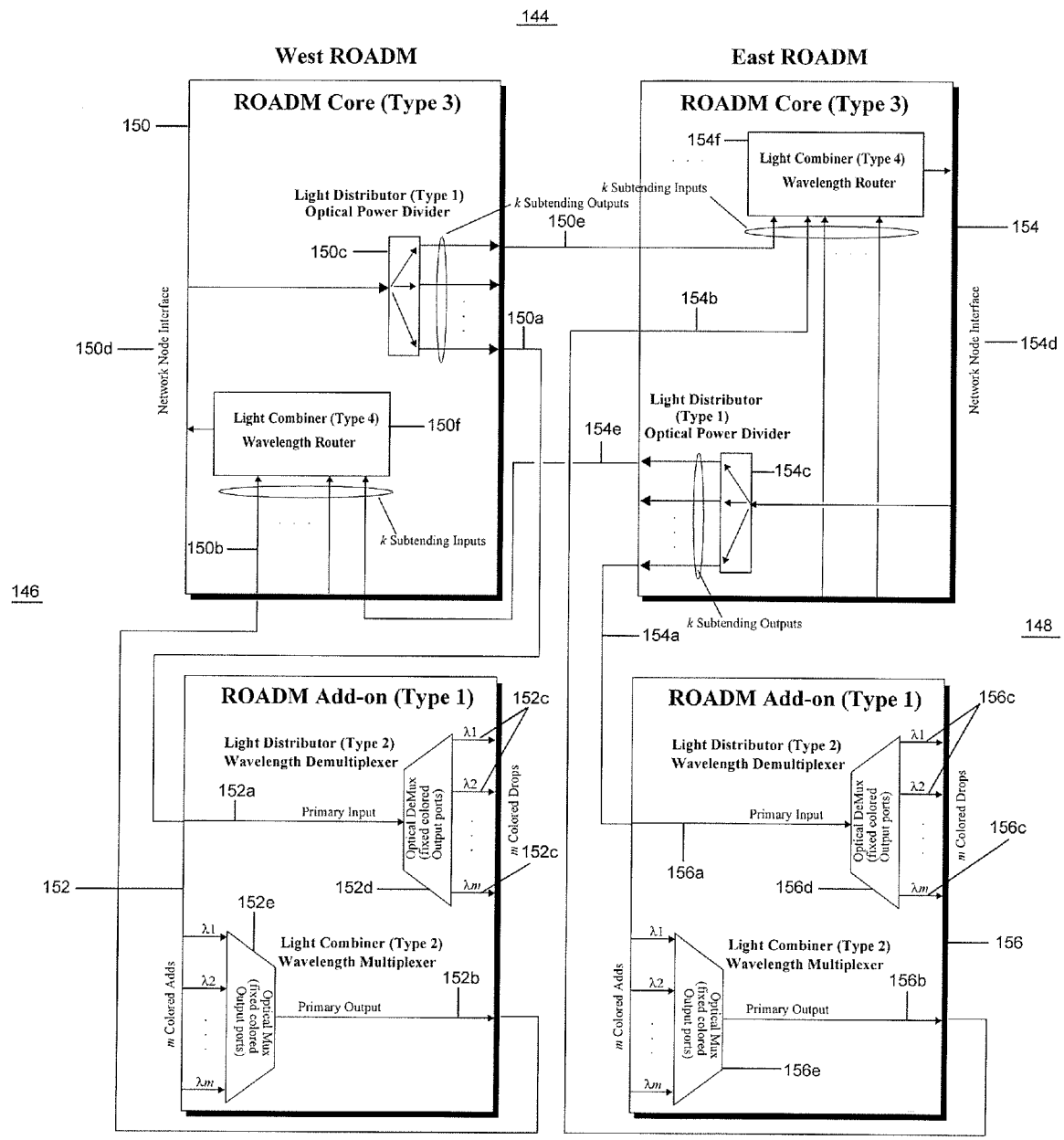

FIG. 14 shows a two-degree network element 144 including two ROADM configurations 146, 148, each including a type-3 ROADM core device connected to the primary input and the primary output of a type-1 ROADM add-on. The ROADM configurations 146 and 148 can be the same as, for example, the ROADM configuration shown 138 shown in FIG. 13, although they are not limited thereto. It is within the scope of the invention, in an example embodiment, for the network element 144 to include additional ROADM configurations and it is within the scope of the invention, in an example embodiment, for the type-3 ROADM core devices and the type-1 ROADM add-ons within the ROADM configurations 146, 148 to include additional ROADMs and other components to those shown in FIG. 14. It is further within the scope of the invention, in an example embodiment, for any of the type-3 ROADM core devices and the type-1 ROADM add-ons shown in FIG. 14 to be replaced by any other suitable component (or components) that performs (or perform) the functions thereof. The ROADM configuration 146 includes a type-3 west ROADM core device 150 and a type-1 ROADM add-on 152, while ROADM configuration 148 includes a type-3 east ROADM core device 154 and a type-1 ROADM add-on 156. The primary input 152a of the type-1 ROADM add-on 152 is connected to a subtending output 150a of the type-3 west ROADM core device 150, while the primary output 152b of the type-1 ROADM add-on 152 is connected to a subtending input 150b of the type-3 west ROADM core device 150. Similarly, the primary input 156a of the type-1 ROADM add-on 156 is connected to a subtending output 154a of the type-3 west ROADM core device 154, while the primary output 156b of the type-1 ROADM add-on 156 is connected to a subtending input 154b of the type-3 west ROADM core device 154. In this example embodiment, the type-1 light distributor 150c of the type-3 west ROADM core device 150 enables a wavelength arriving on the DWDM line interface 150d to be both dropped to a colored drop port 152c on the type-1 ROADM add-on 152 (by being transmitted from the subtending output 150a to the primary input 152a of the ROADM add-on 152, where the wavelength is directed to a pre-assigned drop port 152c by the type-2 light distributor 152d), and passed through to the companion type-3 east ROADM core device 154 (by subtending output 150e), thus performing an optical drop and continue function on that wavelength. (A drop and continue function is useful for applications such as video broadcast and dual-ring interconnection protection architectures.) Similarly, the type-1 light distributor 154c of the type-3 east ROADM core device 154 enables a wavelength arriving on the DWDM line interface 154d to be both dropped to a colored drop port 156c on the type-1 ROADM add-on 156 (by being transmitted from the subtending output 154a to the primary input 156a of the ROADM add-on 156, where the wavelength is directed to a pre-assigned drop port 156c by the type-2 light distributor 156d), and passed through to the companion type-3 west ROADM core device 150 (by subtending output 154e), thus performing an optical drop and continue function on that wavelength. In the network element 144, all wavelengths entering the type-1 light distributors 150c, 154c of each type-3 ROADM core device 150, 154 from the network node interfaces 150d, 154d, respectively, can be simultaneously dropped to each drop port 152c, 156c of the associated type-1 ROADM add-on 152, 156 and sent to the companion ROADM's type-4 light combiner 150f, 154f. The type-4 light combiner 150f, 154f within each ROADM core device 150, 154 can combine any wavelengths that "pass-through" from the companion ROADM with any wavelengths added via the type-2 light combiner 152e, 156e of the ROADM's associated type-1 ROADM add-on 152, 156 in order to form a DWDM signal exiting one of the DWMD line interfaces 150d, 154d. The type-4 light combiners 150f, 154f can power equalize both the added wavelengths and the pass-through wavelengths, although they need not do so. The type-2 light distributors 152d, 156d, the type-2 light combiners 152e, 156e, the type-1 light distributors 150c,154c, and the type-4 light combiners 150f, 154f can be the same as, for example, the type-2 light distributor 52, the type-2 light combiner 58, the type-1 light distributor 24, and the type-4 light combiner 88, respectively, shown in FIGS. 4A, 4B, 2A, and 7, although they are not limited thereto.

In the FIG. 14 configuration 144, each type-3 ROADM core device 150,154 includes additional subtending inputs and outputs that are unused. These unused inputs and outputs can be used to support (and couple with) additional ROADM core devices (called ROADM degrees), or to support coupling with other ROADM add-ons whose primary inputs and outputs are connected thereto. For instance, a type-3 ROADM core device with k subtending inputs and k subtending outputs can be used to create a k-degree ROADM core device (capable of communicating with k other optical nodes through k network node interfaces) while simultaneously supporting the adding and dropping of m wavelengths. (Such a ROADM core device using a type-4 ROADM core device, which includes a built-in type-2 light distributor and type-2 light combiner will be described below.)

Figure 15:
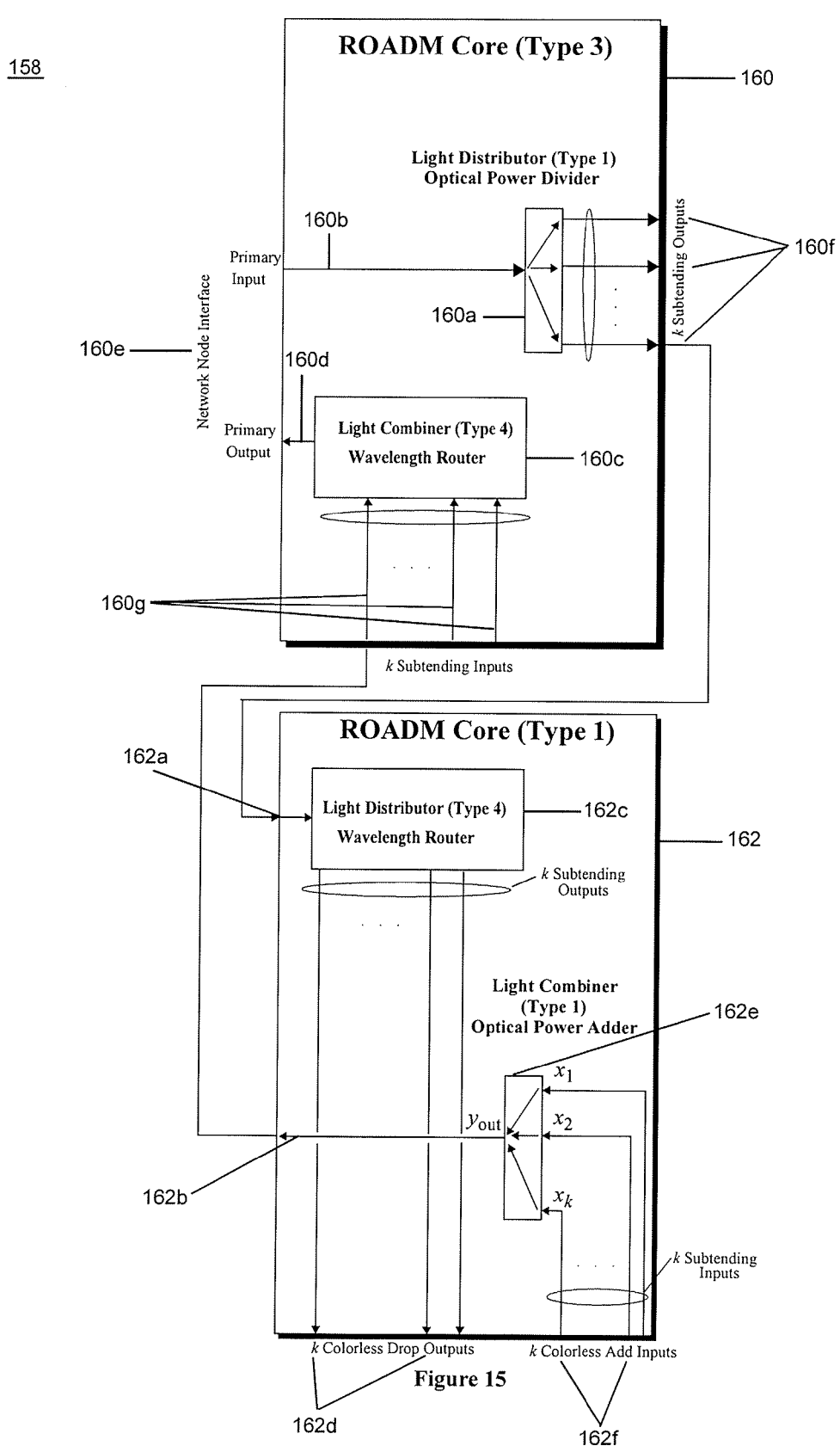
FIG. 15 is a block diagram of an example of a type-3 ROADM core device connected to an external colorless add/drop add-on module.

FIG. 15 shows a network element or configuration 158 with colorless add/drop ports, including a type-3 ROADM core device 160 that is connected to the primary input 162a and the primary output 162b of a type-1 ROADM core device 162, according to an example of an embodiment of the invention. The type-3 ROADM core device 160 and the type-1 ROADM core device 162 can be the same as, for example, the type-3 ROADM core device 132 shown in FIG. 12, and the type-1 ROADM core device 102 shown in FIG. 8, respectively, although they are not limited thereto. It is within the scope of the invention, in an example embodiment, for the network configuration 158 to include additional ROADMs and additional optical elements. It is further within the scope of the invention, in an example embodiment, for any of the type-3 ROADM core device 160 and the type-1 ROADM core device 162 to be replaced by any other suitable component (or components) that performs (or perform) the functions thereof. In this example embodiment, the type-1 ROADM core device 162 can function as a ROADM add-on to the type-3 ROADM core device 160. The type-1 light distributor 160a of the type-3 ROADM core device 160 can route a copy of each wavelength arriving on its primary input 160b to the type-4 light distributor 162c of the type-1 ROADM core device 162. The type-4 light distributor 162 in the type-1 ROADM core device 162 can be used to direct up to k wavelengths to individual colorless drop ports 162d of the type-1 ROADM core device 162, where k is the total number of wavelengths and the number of drop ports 162d is at least as great as the number of wavelengths. As a result, each of the wavelengths arriving at the primary input 160b can be directed to any of the drop ports 162d, since the type-4 light distributor can direct any wavelength to any subtending output thereof.

Similarly, the type-1 light combiner 162e in the type-1 ROADM core device 162 enables for up to k wavelengths to be added to the ROADM configuration 158 shown in FIG. 15, where k is the total number of wavelengths added at the add ports 162f of the type-1 ROADM core device 162 and the number of add ports 162f is at least as great as the number of wavelengths. The type-1 light combiner 162e combines the wavelengths added at the add ports 162f to produce a multiple-wavelength optical signal that is output on the primary output 162b to the type-4 light combiner 160c of the type-3 ROADM core device 160. The type-4 light combiner 160c combines that multiple-wavelength optical signal with other optical signals inputted thereinto at different subtending inputs 160g, and the combined signal is output on the primary output 160d to the network node interface 160e of the type-3 ROADM core device 160 for transmission to another node.

Since the type-1 light distributor 160a of the type-3 ROADM core device 160 includes multiple subtending outputs 160f, and since the type-4 light combiner 160c of the type-3 ROADM core device 160 includes multiple subtending inputs 160g, multiple type-1 ROADM core devices can be attached to the type-3 ROADM core device 160 via these subtending inputs and outputs. For instance, if each type-1 ROADM core device 162 includes 8 drop ports and 8 add ports (k=8, where, in this instance, k is the number of add ports and the number of drop ports), and the type-3 ROADM core device 160 supports 32 wavelengths (m=32) and has at least 5 subtending inputs and outputs, four type-1 ROADM core devices could be coupled to the type-3 ROADM core device 160, leaving one subtending input and output to connect to a similar ROADM configuration similar to configuration 158, thereby forming a two-degree ROADM node (having two network node interfaces) that supports 32 colorless add/drop ports.

Figure 16:
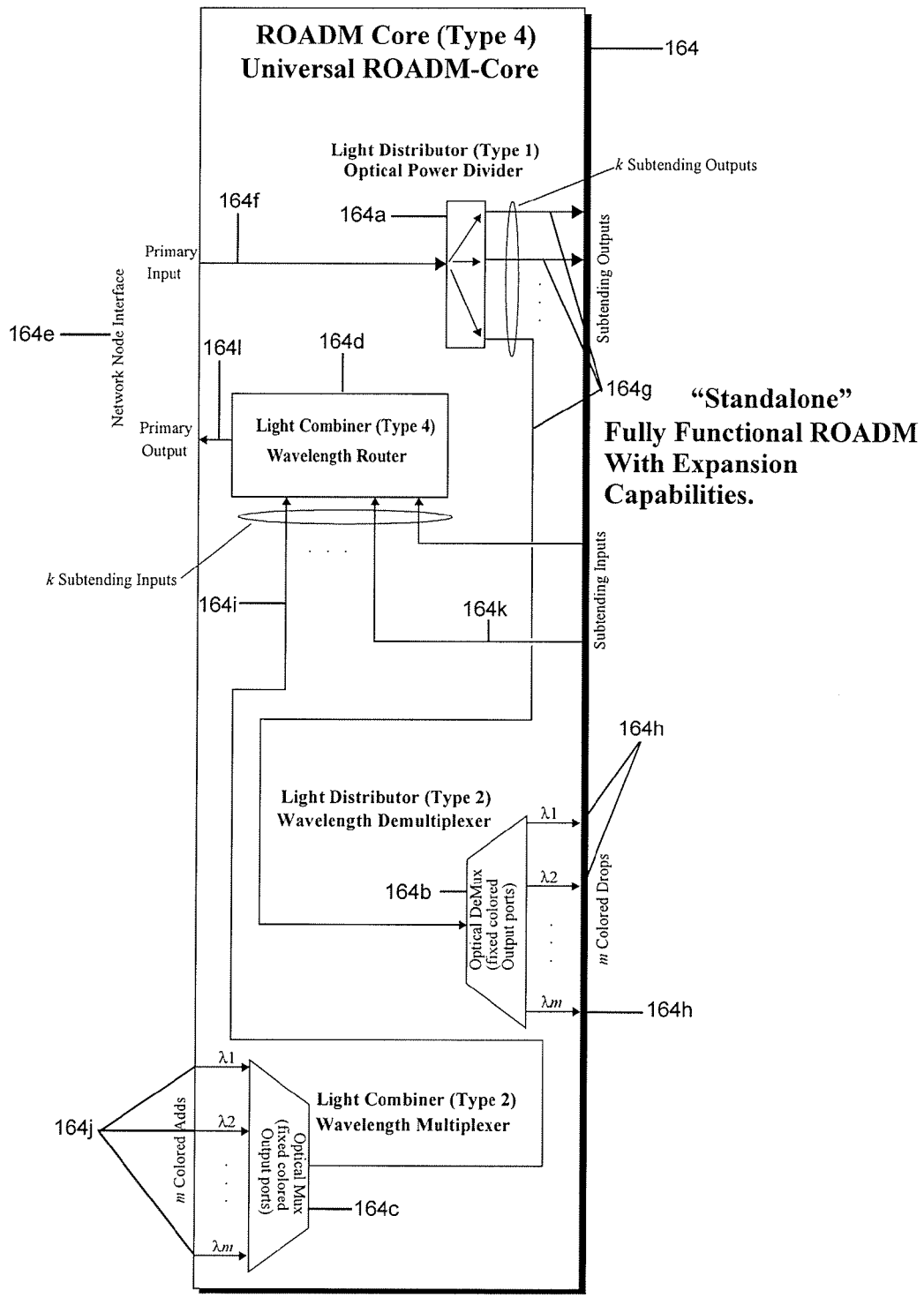
FIG. 16 is a block diagram of an example of a type-4 ROADM core device including an integrated colored add/drop add-on module.

FIG. 16 shows an example of an embodiment of a type-4 ROADM core or core device 164, also referred to as a universal ROADM core device. As shown, the type-4 ROADM core device 164 includes the functionality of the combination of a type-3 ROADM core device and a type-1 ROADM add-on by fully integrating a type-1 ROADM add-on into a type-3 ROADM core device. Therefore, the type-4 ROADM core device 164 of FIG. 16 can be used in all the applications in which the ROADM configuration 138 of FIG. 13 can be used and vice versa. For example, for the applications shown in FIGS. 16, 17, 18, 19, 20, 26, 28, 29, 30, 32, 33, 34, 35, 36, 37, 38, 39, 40, 41, 42, 46, 49, 50, 53-58, and 59A-59H, any type-4 ROADM core device or ROADM core device shown in these figures can be replaced with a type-3 ROADM core device externally connected to a type-1 ROADM add-on, one example of which is shown in FIG. 13 (and vice versa). The type-3 ROADM core device and the type-1 ROADM add-on that include the type-4 ROADM core device 164 can be the same as, for example, the type-3 ROADM core device and the type-1 ROADM add-on shown in FIG. 13, although they are not limited thereto. Accordingly, the type-4 ROADM core device 164 can include a type-1 light distributor 164a, a type-2 light distributor 164b, a type-2 light combiner 164c, and a type-4 light combiner 164d. The type-1 light distributor 164a, the type-2 light distributor 164b, the type-2 light combiner 164c, and the type-4 light combiner 164d can be the same as, for example, the type-1 light distributor 24, the type-2 light distributor 52, the type-2 light combiner 58, and the type-4 light combiner 88, respectively, shown in FIGS. 2A, 3A, 3B, and 7, although they are not limited thereto. It is also within the scope of the invention, in an example embodiment, for the type-4 ROADM core device 164 to include components in addition to the components shown in FIG. 16. It is further within the scope of the invention, in an example embodiment, for any of the type-1 light distributor 164a, the type-2 light distributor 164b, the type-2 light combiner 164c, and the type-4 light combiner 164d to be replaced by any other suitable component (or components) that performs (or perform) the functions thereof.

Because the type-4 ROADM core device 164 can include type-1 and type-2 distributors 164a, 164b and type-2 and type-4 light combiners 164c, 164d, the ROADM core device 164 can be configured to: 1) divide the optical power of an another-node-originating optical signal received from another optical node via the network node interface 164e on the primary input 164f of the device 164 between a plurality of optical-power-divided, output optical signals of multiple wavelengths, output from the ROADM core device on a plurality of subtending outputs 164g with the type-1 light distributor 164a; 2) separate one of the plurality of optical-power-divided output optical signals into a plurality of dropped optical signals each of a single-wavelength output from a plurality of colored drop ports 164h thereof with the type-2 light distributor 164b; 3) receive on a subtending input 164i of the type-4 light combiner 164d a first multiple-wavelength optical signal generated by the type-2 light combiner 164c combining optical signals of different wavelengths added to the ROADM core device 164 via colored add ports 164j thereof, and receive with the type-4 light combiner 164d a second multiple-wavelength optical signal from a subtending input 164k of the ROADM core device 164 (the first and second multiple-wavelength optical signals may contain one or more wavelengths in common); 4) separate the first and second multiple-wavelength optical signals into a first plurality of single-wavelength optical signals originating from the first multiple-wavelength signal and a second plurality of single-wavelength optical signals originating from the second multiple-wavelength optical signal with the type-4 light combiner 164d; 5) for single-wavelength optical signals in the first and second plurality of single-wavelength optical signals having the same wavelength, select only one single-wavelength optical signal from one of the first and second plurality of single-wavelength optical signals for outputting with the type-4 light combiner 164d; 6) attenuate each selected single-wavelength optical signal with the type-4 light combiner 164d; and 7) combine the attenuated, selected single-wavelength optical signals into a single primary output optical signal to be output on a primary output 164l of the ROADM core device 164 via the network node interface 164e to another node with the type-4 light combiner 164d.

Figure 17:
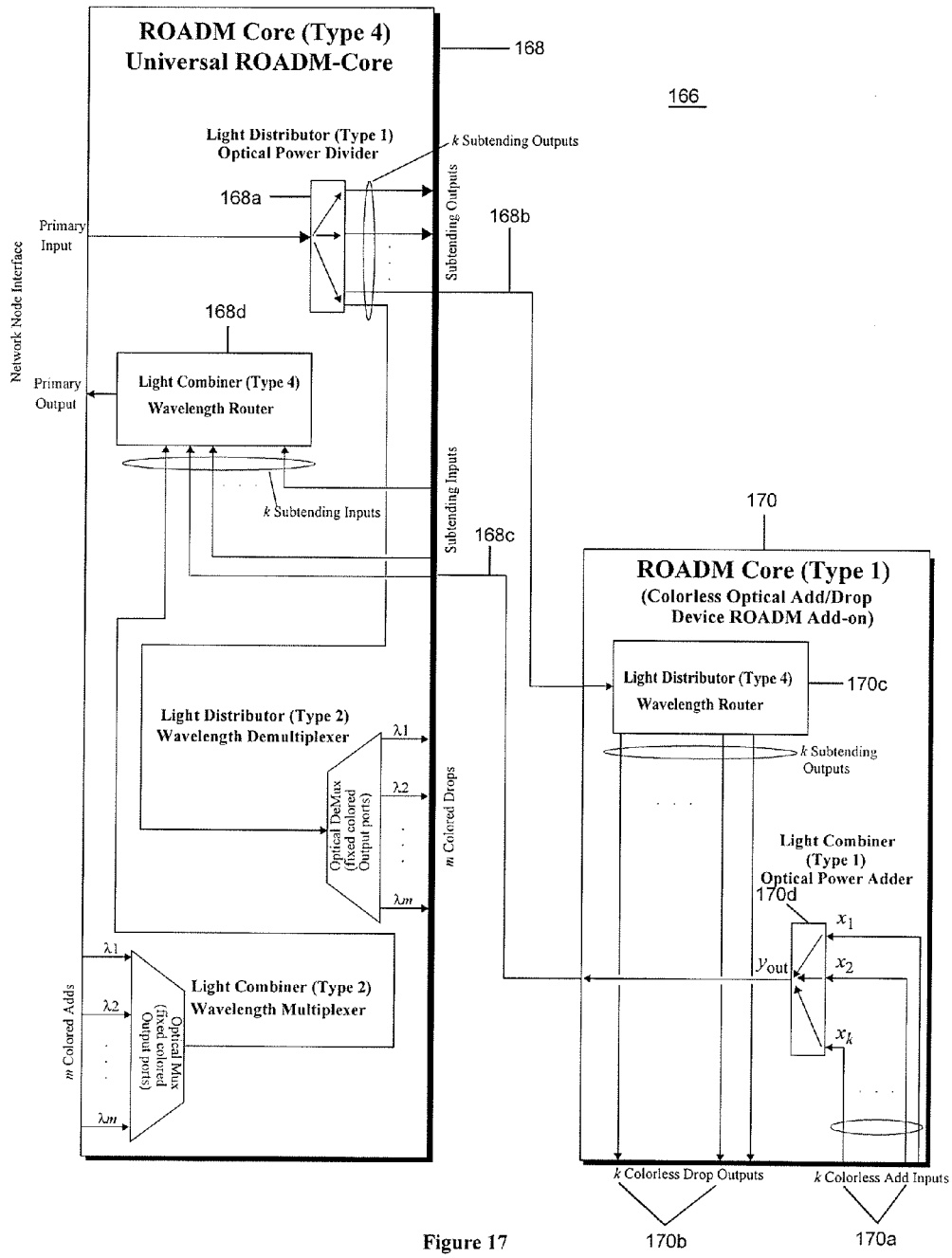
FIG. 17 is a block diagram of an example of a type-4 ROADM core connected to a colorless add/drop add-on module, specifically a type-1 ROADM core device.

The type-4 ROADM core device 164 shown in FIG. 16 can add/drop all m wavelengths of inputted and outputted optical signals, while simultaneously supporting additional ROADM add-on devices and functions, without limitation, as shown in the other figures. For instance, FIG. 17 shows a network element 166 in which k colorless add ports/drop ports are added to a type-4 ROADM core device 168 by connecting a type-1 ROADM core device 170 thereto, which includes k colorless add ports 170a and k colorless drop ports 170b. The type-4 ROADM core device 168 and the type-1 ROADM core device 170 can be the same as, for example, the type-4 ROADM core device 164 shown in FIG. 16, and the type-1 ROADM core device 102 shown in FIG. 8, respectively, but they are not limited thereto. It is also within the scope of the invention, in an example embodiment, for the network element 166 to include ROADMs and other optical elements in addition to those shown in FIG. 17. It is also within the scope of the invention, in an example embodiment, for the type-4 ROADM core device 168 and the type-1 ROADM core device 170 to include components in addition to the components shown in FIG. 17. It is further within the scope of the invention, in an example embodiment, for any of the type-4 ROADM core device 168 and the type-1 ROADM core device 170 to be replaced by any other suitable component (or components) that performs (or perform) the functions thereof. The type-1 ROADM core device 170 functions as a colorless optical add/drop device. More specifically, since the type-1 ROADM core device 170 includes a type-4 light distributor 170c and a type-1 light combiner 170d, the type-1 ROADM core device 170 can be configured to: 1) separate one of the optical-power-divided output optical signals output from the type-1 light distributor 168a of the type-4 ROADM core device 168 on one of the plurality of subtending outputs 168b thereof into a plurality of add/drop device, single-wavelength optical signals with the type-4 light distributor 170c; 2) change the intensity of the add/drop device, single-wavelength optical signals with the type-4 light distributor 170c; and 3) assign and output each of the add/drop device, single-wavelength optical signals to only one of and any one of the plurality of drop ports 170b with the type-4 light distributor 170c. As a result, the type-4 light distributor 170c of the type-1 ROADM core device 170 can be configured to assign each of the add/drop device, single-wavelength optical signals to any of the plurality of drop ports 170b, thereby making the drop ports 170b colorless drop ports. Further, the type-1 light combiner 170d of the type-1 ROADM core device 170 can be configured to combine into a multiple-wavelength optical signal a plurality of single-wavelength optical signals each inputted into one of the plurality of different colorless add ports 170a, and output the multiple-wavelength optical signal to a subtending input 168c of the type-4 light combiner 168d of the type-4 ROADM core 168.

Figure 18:
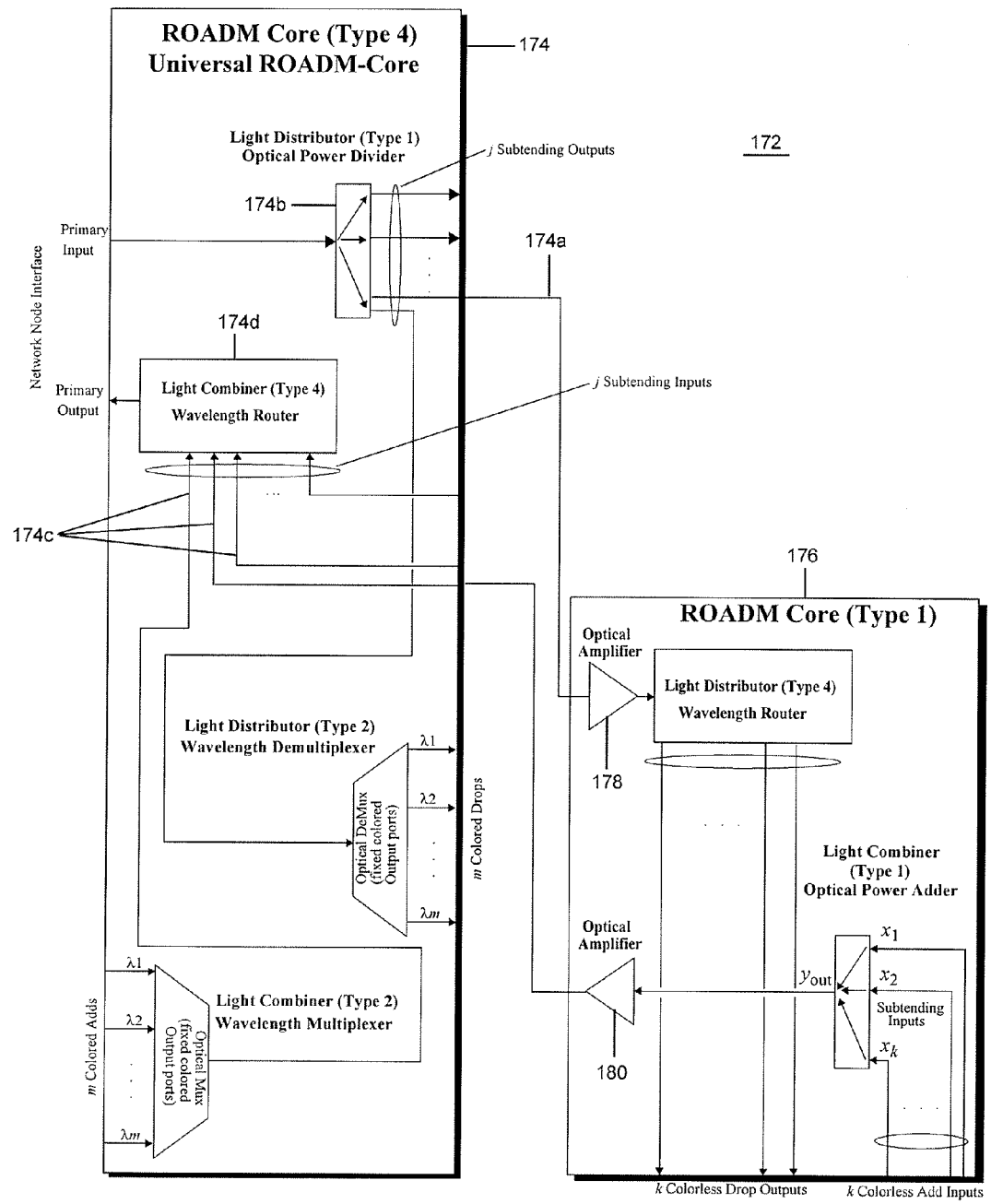
FIG. 18 is a block diagram of an example of a type-4 ROADM core device connected to a colorless add/drop add-on module, specifically a type-1 ROADM core device including optical amplifiers.

Similarly, FIG. 18 shows a network element 172 in which k colorless add/drop ports are added to a type-4 ROADM core device 174 by connecting thereto a type-1 ROADM core device 176 that includes both an input optical amplifier 178 and an output optical amplifier 180. These optical amplifiers can be useful for the case where there is a very large insertion loss associated with the paths through the type-4 ROADM core device 174, although they are not required. Typically this would be the case when j is very large, j being the number of subtending outputs 174a of the type-1 light distributor 174b of the type-4 ROADM core device 174 and the number of subtending inputs 174c of the type-4 light combiner 174d of the type-4 ROADM core device 174. Therefore, the number of optical amplifiers used depends upon the implementation. For example, depending upon the implementation, only one of the optical amplifiers shown in FIG. 18 may be required. The type-4 ROADM core device 174 can be the same as, for example, the type-4 ROADM core device 164 shown in FIG. 16 and/or the type-1 ROADM core device 168 shown in FIG. 17, but it is not limited thereto. In addition, the type-1 ROADM core device 176 can be the same as, for example, the type-1 ROADM core device 102 shown in FIG. 8 and/or the type-1 ROADM core device 170 shown in FIG. 16 (with the exception of the use of amplifiers 178 and 180), but it is not limited thereto. It is also within the scope of the invention, in an example embodiment, for the network element 172 to include ROADMs and other optical elements in addition to those shown in FIG. 18. In addition, it is within the scope of the invention, in an example embodiment, for the type-4 ROADM core device 174 and the type-1 ROADM core device 176 to include components in addition to the components shown in FIG. 18. It is further within the scope of the invention, in an example embodiment, for any of the type-4 ROADM core device 174 and the type-1 ROADM core device 176 to be replaced by any other suitable components (or components) that performs (or perform) the functions thereof.

Figure 19:
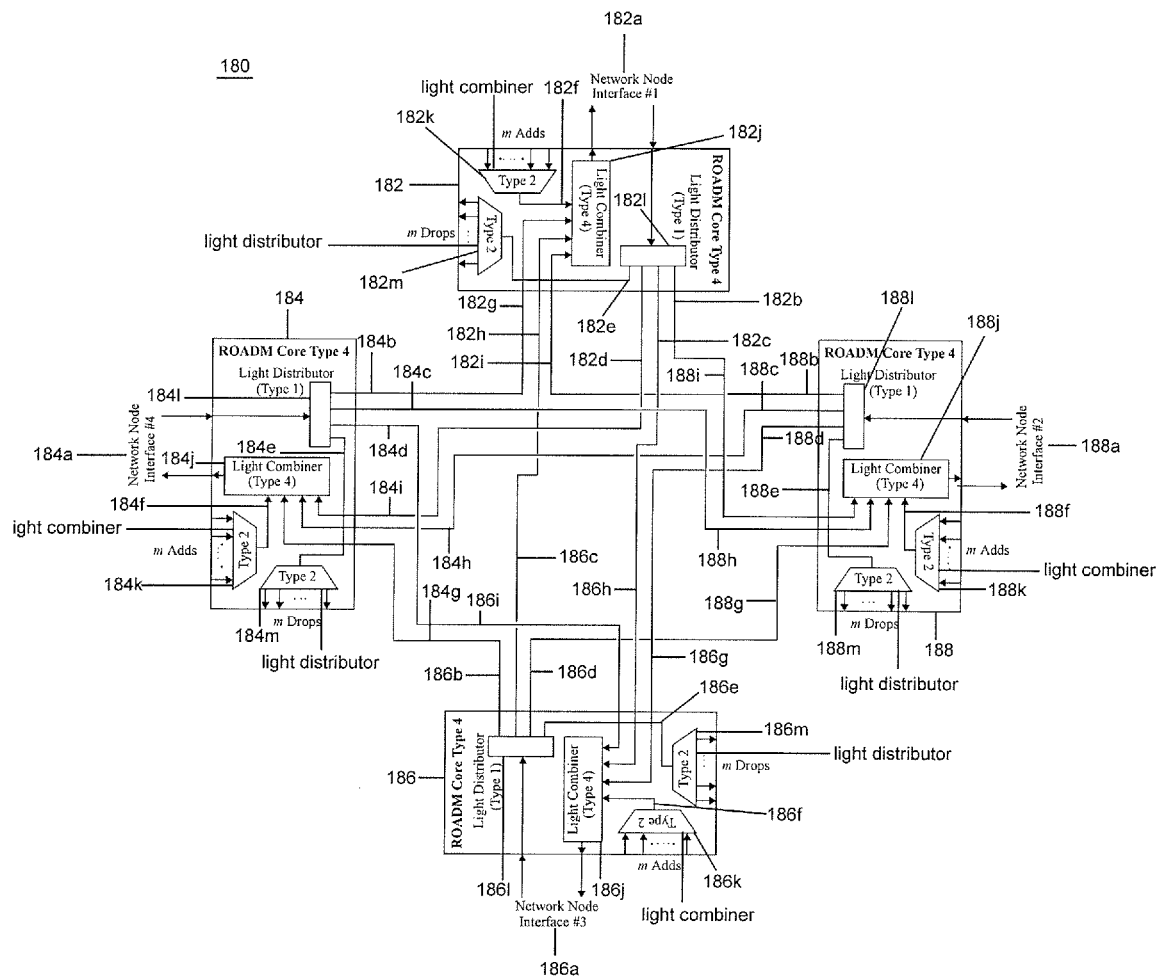
FIG. 19 is a block diagram of an example of four type-4 ROADM core devices connected to each other to form a 4-degree optical node.

FIG. 19 illustrates another example of an embodiment in which a network element 180 includes four type-4 ROADM core devices 182, 184, 186, and 188 that are each connected to all the other type-4 ROADM core devices. The type-4 ROADM core devices 182, 184, 186, and 188 can be the same as, for example, the type-4 ROADM core devices 164, 168, and/or 174 shown in FIGS. 16-18, respectively, although they are not limited thereto. It is within the scope of the invention, in an example embodiment, for the network element 180 to include ROADMs and other optical elements in addition to those shown in FIG. 19. It is also within the scope of the invention, in an example embodiment, for the type-4 ROADM core devices 182, 184, 186, and 188 to include components thereof in addition to the components shown in FIG. 19. It is further within the scope of the invention, in an example embodiment, for any of the type-4 ROADM core devices 182, 184, 186, and 188 to be replaced by any other suitable component (or components) that performs (or performs) the functions of these elements. The type-4 ROADM core devices 182, 184, 186, and 188 can be interconnected to form a four-degree node having four network node interfaces 182a, 184a, 186a, and 188a, one associated with each type-4 ROADM core device, although it is within the scope of the invention, in an example embodiment, for any of the type-4 ROADM core devices 182, 184, 186, and 188 to include more than one network node interface and/or for any of the type-4 ROADM core devices 182, 184, 186, and 188 to lack a network node interface. In this example embodiment, each of the four type-4 ROADM core devices 182, 184, 186, and 188 have four subtending inputs and outputs (i.e., k=4). More specifically, the ROADM core device 182 has subtending outputs 182b, 182c, 182d, and 182e and subtending inputs 182f, 182g, 182h, and 182I. Similarly, the ROADM core device 184 has subtending outputs 184b, 184c, 184d, and 184e and subtending inputs 184f, 184g, 184h, and 184I. The ROADM core device 186 has subtending outputs 186b, 186c, 186d, and 186e and subtending inputs 186f, 186g, 186h, and 186I. And the ROADM core device 188 has subtending outputs 188b, 188c, 188d, and 188e and subtending inputs 188f, 188g, 188h, and 188I. In each type-4 ROADM core device, one of the k subtending inputs (182f, 184f, 186f, and 188f) of the type-4 light combiner (182j, 184j, 186j, and 188j) can be used to couple the integrated type-2 light combiner (182k, 184k, 186k, and 188k), and one of the k subtending outputs (182e, 184e, 186e, and 188e) of the type-1 light distributor (182I, 184I, 186I, and 188I) can be used to couple to the integrated type-2 light distributor (182m, 184m, 186m, and 188m). Each of the other three subtending inputs and outputs of a given type-4 ROADM core device is used to couple the given type-4 ROADM core device to the other three type-4 ROADM core devices. All m wavelengths arriving at each of the DWDM line interfaces 182a, 184a, 186a, and 188a can be made available to all of the other three DWDM line interfaces. Therefore, the type-4 light combiner (182j, 184j, 186j, and 188j) of a given type-4 ROADM core device receives all m wavelengths arriving at each DWDM line interface (182a, 184a, 186a, and 188a) and receives all m wavelengths received by add ports (designated by the term "Adds" in FIG. 19; the drop ports of the type-4 ROADM core devices 182, 184, 186, and 188 are designated by the term "Drops" in FIG. 19) of the given type-4 ROADM core device. In addition, the type-4 light combiner (182j, 184j, 186j, or 188j) of the given type-4 ROADM core device can select for outputting to the DWDM line interface of the given type-4 ROADM core device any of the m wavelengths received at any of the three DWDM line interfaces of the other three type-4 ROADM core devices and any of the m wavelengths applied to the add ports of the given type-4 ROADM core device. Therefore, the type-4 light combiner (182j, 184j, 186j, or 188j) of a given ROADM core device (182, 184, 186, or 188) has access to up to m×4 wavelengths. This is because the type-1 light distributor (1821, 1841, 1861, and 1881), within each type-4 ROADM core device directs copies of all m wavelengths it receives on its DWDM line interface to each of the other three type-4 ROADM core devices.

Although FIG. 19 illustrates an example embodiment of a 4-degree ROADM node, also called a 4-degree optical node, using four type-4 ROADM core devices, each having one network node interface, with k=4 (i.e., where k denotes the number of subtending inputs and outputs and therefore in FIG. 19 there are 4 pairs of subtending inputs and subtending outputs on each ROADM core device 182, 184, 186, and 188), it can be noted that in general an r-degree ROADM node can be created using r number of type-4 ROADM core devices with k=r (i.e., the number of pairs of subtending inputs and outputs equal the number of network node interfaces through which the node can be connected to other nodes). Thus, for example, an 8-degree ROADM node can be created using eight type-4 ROADM core devices with 8 subtending inputs and outputs (i.e., k=8). It could be understood to one ordinarily skilled in the art that in such a node, each of the eight type-4 ROADM core devices could be connected to all the other type-4 ROADM core devices to form an 8-degree ROADM node using the techniques shown in FIG. 19 for the 4-degree node.

Figure 20:
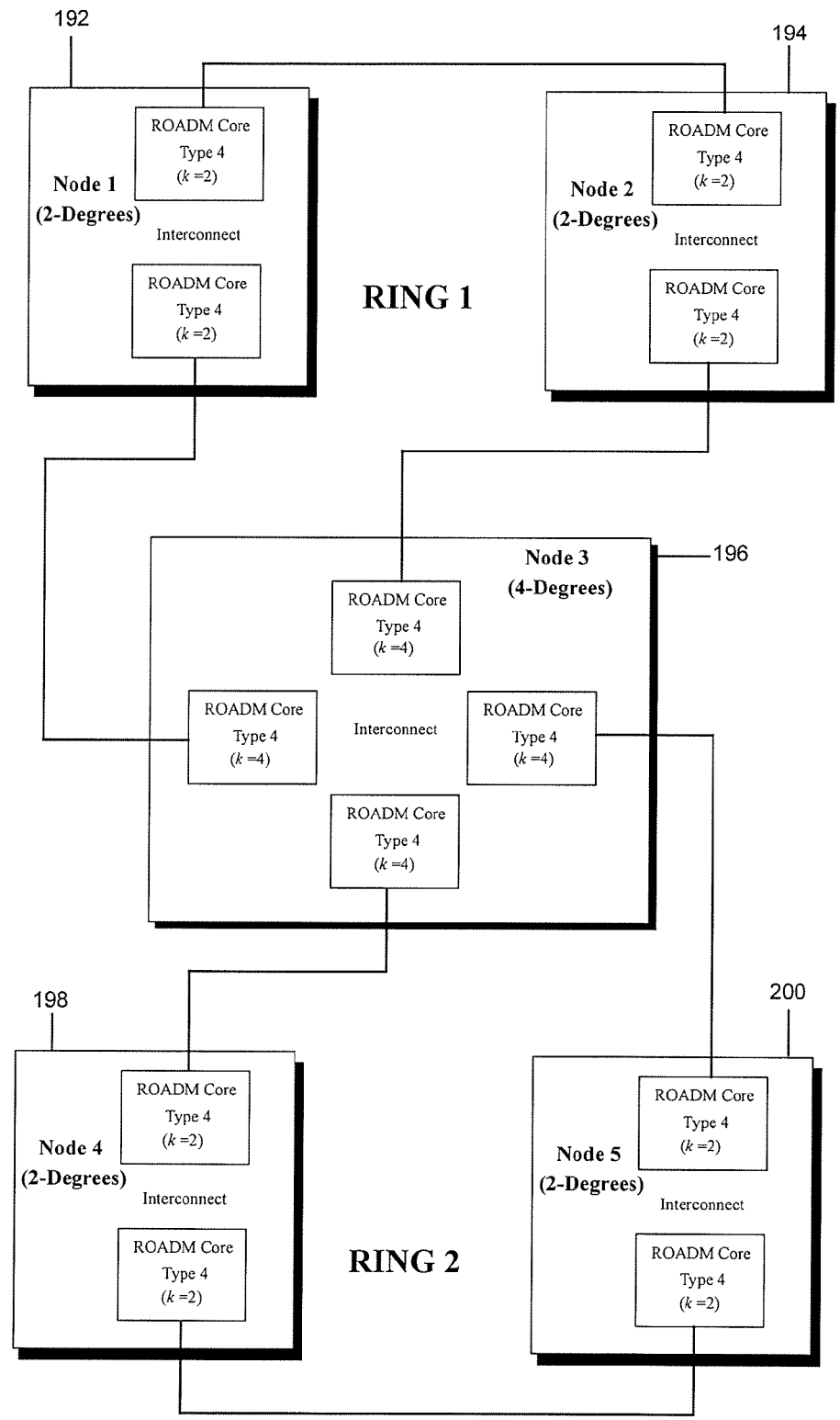
FIG. 20 is a block diagram of an example of an optical network in which a 4-degree node interconnects four other nodes together to form two interconnected rings.

FIG. 20 illustrates an application for a 4-degree DWDM node, according to an example of an embodiment of the invention. In this embodiment, a network 190 includes nodes 1-5 including a first two-degree node 192, a second two-degree node 194, a third four-degree node 196, a fourth two-degree node 198, and a fifth two-degree node 200. The 4-degree node 196 interconnects two DWDM rings (Ring 1 and Ring 2). Each ring includes two 2-degree nodes and two network node interfaces on the 4-degree node. Wavelengths can be directed from one ring to another using the wavelength interconnect capabilities of the 4-degree node 196. For instance, a wavelength originating at an add port of the fifth node 200 may be forwarded to a drop port on the first node 192, via the third node 196, all in the optical domain. Nodes 1, 2, 4, and 5 each include two type-4 ROADM core devices, while node 3 includes four type-4 ROADM core devices. The type-4 ROADM core devices in these nodes can be the same as, for example, the type-4 ROADM core devices 164, 168, 174, 182, 184, 186, and 188 shown in FIGS. 16-19 (with the same or a different number of subtending inputs and outputs), although they are not limited thereto. It is within the scope of the invention, in an example embodiment, for the network element 190 to include ROADMs and other optical elements in addition to those shown in FIG. 20. It is also within the scope of the invention, in an example embodiment, for the type-4 ROADM core devices within each node to include components in addition to the components of the type-4 ROADM core devices shown in FIGS. 16-19. It is further within the scope of the invention, in an example embodiment, for any of the type-4 ROADM core devices in any of the nodes to be replaced by any other suitable component (or components) that performs (or perform) the functions thereof.

Spur Add-Ons, Spur Main Nodes, and Spur End Nodes

Figure 21:
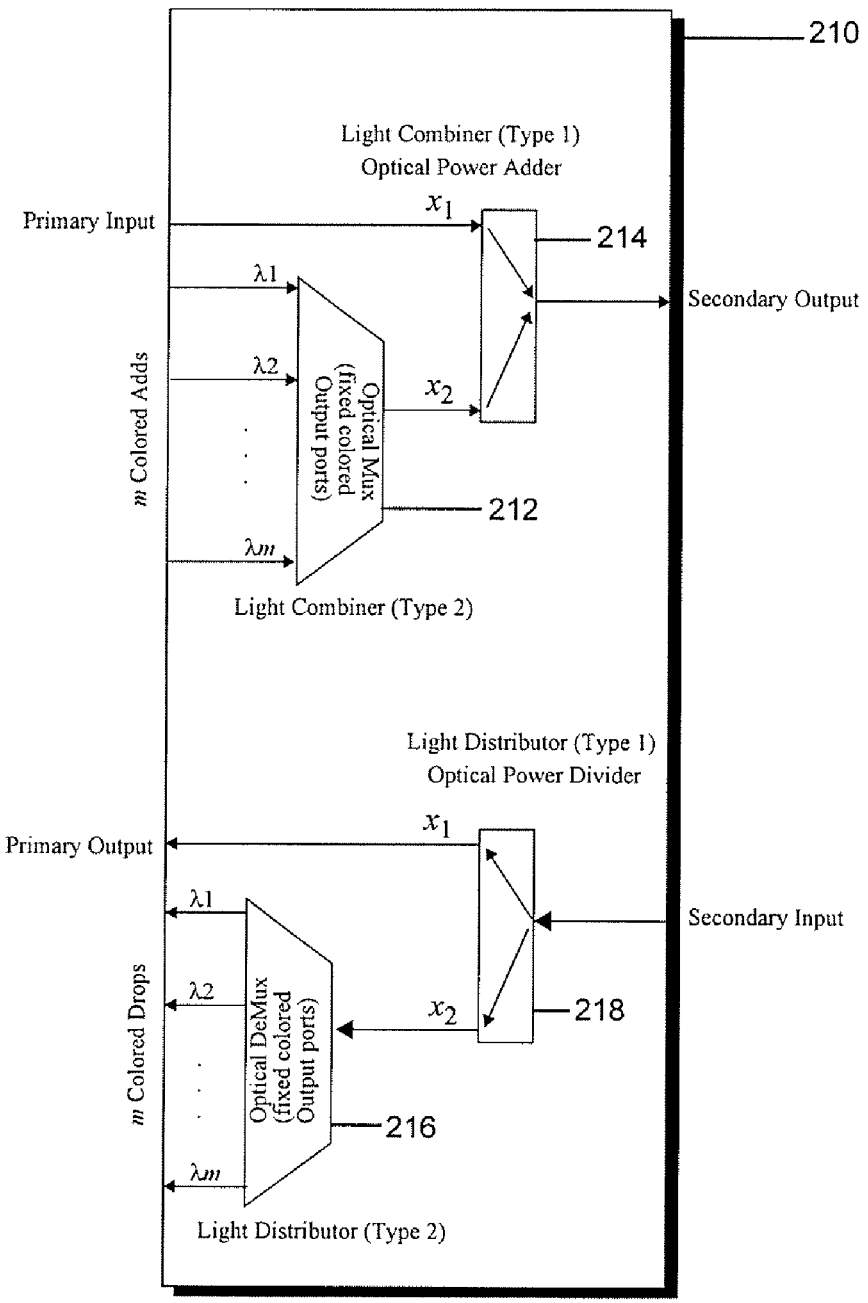
FIG. 21 is a block diagram of an example of a type-1A spur add-on module.

FIG. 21 introduces another type of ROADM add-on, the spur add-on, according to an example of an embodiment of the invention. Spur add-ons typically provide a low cost means of adding an optical spur to an optical ring and an optical network. (The spur concept will be explained further in subsequent paragraphs.) FIG. 21 shows a type-1A spur add-on 210 that includes a type-2 light combiner 212 paired with a two-input, type-1 light combiner 214, and a type-2 light distributor 216 paired with a two-output, type-1 light distributor 218. The type-2 light combiner 212, the two-input, type-1 light combiner 214, the type-2 light distributor 216, and the two-output, type-1 light distributor 218 can be the same as, for example, the type-2 light combiner 58, the type-1 light combiner 30, the type-2 light distributor 52, and the type-1 light distributor 24, respectively, shown in FIGS. 4B, 2B, 4A, and 2A, although they are not limited thereto. It is also within the scope of the invention, in an example embodiment, for the spur add-on 210 to include components in addition to those shown in FIG. 21. It is further within the scope of the invention, in an example embodiment, for any of the type-2 light combiner 212, the two-input, type-1 light combiner 214, the type-2 light distributor 216, and the two-output, type-1 light distributor 218 shown in FIG. 21 to be replaced by any other suitable component (or components) that performs (or perform) the functions thereof discussed above.

Figure 22:
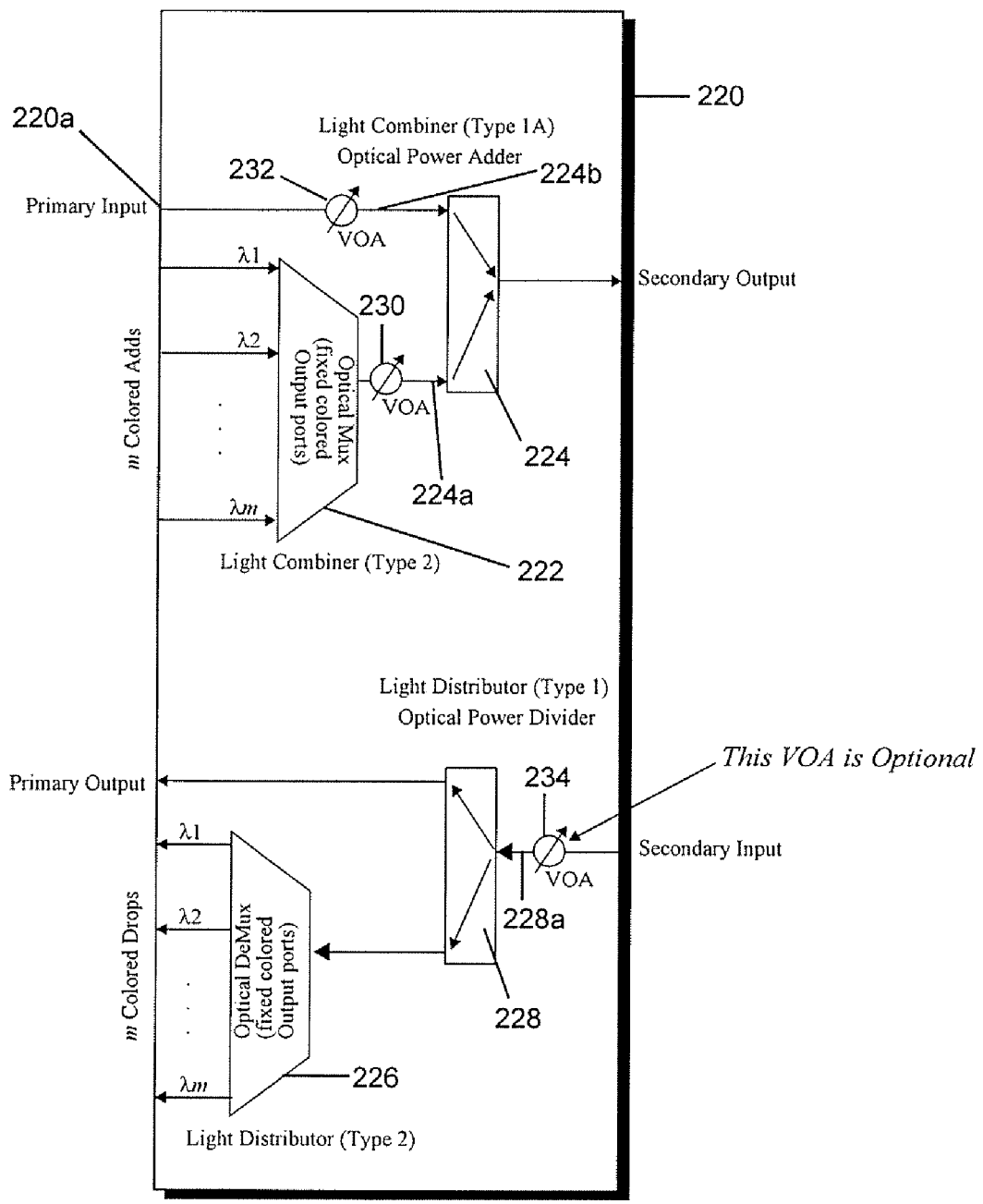
FIG. 22 is a block diagram of an example of a type-1B spur add-on module.

FIG. 22 shows an example of an embodiment of a type-1B spur add-on 220 that includes one type-2 light combiner 222 paired with a two-input, type-1A light combiner 224, and a type-2 light distributor 226 paired with a two-output, type-1 light distributor 228. In addition, a VOA 230 is positioned at the output of the type-2 light combiner 222 so as to provide variable optical attenuation of optical signals output from the type-2 light combiner 222 to the subtending input 224a of the light combiner 224, although it is not required to do so. VOA 230 can be used to simultaneously attenuate all m wavelengths exiting the type-2 light combiner 222 by the same amount, although it is not required to do so. The other subtending input 224b of the light combiner 224 also contains VOA 232 to provide variable optical attenuation of optical signals entering the spur add-on 220 on the primary input 220a, although it is not required to do so. VOA 232 can be used to simultaneously attenuate all m wavelengths input on the primary input 220a and entering the combiner 224 by the same amount, although it is not required to do so. It is within the scope of the invention, in an example embodiment, to provide an optional VOA 234 at the subtending input 228a of the light distributor 228. It is also within the scope of the invention, in an example embodiment, for the type-1B spur add-on 220 to be identical, for example, to the type-1A spur add-on 210 shown in FIG. 21 except for the use of VOAs as noted above. It is also within the scope of the invention, in an example embodiment, for the type-1B spur add-on 220 to be different from the type-1A spur add-on 210 shown in FIG. 21 in ways in addition to the use of VOAs. The type-2 light combiner 222, the two-input, type-1A light combiner 224, the type-2 light distributor 226, and the two-output, type-1 light distributor 228 can be the same as, for example, the type-2 light combiner 58, the type-1A light combiner 44, the type-2 light distributor 52, the type-1 light distributor 24, respectively, shown in FIGS. 4B, 3B, 4A, and 2A, although they are not limited thereto. In addition, the VOAs 230, 232, and 234 can be the same as, for example, the VOAs 42 and 48 shown in FIGS. 3A and 3B, respectively. It is also within the scope of the invention, in an example embodiment, for the spur add-on 220 to include components in addition to those shown in FIG. 22. It is further within the scope of the invention, in an example embodiment, for any of the type-2 light combiner 222, the two-input, type-1A light combiner 224, the type-2 light distributor 226, the two-output, type-1 light distributor 228, and the VOAs 230, 232, and 234 shown in FIG. 22 to be replaced by any other suitable component (or components) that performs (or perform) the functions thereof.

Figure 23:
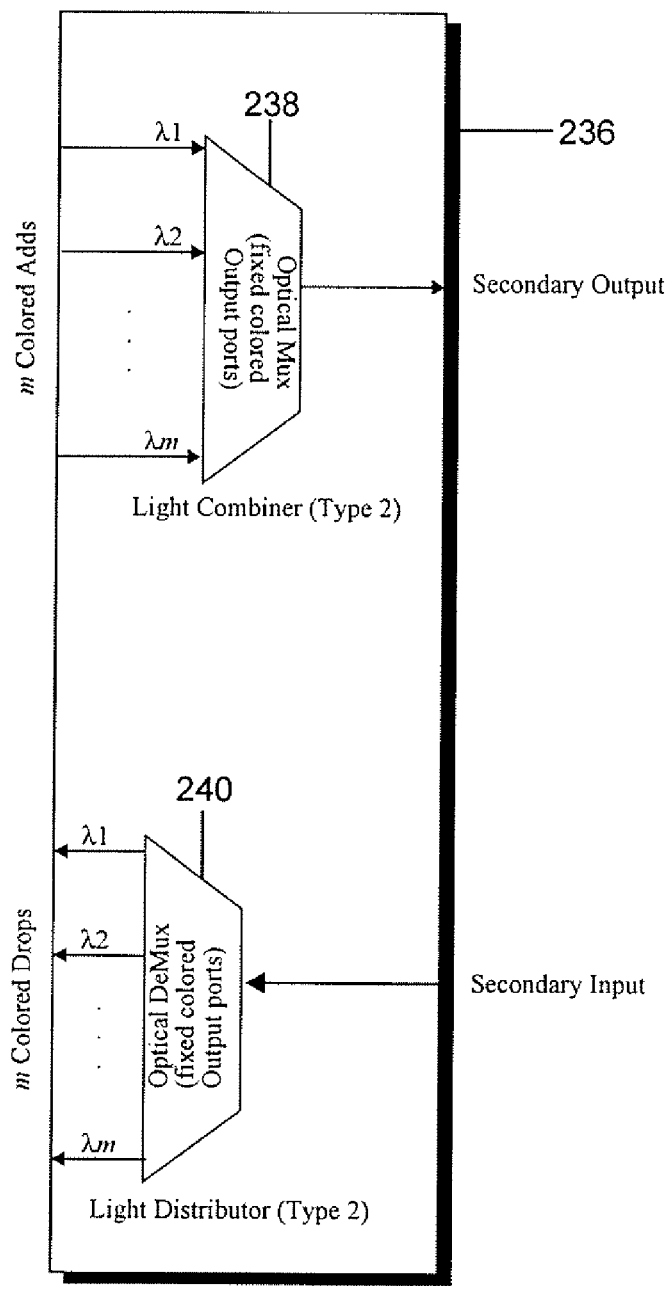
FIG. 23 is a block diagram of an example of a type-1A spur terminator.
Figure 24:
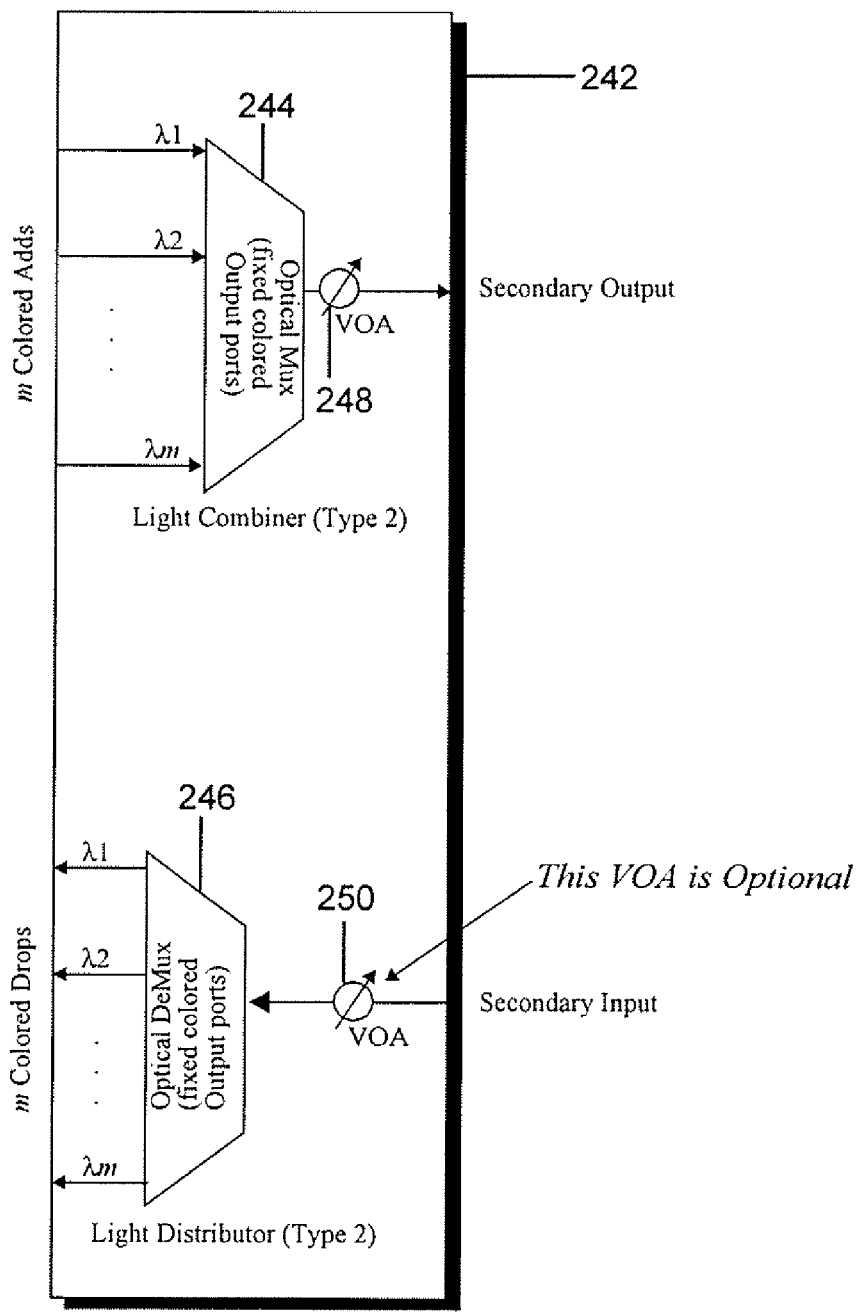
FIG. 24 is a block diagram of an example of a type-1B spur terminator.

FIGS. 23 and 24 show examples of embodiments of type-1A and type-1B spur terminators, respectively. Spur terminators can be used in conjunction with spur add-ons to form an optical spur. The type-1A spur terminator 236 shown in FIG. 23 includes a type-2 light combiner 238 and a type-2 light distributor 240. The type-1B spur terminator 242 shown in FIG. 24 includes a type-2 light combiner 244 and a type-2 light distributor 246, a VOA 248 at the subtending output of the light combiner 244, and a VOA 250 at the subtending input of the light distributor 246. The type-2 light distributors 240 and 246, the type-2 light combiners 238 and 244, and the VOAs 248 and 250 can be the same as, for example, the type-2 light distributor 52, the type-2 light combiner 58, and the VOAs 42 and 48 shown respectively in FIGS. 4A, 4B, and 3A and 3B, although they are not limited thereto. Although each type-1A and type-1B spur terminator can include a single type-2 light combiner and a single type-2 distributor, it is within the scope of the invention, in an example embodiment, for these terminators to include multiple type-2 light distributors and type-2 light combiners and/or additional components. It is further within the scope of the invention, in an example embodiment, for any of the type-2 light distributors 240 and 246, the type-2 light combiners 238 and 244, and the VOAs 248 and 250 shown in FIGS. 23 and 24 to be replaced by any other suitable component that performs the functions of these elements. The VOA 248 can be used to simultaneously attenuate all wavelengths exiting the light combiner 244 and the VOA 250 can be used to simultaneously attenuate all wavelengths entering the light distributor 246, although they are not required to do so.

Figure 25:
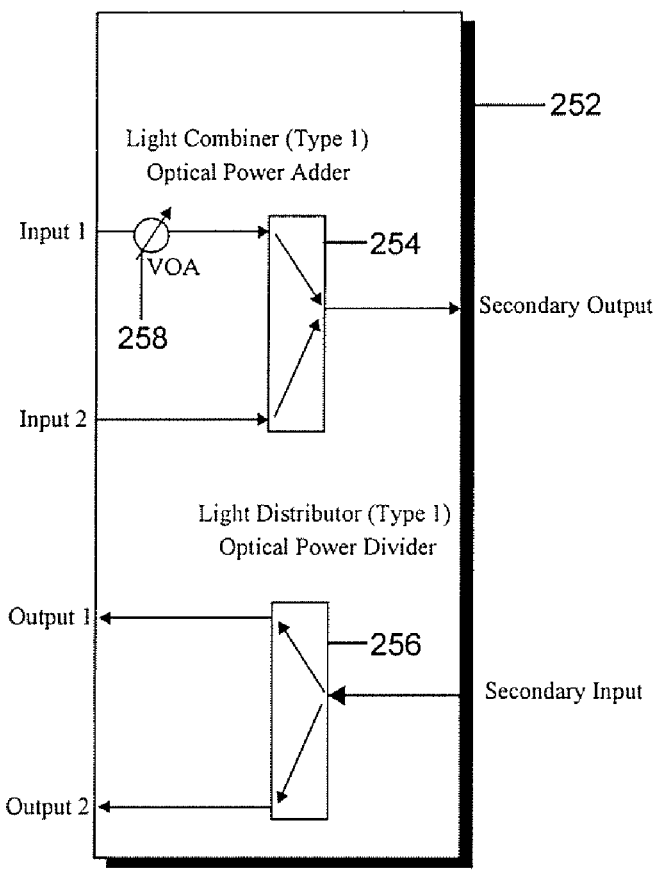
FIG. 25 is a block diagram of an example of a simple coupler module.

FIG. 25 shows an example of an embodiment of a simple coupler module 252. The simple coupler module 252 includes one 2-input, type-1 light combiner 254, one 2-output, type-1 light distributor 256, and a VOA 258 in one subtending input of the light combiner 254. The simple coupler module 252 can be used in conjunction with spur terminator modules in order to provide spur add-on functionality, as later discussed and illustrated herein. (See for example, FIGS. 28 and 30 and the corresponding discussion of these figures).

Figure 26:
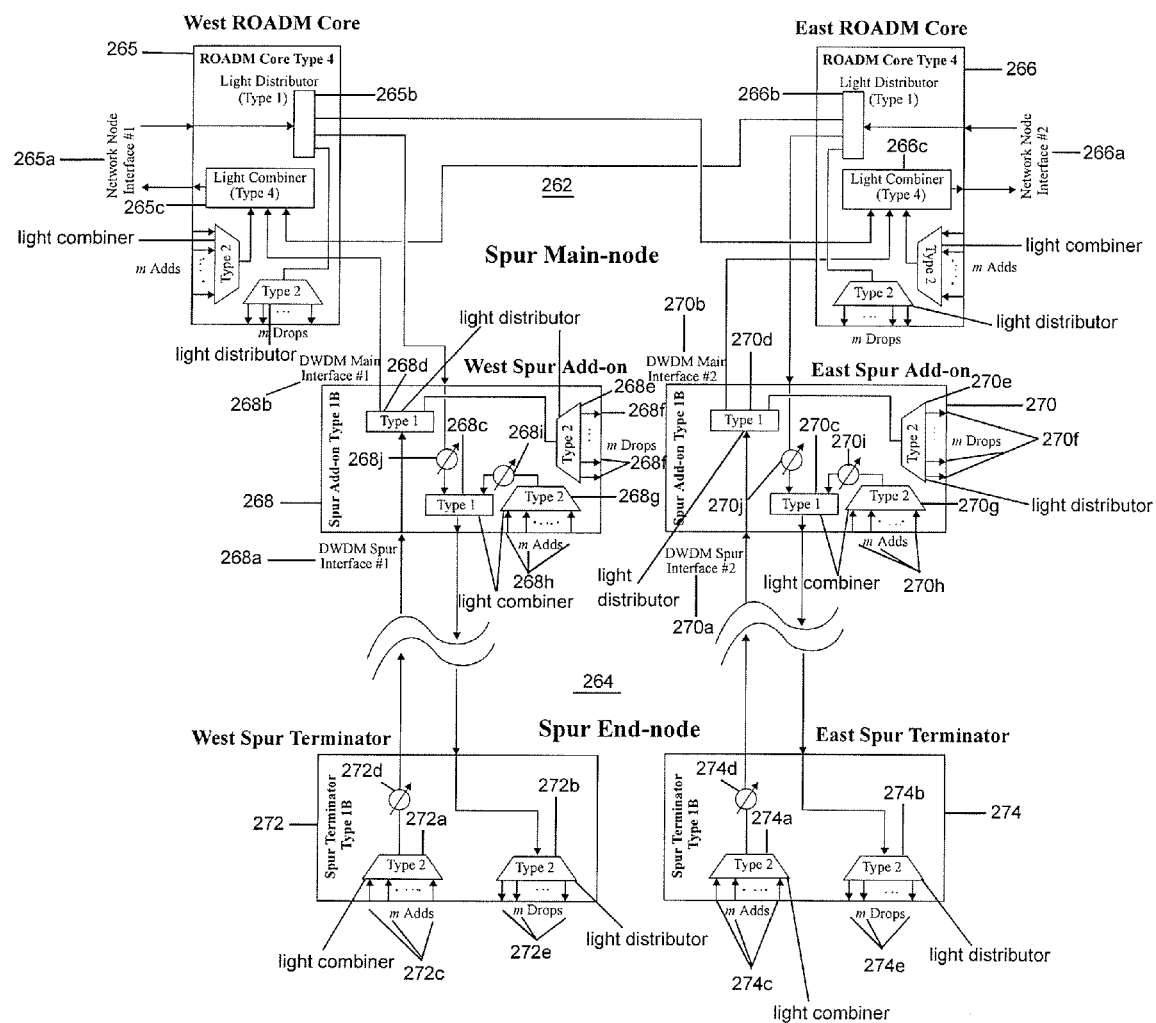
FIG. 26 is a block diagram of an example of an optical node including a spur main node and a spur end node, the spur main node including two type-4 ROADM core devices and two type-1B spur add-on modules, and the spur end node including two type-1B spur terminators.

FIG. 26 illustrates how an optical spur 260 is formed using spur add-ons and spur terminators, according to an example of an embodiment of the invention. The optical spur 260 can include a spur main node 262 and a spur end node 264. The spur main node 262 can include a type-4 west ROADM core device 265, a type-4 east ROADM core device 266, a type-1B west spur add-on 268 and a type-1B east spur add-on 270. The west ROADM core device 265 is connected to the west spur add-on 268 and the east ROADM core device 266 is connected to the east spur add-on 270. The spur end node 264 includes two type-1B spur terminators 272 and 274. The spur terminator 272 is also called the west spur terminator and the spur terminator 274 is also called the east spur terminator. The west spur terminator 272 is connected to the west spur add-on 268, while the east spur terminator 274 is connected to the east spur add-on 270. The type-4 ROADM core devices 265 and 266 can be the same as, for example, the type-4 ROADM core devices 164, 168, 174, 182, 184, 186, and 188 shown in FIGS. 16-19 (and the type-4 ROADM core devices 265 and 266 can be the same as, for example, the type-4 ROADM core devices 164, 168, 174, 182, 184, 186, and 188 except for the number of subtending inputs and outputs), although they are not limited thereto. The type-1B spur add-ons 268 and 270, and the two type-1B spur terminators 272 and 274 can be the same as, for example, the type-1B spur add-on 220 and the type-1B spur terminator 242, respectively, shown in FIGS. 22 and 24, although they are not limited thereto. In addition, VOAs 2681, 268j, 2701, and 270j can be the same as, for example, the VOAs 42 and 48 shown in FIGS. 3A and 3B, although they are not limited thereto. It is within the scope of the invention, in an example embodiment, for the optical spur 260 to include additional optical elements not shown in FIG. 26. It is further within the scope of the invention, in an example embodiment, for any of the type-4 ROADM core devices 265 and 266, the type-1B spur add-ons 268 and 270, and the two type-1B spur terminators 272 and 274 shown in FIG. 26 to be replaced by any other suitable component that performs the functions of these elements. The optical spur 260 also includes the fiber between the spur add-ons and the spur terminators. It is within the scope of the invention, in an example embodiment, for the spur end node 264 to be located a substantial distance from the spur main node 262 (tens or hundreds of kilometers), although it is not required for the spur end node 264 to be so located. As a result, the distance between the ROADM core devices 265 and 266 and the spur add-ons 268 and 270 is substantially closer than the distance between the spur main node 262 and the spur end node 264. The west spur add-on 268 and the east spur add-on 270 include DWDM spur interfaces 268a (spur interface #1) and 270a (spur interface #2), respectively, through which optical signals can be transmitted to and received from the spur end node. The west spur add-on 268 and the east spur add-on 270 also include DWDM main interfaces 268b (main interface #1) and 270b (main interface #2), also called DWDM line interfaces, through which optical signals can be transmitted to and received from the ROADM core devices 265 and 266. In addition, the term "spur interface" as used in this application can also be used to generically describe both the DWDM spur interface and the DWDM main interface of a given spur add-on. It should be understood that the other example embodiments of optical spurs discussed below can also include DWDM spur interfaces and DWDM main interfaces.

The optical spur 260 shown in FIG. 26 is a "protected spur", which means that two fiber paths can be provided from the spur main node 262 to the spur end node 264, although it is within the scope of the invention, in an example embodiment, to include more than two such fiber paths or in an alternative example embodiment, only one fiber path. From FIG. 26 it can be seen that a copy of all wavelengths arriving at the network node interface 265a (network node interface #1) at the west ROADM core device 265 can be forwarded to the spur end node 264 via the path through the type-1 light distributor 265b within the west ROADM core device 265, through the type-1 light combiner 268c in the west spur add-on 268, and down the fiber to the type-2 light distributor 272b within the west spur terminator 272. Similarly, a copy of all wavelengths arriving on DWDM network node interface 266a (network node interface #2) of the east ROADM core device 266 can forwarded to the spur end node 264 via the path through the type-1 light distributor 266b in the east ROADM core device 266, through the type-1 light combiner 270c in the east spur add-on 270, and down the fiber to the type-2 light distributor 274b within the east spur terminator 274. At the spur terminators 272 and 274, all m wavelengths supported by the ROADM network of which the optical spur 260 is a part may be dropped via the type-2 light distributors 272b and 274b within the spur terminators 272 and 274. The optical network of which the optical spur 260 is a part can be configured so that a working copy of a given wavelength arrives at one DWDM main interface (one of the interface 268b on the west spur add-on 268 and the interface 270b the east spur add-on 270) within the spur main node 262, and a duplicate copy is received at the other DWDM line interface (the other of the interface 268b of the west spur add-on 268 and the interface 270b the east spur add-on 270) within the spur main node 262. Therefore, one copy of the wavelength is sent to the west spur terminator 272 and the other copy of the wavelength is sent to the east spur terminator 274. Since there are two copies of a given wavelength available at the spur end node 264, if one of the two fiber pairs connecting the spur end node 264 to the spur main node 262 is cut or otherwise damaged, one fiber pair will remain intact in order to send the remaining copy of the wavelength to the spur end node 264.

It can also be seen from FIG. 26 that wavelengths may be "added" at the spur end node 264 and be forwarded back to the spur main node 262 via two parallel paths. For instance, a given wavelength may be added to the west spur terminator 272 at the add ports 272c (denoted as "adds" in FIG. 26), where they can be combined by the type-2 light combiner 272a and sent up the spur fiber to the west spur add-on 268. An identical copy of the added wavelength may be added to the east spur terminator 274 at the add ports 274c (denoted as "adds" in FIG. 26), where they can be combined by the type-2 light combiner 274a and sent up the fiber spur to the east spur add-on 270. Once the two copies of the added wavelength arrive at the spur add-ons 268 and 270, duplicate copies can be made at the add-ons 268 and 270 via the type-1 light distributors 268d and 270d within the spur add-ons 268 and 270, respectively, and one copy is dropped out of each of the two spur add-ons 268 and 270 via the type-2 light distributors 268e and 270e and the drop ports 268f and 270f (denoted in FIG. 26 as "drops"), and one copy is sent to each of the ROADM core devices 265 and 266 from the type-1 light distributors 268d and 270d. The type-4 light combiner 265c of the ROADM core device 265 can combine the "added" wavelength from the spur end node 264 with any other wavelengths added at an add port of the ROADM core device 265 and combined by a type-2 light combiner thereof and with any other wavelengths received from the network node interface 266a distributed by the type-1 light distributor 266b of the ROADM core device 266. Similarly, the type-4 light combiner 266c of the ROADM core device 266 can combine the "added" wavelength from the spur end node 264 with any other wavelengths added at an add port of the ROADM core device 266 and combined by a type-2 light combiner thereof and with any other wavelengths received from the network node interface 265a distributed by the type-1 light distributor 265b of the ROADM core device 265.

The above example of an embodiment of the invention illustrates how wavelengths can be directed to a main node from a spur end node and how wavelengths can be directed from a main node to a spur end node. The spur add-ons 268 and 270 also include the ability to add wavelengths to the optical spur 260 at the spur main node 262. This is accomplished by inserting added wavelengths into the type-2 light combiner 268g from add ports 268h within the spur add-on 268 and/or inserting added wavelengths into the type-2 light combiner 270g from the add ports 270h within the spur add-on 270. The added wavelengths can be then combined with any wavelengths from the corresponding ROADM core device (265 or 266), and sent down the spur fiber, where they can be dropped via the type-2 light distributor (272b or 274b) within corresponding the spur terminator (272 or 274) (along with wavelengths from the corresponding ROADM core device (265 or 266)). Similarly, wavelengths added at one of spur terminators 272 and 274 at the spur end node 264 may be dropped at their corresponding spur add-on (268 or 270), and blocked from leaving the corresponding DWDM network node interface (265a or 266a) of the corresponding ROADM core device (265 or 266) by setting to zero, the attenuation coefficient of the appropriate VOA (not shown) within the type-4 light combiner (265c or 266c) within that corresponding ROADM core device (265 or 266). Transport traffic that is transported exclusively between the spur main node 262 and the spur end node 264 will be referred to as spur "local traffic".

Since, wavelengths from the DWDM line interfaces (265a, 266a) of the ROADM core devices (265, 266) can be passively coupled with the added wavelengths from the spur add-ons (268, 270), wavelengths added at the spur add-ons (268, 270) must be different than those input into the optical spur 260 from the DWDM line interfaces (265a, 266a) of the ROADM core devices (265, 266). In a typical application, some number of wavelengths may be "reserved" for local traffic that is transported solely between the spur main node 262 and its corresponding spur end node 264. These reserved wavelengths may be "reused" on each optical spur of the DWDM network of which the optical spur 260 is a part, since they are never used on the main DWDM network artery of the DWDM network.

Figure 27:
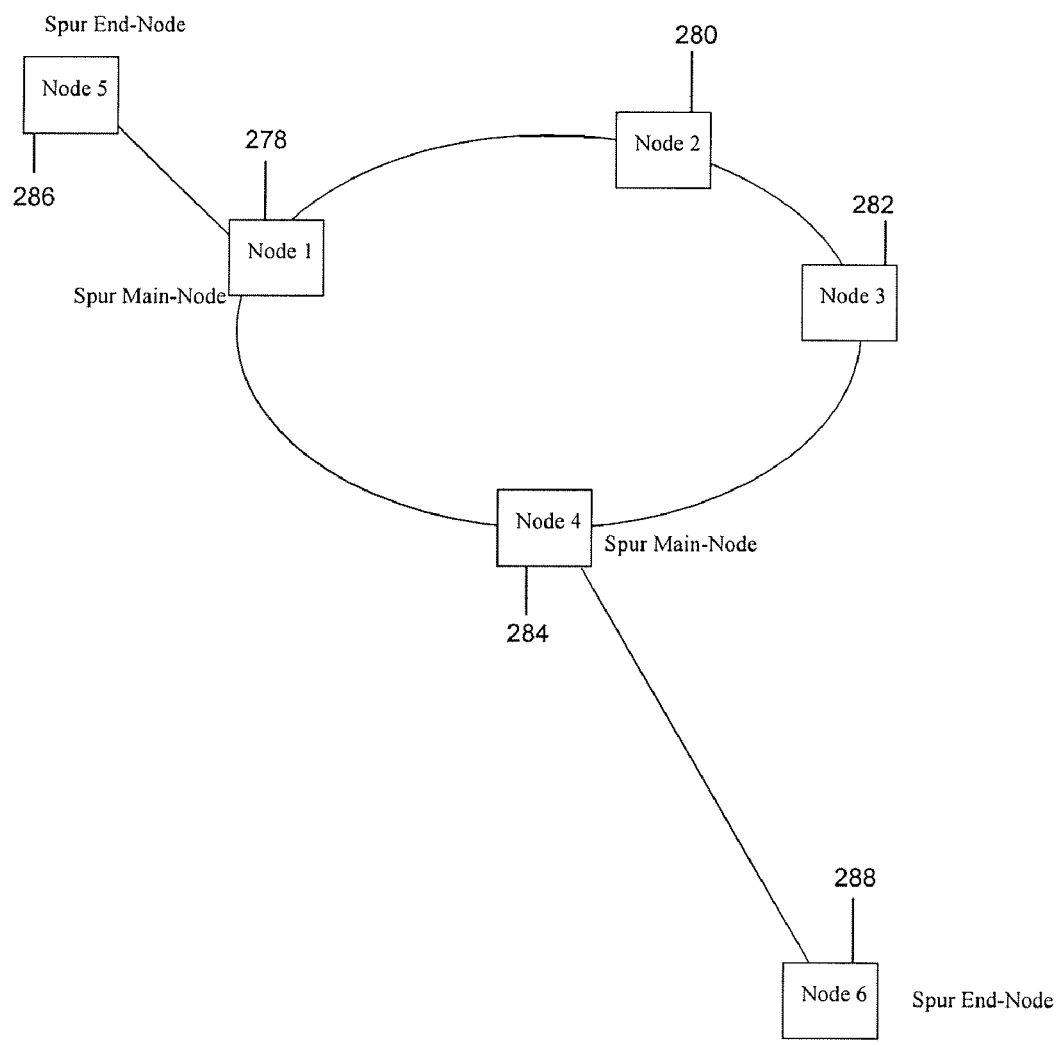
FIG. 27 is a block diagram of an example of an optical node including six nodes including two spur main nodes and two spur end nodes.

To more clearly illustrate the concept of the reuse of wavelengths within a network having optical spurs, FIG. 27 is provided. FIG. 27 shows a DWDM network in the form of a ring network 276 including Nodes 278 (node 1), 280 (node 2), 282 (node 3), and 284 (node 4) that form a ring, and nodes 286 (node 5) and 288 (node 6), which are connected to one of the nodes in the ring and may be a remote distance (e.g., tens of kilometers) from the ring, i.e., substantially further than the distance between the nodes within the ring, although it is within the scope of the invention, in an example embodiment, for nodes 5 and 6 to be as close to the nodes in the ring as the nodes in the ring are to each other. Also, the spur end nodes may be closer to the ring then the nodes within the ring are to each other. Nodes 5 and 6 are spur end nodes and are connected, respectively, to nodes 1 and 4, which are spur main nodes. Nodes 1 and 5 together form an optical spur, and nodes 4 and 6 together form another optical spur. One of ordinary skill in the art would understand that a failure in a link between a spur main node (e.g., Node 4) and a spur end node (e.g., Node 6) would not disrupt traffic between the nodes forming the ring (e.g., Nodes 1 through 4). It is within the scope of the invention, in an example embodiment, for the ring network 276 to include additional elements not shown in FIG. 27 or to include fewer nodes than is shown in FIG. 27. In the event the ring network 276 uses wavelengths 1 through m, wavelengths 1 to 4 could be reserved for spur "local traffic" (between nodes 1 and 5 and between nodes 4 and 6 only) while traffic transported between all other node pairs may use wavelengths 5 through m, where m is the total number of wavelengths available on the DWDM network. Since, wavelengths 1 to 4 are never placed on the main ring (artery) connecting nodes 1 through 4, wavelengths 1 to 4 may be used to transport traffic between nodes 1 and 5 only, and then the same wavelengths may be reused to transport traffic between nodes 4 and 6 only. It should be noted that traffic between a given spur end node and any network node other than the corresponding spur main node would utilize a wavelength between wavelengths 5 and m. For instance, traffic from node 5 to node 3 would not use wavelengths 1 to 4 (in this example), but would instead use wavelengths 5 to m. Similarly traffic from node 5 to node 6 would use wavelengths 5 to m (in this example where wavelengths 1 to 4 are reserved for spur "local traffic").

In FIG. 26, it can be noted that there are two VOAs in the add path of each spur add-on (268 and 270). One VOA (268i, 270i) is positioned between the type-2 light combiner (268g, 270g) at which wavelengths are added and the type-1 light combiner (268c, 270c), which combines wavelengths added at the spur add-on with wavelengths from the ROADM core device (265, 266). The other VOA (268j, 270j) is positioned at the subtending input of the type-1 light combiner (268c, 270c) of the spur add-on (268, 270) that receives an optical signal from the DWDM line interface (265a, 266a) of the ROADM core device (265 or 266). These VOAs 268i, 268j, 270i, 270j can be used to "coarsely" power equalize the locally added wavelengths with those wavelengths from the corresponding DWDM line interface (265a, 266a) of the corresponding ROADM core device (265, 266) before they are combined by the type-1 combiner (268c, 270c) within the spur add-on (268, 270), although they are not required to do so. It is within the scope of the invention, in an example embodiment, for the wavelengths from the DWDM line interface (265a, 266a) to be attenuated by a substantial amount by the type-1 light distributor (265b, 266b) within the ROADM core device (265, 266), and therefore will be at a much lower power level than the wavelengths added at the spur add-on (268, 270), though it is not required. This means that in this case, the wavelengths added at the spur add-on (268, 270) will need to be attenuated to match the lower optical power associated with the wavelengths from the ROADM core devices (265, 266). In an alternative implementation of the type-1B spur add-on, there may a single VOA. It is positioned between the type-2 light combiner (268g, 270g) at which wavelengths are added and the type-1 light combiner (268c, 270c) within each spur add-on (268, 270). It should be noted that although the type-1B spur terminator is used in FIG. 26 (with an internal VOA), a type-1A terminator could also be used, since there is often no need for the VOA at the spur end node 264.

Since the type-1B spur add-ons (268, 270) shown in FIG. 26 employ a type-1A light combiner (268c, 270c), a type-1 light distributor (268d, 270d), a type-2 light combiner (268g, 270g), a type-2 light distributor (268e, 270e), and VOAs (268i, 268j, 270i, 270j) the type-1B spur add-on can be configured to: 1) combine into a combined signal with the type-1A light combiner (268c, 270c) a) a multiple-wavelength, attenuated optical signal generated by combining, with the type-2 light combiner (268h, 270h), single-wavelength optical signals added from a plurality of colored add ports (268h, 270h) (denoted by "Adds" in FIG. 26) into a multiple-wavelength optical signal and attenuating, with the VOA (268i, 270i), the multiple-wavelength optical signal, and b) a multiple-wavelength, attenuated optical signal generated by receiving a multiple-wavelength optical signal from the network node interface (265a, 266a) via one of the ROADM core devices (265, 266) and attenuating the multiple-wavelength optical signal from the network node interface (265a, 266a) via ROADM core device (265, 266) with another VOA (268j, 270j); 2) output the combined signal from the spur interface (268a, 270a) to the spur end node 264 with the type-1A light combiner (268c, 270c); and 3) divide, with the type-1 light distributor (268d, 270d), a multiple-wavelength optical signal, received by the spur interface (268a, 270a) from the spur end node 264, into a plurality of optical-power-divided, multiple-wavelength optical signals, one of which is output to one of the ROADM core devices (265, 266) and then to the network node interface (265a, 266a), and another of which is divided, by the type-2 light distributor (268e, 270e), into a plurality of single-wavelength optical signals output to the plurality of colored drop ports (268f, 270f) (denoted by "m Drops" in FIG. 26). It is within the scope of the invention, in an example embodiment, for the FIG. 26 example embodiment to employ a type-1A spur add-on (which can be the same as, for example, the type-1A spur add-on 210 shown in FIG. 21, although it is not limited thereto) instead of a type-1B spur add-on. Since this type-1A spur add-on does not employ VOAs, but employs a type-1 light combiner, a type-1 light distributor, a type-2 light combiner, and a type-2 light distributor, the processing of the signals therethrough can be the same as the processing of signals by the type-1B spur add-ons 268 and 270, as noted above, except for the attenuation steps, which may not be performed.

Since the type-1B spur terminators (272, 274) each include a type-2 light distributor (272b, 274b), a VOA (272d, 274d), and a type-2 light combiner (272a, 274a), the spur terminators 272 and 274 can be configured to: 1) receive a plurality of single-wavelength optical signals from a plurality of colored add ports (272c, 274c) (denoted by "m Adds" in FIG. 26), combine the plurality of single-wavelength optical signals from the plurality of colored add ports (272c, 274c) into a multiple-wavelength optical signal, attenuate the multiple-wavelength optical signal with the VOA (272d, 274d), and output the attenuated, multiple-wavelength optical signal to the spur interface (268a, 270a) of one the spur add-on (268, 270); and 2) receive a multiple-wavelength optical signal from the spur interface (268a, 270a) of the spur add-on (268, 270), separate the multiple-wavelength optical signal from the spur interface (268a, 270a) into a plurality of single-wavelength optical signals with the type-2 light distributor (272b, 274b), and output the plurality of single-wavelength optical signals to a plurality of colored drop ports (272e, 274e) (denoted by "m Drops" in FIG. 26) so as to output each single-wavelength optical signal to only one pre-assigned drop port (272e, 274d), different from the drop ports to which the other single-wavelength optical signals are output.

It is within the scope of the invention, in an example embodiment, to use a type-1A spur terminator (which may be the same as, for example, the type-1A spur terminator 236 shown in FIG. 23, although it is not limited thereto) instead of the type-1B spur terminator (272, 274) in the optical spur 260 shown in FIG. 26. Since this type-1A spur terminator may not employ a VOA, but employs a type-2 light combiner, and a type-2 light distributor, the processing of the signals therethrough can be the same as for the use of the type-1B spur terminator (272, 274), as discussed above, except for the attenuation step, which may not be performed.

It will later be shown that a type-4 ROADM core device could be used in place of the spur add-ons and spur terminators (according to the example embodiment shown in FIG. 36), but using type-4 ROADM core devices is a much more costly solution, because the type-4 light combiners are complex and thus costly optical components.

Figure 28:
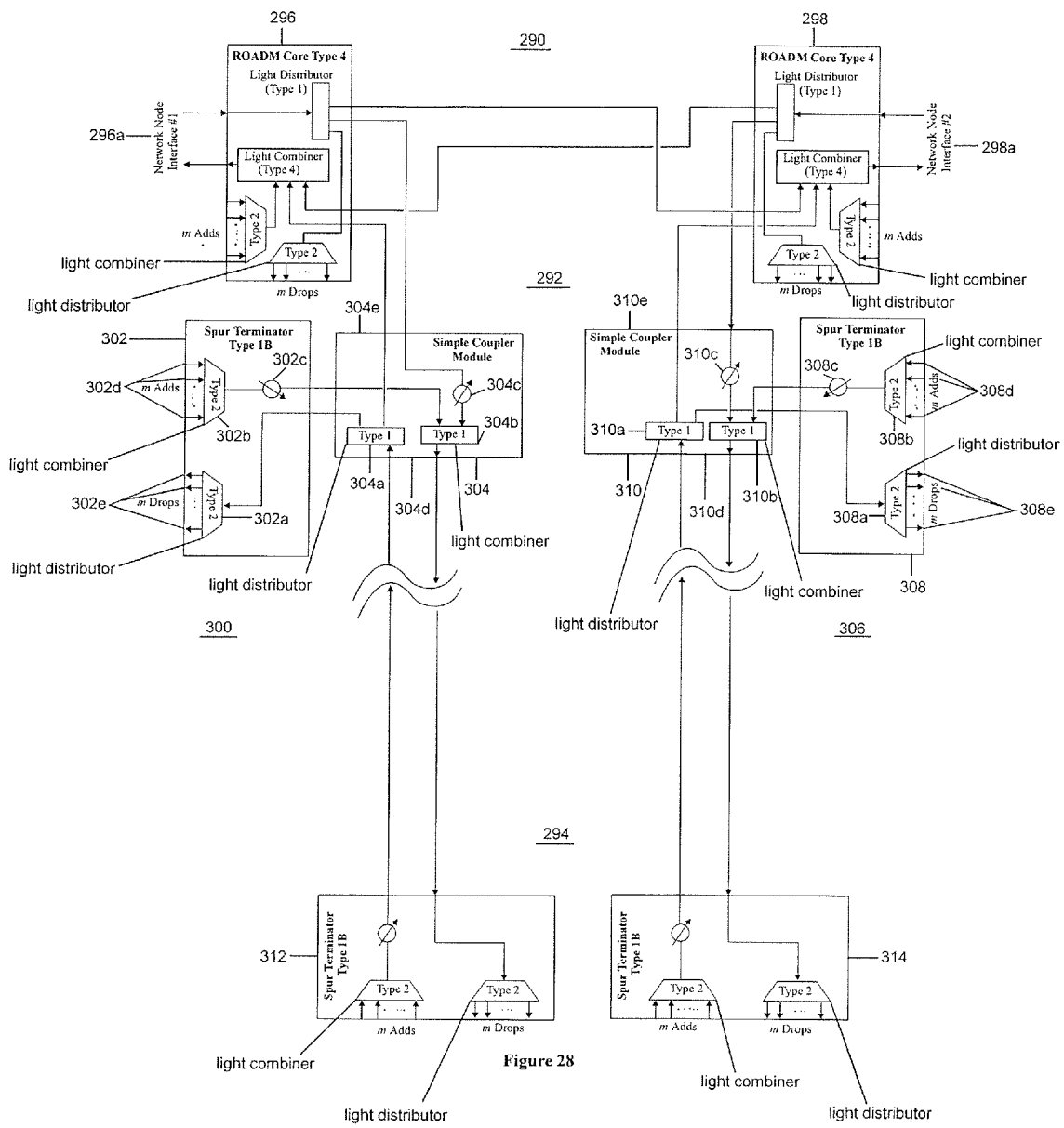
FIG. 28 is a block diagram of an example of an optical node including a spur main node and spur end node, the spur end node including two type-1B spur terminators, and the spur main node including two type-1B spur terminators, two simple coupler modules, and two type-4 ROADM core devices.

FIG. 28 depicts the same functionality as in FIG. 26, with the exception that the spur add-on in the spur main node is divided into two separate physical circuit modules: a type-1B spur terminator module, and a simple coupler module, according to an example of an embodiment of the invention. Such a solution provides a very low-cost optical spur 290 that does not require local traffic, since, for such a case, only the simple coupler module is needed within the spur main node, i.e., the spur terminator is not used and need not be present in the spur main node. However, placing the simple coupler module within the spur main node (rather than running fiber directly from the ROADM core device to the spur end node) enables the hitless addition of spur local traffic at some later date, by simply adding the spur terminator module. Thus, for the initial deployment of the spur (prior to local traffic), the network implementer could incur the cost of the simple coupler module within the spur main node without incurring the cost of the spur terminator within the spur main node. FIG. 28 illustrates the case of full deployment, once the spur terminator module is added. But it should be understood that the optical spur 290 can be used without the spur terminators in the spur main node. FIG. 28 shows the optical spur 290, which includes a spur main node 292 and a spur end node 294. The spur main node 292 can include a type-4 west ROADM core device 296, a type-4 east ROADM core device 298, a west spur add-on 300 including a type-1B west spur terminator 302 connected to a west simple coupler module 304, and an east spur add-on 306 including a type-1B east spur terminator 308 connected to an east simple coupler module 310. The west ROADM core device 296 is connected to the west spur add-on 300 via the west simple coupler module 304, and the east ROADM core device 298 is connected to the east spur add-on 306 via the east simple coupler module 310. The spur end node 294 includes two type-1B spur terminators 312 and 314. The spur terminator 312 is also called the west spur terminator and the spur terminator 314 is also called the east spur terminator. The west spur terminator 312 is connected to the west spur add-on 300 via the west simple coupler module 304, while the east spur terminator 314 is connected to the east spur add-on 306 via the east simple coupler module 310. The type-4 ROADM core devices 296 and 298 can be the same as, for example, the type-4 ROADM core devices 164, 168, 174, 182, 184, 186, and 188 shown in FIGS. 16-19, although they are not limited thereto. The type-1B spur terminators 302, 308, 312, and 314 can be the same as, for example, the type-1B spur terminator 242 shown in FIG. 24, although they are not limited thereto. The simple coupler modules 304 and 310 can be the same as, for example, the simple coupler module 252 shown in FIG. 25, although they are not limited thereto. It is within the scope of the invention, in an example embodiment, for the optical spur 290 to include additional components not shown in FIG. 28. It is further within the scope of the invention, in an example embodiment, for any of the type-4 ROADM core devices 296 and 298, the type-1B spur terminators 302, 308, 312, and 314, and the simple coupler modules 304 and 310 to be replaced by any other suitable component that performs the functions of these elements.

Since the simple coupler modules 304 and 310 each include a type-1 light distributor (304a, 310a), a type-1 light combiner (304b, 310b), and a VOA (304c, 310c), and since the type-1B spur terminators (302, 308) attached to the simple coupler modules (302, 310) in the spur main node 292 include a type-2 light distributor (302a, 308a), a type-2 light combiner (302b, 308b), and a VOA (302c, 308c), these elements can be configured to: 1) receive and then combine, with the type-2 light combiner (302b, 308b) of the type-1B spur terminator (302, 208), a plurality of optical signals added at a plurality of add ports (302d, 308d) (denoted by "m Adds" in FIG. 28) into a single optical signal, attenuate the single optical signal with the VOA (302c, 308c) of the type-1B spur terminator (302, 308), and direct the attenuated single optical signal to the simple coupler module (304, 308), where the attenuated single optical signal is combined, using the type-1 light combiner (304b, 310b), with an optical signal of a plurality of wavelengths received from the network node interface (296a, 298a) via one of the ROADM core devices (296, 298) to produce a combined signal that is output from the spur interface (304d, 310d) to the spur end node 294 with the type-1 light combiner (304b, 310b) of the simple coupler module (304, 310), and 2) divide, with the type-1 light distributor (304a, 310a) of the simple coupler module (304, 310), a multiple-wavelength optical signal received by the spur interface (304d, 310d) from the spur end node 294 into a plurality of optical-power-divided, multiple-wavelength optical, one of which is output to the network node interface (296a, 298a) via one of the ROADM core devices (296, 298) with the type-1 light distributor (304a, 310a) of the simple coupler module (304, 310), and another of which is divided and separated into a plurality of single-wavelength optical signals that can be dropped at a plurality of drop ports (302e, 308e) (denoted by "m Drops" in FIG. 28) with the type-2 light distributor (302a, 308a) of the type-1B spur terminator (302, 308). It should be noted that FIG. 28 also denotes the number of add and drop ports in the spur terminators 312 and 314 by the phrase "m Adds" and "m Drops".

Figure 29:
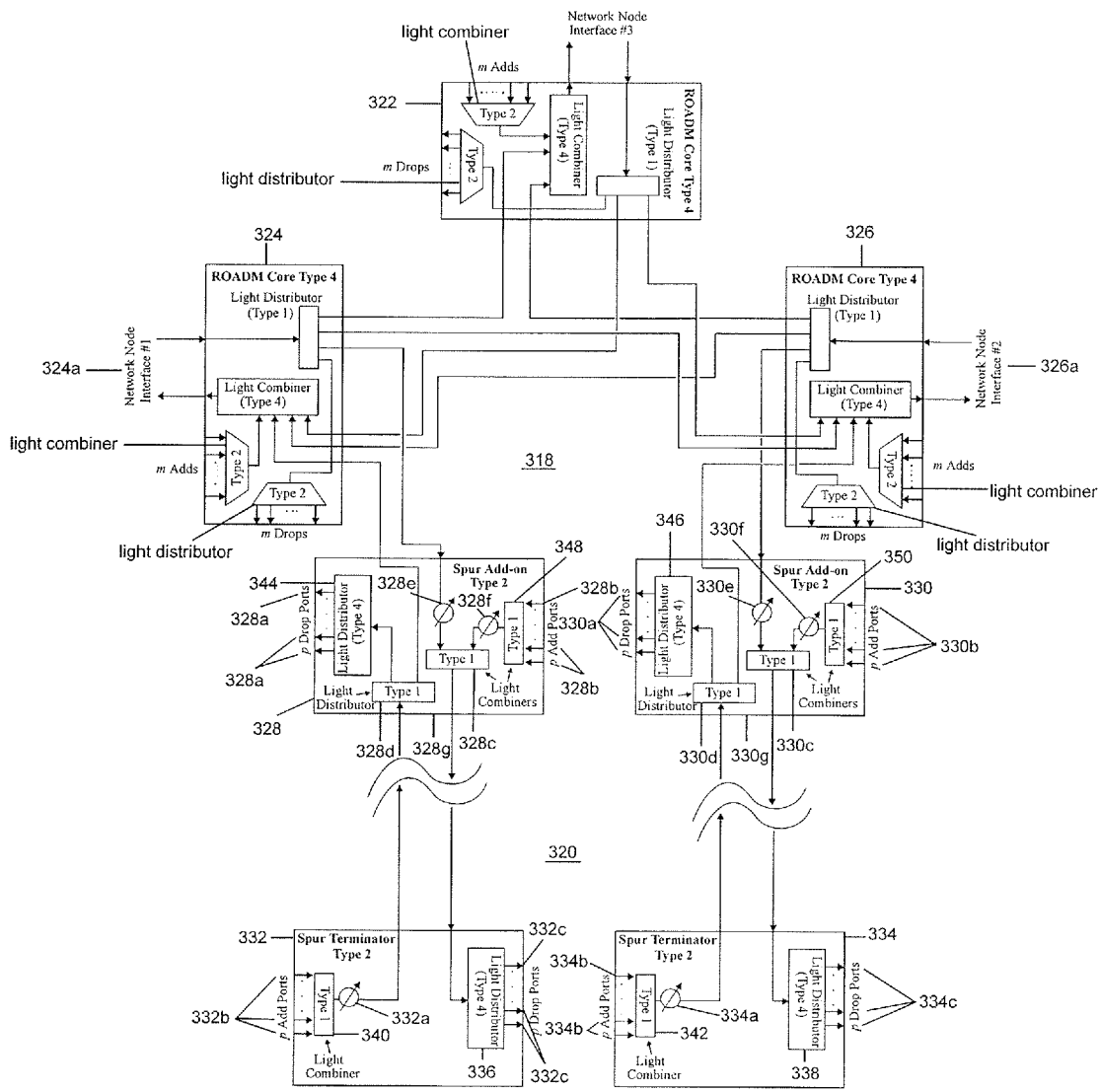
FIG. 29 is a block diagram of an example of an optical node including a spur main node and a spur end node, the spur main node including three type-4 ROADM core devices and two type-2 spur add-ons, and the spur end node including two type-2 spur terminators.

FIG. 29 depicts an example of an alternative embodiment of the spur add-on and spur terminators: the type-2 spur add-on, and the type-2 spur terminator. This alternative example embodiment is shown in the context of an optical spur 316 including a spur main node 318 and a spur end node 320. But is should be understood that it is within the scope of the invention, in an example embodiment, to use the type-2 spur add-on and the type-2 spur terminator in other types of optical spurs and other network elements and nodes. The spur main node 318 includes three type-4 ROADM core devices 322, 324, and 326. The type-4 ROADM core devices 322, 324, and 326 can be the same as, for example, the type-4 ROADM core devices 164, 168, 174, 182, 184, 186, and 188 shown in FIGS. 16-19, although they are not limited thereto. It is within the scope of the invention, in an example embodiment, for the optical spur 316 to include additional components not shown in FIG. 29. The optical spur 316 also includes two type-2 spur add-ons 328 and 330. The spur end node 320 includes type-2 spur terminators 332 and 334. The manner in which the type-2 spur add-on and the type-2 spur terminator differ from the type-1A and type-1B spur add-ons and spur terminators can be understood from reviewing the example embodiment shown in FIG. 26. From FIG. 26 it can be seen that the add/drop ports (268f, 268h, 270f, 270h) on the spur add-ons (268, 270) and the add/drop ports (272c, 272e, 274c, 274e) of the spur terminators (272, 274) were of the colored type (although both the spur add-ons and spur terminators supported "full access" to all m network wavelengths). In contrast, the type-2 spur add-on and type-2 spur terminator provide "colorless" add/drop ports. Typically the number of colorless add/drop ports supported is some number p less than m. But it is within the scope of the invention, in an example embodiment, for p to be equal to m. Thus, the number add and drop ports in the spur main node 318 and in the spur end node 320 is denoted in FIG. 29 by the phrases "p Add Ports" and "p Drop Ports".

This functionality is implemented by using type-4 light distributors and type-1 light combiners. More specifically, the type-2 spur terminators 332 and 334 can each include a type-4 light distributor 336 or 338 (used to selectively drop wavelengths), a type-1 light combiner 340 or 342 (used to add wavelengths), and a VOA 332a or 334a. The type-4 light distributors 336 and 338 can be the same as, for example, the type-4 light distributor 76 shown in FIG. 6, although they are not limited thereto. The type-1 light combiners 340 and 342 can be the same as, for example, the type-1 light combiner 30 shown in FIG. 2B, although they are not limited thereto. The VOAs 332a and 334a can be the same as, for example, the VOAs 42 and 48 shown in FIGS. 3A and 3B, although they are not limited thereto. The type-1 light combiners 340 and 342 allow any wavelength to be added to any add port (332b, 334b) of the terminators 332, 334 (i.e., the type-1 light combiners 340 and 342 provide for colorless add ports). The type-4 light distributors 336 and 338 within the spur terminators 332 and 334 provide the ability to direct any received wavelength to any of the p drop ports (332c, 334c) of the terminators 332 and 334 (i.e., the distributors 336 and 338 provide for colorless drop ports).

Similarly, the type-2 spur add-ons (328 and 330) can each include a type-4 light distributor (344 or 346) that can be used to provide colorless drop ports (328a, 330a) and a type-1 light combiner (348 or 350) that can be used to provide colorless add ports (328b, 330b) for the spur local traffic at the spur main node 318. Each type-2 spur add-on (328, 330) also includes another type-1 light combiner (328c, 330c), a type-1 light distributor (328d, 330d), a VOA (328e, 330e) at the input of the type-1 light combiner (328c, 330c) that receives an optical signal from one of the type-4 ROADMs (324, 326), and a VOA (328f, 330f) at the output of the type-1 light combiner (348, 350). The type-4 light distributors 344 and 346 can be the same as, for example, the type-4 light distributor 76 shown in FIG. 6, although they are not limited thereto. The type-1 light combiners 348, 350, 328c, 330c can be the same as, for example, the type-1 light combiner 30 shown in FIG. 2B, although they are not limited thereto. The type-1 light distributors 328d and 330d can be the same as, for example, the type-1 light distributor 24 shown in FIG. 2A, although they are not limited thereto. The VOAs 328e, 328f, 330e, and 330f can be the same as, for example, the VOAs 42 and 48 shown in FIGS. 3A and 3B, although they are not limited thereto.

It can also be noted in FIG. 29 that the spur main node 318 is a 3-degree node, thus illustrating how the subtending inputs and outputs of ROADM core devices 322, 324, and 326 can be utilized for different purposes within a given DWDM node. It is within the scope of the invention, in an example embodiment, for any of the type-4 ROADM core devices 322, 324, 326, the type-2 spur add-ons 328, 330, and the type-2 spur terminators 332, 334 shown in FIG. 29 to be replaced by any other suitable component that performs the functions of these elements.

Since the type-2 spur add-on includes two type-1 light combiners, a type-1 light distributor, a type-4 light distributor, and two VOAs, these add-ons 328 and 330 can be configured to: 1) combine a plurality of optical signals added at a plurality of colorless add ports (328b, 330b) (denoted by "p Add Ports" in FIG. 29) into a single optical signal with one of the type-1 light combiners (348, 350); 2) attenuate the single optical signal with one of the VOAs (328f, 330f); 3) combine the attenuated single optical signal with an optical signal of a plurality of wavelengths a) received from the network node interface (324a, 326a) via one of the ROADM core devices (324, 326) and b) attenuated by the other VOA (328e, 330e) after being received, to produce a combined signal that is output from the spur interface (328g, 330g) to the spur end node 320 with the other type-1 light combiner (328c, 330c); 4) divide a multiple-wavelength optical signal received by the spur interface (328g, 330g) from the spur end node 320 into a plurality of optical-power-divided, multiple-wavelength optical signals with the type-1 light distributor (328d, 330d); 5) output one of optical-power-divided, multiple-wavelength optical signals to the network node interface (324a, 326a) via one of the ROADM core devices (324, 326) with the type-1 light distributor (328d, 330d); and 6) with the type-4 light distributor (344, 346) separate another one of the optical-power-divided, multiple-wavelength optical signals into a plurality of single-wavelength optical signals, change the intensity of at least one of the single-wavelength optical signals, and assign and output each of the single-wavelength optical signals to any one of and only one of a plurality of colorless drop ports (328a, 330a) (denoted by "p Drop Ports" in FIG. 29).

Since the type-2 spur terminators (332, 334) include a type-1 light combiner (340, 342) and a type-4 light distributor (336, 338), the type-2 spur terminators 332 and 334 can be configured to: 1) receive a plurality of optical signals from a plurality of colorless add ports (332b, 334b) (denoted by "p Add Ports") with the type-1 light combiner (340, 342); 2) combine the plurality of optical signals from the plurality of colorless add ports (332b, 334b) into a single optical signal with the type-1 light combiner (340, 342); 3) attenuate the single optical signal with the VOA (332a, 334a); 4) output the attenuated, single optical signal to the spur interface (328g, 330g) of one of the spur add-ons (328, 330); 5) receive a multiple-wavelength optical signal from the spur interface (328g, 330g) of the spur add-on (328, 330) with the type-4 light distributor (336, 338); 6) divide the multiple-wavelength optical signal from the spur interface (328g, 330g) into a plurality of single-wavelength optical signals with the type-4 light distributor (336, 338); 7) individually attenuate the plurality of single-wavelength optical signals with the type-4 light distributor (336, 338); and 8) assign each of the individually attenuated single-wavelength optical signals to any one of and only one of a plurality of drop ports (332c, 334c) (denoted by "p Drop Ports"), and output each individually attenuated single-wavelength optical signal from a different assigned drop port (332c, 334c) with the type-4 light distributor (336, 338).

Figure 30:
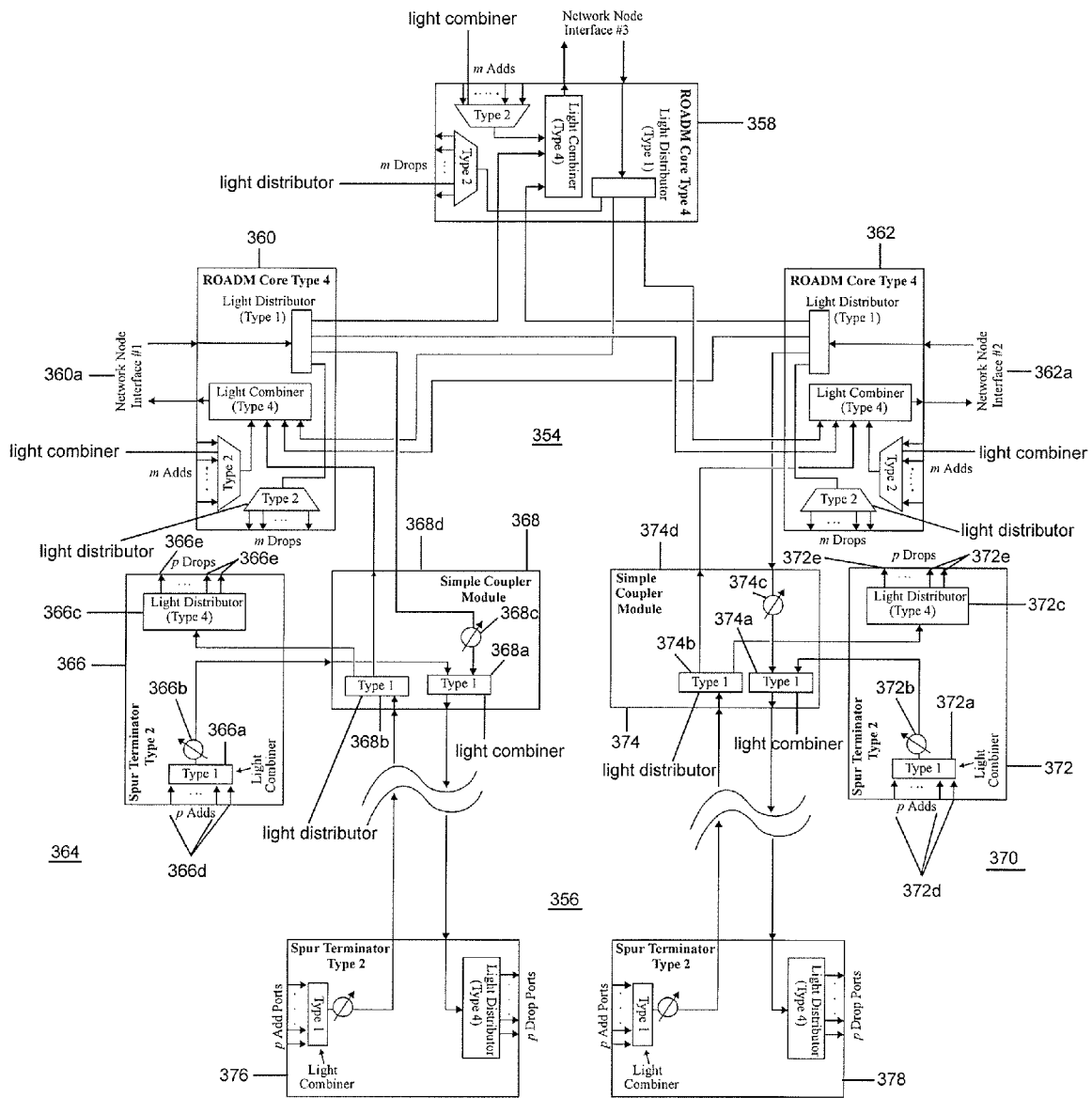
FIG. 30 is a block diagram of an example of an optical node including a spur main node and a spur end node, the spur main node including three type-4 ROADM core devices, two type-2 spur add-ons, and two simple coupler modules, and the spur end node including two type-2 spur terminators.

FIG. 30 shows an example of a configuration that is functionally identical to that shown in FIG. 29, except for the physical partitioning of the type-2 spur add-on functionality across two modules: a simple coupler module and a type-2 spur terminator module, according to an example of an embodiment of the invention. As was the case for the FIG. 28 configuration, the FIG. 30 configuration provides for a low-cost means of providing spur capability within the spur main node for cases where spur local traffic is not initially required, while providing a hitless method of adding spur local traffic at some later date. It should be noted that the spur add-ons used within the spur main node may have colorless add/drop ports, while the spur terminators within the spur end nodes may have colored add/drop ports, or vice versa. Alternatively, both the spur add-ons in the spur main node and the spur terminators within the spur end node may have colorless add/drop ports or colored add/drop ports. FIG. 30 illustrates the case of full deployment, once the spur terminator module is added. But it is within the scope of the invention, in an example embodiment, to partially deploy the type-2 spur add-on functionality by omitting the type-2 spur terminator in the main node. It is also within the scope of the invention, in an example embodiment, to employ the combination of a simple coupler module and a type-2 spur terminator in a different type of optical spur than the optical spur 352 shown in FIG. 30, and it is within the scope of the invention, in an example embodiment, to employ this combination in other nodes and network elements. Accordingly, FIG. 30 shows an optical spur 352 including a spur main node 354 and a spur end node 356. The spur main node 354 can include three type-4 ROADM core devices 358, 360, and 362, a west spur add-on 364 including a type-2 west spur terminator 366 connected to a west simple coupler module 368, and an east spur add-on 370 including a type-2 east spur terminator 372 connected to an east simple coupler module 374. The ROADM core device 360 is connected to the west spur add-on 364 via the west simple coupler module 368, and the ROADM core device 362 is connected to the east spur add-on 370 via the east simple coupler module 374. The spur end node 256 includes two type-2 spur terminators 376 and 378. The spur terminator 376 is connected to the west spur add-on 364 via the west simple coupler module 368, while the spur terminator 378 is connected to the east spur add-on 370 via the east simple coupler module 374. The type-4 ROADM core devices 358, 360, and 362 can be the same as, for example, the type-4 ROADM core devices 164, 168, 174, 182, 184, 186, and 188 shown in FIGS. 16-19, although they are not limited thereto. The type-2 spur terminators 366, 372, 376, and 378 can be the same as, for example, the type-2 spur terminators 332 and 334 shown in FIG. 29, although they are not limited thereto. The simple coupler modules 368 and 374 can be the same as, for example, the simple coupler module 252 shown in FIG. 25, although they are not limited thereto. It is within the scope of the invention, in an example embodiment, for the optical spur 352 to include additional components not shown in FIG. 30. It is also within the scope of the invention, in an example embodiment, for any of the type-4 ROADM core devices 358, 360, and 362, the type-2 spur terminators 366, 372, 376, and 378, and the simple coupler modules 368 and 374 shown in FIG. 30 to be replaced by any other suitable component (or components) that performs (or perform) the functions thereof.

Since type-2 spur terminators 366 and 372 of the spur add-ons 364 and 370 include a type-1 light combiner (366a, 372a), a VOA (366b, 372b), and a type-4 light distributor (366c, 372c), and the simple couplers include a type-1 light combiner (368a, 374a), a type-1 light distributor (368b, 374b), and a VOA (368c, 374c), these spur terminators 366 and 372 can be configured to: 1) receive a plurality of optical signals from a plurality of colorless add ports (366d, 372d) (denoted by "p Adds" in FIG. 30) with the type-1 light combiner (366a, 372a); 2) combine the plurality of optical signals from the plurality of colorless add ports (366d, 372d) into a single optical signal with the type-1 light combiner (366a, 372a); 3) attenuate the single optical signal with the VOA (366b, 372b), and output the attenuated, single optical signal to the simple coupler module (368, 374), which combines the attenuated, single optical signal with a multiple-wavelength optical signal received by the spur interface (368d, 374d) from the network node interface (360a, 362a) via one of the ROADM core devices (360, 362) to produce a combined signal with the type-1 light distributor (368a, 374a), and outputs the combined signal, produced by combining the attenuated, single optical signal with the multiple-wavelength optical signal received by the spur interface (368d, 374d) from the network node interface (360a, 362a), to the spur end node 356 with the type-1 light distributor (368a, 374a); 4) receive an optical-power-divided, multiple-wavelength optical signal from the simple coupler module (368, 374), which is produced by the type-1 light distributor (368b, 374b) of the simple coupler module (368, 374) receiving a multiple-wavelength optical signal from the spur end node 356, dividing the multiple-wavelength optical signal from the spur end node 356 into a plurality of optical-power-divided, multiple-wavelength optical signals, one of which is output from the spur interface (368d, 374d) to the network node interface (360a, 362a) via one of the ROADM core devices (360, 362), and another of which is transmitted to the spur terminator (366, 372); 5) separate the optical-power-divided, multiple-wavelength optical signal received from the simple coupler module (368, 374) into a plurality of single-wavelength optical signals with the type-4 light distributor (366c, 372c); 6) individually attenuate the plurality of single-wavelength optical signals with the type-4 light distributor (366c, 372c); and 7) assign and output each of the individually attenuated plurality of single-wavelength optical signals to any one of and only one of a plurality of different colorless drop ports (366e, 372e) (denoted as "p Drops" in FIG. 30).

Figure 31:
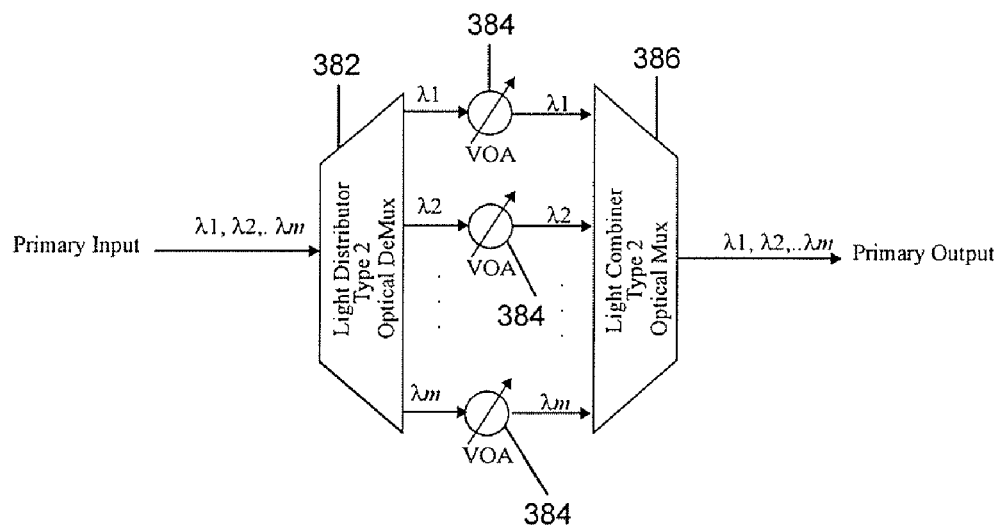
FIG. 31 is an example of a block diagram of an optical blocker.

FIG. 31 shows an example of an embodiment of a wavelength "blocker" element 380. The wavelength blocker element 380 includes a type-2 light distributor 382 (which can be used to demultiplex the incoming DWDM light stream), a set of m VOAs 384 in the subtending outputs of the light distributor 382 (which can be used to power equalize wavelengths outputted from the light distributor 382 or extinguish them completely), and a type-2 light combiner 386 (which can be used to multiplex the outgoing wavelengths output on the subtending outputs of the light distributor 382 into a DWDM light stream). The type-2 light distributor 382, the VOAs 384, and the type-2 light combiner 386 can be the same as, for example, the type-2 light distributor 52, the VOAs 42 and/or 48, and the type-2 light combiner 58, respectively, as shown in FIGS. 4A, 3A, 3B, and 4B, although they are not limited thereto. In addition, the wavelength blocker 380 can include additional elements not shown in FIG. 31. Also, it is also within the scope of the invention, in an example embodiment, for the wavelength blocker 380 and its component parts to be replaced by any other suitable component (or components) that perform (or perform) the functions thereof.

Figure 32:
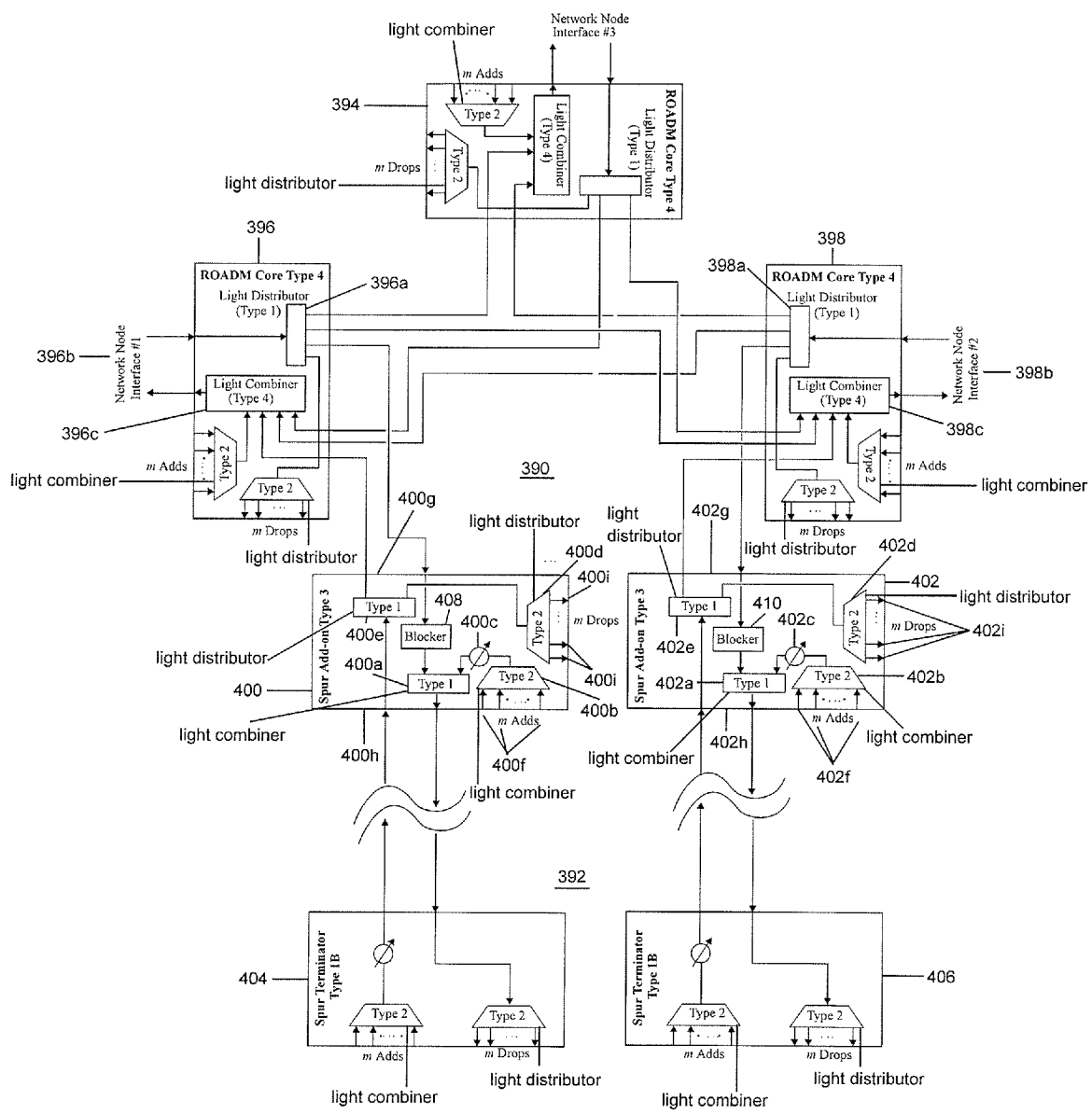
FIG. 32 is a block diagram of an example of an optical node including a spur main node and a spur end node, the spur main node including three type-4 ROADM core devices and two type-3 spur add-on modules, and the spur end node including two type-1B spur terminators.

FIG. 32 shows one application of the wavelength blocker element to form a type-3 spur add-on in the context of an optical spur 388 including a spur main node 390 and a spur end node 392, according to an example of an embodiment of the invention. But it should be understood that it is within the scope of the invention, in an example embodiment, for the type-3 spur add-on to be used in an optical spur different from the optical spur 388, and to be used in other optical nodes and network elements. The type-3 spur add-on is formed by adding a wavelength blocker, such as the wavelength blocker 380 shown in FIG. 31, for example, to a type-1B spur add-on, such as the type-1B spur add-on 220 shown in FIG. 22, for example. But it should be understood that the type-3 spur add-on is not limited to the use of these specific components. Other components can be used as long as they perform the functions of the wavelength blocker 380 and the type-1B spur add-on 220. The spur main node 390 includes three type-4 ROADM core devices 394, 396, and 398, and two type-3 spur add-ons 400 and 402. The spur end node 392 includes two type-1B spur terminators 404 and 406. The type-4 ROADM core devices 394, 396, and 398, can be the same as, for example, the type-4 ROADM core devices 164, 168, 174, 182, 184, 186, and 188 shown in FIGS. 16-19, although they are not limited thereto. The two type-1B spur terminators 404 and 406 can be the same as, for example, the type-1B spur terminator 242 in FIG. 24, although they are not limited thereto. As shown in FIG. 32, each of the type-3 spur add-ons 400, 402 includes a wavelength blocker (408, 410) placed at the subtending input of a type-1 light combiner (400a, 402a) that receives a multiple-wavelength optical signal from a type-1 light distributor (396a, 398a) of a type-4 ROADM core device (396, 398). Each of the type-3 spur add-ons 400, 402 can also include a type-2 light combiner (400b, 402b), a VOA (400c, 402c), a type-2 light distributor (400d, 402d), and a type-1 light distributor (400e, 402e). The wavelength blockers 408 and 410 can be the same as, for example, the wavelength blocker 380 shown in FIG. 31, although they are not limited thereto. The type-2 light combiners 400b and 402b can be the same as, for example, the type-2 light combiner 58 shown in FIG. 4B, although they are not limited thereto. The VOAs 400c and 402c can be the same as, for example, the VOAs 42 and/or 48 shown in FIGS. 3A and 3B, although they are not limited thereto. The type-2 light distributors 400d and 402d can be the same as, for example, the type-2 light distributor 52 shown in FIG. 4A, although they are not limited thereto. The type-1 light distributors 400e and 402e can be the same as, for example, the type-1 light distributor 24 shown in FIG. 2A, although they are not limited thereto. It is within the scope of the invention, in an example embodiment, to replace any of the type-1 light combiners (400a, 402a), the type-2 light distributors (400d, 402d), the type-2 light combiners (400b, 402b), the type-1 light distributors (400e, 402e), and the VOAs (400c, 402c) with any other suitable component (or components) that performs (or perform) the same functions thereof. The wavelength blockers 408 and 410 can be configured to prevent unneeded wavelengths from being directed to the spur end node 392, although they are not required to do so. The type-3 spur add-ons 400 and 402 can be configured to enable wavelengths that are used on the main artery of a DWMD network of which the optical spur 388 is a part to be reused for spur local traffic. With this type of spur add-on, it is no longer necessary to reserve a set of wavelengths for spur local traffic use. For instance, if wavelengths 1 through 5 are passing through the spur main node 390 from network node interface 396*b* (also called network node interface #1) of the ROADM core device 396 to the network node interface 398*b* (also called the network node interface #2) of the ROADM core device 398, but there is no need to send the data within these pass-through wavelengths down to the spur end node 392, then wavelengths 1 through 5 can be reused to carry spur local traffic from the spur main node 390 to the spur end node 392. This function is enabled by the wavelength blockers 408 and 410 within the spur add-ons 400 and 402, since the wavelength blockers 408 and 410 can be configured to block wavelengths 1 to 5 from passing from the network node interfaces 396*b* and 398*b* to the spur end node 392. In the reverse direction, the wavelengths that are transporting local traffic from the spur end node 392 to the spur main node 390 can be blocked from being applied to the main DWDM network artery of which the optical spur 388 is a part by the type-4 light combiner (396*c*, 398*c*) in one of the ROADM core devices (396, 398).

Since the type-3 spur add-ons 400 and 402 each include a type-1 light combiner (400*a*, 402*a*), a type-2 light distributor (400*d*, 402*d*), a type-2 light combiner (400*b*, 402*b*), a type-1 light distributor (400*e*, 402*e*), a VOA (400*c*, 402*c*), and a wavelength blocker (408, 410), these type-3 spur add-ons can be configured to: 1) combine single-wavelength optical signals added from a plurality of colored add ports (400*f*, 402*f*) (denoted as "Adds" in FIG. 32) into a first multiple-wavelength optical signal with the type-2 light combiner (400*b*, 402*b*); 2) attenuate the first multiple-wavelength optical signal with the VOA (400*c*, 402*c*); 3) combine, with the type-1 light combiner (400*a*, 402*a*) a) the attenuated first multiple-wavelength optical signal, and b) a second optical signal received by the spur interface (400*g*, 402*g*) from the network node interface (396*b*, 398*b*) via one of the ROADM core devices (396, 398), at least one wavelength of which can be blocked from being combined with the attenuated, first multiple-wavelength optical signal by the wavelength blocker (408, 410); 4) output from type-1 light combiner (400*a*, 402*a*) to the spur interface (400*h*, 402*h*) and then from the spur interface (400*h*, 402*h*) to the spur end node 392 an optical signal resulting from combining the attenuated, first multiple-wavelength optical signal with the second optical signal received from the network node interface (396*b*, 398*b*) at least one wavelength of which has passed through the wavelength blocker (408, 410); 5) divide a multiple-wavelength optical signal received by the spur interface (400*h*, 402*h*) from the spur end node 392 into a plurality of optical-power-divided, multiple-wavelength optical signals with the type-1 light distributor (400*e*, 402*e*), which outputs one of the optical-power-divided, multiple-wavelength optical signals to the spur interface (400*g*, 402*g*), which in turn outputs that optical-power-divided, multiple-wavelength optical signal to the network node interface (396*b*, 398*b*) via one of the ROADM core devices (396, 398), and 6) divide another of the optical-power-divided, multiple-wavelength optical signals output by the type-1 light distributor (400*e*, 402*e*) into a plurality of single-wavelength optical signals with the type-2 light distributor (400*d*, 402*d*), which also outputs each of the single-wavelength optical signals to a different, pre-assigned colored drop port (400*l*, 402*l*) (denoted by "m Drops" in FIG. 32).

Figure 33:
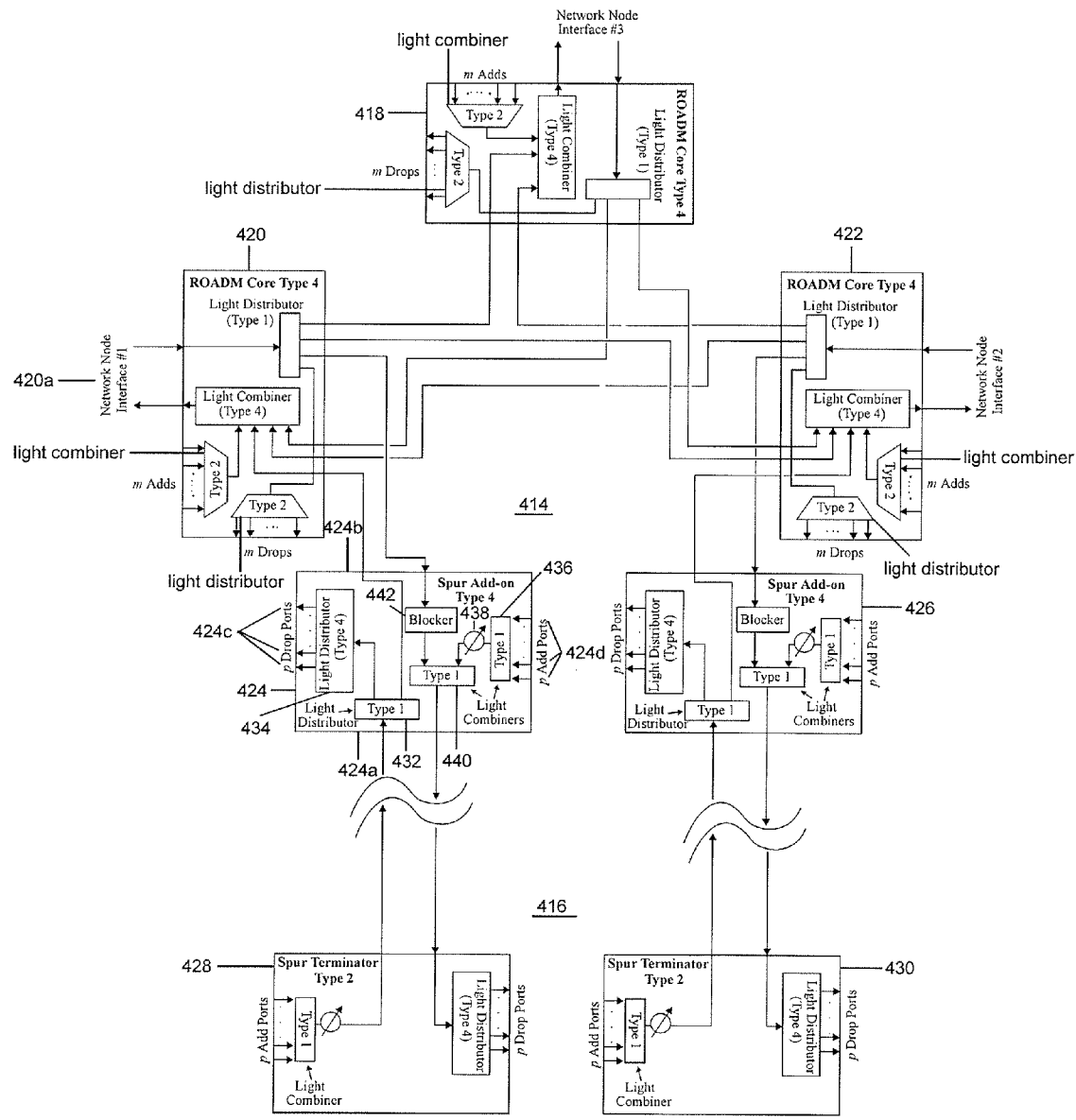
FIG. 33 is a block diagram of an example of an optical node including a spur main node and a spur end node, the spur main node including three type-4 ROADM core devices and two type-4 spur add-on modules, and the spur end node including two type-2 spur terminators.

FIG. 33 illustrates an example of an embodiment of a type-4 spur add-on in the context of an optical spur 412 including a spur main node 414 and a spur end node 416. But is should be understood that it is within the scope of the invention, in an example embodiment, to use the type-4 spur add-on in other types of optical spurs and in various network elements and nodes. Although the optical spur 412 as shown in FIG. 33 includes the spur main node 414 and the spur end node 416, it is within the scope of the invention, in an example embodiment, to employ additional components in the optical spur 412. The spur main node 414 includes three type-4 ROADM core devices 418, 420, and 422, and two type-4 spur add-ons 424 and 426. The spur end node 416 includes two type-2 spur terminators 428 and 430. The type-4 ROADM core devices 418, 420, and 422, can be the same as, for example, the type-4 ROADM core devices 164, 168, 174, 182, 184, 186, and 188 shown in FIGS. 16-19, although they are not limited thereto. The two type-2 spur terminators 428 and 430 can be the same as, for example, the type-2 spur terminators 332 and 334 in FIG. 29, although they are not limited thereto. Each type-4 spur add-on 424 and 426 is a colorless version of the type-3 spur add-on; it also includes a wavelength blocker, but provides for colorless add/drop ports. This functionality is implemented by using two light distributors, two light combiners, a wavelength blocker, and a VOA in each type-4 spur add-on 424 and 426, though it is not limited to using these specific components to provide this functionality. More specifically, in the type-4 spur add-on 424, one of the light distributors can include a type-1 light distributor 432 that can divide multiple-wavelength optical signals received from the type-2 spur terminator 428 after passing through the spur interface 424*a* into a plurality of optical-power divided, multiple-wavelength optical signals, one of which is output from the spur interface 424*b* to the network node interface 420*a* via the type-4 ROADM core device 420. The other light distributor can be a type-4 light distributor 434 that can be configured to divide another of the optical-power-divided, multiple-wavelength optical signals output by the type-1 light distributor 432 into a plurality of single-wavelength optical signals, and change the intensity of the single-wavelength optical signals, and can be programmed to direct each of the single-wavelength optical signals to any of and only one of a plurality of different drop ports 424*c* (denoted by "p Drop Ports" in FIG. 33) of the type-4 spur add-on 424. One of the light combiners of the type-4 spur add-on 424 can include a type-1 light combiner 436 that can be configured to combine single-wavelength optical signals added from a plurality of colorless add ports 424*d* (denoted by "p Add Ports" in FIG. 33) of the spur add-on 424 into a first multiple-wavelength optical signal. The VOA 438 can attenuate the first multiple-wavelength optical signal output from the type-1 light combiner 436, though it is not required to do so. The other light combiner can be a type-1 light combiner 440 that can be configured to combine the attenuated first multiple-wavelength optical signal with an optical signal, received by the spur interface 424*b* from the network node interface 420*a* via the ROADM core device 420, at least one wavelength of which can be blocked from being combined with the attenuated, first multiple-wavelength optical signal by a wavelength blocker 442, and outputs from the spur interface 424*a* to the spur end node 416 an optical signal resulting from combining the attenuated, first multiple-wavelength optical signal with an optical signal received from the network node interface 420a via the ROADM core device 420. The type-1 light distributor 432 can be the same as, for example, the type-1 light distributor 24 shown in FIG. 2A, although it is not limited thereto. The type-4 light distributor 434 can be the same as, for example, the type-4 light distributor 76 shown in FIG. 6, although it is not limited thereto. The type-1 light combiner 436 can be the same as, for example, the type-1 light combiner 30 shown in FIG. 2B, although it is not limited thereto. The VOA 438 can be the same as, for example, the VOAs 42 and/or 48 shown in FIGS. 3A and 3B, although it is not limited thereto. The type-1 light combiner 440 can be the same as, for example, the type-1 light combiner 30 shown in FIG. 2B, although it is not limited thereto. In addition, the type-4 spur add-on 426 can have the same structure, and function the same as, for example, the type-4 spur add-on 424 with respect to the ROADM core device 422 and the spur terminator 430, although it is not limited thereto. It is within the scope of the invention, in an example embodiment, for any of the components of the type-4 spur add-on 424 (the light combiners 436 and 440, the light distributors 432 and 434, the wavelength blocker 442, and the VOA 438) to be replaced with another suitable component (or components) that performs (or perform) the same functions thereof.

Figure 34:
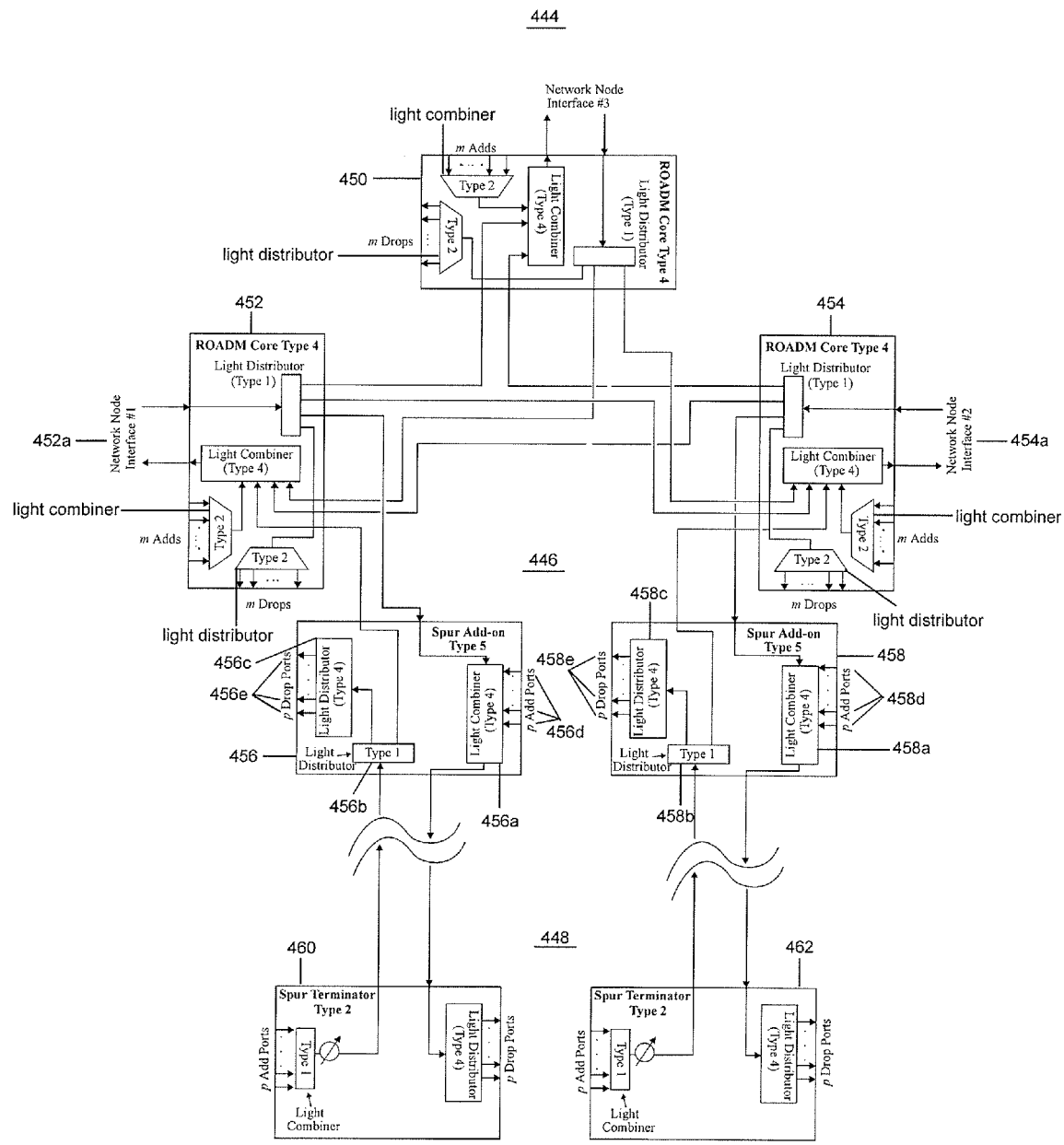
FIG. 34 is a block diagram of an example of an optical node including a spur main node and a spur end node, the spur main node including three type-4 ROADM core devices and two type-5 spur add-on modules, and the spur end node including two type-2 spur terminators.

FIG. 34 illustrates an example of an embodiment of a type-5 spur add-on in the context of an optical spur 444 including a spur main node 446 and a spur end node 448. It should be understood, however, that it is within the scope of the invention, in an example embodiment, to use the type-5 spur add-on with other optical spurs, nodes, and network elements. It is also within the scope of the invention, in an example embodiment, for the optical spur 444 to employ additional components not shown in FIG. 34. The spur main node 446 includes three type-4 ROADM core devices 450, 452, and 454, and two type-5 spur add-ons 456 and 458. The spur end node 448 includes two type-2 spur terminators 460 and 462. The type-5 spur add-on can provide the same functionality as the type-4 spur add-on, except that it replaces the type-1 light combiner, the VOA, and the wavelength blocker with a type-4 light combiner, though it is not limited to providing the same functionality as the type-4 spur add-on. Therefore, the type-5 spur add-on also can enable the reuse of the main DWDM artery wavelengths for the spur local traffic. In addition, the type-5 spur add-on can provide individual wavelength power equalizing for all wavelengths exiting the spur add-ons 456 and 458 towards the spur end node 448, though it is not required to do so. The three type-4 ROADM core devices 450, 452, and 454, can be the same as, for example, the type-4 ROADM core devices 164, 168, 174, 182, 184, 186, and 188 shown in FIGS. 16-19, although they are not limited thereto. The two type-2 spur terminators 460 and 462 can be the same as, for example, the type-2 spur terminators 332 and 334 in FIG. 29, although they are not limited thereto. The type-5 spur add-ons (456, 458) each include a type-4 light combiner (456a, 458a), a type-1 light distributor (456b, 458b), and a type-4 light distributor (456c, 458c). The type-1 light distributors (456b, 458b) and the type-4 light distributors (456c, 458c) can be the same as, for example, the type-1 and type-4 light distributors 432 and 434, respectively, of the type-4 spur add-on 424, shown in FIG. 33, though they are not limited thereto. The type-1 light distributors (456b, 458b) and the type-4 light distributors (456c, 458c) can also be the same as, for example, the type-1 light distributor 24 and the type-4 light distributor 76, respectively, shown in FIGS. 2A and 6, though they are not limited thereto. The type-4 light combiners (456a, 458a) can be the same as, for example, the type-4 light combiner 88 shown in FIG. 7, although they are not limited thereto. Thus, the type-4 light combiners (456a, 458a) of the type-5 spur add-ons (456, 458) can be configured to: 1) receive a first optical signal from a network node interface (452a, 454a) via one of the ROADM core devices (452, 454); 2) receive second optical signals from add ports (456d, 458d) (denoted as "p Add Ports" in FIG. 34) of the type-5 spur add-ons (456, 458), and separate or divide the first and second optical signals into a first plurality of single-wavelength optical signals originating from the first optical signal and a second plurality of single-wavelength optical signals originating from the second optical signal; 3) for single-wavelength optical signals in the first and second plurality of single-wavelength optical signals having the same wavelength, select for outputting only one single-wavelength optical signal from one of the first and second plurality of single-wavelength optical signals, and attenuate each selected single-wavelength optical signal; and 4) combine the attenuated, selected single-wavelength optical signals into a single primary output optical signal to be output to one of the spur terminators (460, 462). The type-1 light distributors (456b, 458b) of the type-5 spur add-ons (456, 458) can be configured to divide an optical signal from a spur terminator (460, 462) into first and second optical-power-divided optical signals, direct the first optical-power-divided optical signal to one of the ROADM core devices (452, 454), and direct the second optical-power-divided optical signal to the type-4 light distributor (456c, 458c). And the type-4 light distributors (456c, 458c) of the type-5 spur add-ons (456, 458) can be configured to: 1) separate the second optical-power-divided optical signal into a plurality of single-wavelength optical signals; 2) change the intensity of at least one of the single-wavelength optical signals; and 3) assign each of the single-wavelength optical signals to any one of and only one of a plurality of different drop ports (456e, 458e) (denoted by "p Drop Ports" in FIG. 34) of the type-5 spur add-on (456, 458). It is within the scope of the invention, in an example embodiment, for any of the components of the type-5 spur add-ons (456, 458) (the type-4 light combiners (456a, 458a), the type-1 light distributors (4586b, 458b), and the type-4 light distributors (456c, 458c)) to be replaced with another suitable component (or components) that performs (or perform) the functions thereof.

Figure 35:
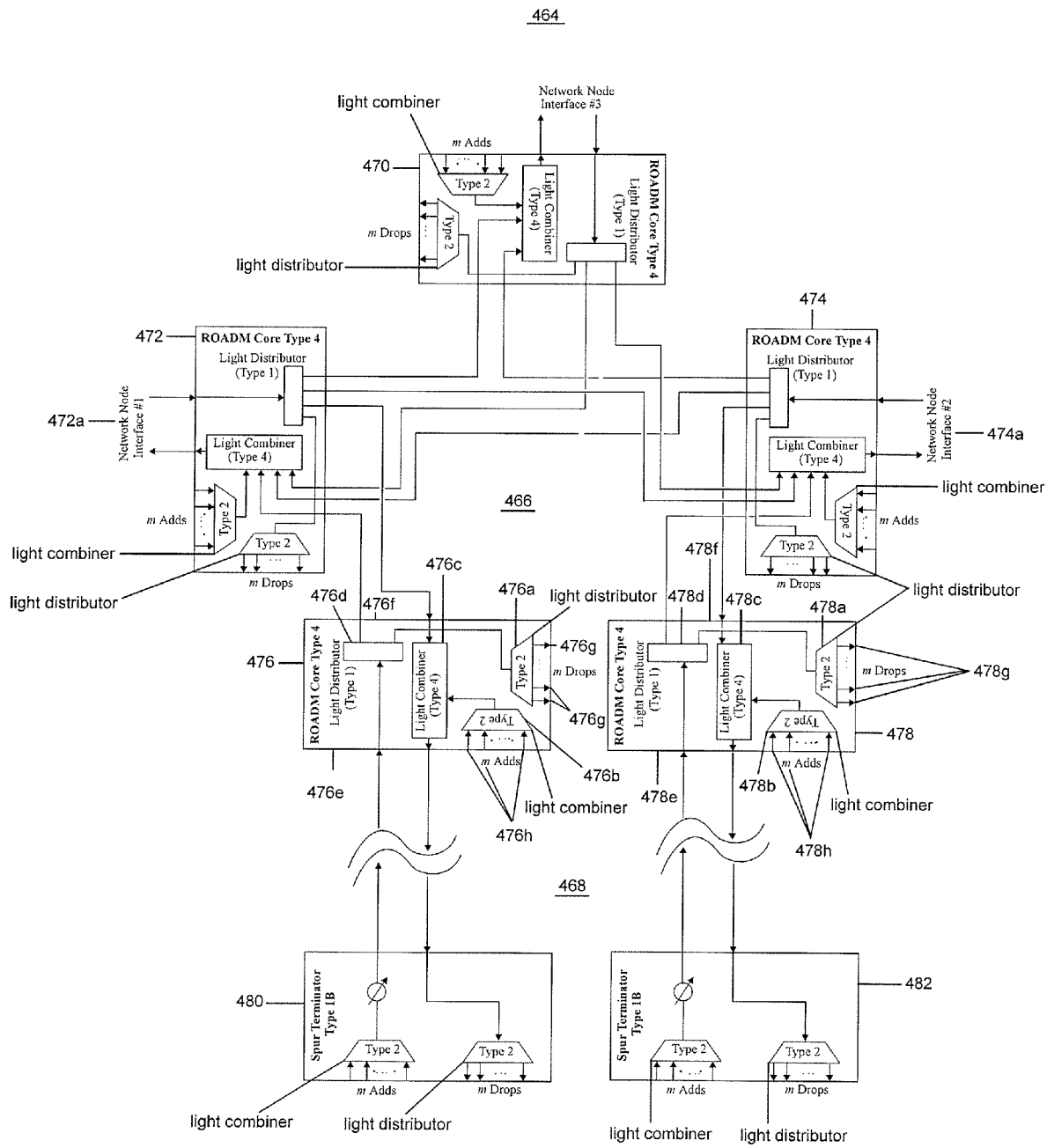
FIG. 35 is a block diagram of an example of an optical node including a spur main node and a spur end node, the spur main node including three type-4 ROADM core devices and two spur add-on modules including two type-4 ROADM core devices, and the spur end node including two type-1B spur terminators.

FIG. 35 shows how a type-4 ROADM core device can be used as a spur add-on within the spur main node, according to an example of an embodiment of the invention. More specifically, FIG. 35 shows an optical spur 464 including a spur main node 466 and a spur end node 468. It should be understood, however, that it is within the scope of the invention, in an example embodiment, to use a type-4 ROADM core device in an optical spur different from the optical spur 464 shown in FIG. 35. It is also within the scope of the invention, in an example embodiment, for the optical spur to include other components not shown in FIG. 35. The spur main node includes three type-4 ROADM core devices 470, 472, and 474, and two spur add-ons, specifically two type-4 ROADM core devices 476 and 478. The spur end node 468 includes two type-1B spur terminators 480 and 482. The five type-4 ROADM core devices 470, 472, 474, 476, and 478, can be the same as, for example, the type-4 ROADM core devices 164, 168, 174, 182, 184, 186, and 188 shown in FIGS. 16-19, although they are not limited thereto. The two type-1B spur terminators 480 and 482 can be the same as, for example, the type-1B spur terminator 242 in FIG. 24, although they are not limited thereto. The type-4 ROADM core devices 476 and 478 functioning as the spur add-ons each include a type-2 light distributor (476a, 478a), a type-2 light combiner (476b, 478b), a type-4 light combiner (476c, 478c), and a type-1 light distributor (476d, 478d). The type-4 ROADM core devices 476 and 478 functioning as a spur add-on can be configured to: 1) divide, with the type-1 light distributor (476d, 478d), a multiple-wavelength optical signal received by the spur interface (476e, 478e) from the spur end node 468 into a plurality of optical-power-divided, multiple-wavelength output signals, one of which is output from the spur interface (476f, 478f) to a network node interface (472a, 474a) via one of the ROADM cores (472, 474), and another of which is separated into a plurality of single-wavelength optical signals, which can be each output to a pre-assigned different colorless drop port (476g, 478g) (denoted as "m Drops" in FIG. 35) with the type-2 light distributor (476a, 478a); 2) receive a plurality of single-wavelength optical signals each added from a different pre-assigned add port (476h, 478h) (denoted as "m Adds" in FIG. 35) and combine the single-wavelength optical signals into a first multiple-wavelength optical signal with the type-2 light combiner (476b, 478b); 3) receive, with the type-4 light combiner (476c, 478c), the first multiple-wavelength optical signal and a second multiple-wavelength optical signal from one of the network node interfaces (472a, 474a) via one of the ROADM cores (472, 474); 4) separate, with the type-4 light combiner (476c, 478c), the first and second multiple-wavelength optical signals into a first plurality of single-wavelength optical signals originating from the first multiple-wavelength signal and a second plurality of single-wavelength optical signals originating from the second multiple-wavelength optical signal; 5) for single-wavelength optical signals in the first and second plurality of single-wavelength optical signals having the same wavelength, select for outputting only one single-wavelength optical signal from one of the first and second plurality of single-wavelength optical signals, with the type-4 light combiner (476c, 478c); 6) attenuate each selected single-wavelength optical signal, with the type-4 light combiner (476c, 478c); and 7) combine the attenuated, selected single-wavelength optical signals into a single primary output optical signal to be output from the spur interface (476e, 478e) to the spur end node 468, with the type-4 light combiner (476c, 478c). It is within the scope of the invention, in an example embodiment, for any of the components of the type-4 ROADM core devices (476, 478) (the type-2 light distributor (476a, 478a), the type-2 light combiner (476b, 478b), the type-4 light combiner (476c, 478c), and the type-1 light combiner (476d, 478d)) to be replaced with another suitable component (or components) that performs (or perform) the same functions thereof.

Figure 36:
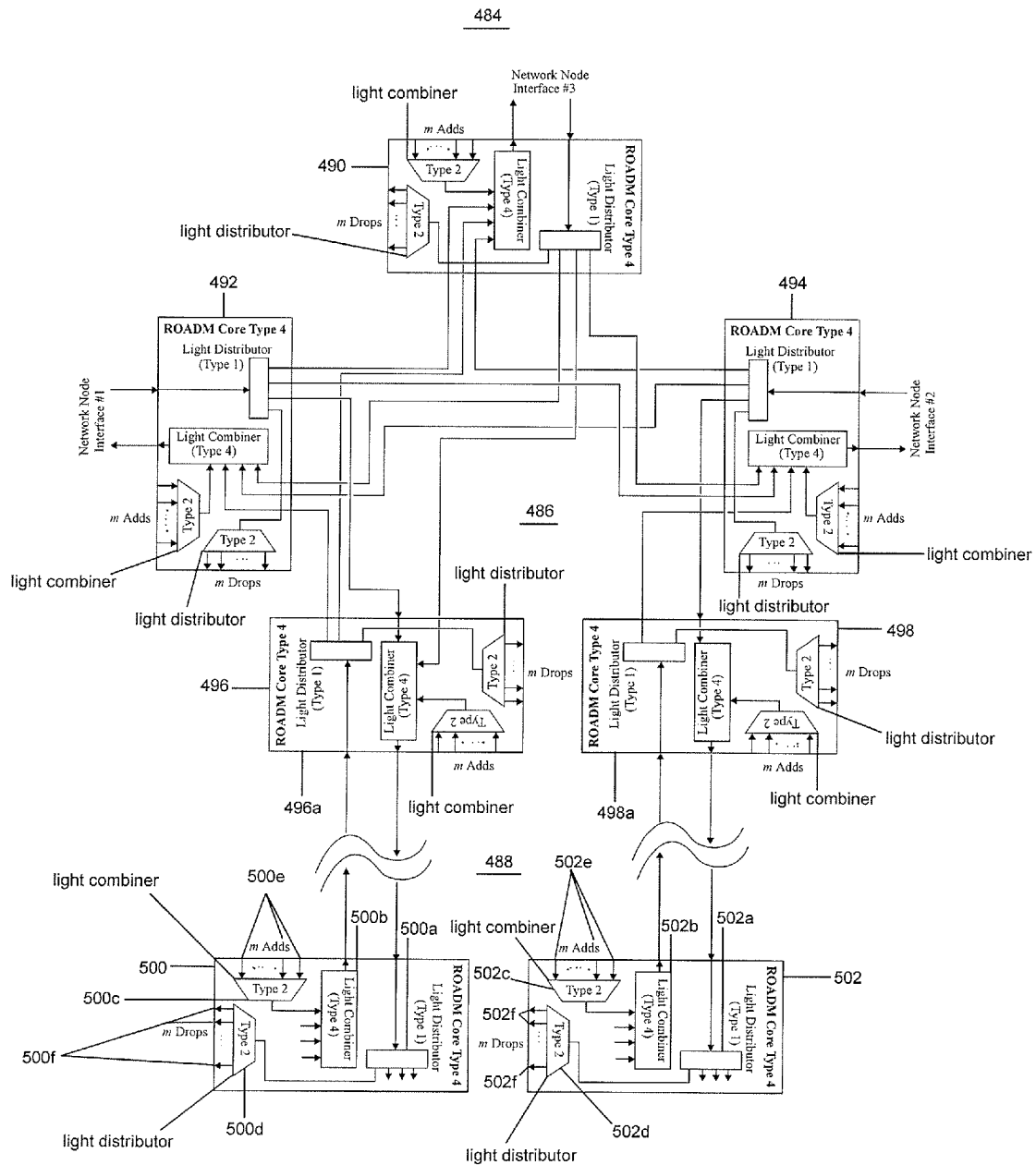
FIG. 36 is a block diagram of an example of an optical node including a spur main node and a spur end node, the spur main node including three type-4 ROADM core devices and two spur add-on modules including two type-4 ROADM core devices, and the spur end node including spur terminators including two type-4 ROADM core devices.

FIG. 36 shows how a type-4 ROADM core device can be used as a spur add-on within the spur main node and also how a type-4 ROADM core device can be used within the spur end node, according to an example of an embodiment of the invention. More specifically, FIG. 36 shows an optical spur 484 including a spur main node 486 and a spur end node 488. It is within the scope of the invention, in an example embodiment, for the optical spur 484 to include components in addition to those shown in FIG. 36. It is also within the scope of the invention, in an example embodiment, to use type-4 ROADM core devices as spur add-ons and in spur end nodes of other types of optical spurs. The spur main node 486 can be the same as, for example, the spur main node 466 shown in FIG. 35, although it is not limited thereto. The spur main node 486 includes three type-4 ROADM core devices 490, 492, and 494, and two spur add-ons, specifically two type-4 ROADM core devices 496 and 498. The spur end node 488 includes two type-4 ROADM core devices 500 and 502. The type-4 ROADM core devices 490, 492, 494, 496, 498, 500, and 502 can be the same as, for example, the type-4 ROADM core devices 164, 168, 174, 182, 184, 186, and 188 shown in FIGS. 16-19, although they are not limited thereto. The type-4 ROADM core devices in the spur end node 488 (500, 502) include a type-1 light distributor (500a, 502a), a type-4 light combiner (500b, 502b), a type-2 light combiner (500c, 502c), and a type-2 light distributor (500d, 502d). The type-4 ROADM core devices 500 and 502 can be configured to: 1) combine single-wavelength optical signals of different wavelengths added thereto via colored add ports (500e, 502e) (denoted as "Adds" in FIG. 36) into a multiple-wavelength optical signal with the type-2 light combiner (500c, 502c); 2) separate the multiple-wavelength optical signal of different wavelengths into a plurality of single-wavelength optical signals with the type-4 light combiner (500b, 502b); 3) individually attenuate each of the single-wavelength optical signals, combine each of the attenuated, single-wavelength optical signals into a combined multiple-wavelength optical signal and output the combined multiple-wavelength optical signal to the spur interface (496a, 498a) of the spur add-ons (496, 498) of the spur main node 486 with the type-4 light combiner (500b, 502b); 4) divide a multiple-wavelength optical signal received from the spur interface (496a, 498a) of the spur main node 486 into a plurality of optical-power-divided, multiple-wavelength optical signals with the type-1 light distributor (500a, 502a); and 5) divide one of the optical-power-divided, multiple-wavelength output optical signals into a plurality of single-wavelength optical signals and output those signals from a plurality of colored drop ports (500f, 502f) (denoted by "m Drops" in FIG. 36), using the type-2 light distributor (500d, 502d). It is within the scope of the invention, in an example embodiment, for any of the components of the type-4 ROADM core devices (500, 502) of the spur end node 488 (the type-1 light distributor (500a, 502a), the type-4 light combiner (500b, 502b), the type-2 light combiner (500c, 502c), and the type-2 light distributor (500d, 502d)) to be replaced with another suitable component (or components) that performs (or perform) the same functions thereof.

Figure 37:
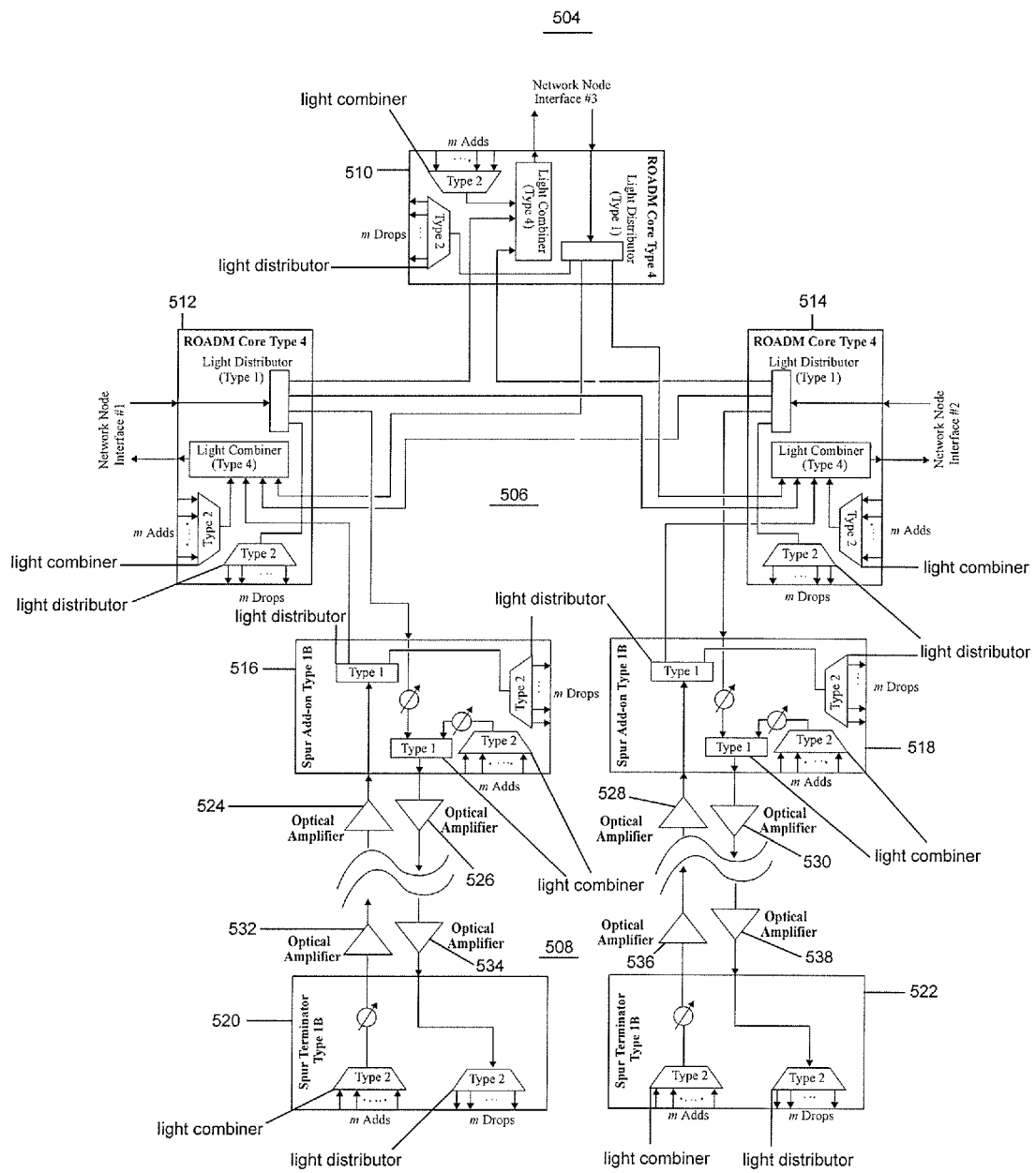
FIG. 37 is a block diagram of an example of an optical node including a spur main node and a spur end node, the spur main node including three type-4 ROADM core devices, two type-1B spur add-on modules, and optical amplifiers, the spur end node including two type-1B spur terminators and optical amplifiers.

FIG. 37 shows how amplifiers can be used to extend the length of the spur fibers associated with a spur, according to an example of an embodiment of the invention. More specifically, FIG. 37 shows an optical spur 504 including a spur main node 506 and a spur end node 508. It is within the scope of the invention, in an example embodiment, for the optical spur 504 to include additional components not shown in FIG. 37. It is also within the scope of the invention, in an example embodiment, for amplifiers to be used to extend the length of the spur fiber associated with a spur, in an optical spur different from the optical spur 504, such as the optical spurs 260 (FIG. 26), 290 (FIG. 28), 316 (FIG. 29), 352 (FIG. 30), 388 (FIG. 32), 412 (FIG. 33), 444 (FIG. 34), 464 (FIG. 35), and 484 (FIG. 36). The spur main node 506 includes three type-4 ROADM core devices 510, 512, and 514, and two type-1B spur add-ons 516 and 518. The spur end node 508 includes two type-1B spur terminators 520 and 522. Optical amplifiers 524, 526, 528, and 530 amplify signals inputted into the spur add-ons 516 and 518 from the spur terminators 520 and 522 and amplify signals outputted from the spur add-ons 516 and 518 to the spur terminators 520 and 522. Optical amplifiers 532, 534, 536, and 538 amplify signals inputted into the spur terminators 520 and 522 from the spur add-ons 516 and 518 and amplify signals outputted from the spur terminators 520 and 522 to the spur add-ons 516 and 518. The three type-4 ROADM core devices 510, 512, and 514 can be the same as, for example, the type-4 ROADM core devices 164, 168, 174, 182, 184, 186, and 188 shown in FIGS. 16-19, although they are not limited thereto. The two type-1B spur add-ons 516 and 518 can be the same as, for example, the type-1B spur add-on 220 in FIG. 22, although they are not limited thereto. The two type-1B spur terminators 520 and 522 can be the same as, for example, the type-1B spur terminator 242 in FIG. 24, although they are not limited thereto. Any of the type-4 ROADM core devices 510, 512, and 514, the type-1B spur add-ons 516 and 518, the type-1B spur terminators 520 and 522, and the optical amplifiers 524, 526, 528, 530, 532, 534, 536, and 538 can be replaced by another component (or components) that performs (or perform) the same functions thereof.

Figure 38:
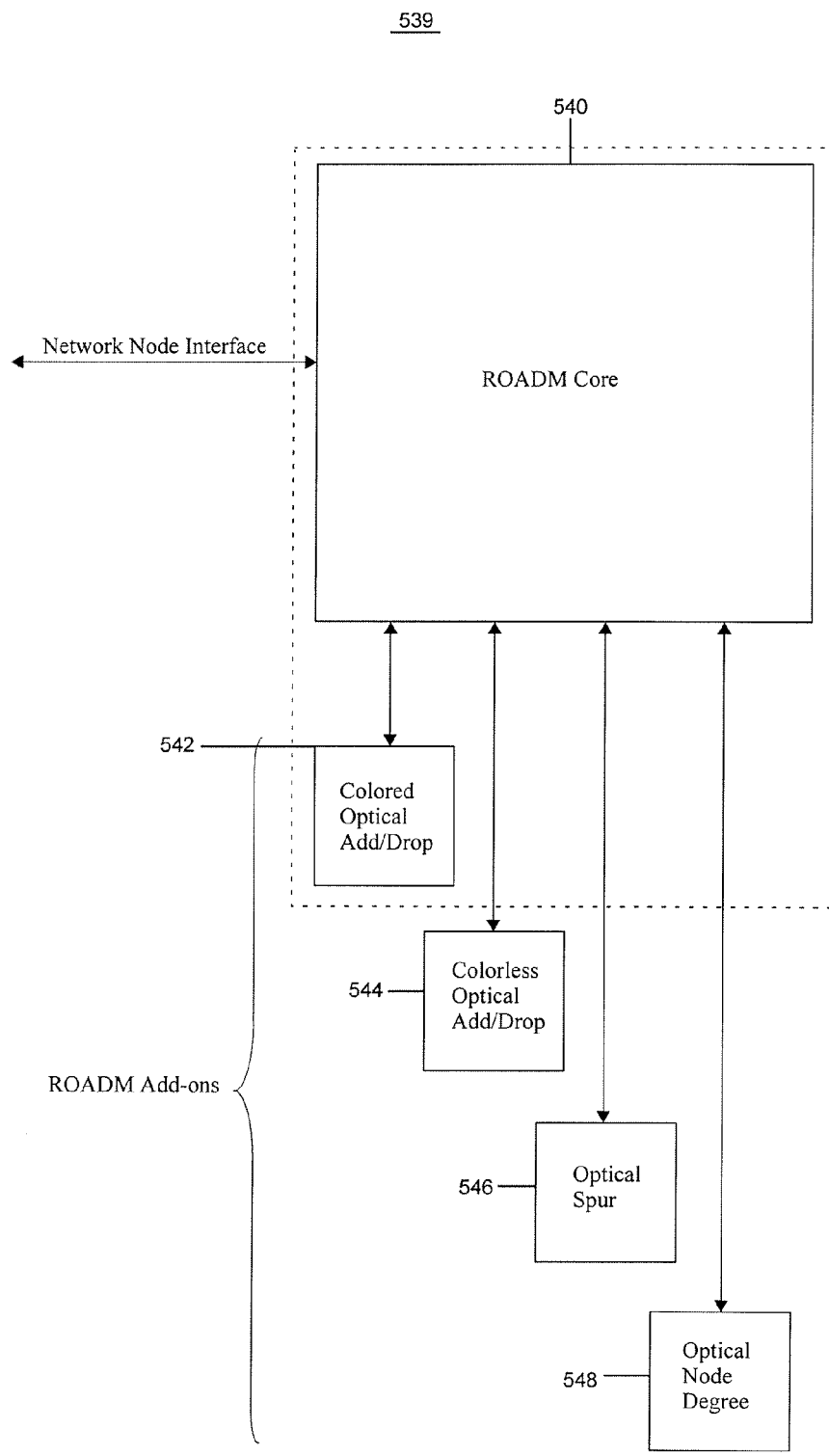
FIG. 38 is a schematic block diagram of an example of an optical node including a ROADM core device, a variety of add-on modules connectable to the ROADM core device, and an indication of the degree of the optical node.

FIG. 38 depicts a 4$^{th}$ generation DWDM networking element 539, according to an example of an embodiment of the invention. The networking element 539 can constitute an entire optical node by itself or it can be a part of an optical node containing other components. The 4$^{th}$ generation networking element 539 includes a ROADM core device 540 of any type that is capable of being connected 1) to various add-ons or add-on devices, which are denoted as add-ons 542, 544, and 546, and 2) one or more additional ROADMs and/or ROADM core devices having one or more network node interfaces enabling the networking element 539 to be connected to additional nodes (denoted by optical node degree 548). This capability of ROADM core device 540 is shown in FIG. 38 by connecting four devices thereto. But it should be understood that the invention is not limited to a ROADM core device 540 of any type that is connected to four other add-ones and/or devices. It is within the scope of the invention, in an example embodiment, for the ROADM core device 540 to be connected to one, two, three, four, or more add-on devices and to be connected to one, two, three, four, or more ROADMs and/or ROADM core devices. Add-on 542 is a colored add/drop optical device or add-on. One example of a colored add/drop add-on is the type-1 ROADM add-on 142 shown in FIG. 13, although the colored add/drop add-on 542 is not limited thereto. Add-on 544 is a colorless add/drop device. One example of a colorless add/drop add-on is the type-1 ROADM core device 162 shown in FIG. 15, although the colorless add/drop add-on 544 is not limited thereto. Add-on 546 is an optical spur, which in this example embodiment is used to denote an entire optical spur or a portion of an optical spur, such as a spur add-on, a spur terminator, a wavelength blocker, or a simple coupler module, although the phrase "portion of an optical spur" and the term "add-on 546" are not limited thereto. Examples of optical spurs and/or portions of optical spurs are the spur add-ons 210 (FIG. 21), 220 (FIG. 22), 236 (FIG. 23), 242 (FIG. 24), 252 (FIG. 25), 300, 306 (FIG. 28) 328, 330 (FIG. 29), 364, 370 (FIG. 30), 380 (FIG. 31), 400, 402 (FIG. 32), 424, 426 (FIG. 33), 456, 458 (FIG. 34), 476, 478 (FIG. 35), and 500, 502 (FIG. 36), although it should be understood that the add-on 546 is not limited to these examples. And although FIG. 38 shows one colored add-on, one colorless add-on, one optical spur add-on, and one additional ROADM (denoted by the component 548 labeled "optical node degree"), it is within the scope of the invention, in an example embodiment, to couple the ROADM core device 540 to more than one colored add-on, more than one colorless add-on, more than one optical spur, and more than one other ROADM core device. The dashed lines around ROADM core device 540 and colored add-on 542 indicate that the colored add-on 542 can be internally coupled to the ROADM core device 540 by being located inside the ROADM core device 540. One example of this configuration is shown in FIG. 16, although it should be understood that the networking element 539 is not limited to this example. It should also be understood that it is within the scope of the invention, in an example embodiment, to externally couple a colored add-on to the ROADM core device 540. The ROADM core device 540 can be the same as, for example, the ROADM 10 (FIG. 1), the ROADM core device 102 (FIG. 8), the ROADM core devices 108, 110 (FIG. 9), the ROADM core devices 122, 124 (FIG. 10), the ROADM core devices 128, 130 (FIG. 11), the ROADM core device 132 (FIG. 12), the ROADM core device 140 (FIG. 13), the ROADM core device 164 (FIG. 16), the ROADM core device 168 (FIG. 17), or the ROADM core device 174 (FIG. 18), although it is not limited thereto. It is within the scope of the invention, in an example embodiment, for the 4$^{th}$ generation DWDM networking element 539 to include components in addition to those shown in FIG. 38, such as one or more input and output amplifiers and one or more optical converters. It should be noted that using the techniques described herein, all add-ons can be added without affecting existing traffic through the DWDM networking element 539 and through a multifunctional reconfigurable DWDM optical node of which the 4$^{th}$ generation DWDM networking element 539 may be a part.

Figure 39:
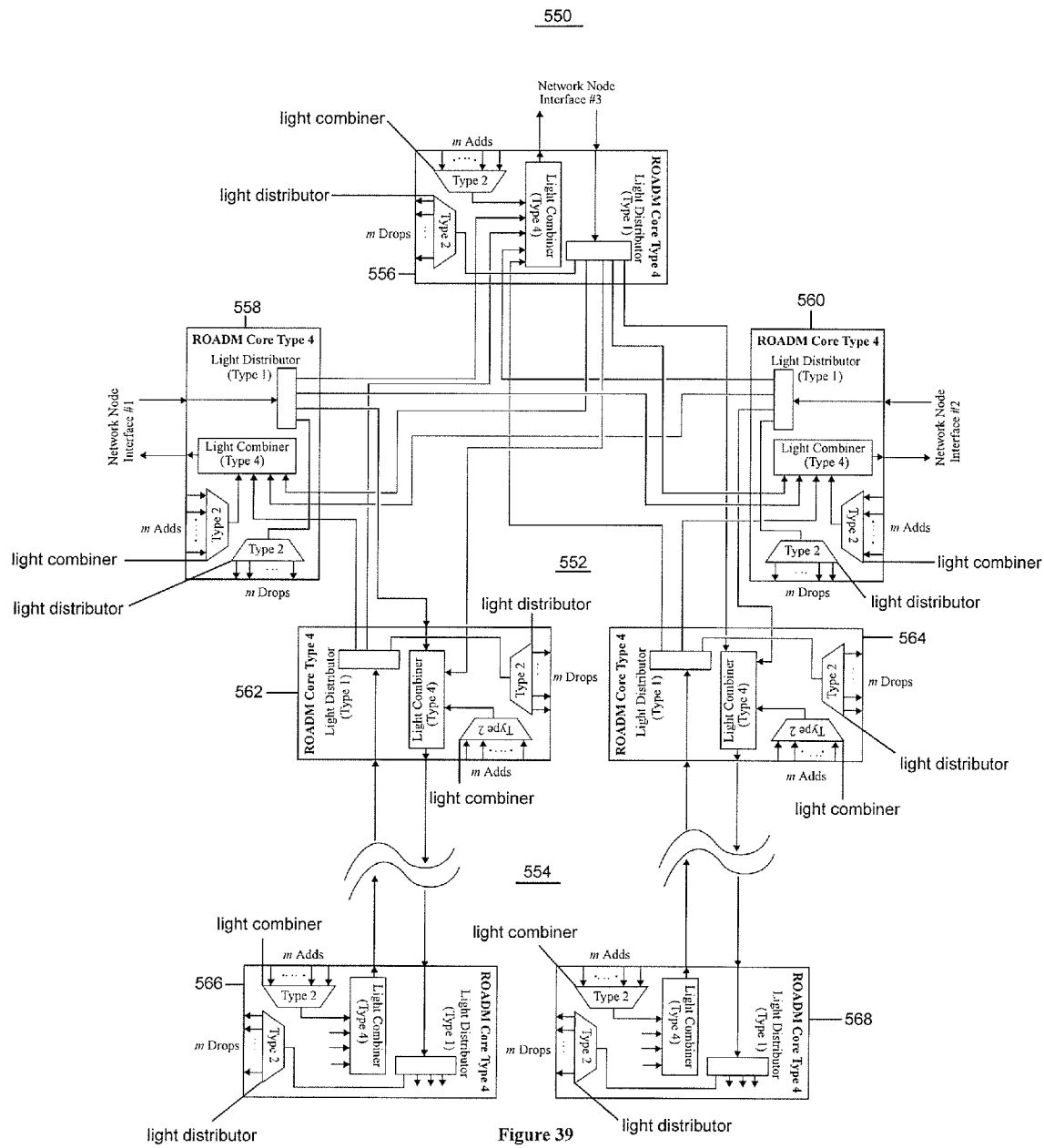
FIG. 39 is a block diagram of an example of an optical node including a spur main node and a spur end node, the spur main node including three type-4 ROADM core devices, and two spur add-on modules which are two type-4 ROADM core devices, and the spur end node including two spur terminators which are two type-4 ROADM core devices.

FIG. 39, like FIG. 36, shows an example of an embodiment in which the spur main node and the spur end node are composed of type-4 ROADM core devices. The difference is that in FIG. 39, each spur add-on is connected to two of the ROADM core devices (the FIG. 36 example embodiment shows only one spur add-on (496) connected to two ROADM core devices (490, 492)). Thus, FIG. 39 shows an optical spur 550 including a spur main node 552 and a spur end node 554. The spur main node includes three type-4 ROADM core devices 556, 558, and 560, and two spur add-ons, specifically two type-4 ROADM core devices 562 and 564. The spur end node 554 includes two type-4 ROADM core devices 566 and 568. Spur add-on 562 is connected to both ROADM core devices 556 and 558, while spur add-on 564 is connected to both ROADM core devices 556 and 560. The optical spur 550 can be the same as, for example, the optical spur 484 shown in FIG. 36 (except that both spur add-ons 562 and 564 are connected to two type-4 ROADM core devices), although it is not limited thereto. Therefore, the type-4 ROADM core devices 556, 558, 560, 562, 564, 566, and 568 can be the same as, for example, the type-4 ROADM core devices 164, 168, 174, 182, 184, 186, and 188 shown in FIGS. 16-19, although they are not limited thereto. In addition, it is within the scope of the invention, in an example embodiment, for the optical spur 550 to include components in addition to those shown in FIG. 39. It is also within the scope of the invention, in an example embodiment, for any of the type-4 ROADM core devices 556, 558, 560, 562, 564, 566, and 568 to be replaced with another suitable component (or components) that performs (or perform) the same functions thereof.

Figure 40:
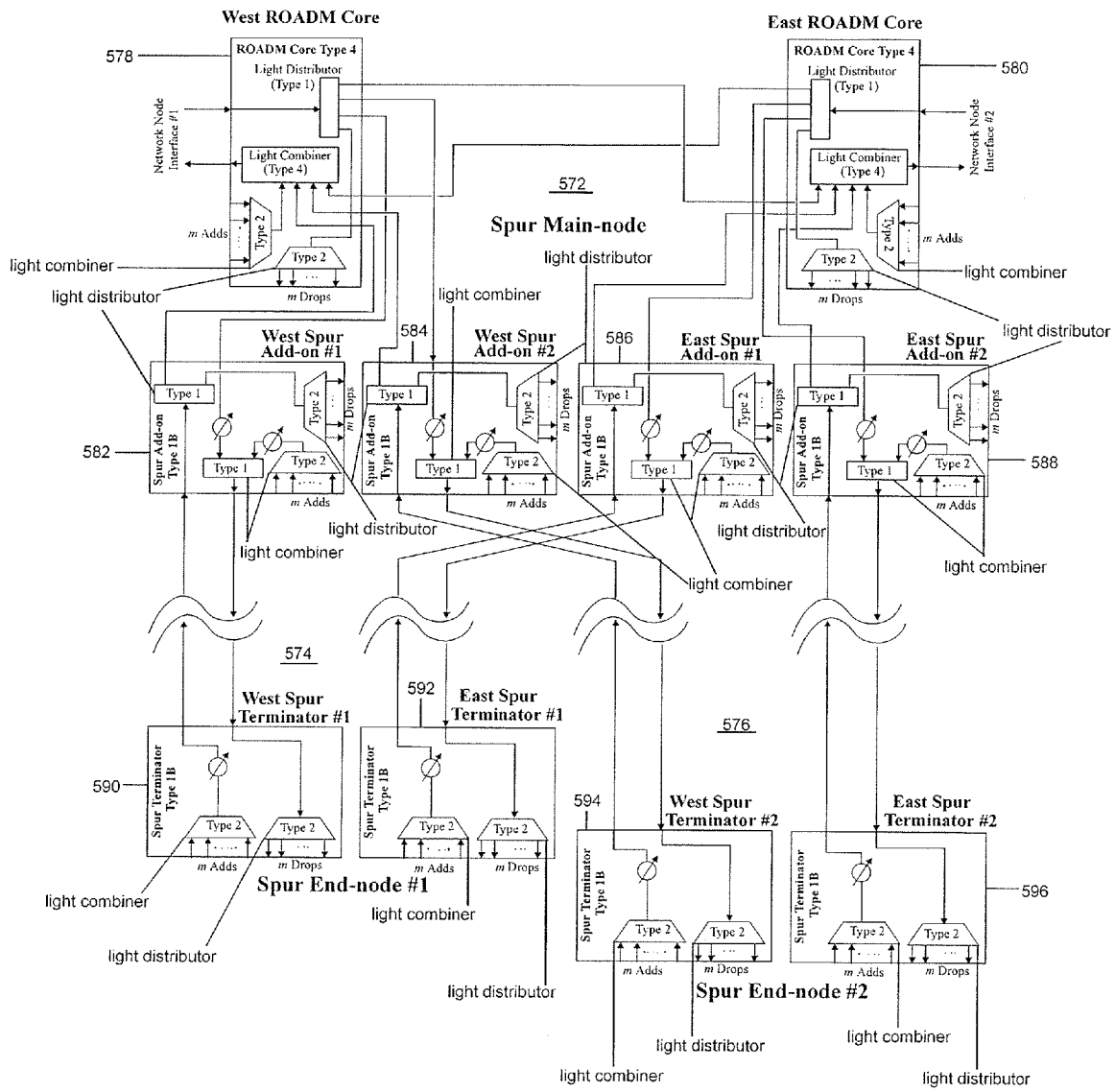
FIG. 40 is a block diagram of an example of an optical node including a spur main node and two spur end nodes, the spur main node including two type-4 ROADM core devices, and two pairs of type-1B spur add-on modules, each pair connected to one of the two type-4 ROADM core devices, and the spur end nodes each including a pair of type-1B spur terminators.

FIG. 40 shows an example of an embodiment having two spur end nodes and in which two spur add-ons are connected to each ROADM core device. Thus, FIG. 40 shows an optical spur 570 including a spur main node 572 and spur end nodes 574 and 576. The spur main node 572 includes two type-4 ROADM core devices, west ROADM core device 578 and east ROADM core device 580, and two pairs of spur add-ons. One pair of spur add-ons, west spur add-on #1 (582) and west spur add-on #2 (584), is connected to the west ROADM core device 578 and the other pair of spur add-ons, east spur add-on #1 (586) and east spur add-on #2 (588), is connected to the ROADM core device 580. The spur end node #1 includes west spur terminator #1 (590) and east spur terminator #1 (592), while the spur end node #2 includes west spur terminator #2 (594) and east spur terminator #2 (596). The west spur terminators #1 and #2 (590 and 594) are connected to the west spur add-ons #1 (582) and #2 (584), respectively. The east spur terminators #1 and #2 (592 and 596) are connected to the east spur add-ons #1 (586) and #2 (588), respectively. It is within the scope of the invention, in an example embodiment, for the optical spur 570 to include components in addition to those shown in FIG. 40. The type-4 ROADM core devices 578 and 580 can be the same as, for example, the type-4 ROADM core devices 164, 168, 174, 182, 184, 186, and 188 shown in FIGS. 16-19, although they are not limited thereto. The spur add-ons 582, 584, 586, and 588 each include a type-1B spur add-on, while the spur terminators 590, 592, 594, and 596 each include a type-1B spur terminator. The spur add-ons 582, 584, 586, and 588 can be the same, for example, the type-1B spur add-on 220 shown in FIG. 22, although they are not limited thereto. The spur terminators 590, 592, 594, and 596 can be the same as, for example, the type-1B spur terminator 242 shown in FIG. 24, although they are not limited thereto. It is within the scope of the invention, in an example embodiment, for any of the type-4 ROADM core devices 578 and 580, the type-1B spur add-ons 582, 584, 586, and 588, and the type-1B spur terminators 590, 592, 594, and 596 to be replaced with other suitable component (or components) that performs (or perform) the same functions thereof.

Additional Example Embodiments

FIGS. 41-58, and 59A-59H illustrate additional examples of embodiments of the invention.

Figure 41:
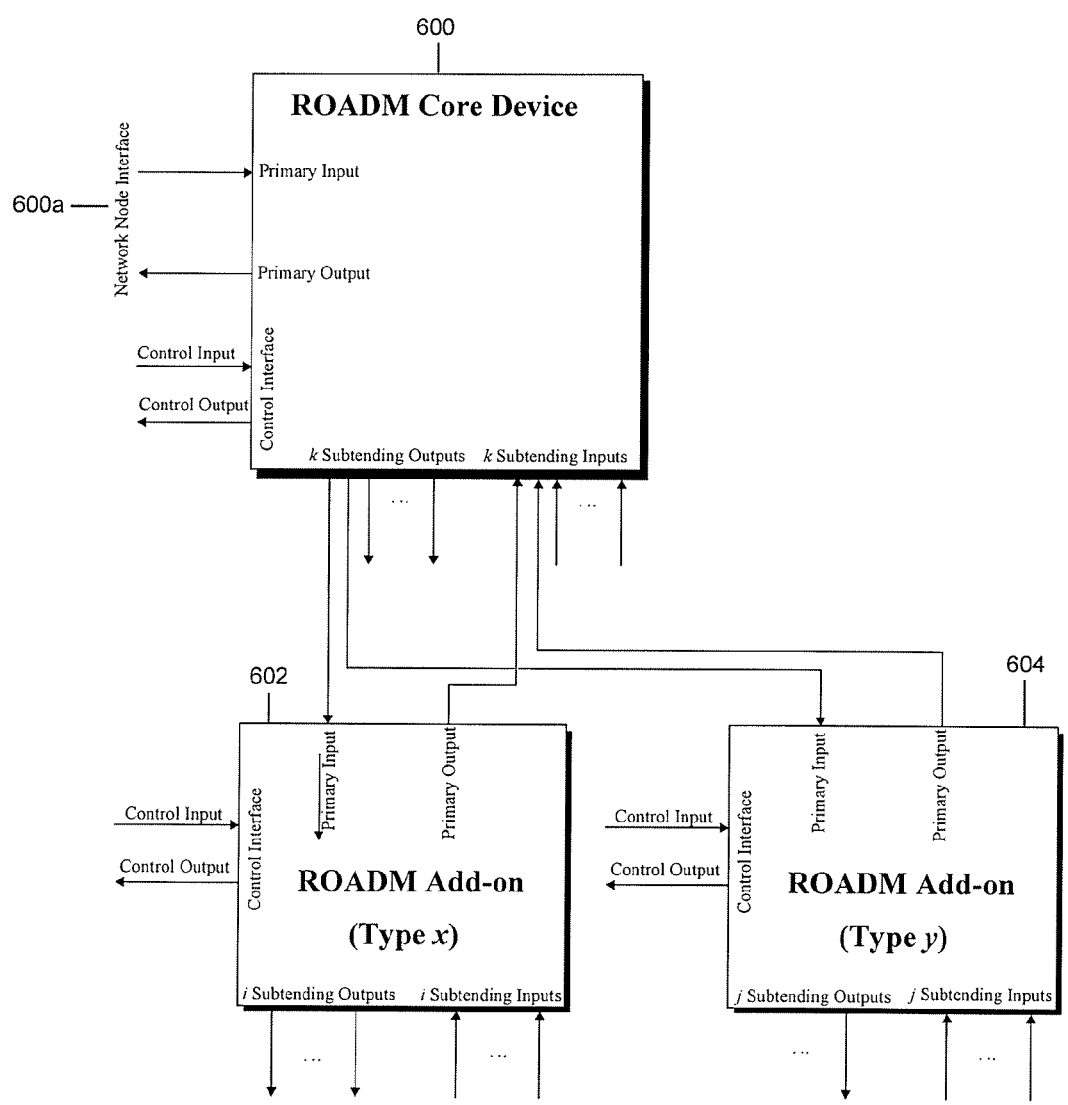
FIG. 41 is a block diagram of an example of an optical node including a ROADM core device and two add-on modules.

FIG. 41 shows a network element 598 including a ROADM core device of any type 600 connected to two different types ROADM add-ons 602 and 604 (denoted as type x and type y in the drawings) through two pairs of subtending inputs and outputs. The ROADM core device 600 has a network node interface 600a through which the ROADM core device 600 communicates with another node and k subtending inputs and outputs, where k is at least 2, providing the at least two pairs of subtending inputs and outputs for connection to the two ROADM add-ons 602 and 604. The x type of ROADM add-on 602 has i pairs of subtending inputs and outputs and the y type of ROADM add-on 604 has j pairs of subtending inputs and outputs. The number of subtending inputs and outputs of the ROADM add-ons and of the ROADM core device, i, j, and k, may be the same or different from each other. The ROADM core device 600 may be the same as, for example, the ROADM 10 (FIG. 1), the ROADM core device 102 (FIG. 8), the ROADM core devices 108, 110 (FIG. 9), the ROADM core devices 122, 124 (FIG. 10), the ROADM core devices 128, 130 (FIG. 11), the ROADM core device 132 (FIG. 12), the ROADM core device 140 (FIG. 13), the ROADM core device 164 (FIG. 16), the ROADM core device 168 (FIG. 17), or the ROADM core device 174 (FIG. 18), although it is not limited thereto. The ROADM add-ons 602 and 604 may be the same as, for example, the add-ons 542, 544, 546, or 548 shown in FIG. 38, although they are not limited thereto.

Figure 42:
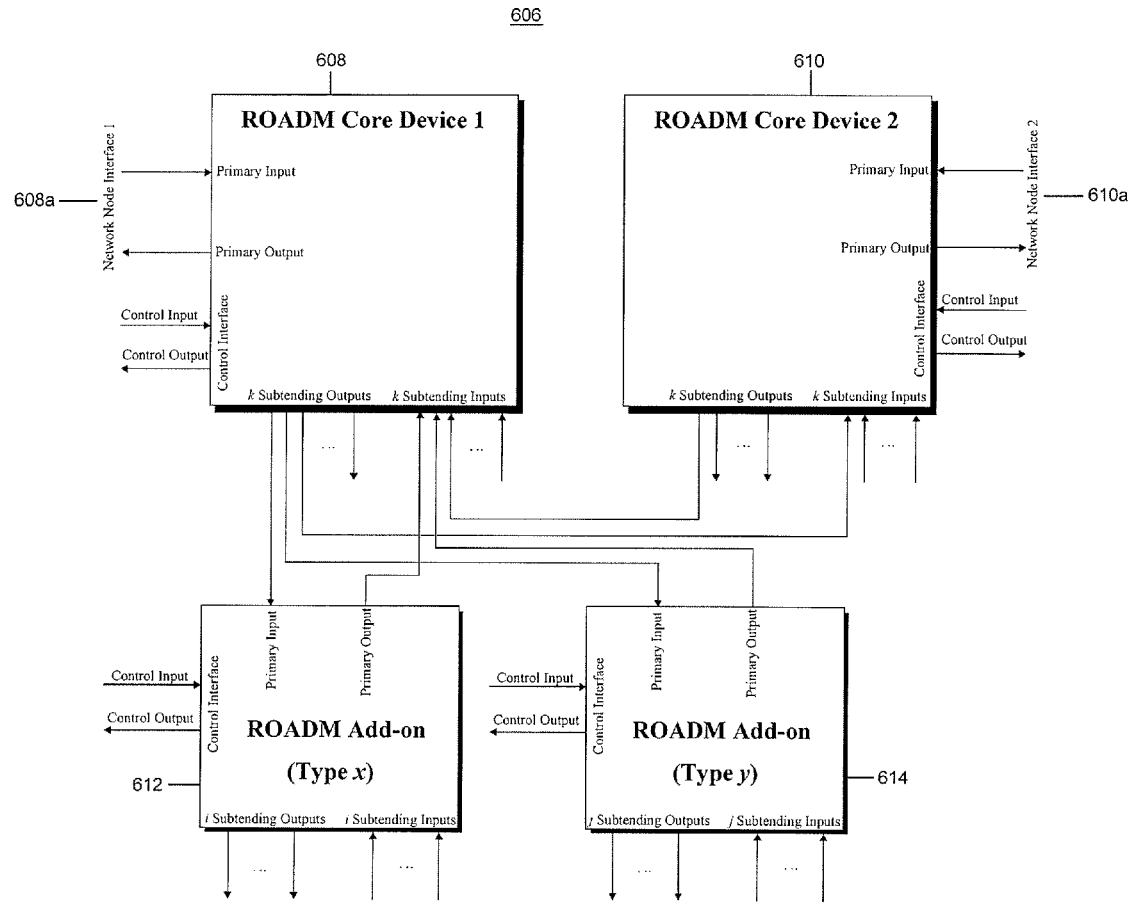
FIG. 42 is a block diagram of an example of an optical node including two ROADM core devices and two add-on modules, each connected to the same ROADM core device.

FIG. 42 shows a network element 606 including two interconnected ROADM core devices of any type 608 and 610, where ROADM core device 608 is also connected to two different types of ROADM add-ons 612 and 614 (denoted as type x and type y in the drawings) through two pairs of its k subtending inputs and outputs. Each ROADM core device has a network node interface (608a, 610a) through which the network element 606 communicates with another node, and a result, the network element 606 is a two-degree optical node. Each ROADM core device also has k subtending inputs and outputs, where k can be the same or different for each ROADM core device. The x type of ROADM add-on 612 has i pairs of subtending inputs and outputs and the y type of ROADM add-on 614 has j pairs of subtending inputs and outputs. The number of subtending inputs and outputs of the ROADM add-ons and of the ROADM core device, i, j, and k, may be the same or different from each other. The ROADM core devices 608 and 610 may be the same as, for example, the ROADM 10 shown in FIG. 1, the ROADM core device 102 (FIG. 8), the ROADM core devices 108, 110 (FIG. 9), the ROADM core devices 122, 124 (FIG. 10), the ROADM core devices 128, 130 (FIG. 11), the ROADM core device 132 (FIG. 12), the ROADM core device 140 (FIG. 13), the ROADM core device 164 (FIG. 16), the ROADM core device 168 (FIG. 17), or the ROADM core device 174 (FIG. 18), although they are not limited thereto. The ROADM add-ons 612 and 614 may be the same as, for example, the add-ons 542, 544, 546, or 548 shown in FIG. 38, although they are not limited thereto.

Figure 43:
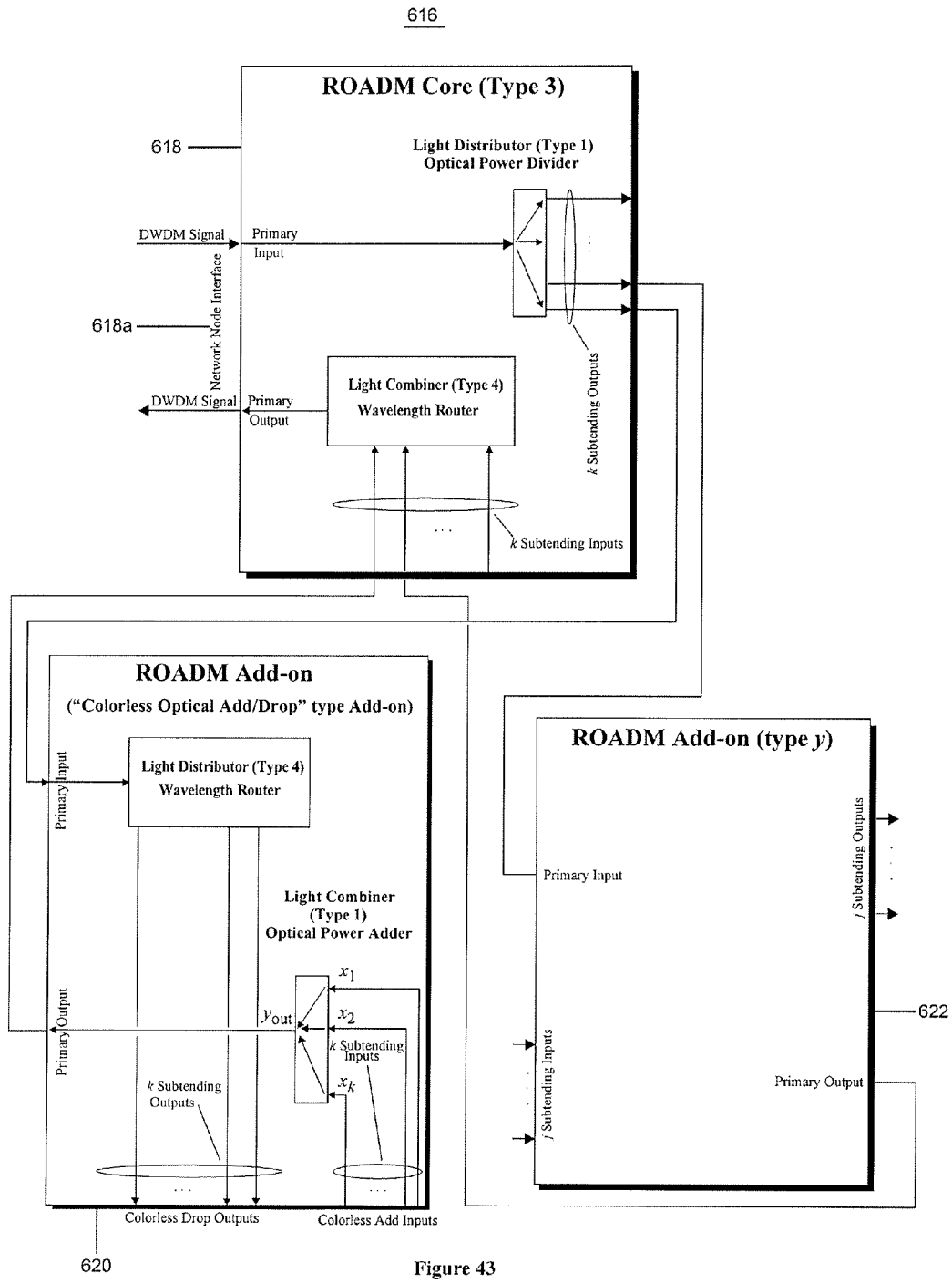
FIG. 43 is a block diagram of an example of an optical node including a type-3 ROADM core device and two add-on modules, one of which is a colorless optical add/drop module, specifically a type-1 ROADM core device.

FIG. 43 shows a network element 616 including a type-3 ROADM core device 618 connected to two ROADM add-ons through two pairs of its k subtending inputs and outputs. The two ROADM add-ons include a type-1 ROADM core 620, which functions as a colorless optical add/drop device, and a ROADM add-on 622 of any type (denoted as type y in the FIG. 43). The ROADM core device 618 has a network node interface 618a through which the ROADM core device communicates with another node. The ROADM add-on 620 has k pairs of subtending inputs and outputs and the y type of ROADM add-on 622 has j pairs of subtending inputs and outputs. The number of subtending inputs and outputs of the ROADM add-ons and of the ROADM core device may be the same or different from each other. Thus, k for the ROADM core device 618, k for the ROADM add-on 620, and j for the ROADM add-on 622 may be the same or different from each other. The ROADM core device 618 may be the same as, for example, the type-3 ROADM core device 132 shown in FIG. 12, although it is not limited thereto. The ROADM add-on 620 may be the same as, for example, the ROADM add-on 162 shown in FIG. 15. The add-on 622 may be the same as, for example, one of the add-ons 542, 544, 546, or 548 shown in FIG. 38, although it is not limited thereto.

Figure 44:
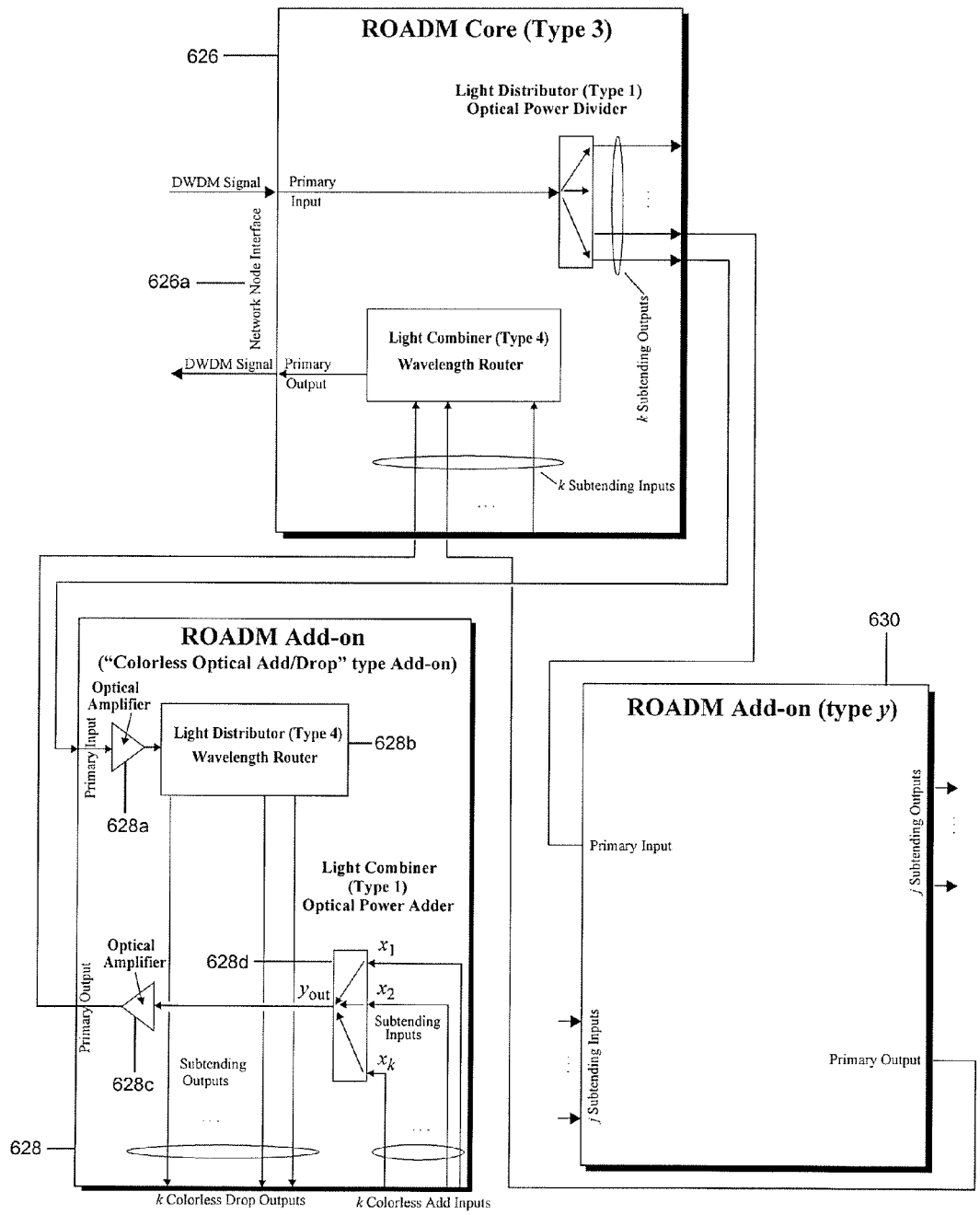
FIG. 44 is a block diagram of an example of an optical node including a type-3 ROADM core device and two add-on modules, one of which is a colorless optical add/drop module, specifically a type-1 ROADM core device with optical amplifiers.

FIG. 44 shows a network element 624 including a type-3 ROADM core device 626 connected to two ROADM add-ons through two pairs of its k subtending inputs and outputs. The two ROADM add-ons include a type-1 ROADM core 628, which functions as a colorless optical add/drop device, and another ROADM add-on 630 of any type (denoted as type y in FIG. 44). The type-1 ROADM core 628 includes an optical amplifier 628a at the primary input to the type-4 light distributor 628b and an optical amplifier 628c at the primary output of the type-1 light combiner 628d. The type-3 ROADM core device 626 has a network node interface 626a through which the type-3 ROADM core device 626 communicates with another node. The ROADM add-on 628 has k pairs of subtending inputs and outputs and the y type of ROADM add-on 630 has j pairs of subtending inputs and outputs. The number of subtending inputs and outputs of the ROADM add-ons and of the ROADM core device may be the same or different from each other. Thus, k for the ROADM core device 626, k for the ROADM add-on 628, and j for the ROADM add-on 630 may be the same or different from each other. The type-3 ROADM core device 626 may be the same as, for example, the type-3 ROADM core device 132 shown in FIG. 12, although it is not limited thereto. The type-1 ROADM core device 628 may be the same as, for example, the ROADM core device 176 shown in FIG. 18, although it is not limited thereto. The ROADM add-on 630 may be the same as, for example, one of the add-ons 542, 544, 546, or 548 shown in FIG. 38, although it is not limited thereto.

Figure 45:
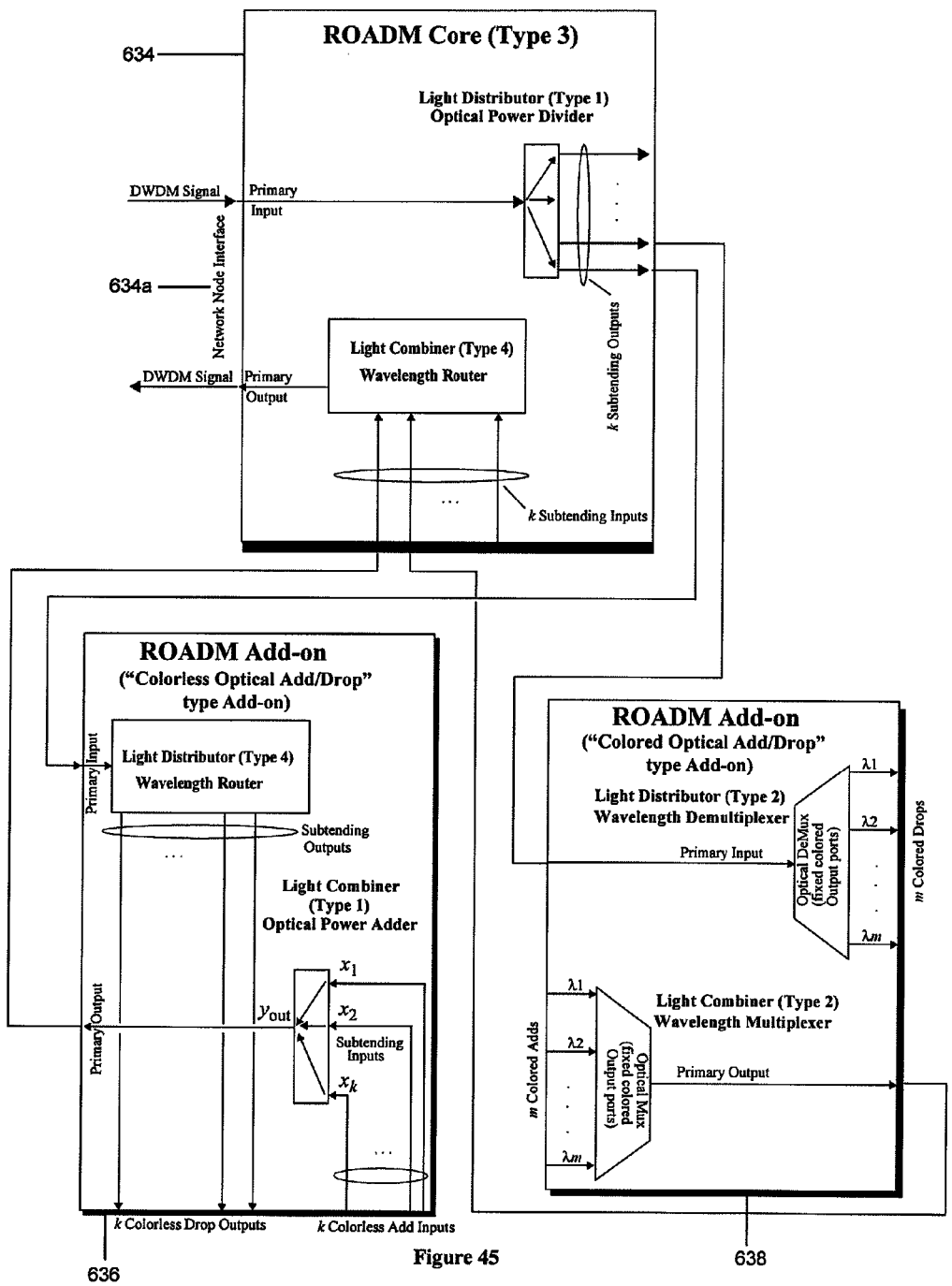
FIG. 45 is a block diagram of an example of an optical node including a type-3 ROADM core device and two add-on modules, one of which is a colorless optical add/drop module, specifically a type-1 ROADM core device and the other of which is a colored optical add/drop module including a type-2 light distributor and a type-2 light combiner.

FIG. 45 shows a network element 632 including a type-3 ROADM core device 634 connected to two ROADM add-ons through two pairs of its k subtending inputs and outputs. The type-3 ROADM core device 634 also has a network node interface 634a through which it communicates with another node. The ROADM add-ons include a type-1 ROADM core 636, which functions as a colorless optical add/drop device, and a type-1 ROADM add-on 638, which functions as a colored optical add/drop device. The number of pairs of subtending inputs and outputs of the ROADM core device 634, and of the ROADM add-ons 636 and 638 may be the same or different from each other. The type-3 ROADM core device 634 may be the same as, for example, the type-3 ROADM core device 132 shown in FIG. 12, although it is not limited thereto. The type-1 ROADM core 636 may be the same as, for example, the type-1 ROADM core device 102 shown in FIG. 8, the type-1 ROADM core devices 108, 110 shown in FIG. 9, and the type-1 ROADM core devices 122, 124 shown in FIG. 10, although it is not limited thereto. The type-1 ROADM add-on 638 can be the same as, for example, the type-1 ROADM add-on 142 shown in FIG. 13.

Figure 46:
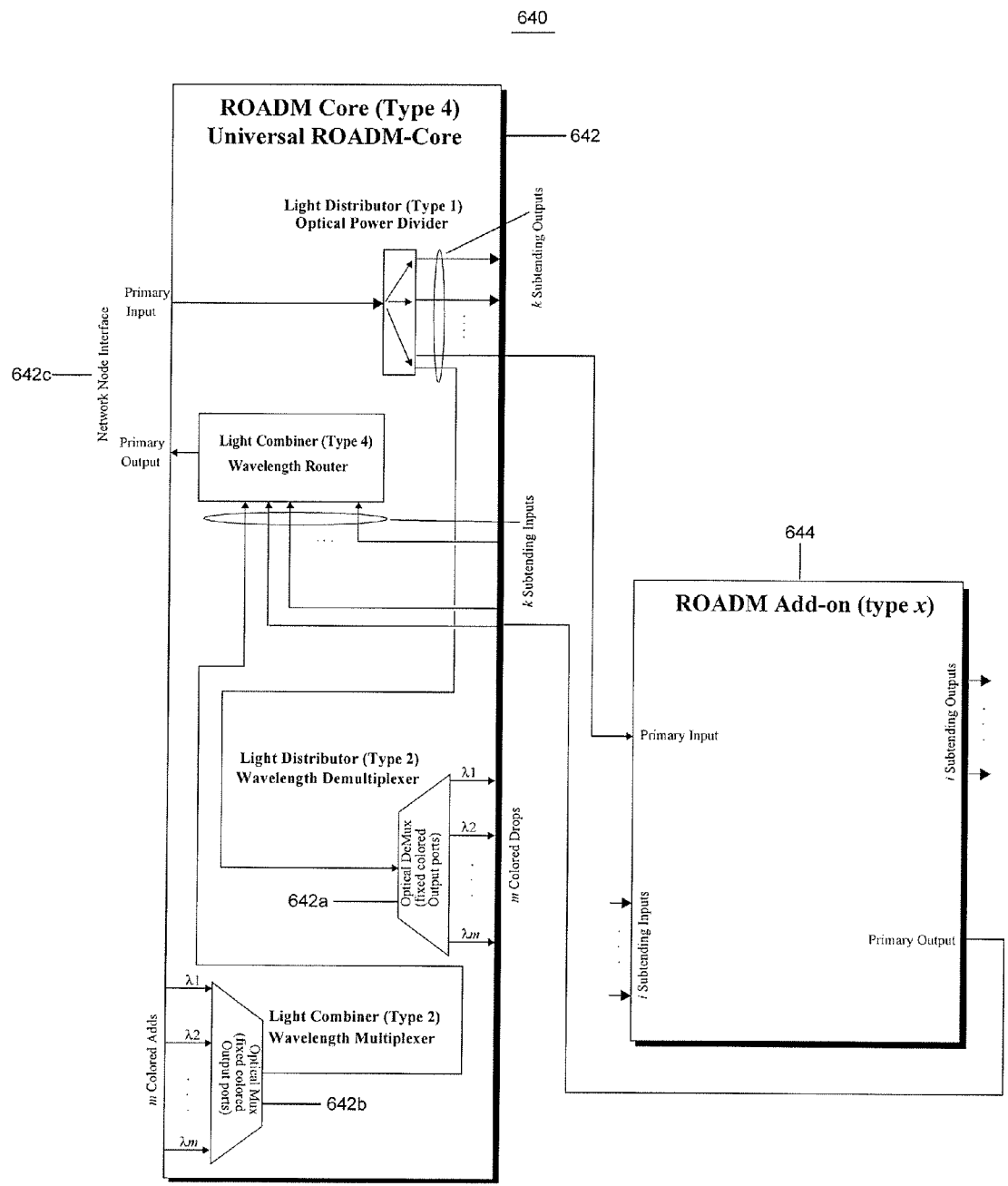
FIG. 46 is a block diagram of an example of an optical node including a type-4 ROADM core device and an add-on module.

FIG. 46 shows a network element 640 including a type-4 ROADM core device 642 connected internally to a type-1 ROADM add-on (including a type-2 light distributor 642a and a type-2 light combiner 642b), and externally to another ROADM add-on 644 of any type (denoted in FIG. 46 as type x), through two pairs of its k subtending inputs and outputs. The type-4 ROADM core device 642 has a network node interface 642c. The ROADM add-on 644 has i subtending inputs and outputs. The number of subtending inputs and outputs i of the ROADM add-on 644, is the same as or different from the number of subtending inputs and outputs k for the ROADM core device 642. The type-4 ROADM core device 642 can be the same as, for example, the type-4 ROADM core device 164 shown in FIG. 16, although it is not limited thereto. The ROADM add-on 644 may be the same as, for example, one of the add-ons 542, 544, 546, or 548 shown in FIG. 38, although it is not limited thereto.

Figure 47:
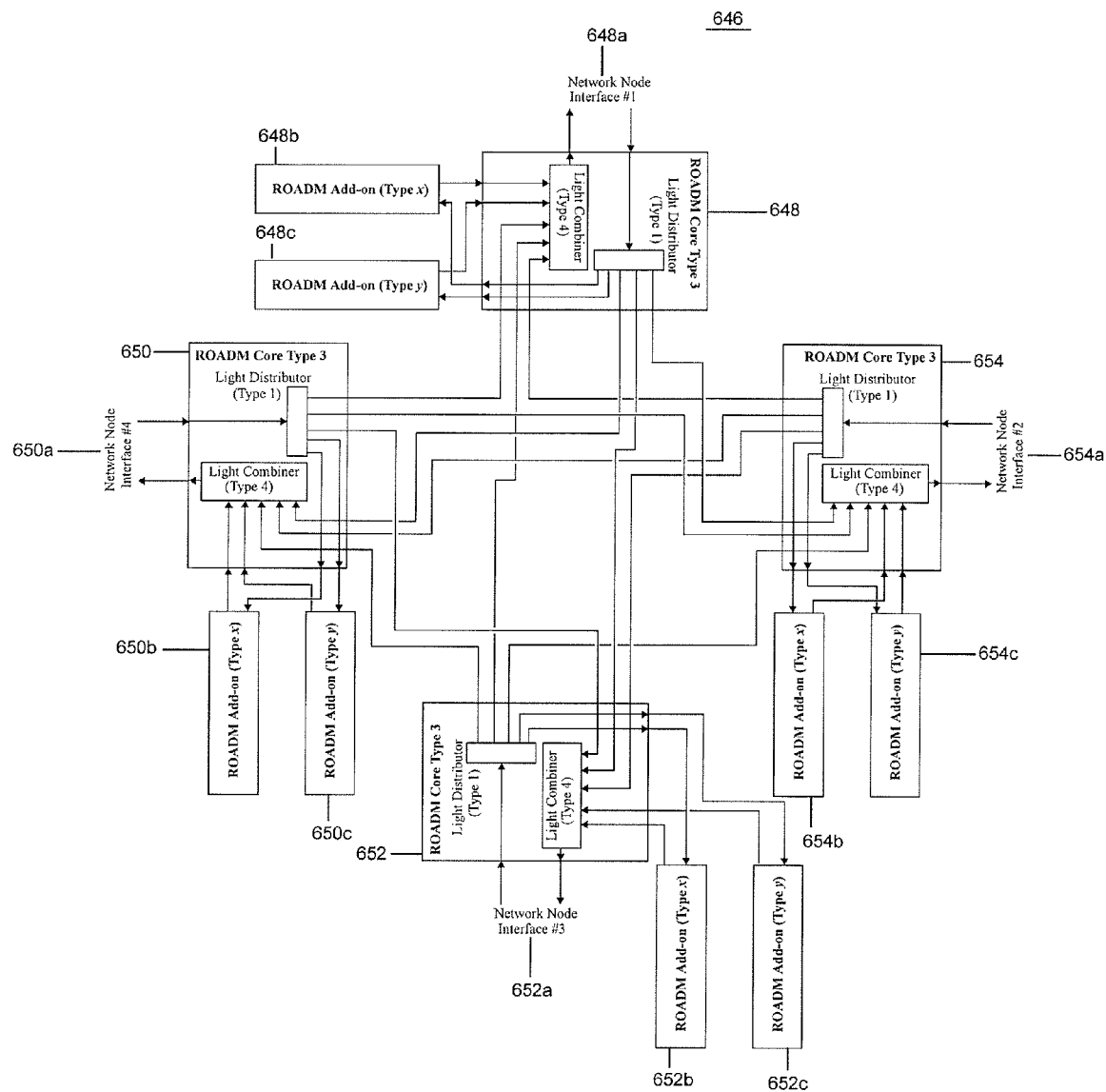
FIG. 47 is a block diagram of an example of an optical node including four type-3 ROADM core devices, each connected to two add-on modules.

FIG. 47 shows a network element 646 including a four-degree node including four type-3 ROADM core devices (648, 650, 652, and 654), each having a network node interface (648a, 650a, 652a, and 654a) enabling communication with another node. Each type-3 ROADM core device (648, 650, 652, and 654) is connected to the other type-3 ROADM core devices and to two different kinds of ROADM add-ons ((648b, 648c), (650b, 650c), (652b, 652c), (654b, 654c)) (denoted in FIG. 47 as type x and type y) through five pairs of its k subtending inputs and outputs. Each of the ROADM add-ons ((648b, 648c), (650b, 650c), (652b, 652c), (654b, 654c)) can have the same number or a different number of subtending inputs and outputs from the other ROADM add-ons and from the four type-3 ROADM core devices (648, 650, 652, and 654). The type-3 ROADM core devices 648, 650, 652, and 654 can be the same as, for example, the type-3 ROADM core device 132 shown in FIG. 12, although they are not limited thereto. Each of the x-and y-type ROADM add-ons ((648b, 648c), (650b, 650c), (652b, 652c), (654b, 654c)) may be the same as, for example, one of the add-ons 542, 544, 546, or 548 shown in FIG. 38, although they are not limited thereto. Although FIG. 47 shows that the add-ons connected to each ROADM core device are different from each other, it is within the scope of the invention, in an example embodiment, for the add-ons within each pair to be the same type of add-on.

Figure 48:
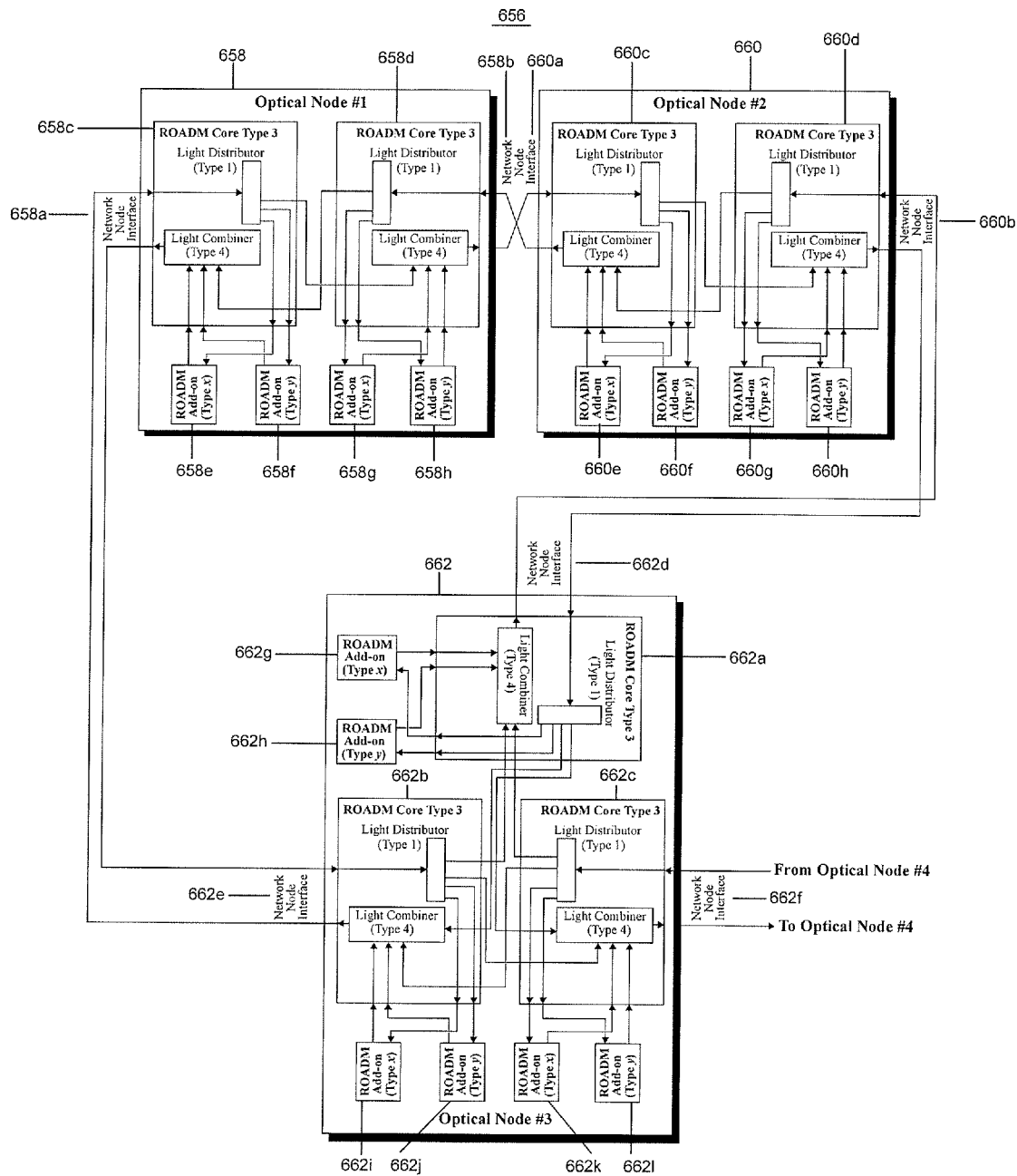
FIG. 48 is a block diagram of an example of an optical network including three optical nodes, two of which include two type-3 ROADM core devices, and one of which includes three type-3 ROADM core devices, each ROADM core device connected to two add-on modules.

FIG. 48 shows an optical network 656 including a first node 658, a second node 660, and a third node 662. Nodes 658 and 660 are two-degree nodes, each having two network node interfaces (658a, 658b, 660a, 660b), through each of which these nodes connect to one of the other nodes. Nodes 658 and 660 each include two type-3 ROADM core devices (658c, 658d, 660c, 660d), each of which includes one of the network node interfaces (658a, 658b, 660a, 660b). Each type-3 ROADM core device (658c, 658d, 660c, 660d) is connected to two different kinds of ROADM add-ons (ROADM core device 658c is connected to add-ons (658e, 658f), ROADM core device 658d is connected to add-ons (658g, 658h), ROADM core device 660c is connected to add-ons (660e, 660f), and ROADM core device 660d is connected to add-ons (660g, 660h) (the add-ons in FIG. 48 are denoted as type x and type y add-ons). Each type-3 ROADM core device (658c, 658d, 660c, 660d) is also connected to the other type-3 ROADM core device within its node through a pair of its k subtending inputs and outputs. Node 662 is a three-degree node including three type-3 ROADM core devices (662a, 662b, 662c), each including a network node interface (662d, 662e, 662f) and each connected to two different kinds of ROADM add-ons (662g, 662h, 662i, 662j, 662k, and 662l) (denoted as type x and type y) and to the other two type-3 ROADM core devices within node 662 through four pairs of its k subtending inputs and outputs. The type-3 ROADM core devices 658c, 658d, 660c, 660d, 662a, 662b, and 662c can be the same as, for example, the type-3 ROADM core device 132 shown in FIG. 12, although they are not limited thereto. Each of the add-ons 658e, 658f, 658g, 658h, 660e, 660f, 660g, 660h, 662g, 662h, 662i, 662j, 662k, and 662l, may be the same as, for example, one of the add-ons 542, 544, 546, or 548 shown in FIG. 38, although they are not limited thereto. Although FIG. 48 shows that the add-ons connected to each ROADM core device are different from each other, it is within the scope of the invention, in an example embodiment, for the add-ons within each pair to be the same type of add-on.

Figure 49:
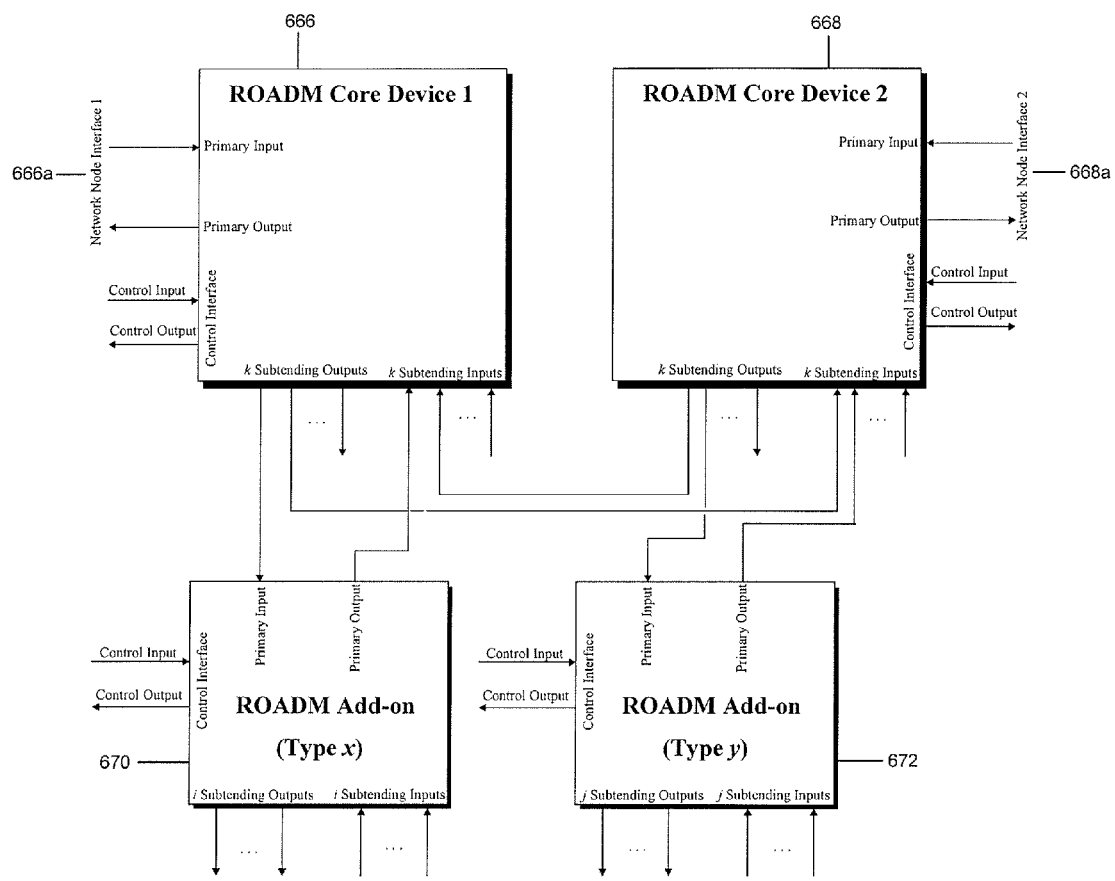
FIG. 49 is a block diagram of an example of an optical node including two ROADM core devices each connected to a different type of add-on module.

FIG. 49 shows a network element 664 including a two-degree node including two ROADM core devices (666, 668) of any type, each having a network node interface (666a, 668a), enabling connection to another node. Each ROADM core device is connected to the other ROADM core device and to a different type of ROADM add-on 670, 672 through two pairs of its k subtending inputs and outputs. The ROADM add-on 670 has i subtending inputs and outputs, the ROADM add-on 672 has j subtending inputs and outputs, and i, j, k, and k (respectively representing the total number of subtending inputs and outputs for the ROADM add-on 670, the ROADM add-on 672, the ROADM core device 666, and the ROADM core device 668) are the same or different from each other. The ROADM core devices 666 and 668 may be the same as, for example, the ROADM 10 (FIG. 1), the ROADM core device 102 (FIG. 8), the ROADM core devices 108, 110 (FIG. 9), the ROADM core devices 122, 124 (FIG. 10), the ROADM core devices 128, 130 (FIG. 11), the ROADM core device 132 (FIG. 12), the ROADM core device 140 (FIG. 13), the ROADM core device 164 (FIG. 16), the ROADM core device 168 (FIG. 17), or the ROADM core device 174 (FIG. 18), although they are not limited thereto. Each of the ROADM add-ons 670 and 672 may be the same as, for example, the add-ons 542, 544, 546, or 548 shown in FIG. 38, although they are not limited thereto. Although FIG. 49 shows that the add-ons are different from each other, it is within the scope of the invention, in an example embodiment, for the add-ons to be the same type of add-on.

Figure 50:
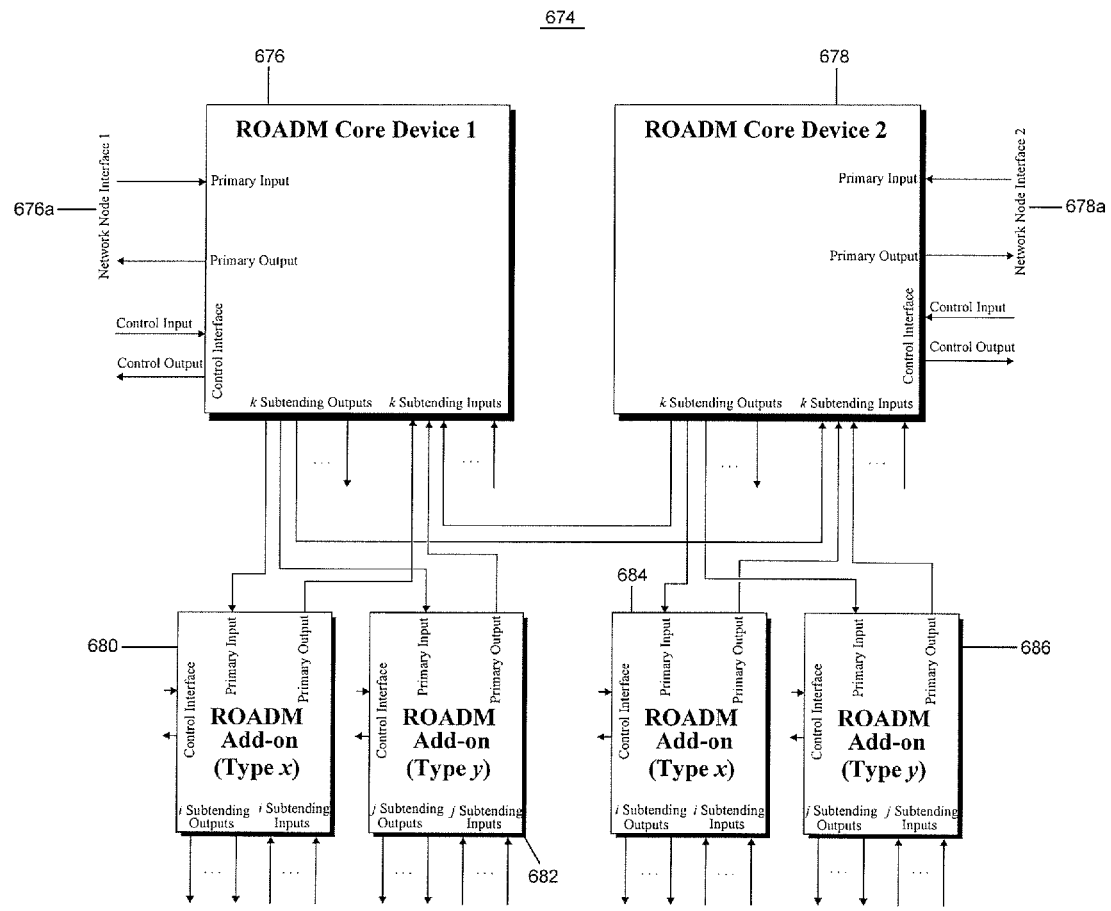
FIG. 50 is a block diagram of an example of an optical node including two ROADM core devices each connected to two different types of add-on modules.

FIG. 50 shows a network element 674 including a two-degree node including two ROADM core devices (676, 678) of any type, each having a network node interface (676a, 678a), enabling communication with another node. Each ROADM core device is connected to the other ROADM core device and to two different types of ROADM add-ons through three pairs of its k subtending inputs and outputs. More specifically, ROADM add-ons 680 and 682 are different types of ROADM add-ons from each other (denoted in FIG. 50 as type x and type y) and are connected to ROADM core device 676, and ROADM add-ons 684 and 686 are different types of ROADM add-ons from each other (denoted as type x and type y) that are connected to ROADM core device 678. The number of subtending inputs and outputs on the ROADM add-ons 680, 682, 684, and 686 and the ROADM core devices 676 and 678 may be the same or different from each other. The ROADM core devices 676 and 678 may be the same as, for example, the ROADM 10 (FIG. 1), the ROADM core device 102 (FIG. 8), the ROADM core devices 108, 110 (FIG. 9), the ROADM core devices 122, 124 (FIG. 10), the ROADM core devices 128, 130 (FIG. 11), the ROADM core device 132 (FIG. 12), the ROADM core device 140 (FIG. 13), the ROADM core device 164 (FIG. 16), the ROADM core device 168 (FIG. 17), or the ROADM core device 174 (FIG. 18), although they are not limited thereto. Each of the ROADM add-ons 680, 682, 684, and 686 may be the same as, for example, the add-ons 542, 544, 546, or 548 shown in FIG. 38, although they are not limited thereto. Although FIG. 50 shows that the add-ons connected to each ROADM core device are different from each other, it is within the scope of the invention, in an example embodiment, for the add-ons within each pair to be the same type of add-on.

Figure 51:
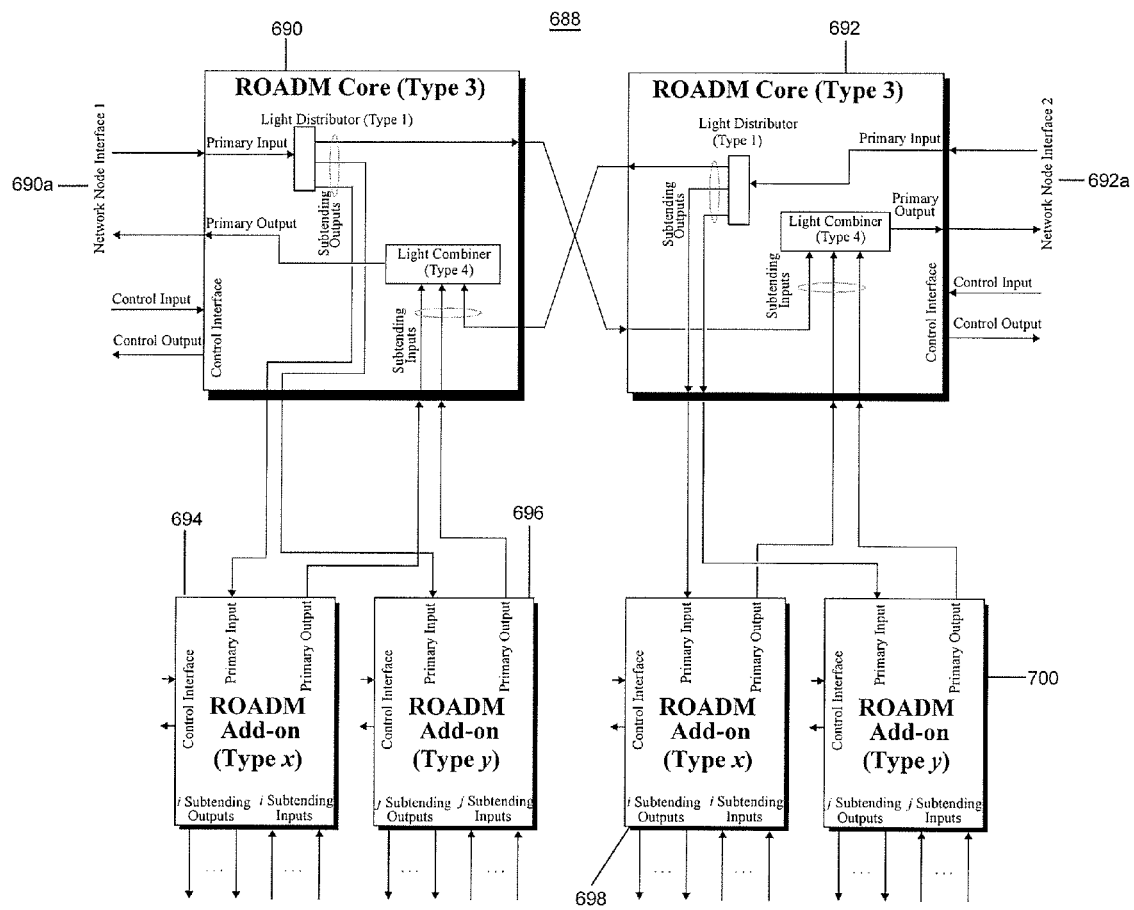
FIG. 51 is a block diagram of an example of an optical node including two type-3 ROADM core devices each connected to two different types of add-on modules.

FIG. 51 shows a network element 688 including a two-degree node including two type-3 ROADM core devices (690,692), each having a network node interface (690a, 692a), enabling communication with another node. Each ROADM core device is connected to the other ROADM core device and to two different types of ROADM add-ons through three pairs of its k subtending inputs and outputs. More specifically, ROADM add-ons 694 and 696 are different types of ROADM add-ons from each other (denoted in FIG. 51 as type x and type y) and are connected to ROADM core device 690, and ROADM add-ons 698 and 700 are different types of ROADM add-ons from each other (denoted in FIG. 51 as type x and type y) that are connected to ROADM core device 692. The number of subtending inputs and outputs on the ROADM add-ons 694, 696, 698, and 700 the ROADM core devices 690 and 692 may be the same or different from each other. The type-3 ROADM core devices 690 and 692 can be the same as, for example, the type-3 ROADM core device 140 shown in FIG. 13, although they are not limited thereto. The add-ons 694, 696, 698, and 700 may be the same as, for example, the add-ons 542, 544, 546, or 548 shown in FIG. 38, although they are not limited thereto. Although FIG. 51 shows that the add-ons connected to each ROADM core device are different from each other, it is within the scope of the invention, in an example embodiment, for the add-ons within each pair to be the same type of add-on.

Figure 52:
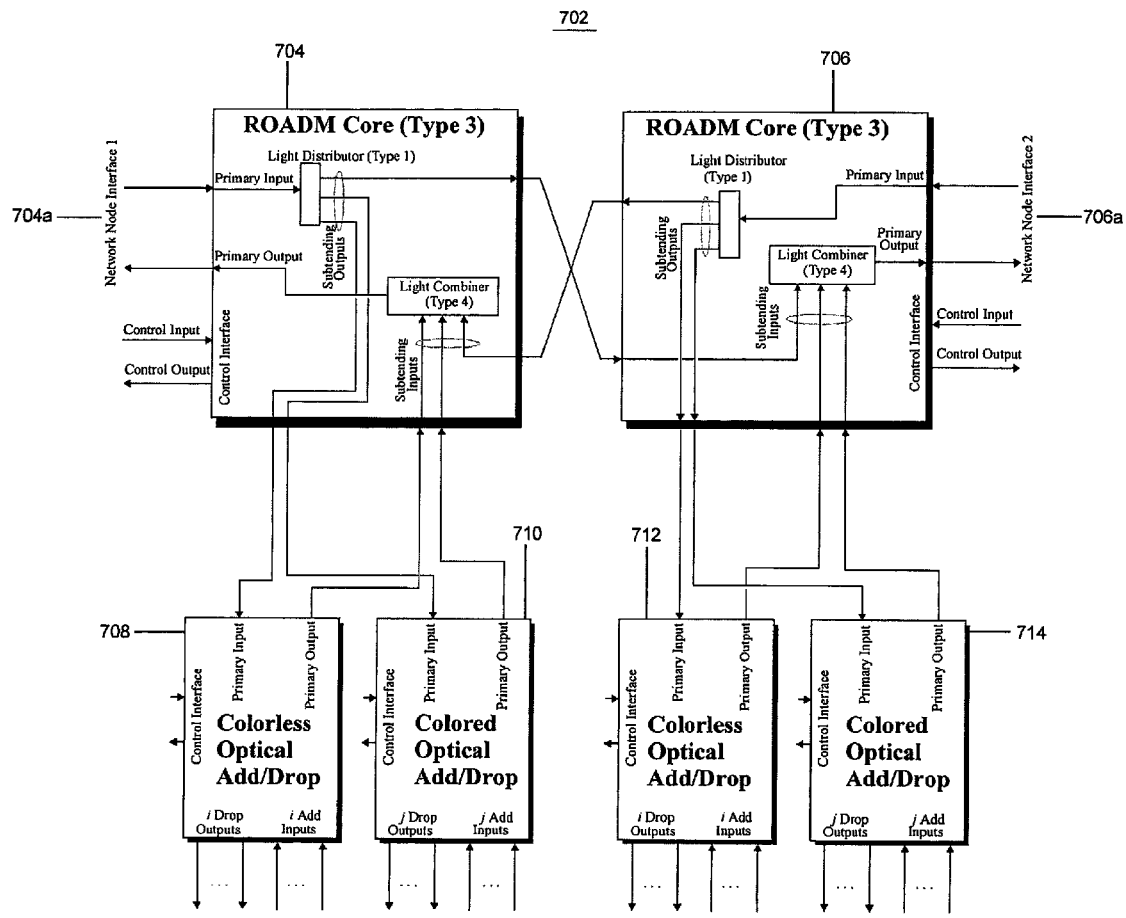
FIG. 52 is a block diagram of an example of an optical node including two type-3 ROADM core devices each connected to colored and colorless add-on modules.

FIG. 52 shows a network element 702 including a two-degree node including two type-3 ROADM core devices (704, 706), each having a network node interface (704a, 706a), enabling communication with another node. Each ROADM core device is connected to the other ROADM core device and to colored and colorless types of ROADM add-ons through three pairs of its k subtending inputs and outputs. More specifically, ROADM add-ons 708 and 710 are colorless and colored optical add/drop add-ons, respectively, and are connected to ROADM core device 704, and ROADM add-ons 712 and 714 are colorless and colored optical add/drop add-ons, respectively, that are connected to ROADM core device 706. The ROADM add-ons 708, 710, 712, and 714 and the ROADM core devices 704 and 706 may have the same or a different number of subtending inputs and outputs from each other. The type-3 ROADM core devices 704 and 706 can be the same as, for example, the type-3 ROADM core device 140 shown in FIG. 13, although they are not limited thereto. The colorless add-ons 708 and 712 can be the same as, for example, the type-1 ROADM core device 162 shown in FIG. 15, although they are not limited thereto. The colored add-ons 710 and 714 can be the same as, for example, the type-1 ROADM add-on 142 shown in FIG. 13, although they are not limited thereto.

Figure 53:
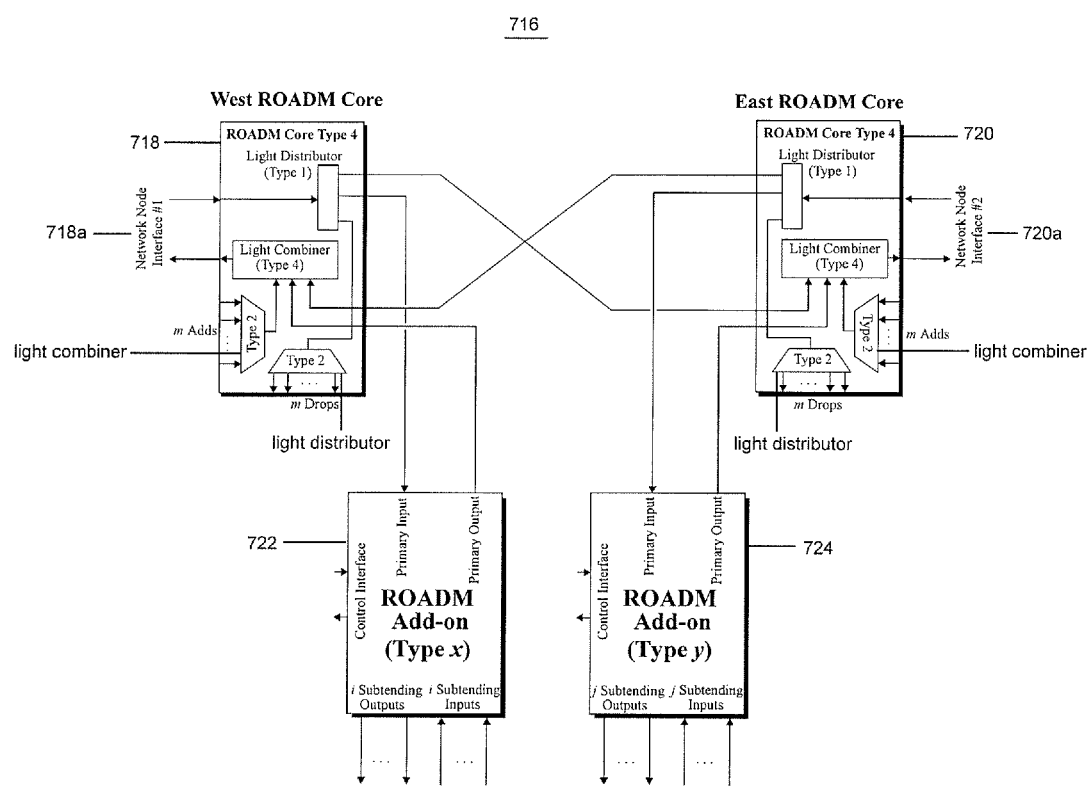
FIG. 53 is a block diagram of an example of an optical node including two type-4 ROADM core devices, each including a colored add-on module therein and each externally connected to another add-on module.

FIG. 53 shows a network element 716 including a two-degree node including a type-4 west ROADM core device 718 and a type-4 east ROADM core device 720, each having a network node interface (718a and 720a, respectively) enabling communication with another node. Each type-4 ROADM core device in this example embodiment is connected to the other type-4 ROADM core device, is connected internally to a type-1 ROADM add-on, and is connected externally to a different type of ROADM add-on from the other ROADM core device (the two types of add-ons 722 and 724 are denoted in FIG. 53 as type x and type y add-ons) through three pairs of its k subtending inputs and outputs. Thus, ROADM add-on 722 is connected to the type-4 west ROADM core device 718 and the ROADM add-on 724 is connected to the type-4 east ROADM core device 720. The ROADM add-ons 722 and 724 and the ROADM core devices 718 and 720 have the same or a different number of subtending inputs and outputs from each other. The type-4 ROADM core devices 718 and 720 can be the same as, for example, the type-4 ROADM core device 164 shown in FIG. 16, although they are not limited thereto. The add-ons 722 and 724 can be the same as, for example, the add-ons 542, 544, 546, or 548 shown in FIG. 38, although they are not limited thereto. Although FIG. 53 shows that the add-ons are different from each other, it is within the scope of the invention, in an example embodiment, for the add-ons to be the same type of add-on.

Figure 54:
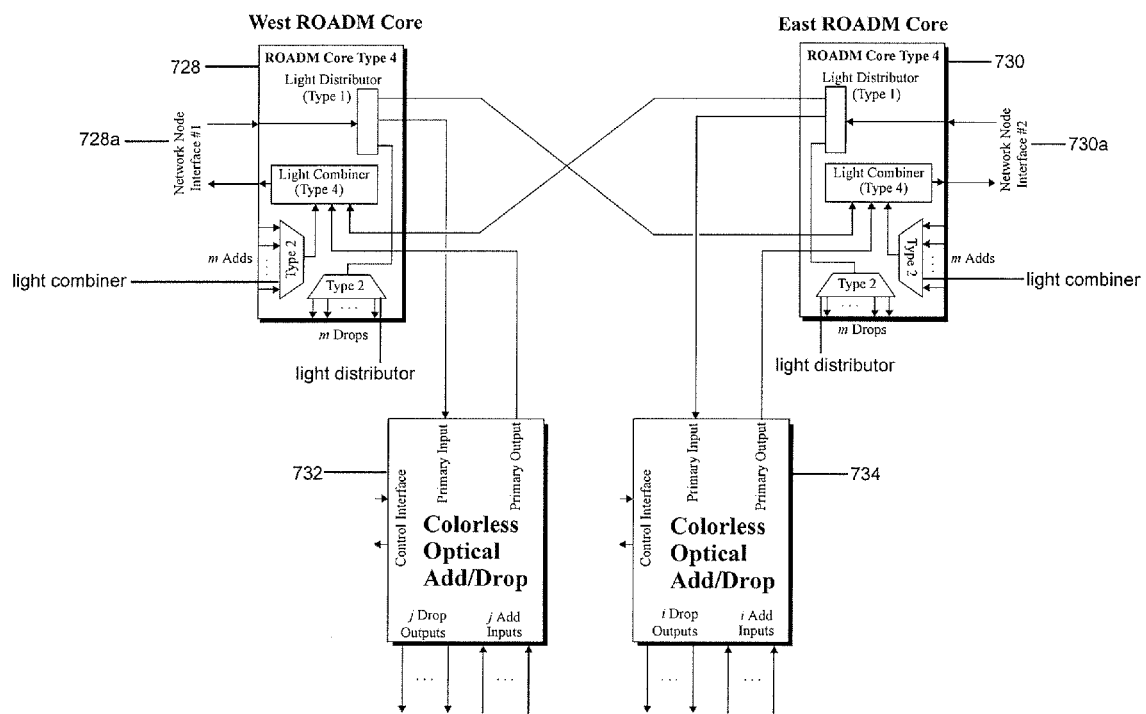
FIG. 54 is a block diagram of an example of an optical node including two type-4 ROADM core devices, each including a colored add-on module therein and each externally connected to a colorless add/drop add-on module.

FIG. 54 shows a network element 726 including a two-degree node including a type-4 west ROADM core device 728 and a type-4 east ROADM core device 730, each having a network node interface (728a and 730a, respectively) enabling communication with another node. Each type-4 ROADM core device in this example embodiment is connected to the other type-4 ROADM core device, is connected internally to a type-1 ROADM add-on, and is connected externally to a colorless optical add/drop add-on through three pairs of its k subtending inputs and outputs. Thus, ROADM add-on 732 is connected to the type-4 west ROADM core device 728 and the ROADM add-on 734 is connected to the type-4 east ROADM core device 730. The ROADM add-ons 732 and 734 and the ROADM core devices 728 and 730 have the same or a different number of subtending inputs and outputs from each other. Add-ons 732 and 734 are colorless optical add/drop devices. The type-4 ROADM core devices 728 and 730 can be the same as, for example, the type-4 ROADM core device 164 shown in FIG. 16, although they are not limited thereto. Colorless Add-ons 732 and 734 can be the same as, for example, the type-1 ROADM core device 162 shown in FIG. 15, although they are not limited thereto.

Figure 55:
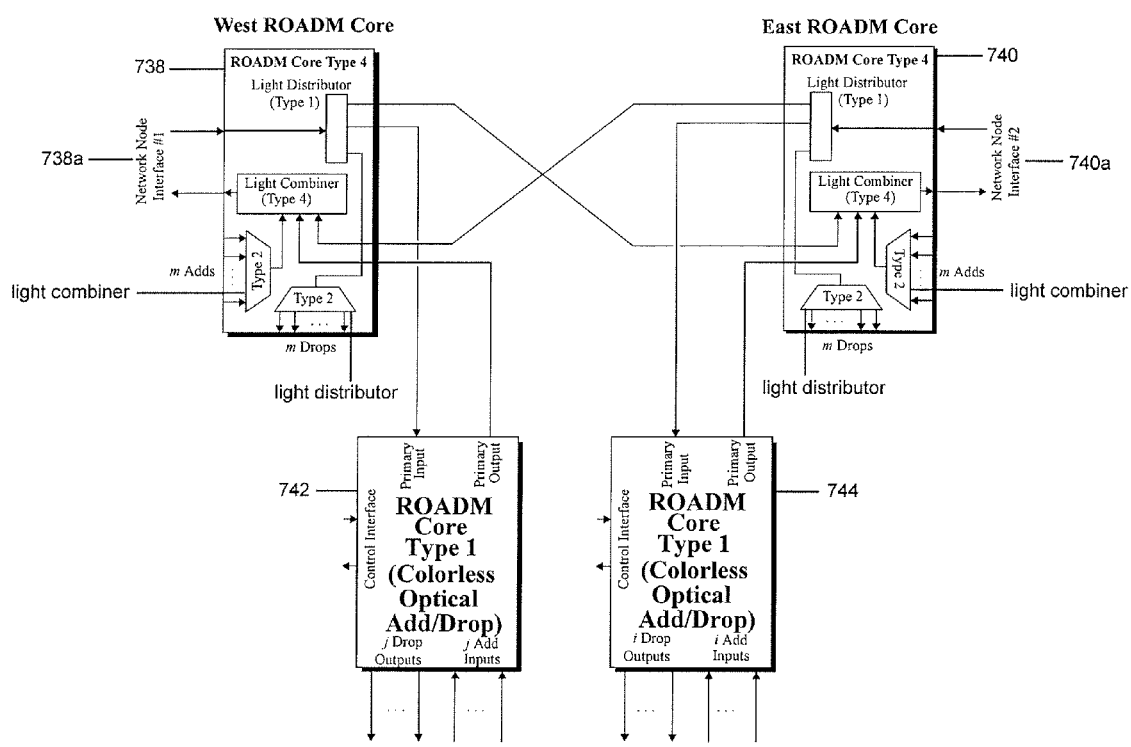
FIG. 55 is a block diagram of an example of an optical node including two type-4 ROADM core devices, each including a colored add-on module therein and each externally connected to a colorless add-on module, specifically a type-1 ROADM core device.

FIG. 55 shows a network element 736 including a two-degree node including a type-4 west ROADM core device 738 and a type-4 east ROADM core device 740, each having a network node interface (738a, 740a, respectively) enabling communication with another node. Each type-4 ROADM core device in this example embodiment is connected to the other type-4 ROADM core device, is connected internally to a type-1 ROADM add-on, and is connected externally to a colorless optical add/drop add-on (one of ROADM add-ons 742 and 744) through three pairs of its k subtending inputs and outputs. The ROADM add-on 742 is connected to the type-4 west ROADM core device 738 and the ROADM add-on 744 is connected to the type-4 east ROADM core device 740. The ROADM add-ons 742 and 744 and the ROADM core devices 738 and 740 have the same or a different number of subtending inputs and outputs from each other. Colorless optical add/drop add-ons 742 and 744 each include a type-1 ROADM core device, such as, for example, the type-1 ROADM core device 162 shown in FIG. 15, although they are not limited thereto. The type-4 ROADM core devices 738 and 740 can be the same as, for example, the type-4 ROADM core device 164 shown in FIG. 16, although they are not limited thereto.

Figure 56:
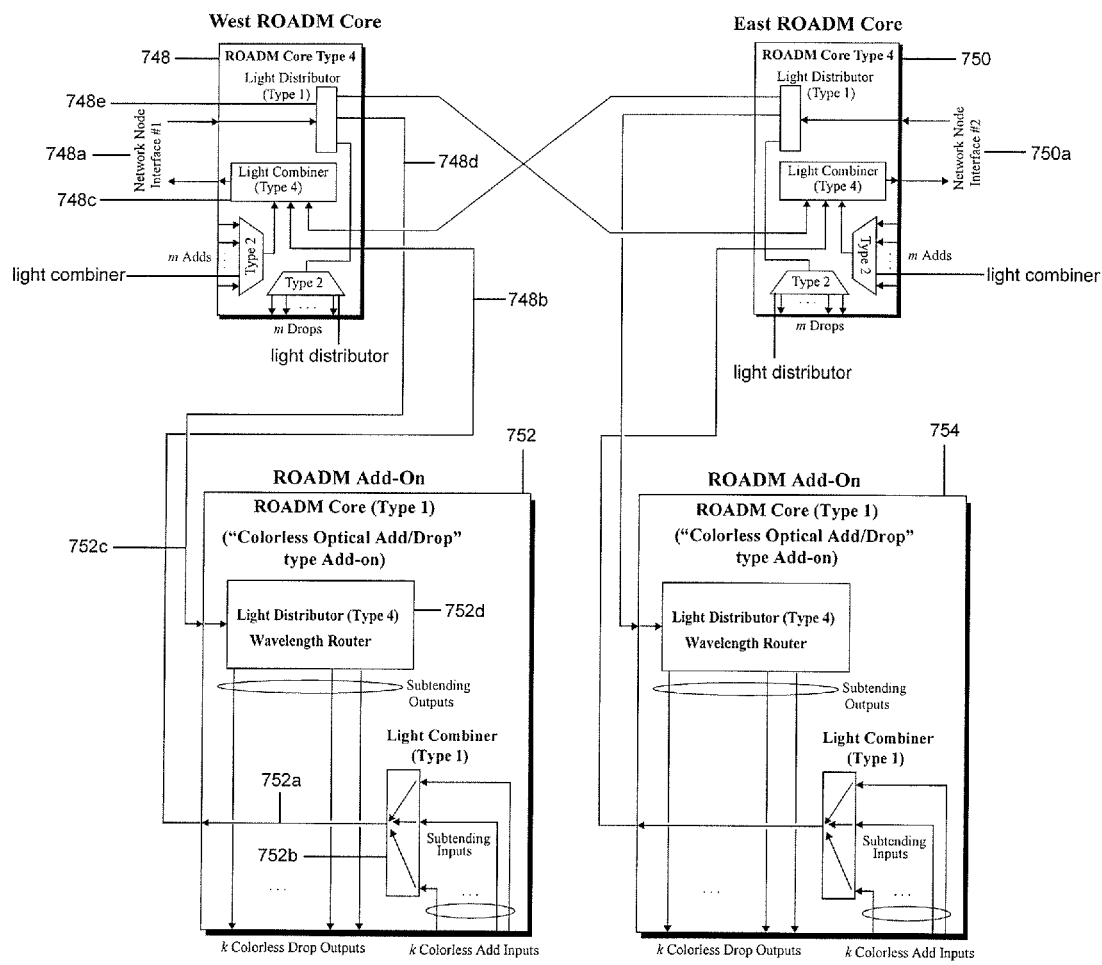
FIG. 56 is a block diagram of an example of an optical node including two type-4 ROADM core devices, each including a colored add-on module therein and each externally connected to a colorless add-on module, specifically a type-1 ROADM core device, including a type-4 light distributor and a type-1 light combiner.

FIG. 56 shows one way to connect a type-4 ROADM core device to a type-1 ROADM core device functioning as a colorless optical add/drop ROADM add-on in another example of an embodiment of the invention. More specifically, FIG. 56 shows a network element 746 including a two-degree node including a type-4 west ROADM core device 748 and a type-4 east ROADM core device 750, each having a network node interface (748*a*, 750*a*, respectively) enabling communication with another node. Each type-4 ROADM core device in this example embodiment is connected to the other type-4 ROADM core device, is connected internally to a type-1 ROADM add-on, and is connected externally to a type-1 ROADM core device (functioning as a colorless optical add/drop add-on) through three pairs of its k subtending inputs and outputs. More specifically, the ROADM add-on 752 is connected to the type-4 west ROADM core device 748 and the ROADM add-on 754 is connected to the type-4 east ROADM core device 750. The ROADM add-ons 752 and 754 and the ROADM core devices 748 and 750 have the same or a different number of subtending inputs and outputs from each other. In this example embodiment, the primary output 752*a* of the type-1 ROADM core device 752, which is the output of the type-1 light combiner 752*b*, is connected to one of the subtending inputs 748*b* of the type-4 light combiner 748*c* of the type-4 west ROADM core device 748, while one of the subtending outputs 748*d* of the type-1 light distributor 748*e* of the type-4 west ROADM core device 748 is connected to the primary input 752*c* of the type-1 ROADM core device 752, which is connected to the input of the type-4 light distributor 752*d*. The east ROADM core device 750 is connected to the type-1 ROADM core device 754 in the same manner, although it is not limited to this type of connection. The type-4 ROADM core devices 748 and 750 can be the same as, for example, the type-4 ROADM core device 164 shown in FIG. 16, although they are not limited thereto. The type-1 ROADM core devices 752 and 754 can be the same as, for example, the type-1 ROADM core device 162 shown in FIG. 15, although they are not limited thereto.

Figure 57:
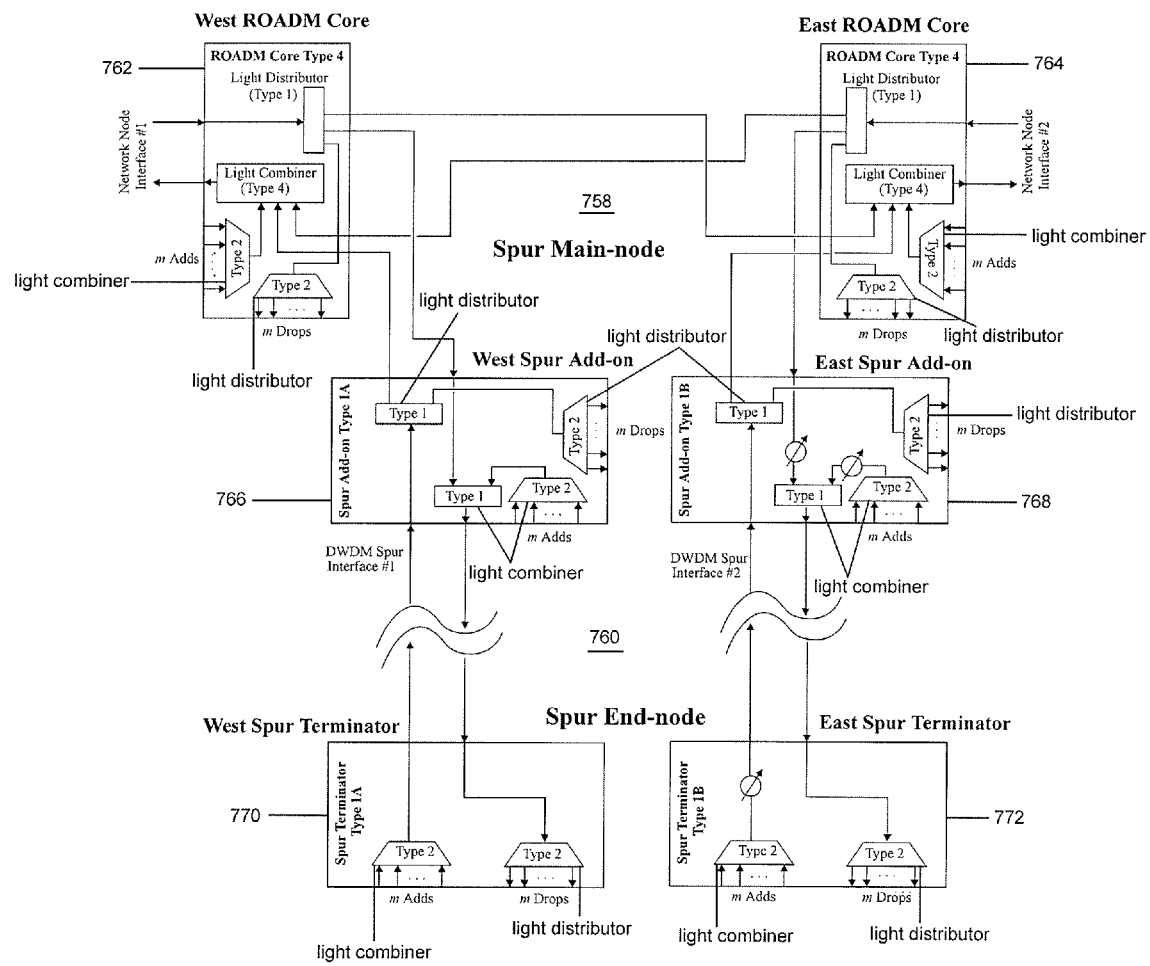
FIG. 57 is a block diagram of an example of an optical node including a spur main node and a spur end node, the spur main node including two type-4 ROADM core devices one of which is connected to a type-1A spur add-on, the other of which is connected to a type-1B spur add-on, the spur end node including a type-1A spur terminator and a type-1B spur terminator.

FIG. 57 shows another example of an embodiment of an optical spur. It is similar to FIG. 26, except that it uses type-1A spur add-ons and type-1A spur terminators. Accordingly, FIG. 57 shows an optical spur 756 that can include a spur main node 758 and a spur end node 760. The spur main node 758 can include a type-4 west ROADM core device 762, a type-4 east ROADM core device 764, a type-1A west spur add-on 766 and a type-1B east spur add-on 768. The west ROADM core device 762 is connected to the west spur add-on 766 and the east ROADM core device 764 is connected to the east spur add-on 768. The spur end node 760 includes a type-1A west spur terminator 770 and a type-1B east spur terminator 772. The west spur terminator 770 is connected to the west spur add-on 766, while the east spur terminator 772 is connected to the east spur add-on 768, although it is within the scope of the invention, in an example embodiment, to connect the west spur terminator 770 to the east spur add-on 768 and to connect the east spur terminator 772 to the west spur add-on 766. The type-4 ROADM core devices 762 and 764 can be the same as, for example, the type-4 ROADM core device 164 shown in FIG. 16, although they are not limited thereto. The type-1A and type-1B spur add-ons 766 and 768 can be the same as, for example, the type-1A spur add-on 210 shown in FIG. 21 and the type-1B spur add-on 220 shown in FIG. 22, although they are not limited thereto. The type-1A and 1B spur terminators 770 and 772 can be the same as, for example, the type-1A spur terminator 236 shown in FIG. 23 and the type-1B spur terminator 242 shown in FIG. 24, although they are not limited thereto. It is within the scope of the invention, in an example embodiment, for the optical node 756 to include components in addition to those shown in FIG. 57. In addition, it is within the scope of the invention, in an example embodiment, for any of the type-4 ROADM core devices 762, 764, the type-1A and type-1B spur add-ons 766 and 768, and the type-1A and type-1B spur terminators 770 and 772 to be replaced with another component (or components) that performs (or perform) the same functions thereof.

Figure 58:
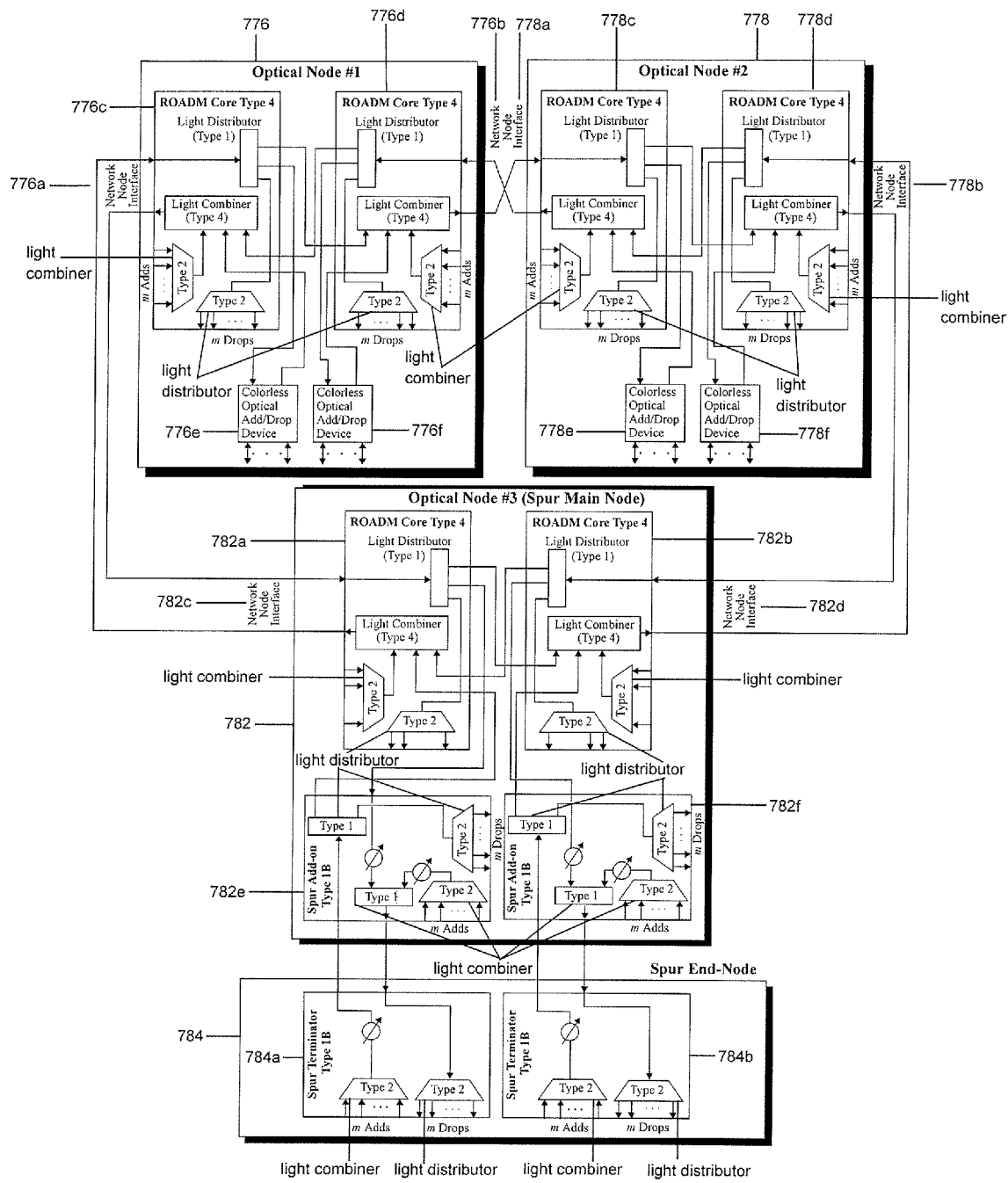
FIG. 58 is a block diagram of an example of an optical network including plural optical nodes, one of which includes a spur main node and a spur end node.

FIG. 58 illustrates an optical network 774 including a first optical node 776, a second optical node 778, and a third optical node 780. Nodes 776 and 778 are two-degree nodes, each having two network node interfaces, (776*a*, 776*b*) and (778*a*, 778*b*) respectively, through each of which these nodes connect to one of the other nodes. Nodes 776 and 778 each include two type-4 ROADM core devices (776*c*, 776*d*), (778*c*, 778*d*), each of which includes one of the network node interfaces. Each type-4 ROADM core device in one of the nodes 776, 778 is connected to a colorless optical add/drop device (776*e*, 776*f*), (778*e*, 778*f*) and to the other type-4 ROADM core device in that node through two pairs of its k external subtending inputs and outputs. Node 782 is a two-degree node including a spur main node. Node 784 is a spur end node. The spur main node 782 includes two type-4 ROADM core devices 782*a*, 782*b*, each including a network node interface 782*c*, 782*d*, and two type-1B spur add-ons 782*e*, 782*f*. The spur end node 784 includes two type-1B spur terminators 784*a*, 784*b*. The type-4 ROADM core devices 776*c*, 776*d*, 778*c*, 778*d*, 782*a*, and 782*b* can be the same as, for example, the type-4 ROADM core device 164 shown in FIG. 16, although they are not limited thereto. The colorless optical add/drop devices 776*e*, 776*f*, 778*e*, and 778*f* can be the same as, for example, the type-1 ROADM core device 162 shown in FIG. 15, although they are not limited thereto. The type-1B spur add-ons 782*e* and 782*f* can be the same as, for example, the type-1B spur add-on 220 shown in FIG. 22 although they are not limited thereto. The type-1B spur terminators 784*a*, 784*b* can be the same as, for example, the type-1B spur terminator 242 shown in FIG. 24 although they are not limited thereto. It is within the scope of the invention, in an example embodiment, for any of the type-4 ROADM core devices 776*c*, 776*d*, 778*c*, 778*d*, 782*a*, the colorless optical add/drop devices 776*e*, 776*f*, 778*e*, and 778*f*, the type-1B spur add-ons 782*e* and 782*f*, and the type-1B spur terminators 784*a*, 784*b* to be replaced with another component (or components) that performs (or perform) the same functions thereof.

FIGS. 59A through 59H show elements of a spur main node of an optical spur including a spur main node and a spur end node. In addition, these figures show a specific type of spur main node, i.e., one that includes type-4 ROADM core devices with three pairs of external subtending inputs and outputs (i.e., k=3, where k is the total number of pairs of subtending inputs and outputs). However, it is within the scope of the invention for these example embodiments to include type-4 ROADM core devices that have more than three pairs of external subtending inputs and outputs. The type-4 ROADM core devices are connected to add-on devices whose number of subtending inputs and outputs is the same as or different from each other and is the same as or different from the number of pairs of external subtending inputs and outputs of the type-4 ROADM core devices.

Figure 59A:
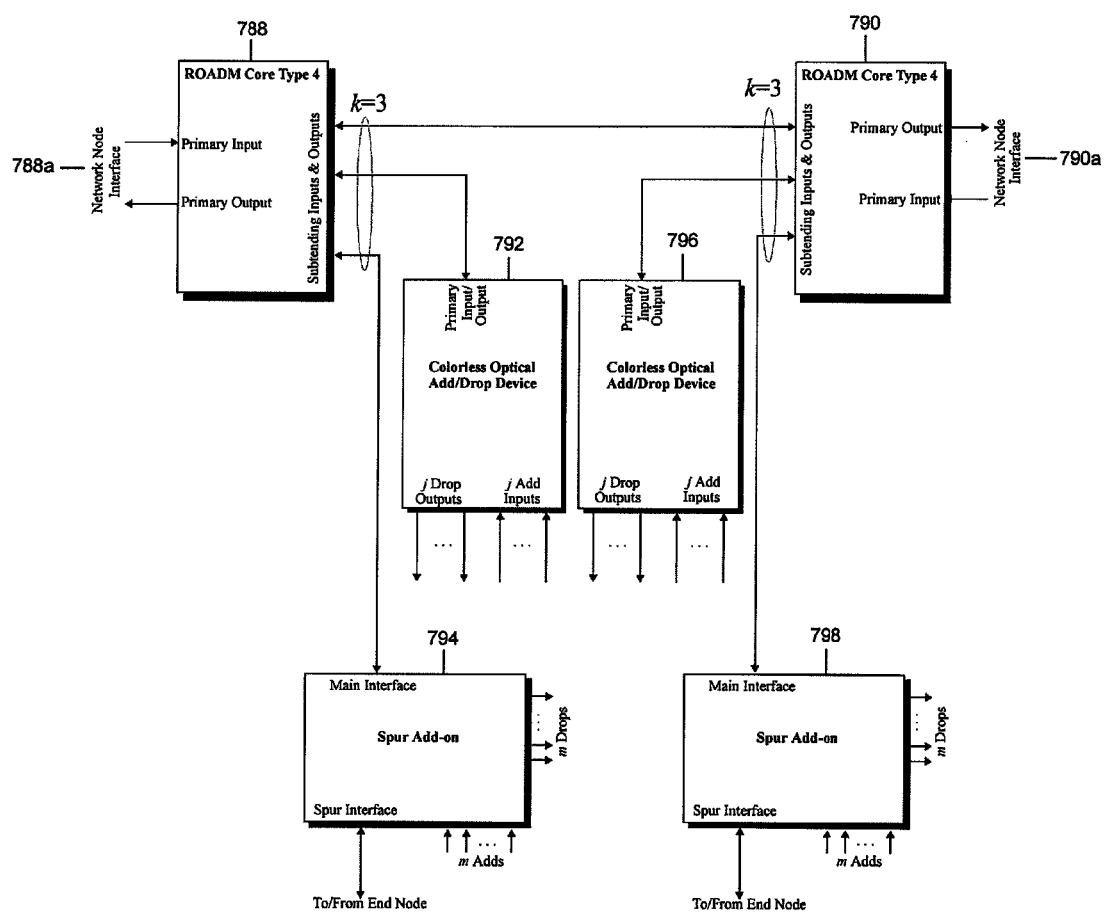
FIGS. 59A through 59H illustrate different examples of optical nodes. More specifically.

FIG. 59A illustrates a network element 786 including a two-degree optical node having two network node interfaces. The network element 786 includes two type-4 ROADM core devices 788 and 790 each having a network node interface 788a, 790a, and each of which is connected through three of its k subtending inputs and outputs to the other type-4 ROADM core device, to a colorless optical add/drop device 792 or 796, and to a spur add-on 794 or 798. The type-4 ROADM core devices 788 and 790 can be the same as, for example, the type-4 ROADM core device 164 shown in FIG. 16, although they are not limited thereto. The colorless optical add-drop devices 792 and 796 can be the same as, for example, the type-1 ROADM core device 162 shown in FIG. 15, although they are not limited thereto. Each of the spur add-ons 794 and 798 can be the same as, for example, any of the spur add-ons 210 (FIG. 21), 220 (FIG. 22), 236 (FIG. 23), 242 (FIG. 24), 252 (FIG. 25), 300, 306 (FIG. 28) 328, 330 (FIG. 29), 364, 370 (FIG. 30), 380 (FIG. 31), 400, 402 (FIG. 32), 424, 426 (FIG. 33), 456, 458 (FIG. 34), 476, 478 (FIG. 35), and 500, 502 (FIG. 36), although they are not limited thereto.

Figure 59B:
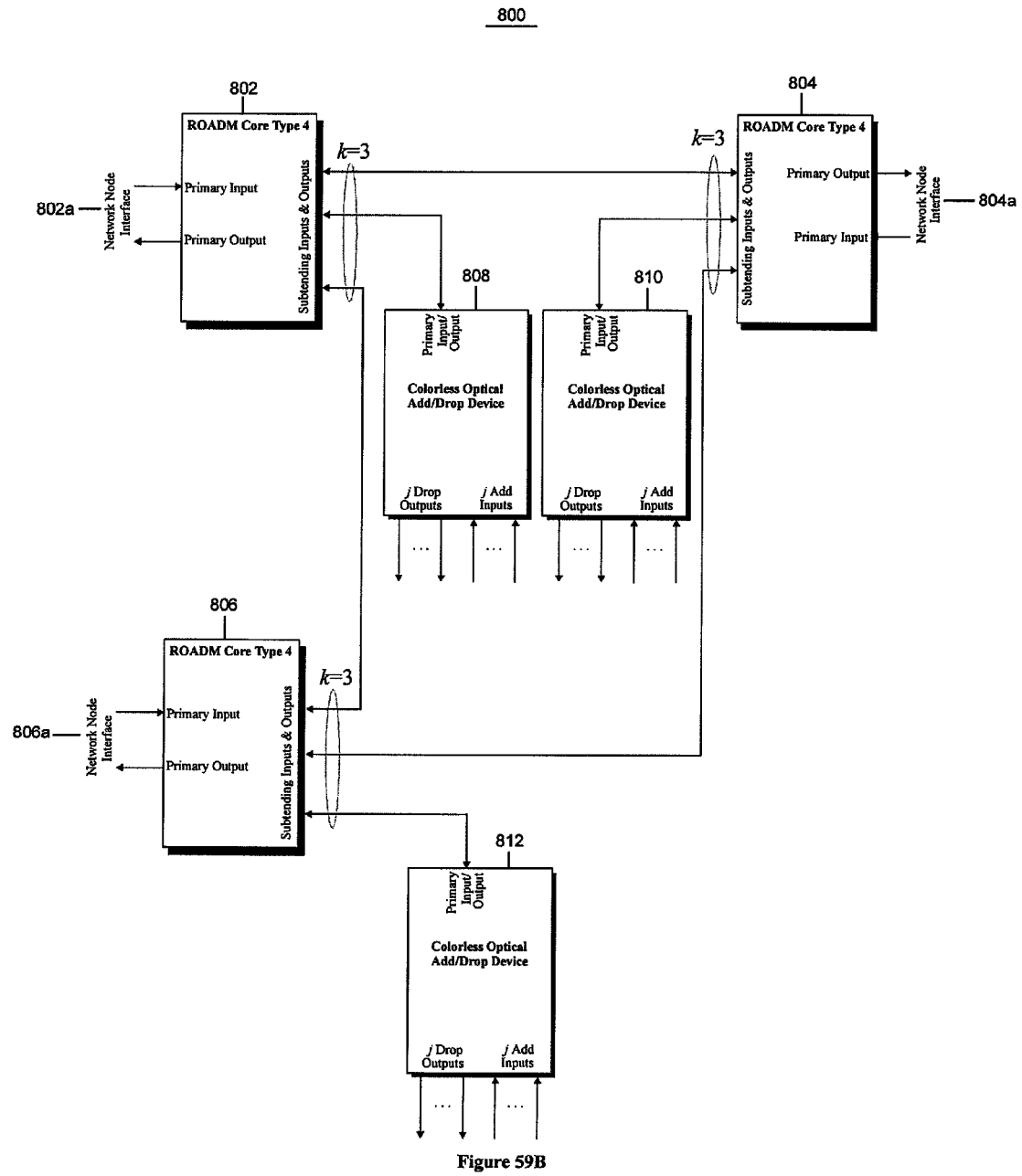

FIG. 59B illustrates a network element 800 including a three-degree optical node having three network node interfaces. The network element 800 includes three type-4 ROADM core devices 802, 804, and 806, each having a network node interface 802a, 804a, 806a, respectively, and each of which is connected through three of its k subtending inputs and outputs to the two other type-4 ROADM core devices, and to a colorless optical add/drop device 808, 810, or 812. The type-4 ROADM core devices 802 and 804 can be the same as, for example, the type-4 ROADM core device 164 shown in FIG. 16, although they are not limited thereto. The colorless optical add-drop devices 808, 810, and 812 can be the same as, for example, the type-1 ROADM core device 162 shown in FIG. 15, although they are not limited thereto.

Figure 59C:
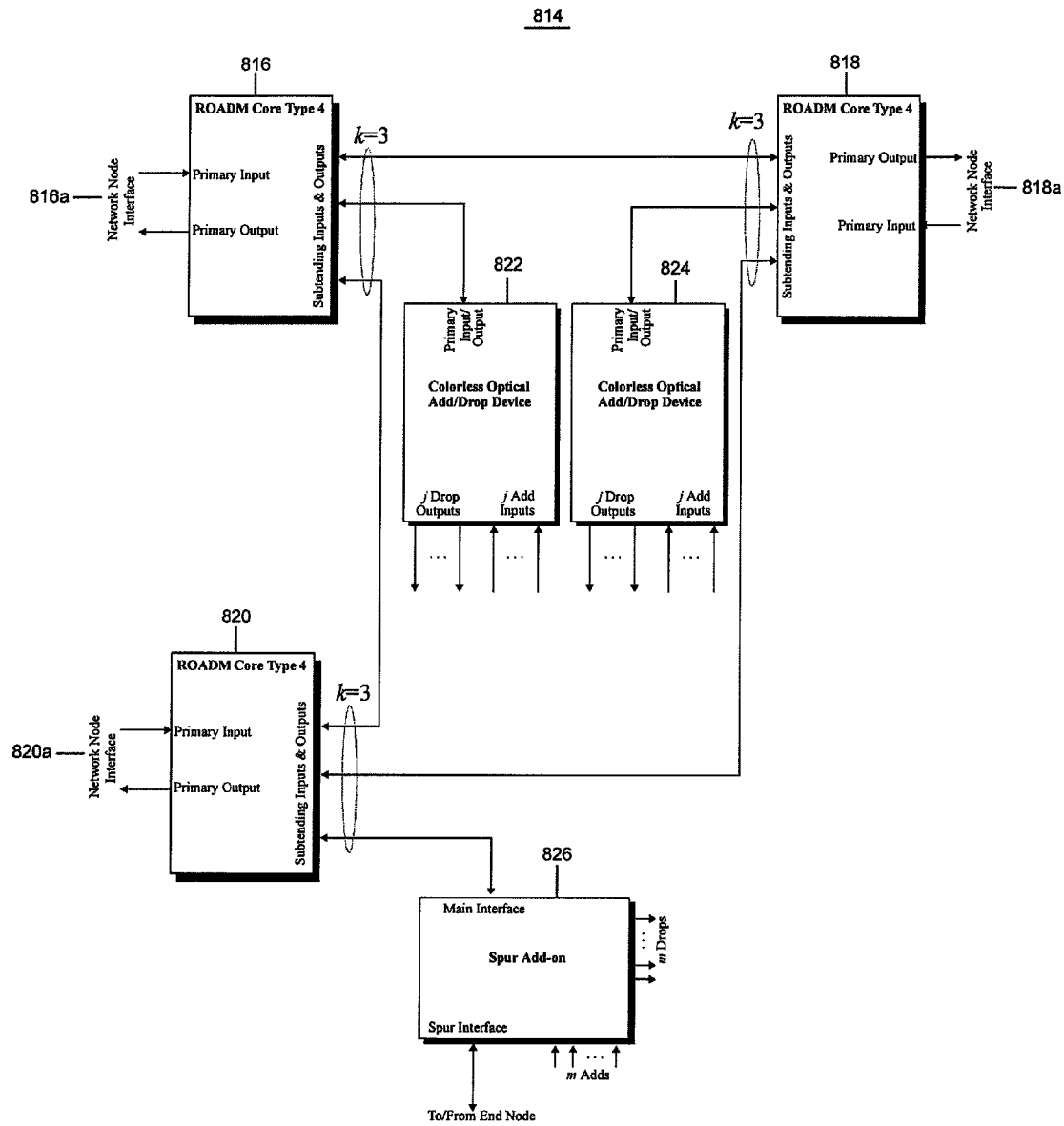

FIG. 59C illustrates a network element 814 including a three-degree optical node having three network node interfaces. The network element 814 includes three type-4 ROADM core devices 816, 818, and 820, each having a network node interface 816a, 818a, and 820a, respectively, and each of which is connected through three of its k subtending inputs and outputs to the two other type-4 ROADM core devices and to an add-on device. More specifically, ROADM core devices 816 and 818 are each connected to a colorless optical add/drop add-on 822 or 824. ROADM core device 820 is connected to spur add-on 826. The type-4 ROADM core devices 816 and 818 can be the same as, for example, the type-4 ROADM core device 164 shown in FIG. 16, although they are not limited thereto. The colorless optical add-drop devices 822 and 824 can be the same as, for example, the type-1 ROADM core device 162 shown in FIG. 15, although they are not limited thereto. The spur add-on 826 can be the same as, for example, any of the spur add-ons 210 (FIG. 21), 220 (FIG. 22), 236 (FIG. 23), 242 (FIG. 24), 252 (FIG. 25), 300, 306 (FIG. 28) 328, 330 (FIG. 29), 364, 370 (FIG. 30), 380 (FIG. 31), 400, 402 (FIG. 32), 424, 426 (FIG. 33), 456, 458 (FIG. 34), 476, 478 (FIG. 35), and 500, 502 (FIG. 36), although it is not limited thereto.

Figure 59D:
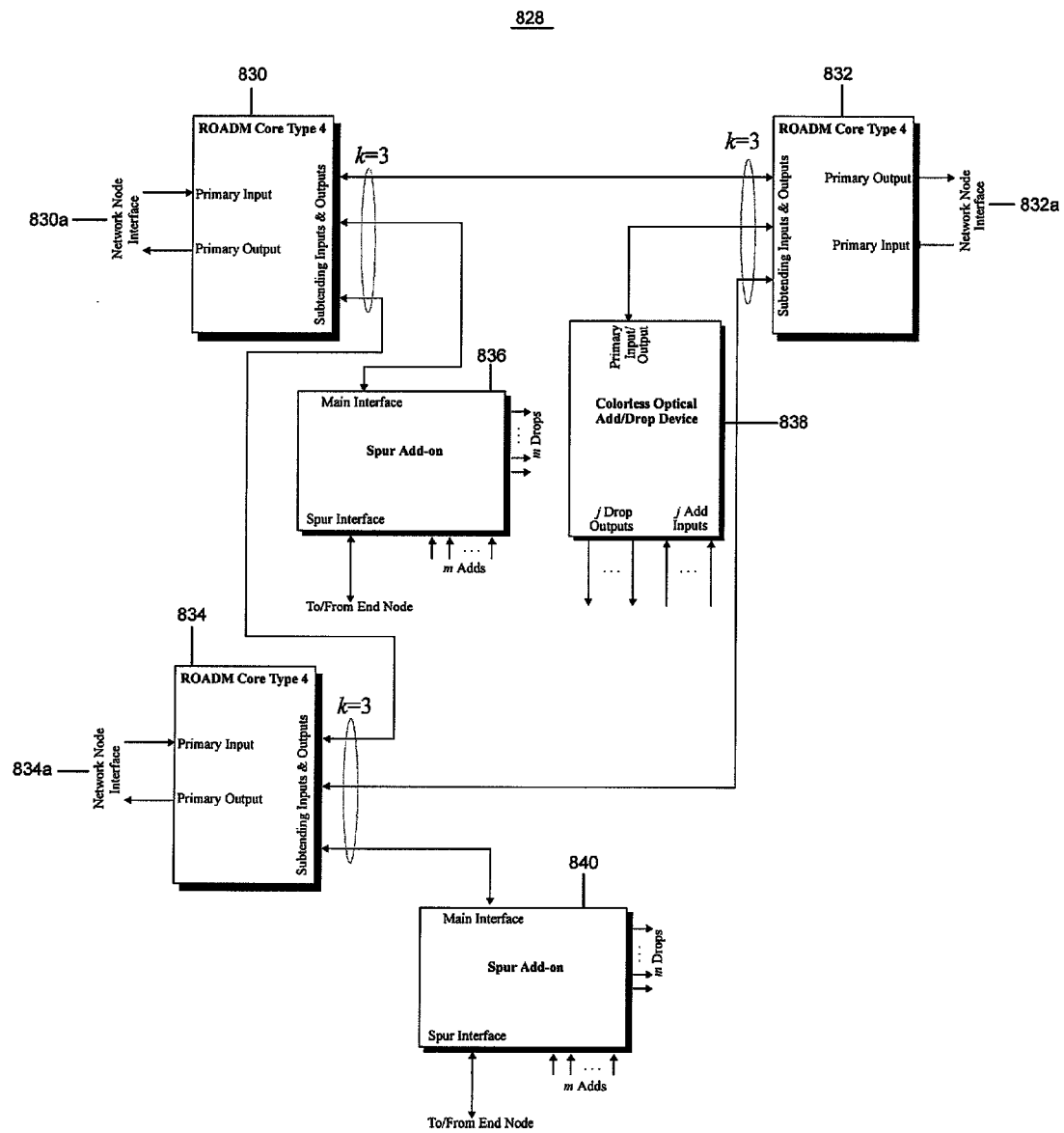

FIG. 59D illustrates a network element 828 including a three-degree optical node having three network node interfaces. The network element 828 includes three type-4 ROADM core devices 830, 832, and 834, each having a network node interface 830a, 832, and 834a, respectively. Each ROADM core device is connected through three of its k subtending inputs and outputs to the two other type-4 ROADM core devices and to an add-on device. More specifically, the ROADM core devices 830 and 834 are connected to spur add-ons 836 and 840, respectively, and the ROADM core device 832 is connected to a colorless optical add/drop device 838. The type-4 ROADM core devices 830, 832, and 834 can be the same as, for example, the type-4 ROADM core device 164 shown in FIG. 16, although they are not limited thereto. The colorless optical add-drop device 838 can be the same as, for example, the type-1 ROADM core device 162 shown in FIG. 15, although they are not limited thereto. Each of the spur add-ons 836 and 840 can be the same as, for example, any of the spur add-ons 210 (FIG. 21), 220 (FIG. 22), 236 (FIG. 23), 242 (FIG. 24), 252 (FIG. 25), 300, 306 (FIG. 28) 328, 330 (FIG. 29), 364, 370 (FIG. 30), 380 (FIG. 31), 400, 402 (FIG. 32), 424, 426 (FIG. 33), 456, 458 (FIG. 34), 476, 478 (FIG. 35), and 500, 502 (FIG. 36), although they are not limited thereto.

Figure 59E:
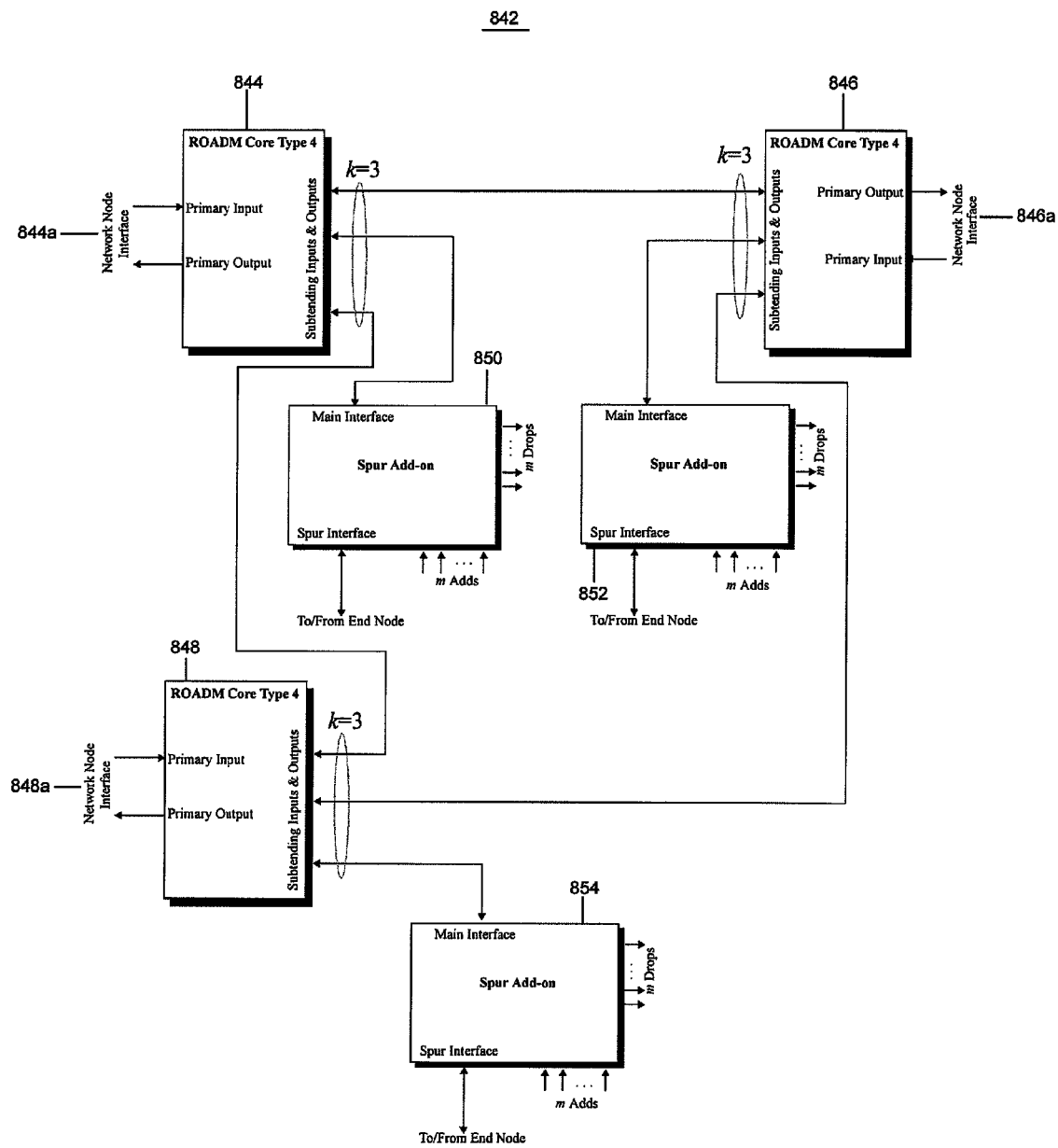

FIG. 59E illustrates a network element 842 including a three-degree optical node having three network node interfaces. The network element 842 includes three type-4 ROADM core devices 844, 846, and 848, each having a network node interface 844a, 846a, and 848a, respectively, and each of which is connected through three of its k subtending inputs and outputs to the two other type-4 ROADM core devices, and to one of the spur add-ons 850, 852, and 854. The type-4 ROADM core devices 844, 846, and 848 can be the same as, for example, the type-4 ROADM core device 164 shown in FIG. 16, although they are not limited thereto. Each of the spur add-ons 850, 852, and 854 can be the same as, for example, any of the spur add-ons 210 (FIG. 21), 220 (FIG. 22), 236 (FIG. 23), 242 (FIG. 24), 252 (FIG. 25), 300, 306 (FIG. 28) 328, 330 (FIG. 29), 364, 370 (FIG. 30), 380 (FIG. 31), 400, 402 (FIG. 32), 424, 426 (FIG. 33), 456, 458 (FIG. 34), 476, 478 (FIG. 35), and 500, 502 (FIG. 36), although they are not limited thereto.

Figure 59F:
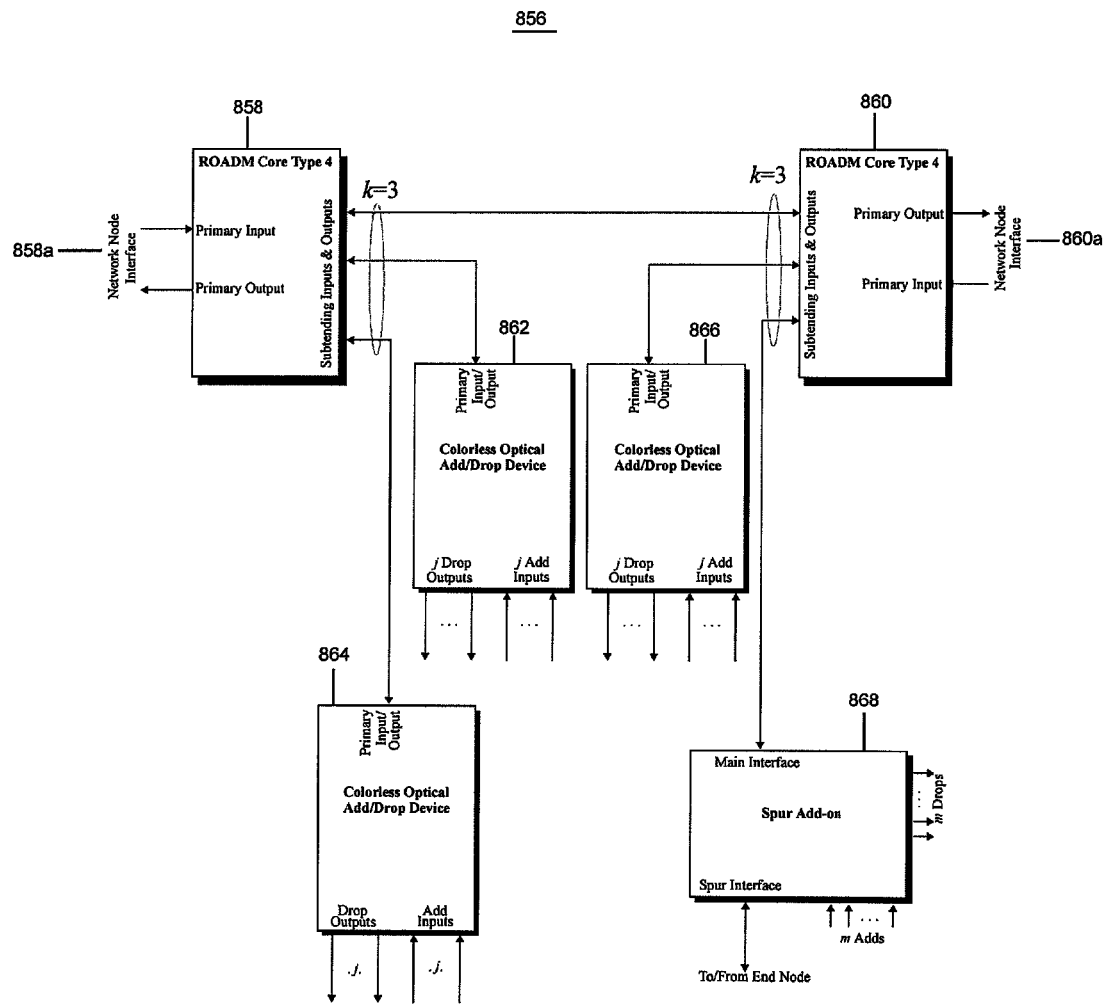

FIG. 59F illustrates a network element 856 including a two-degree optical node having two network node interfaces. The network element 856 includes two type-4 ROADM core devices 858 and 860 each having a network node interface 858a and 860a, respectively, and each of which is connected through three of its k subtending inputs and outputs to the other type-4 ROADM core device and to two add-ons. Thus, the type-4 ROADM core device 858 is connected to the two colorless optical add/drop add-ons 862 and 864, and the type-4 ROADM core device 860 is connected to a colorless optical add/drop device 866 and a spur add-on 868. The type-4 ROADM core devices 858 and 860 can be the same as, for example, the type-4 ROADM core device 164 shown in FIG. 16, although they are not limited thereto. The colorless optical add-drop devices 862, 864, and 866 can be the same as, for example, the type-1 ROADM core device 162 shown in FIG. 15, although they are not limited thereto. The spur add-on 868 can be the same as, for example, any of the spur add-ons 210 (FIG. 21), 220 (FIG. 22), 252 (FIG. 25), 328, 330 (FIG. 29), 366, 368, 372, 374 (FIG. 30), 380 (FIG. 31), 400, 402 (FIG. 32), 424, 426 (FIG. 33), 456, 458 (FIG. 34), 476, 478 (FIG. 35), and 496, 498 (FIG. 36), although it is not limited thereto.

Figure 59G:
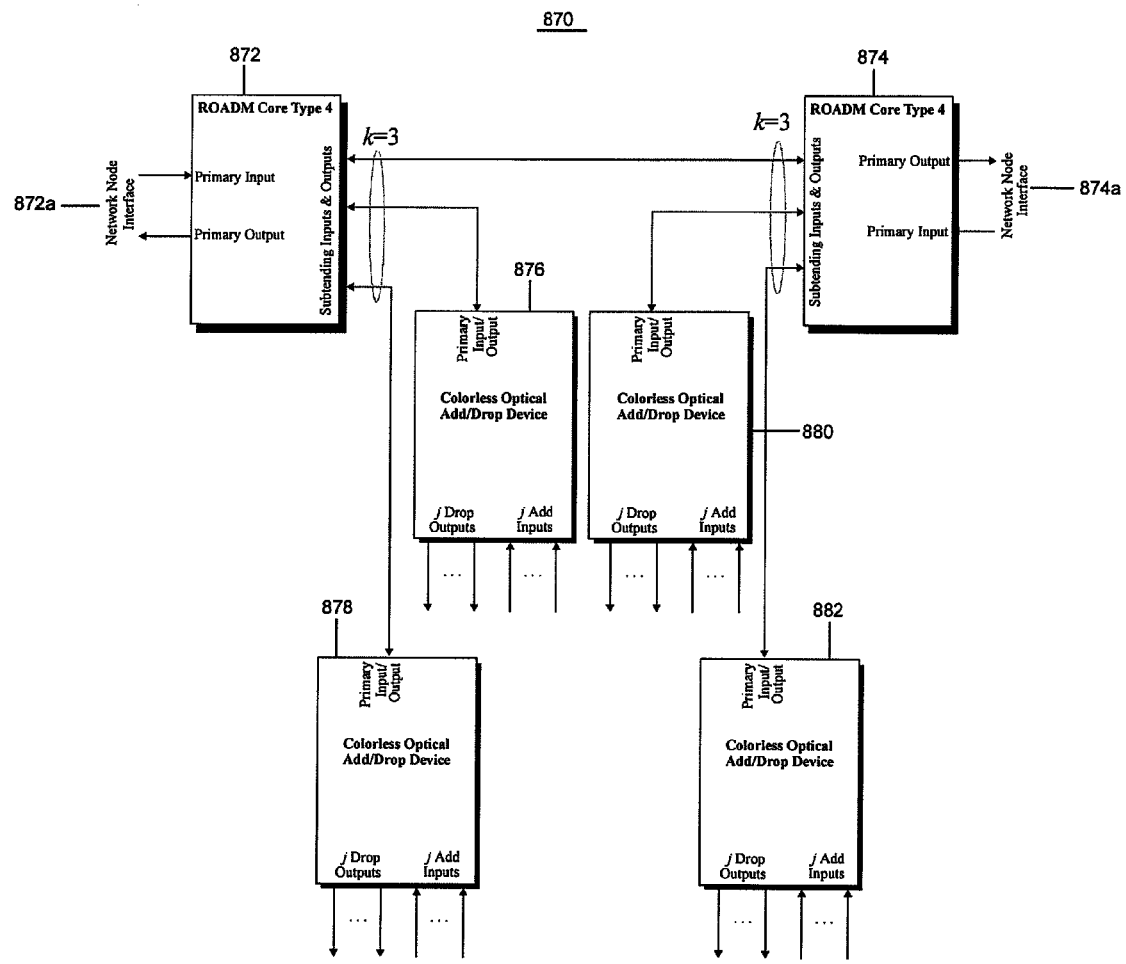

FIG. 59G illustrates a network element 870 including a two-degree optical node having two network node interfaces. The network element 870 includes two type-4 ROADM core devices 872 and 874 each having a network node interface, 872a and 874a, respectively, and each of which is connected through three of its k subtending inputs and outputs to the other type-4 ROADM core device, and to two colorless optical add/drop add-ons. More specifically, the ROADM core device 872 is connected to colorless optical add/drop add-ons 876 and 878 and the ROADM core device 874 is connected to colorless optical add/drop add-ons 880 and 882. The type-4 ROADM core devices 872 and 874 can be the same as, for example, the type-4 ROADM core device 164 shown in FIG. 16, although they are not limited thereto. The colorless optical add-drop devices 876, 878, 880, and 882 can be the same as, for example, the type-1 ROADM core device 162 shown in FIG. 15, although they are not limited thereto.

Figure 59H:
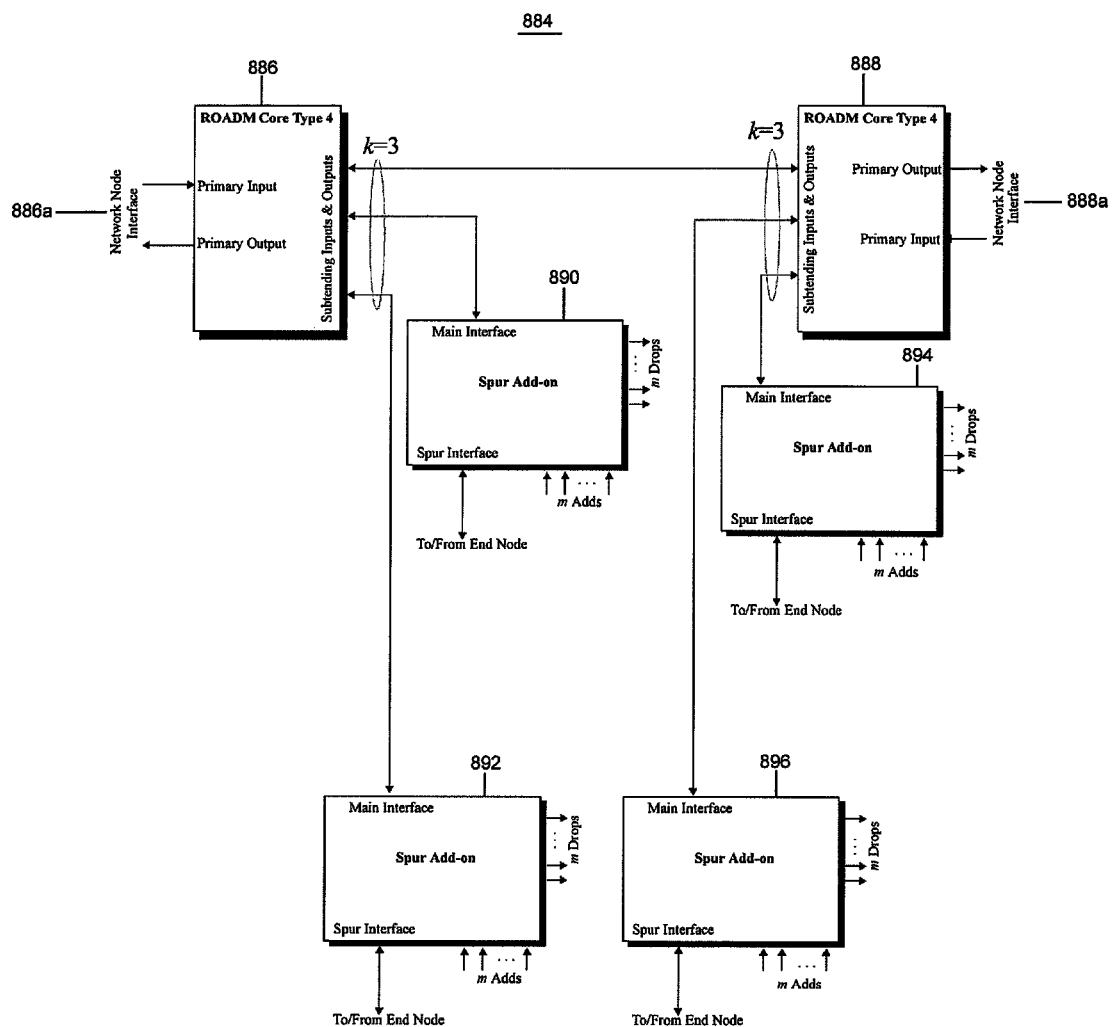

FIG. 59H illustrates a network element 884 including a two-degree optical node having two network node interfaces. The network element 884 includes two type-4 ROADM core devices 886 and 888 each having a network node interface, 886a and 888a, respectively, and each of which is connected through three of its k subtending inputs and outputs to the other type-4 ROADM core device, and to two spur add-ons. More specifically, the ROADM core device 886 is connected to spur add-ons 890 and 892 and the ROADM core device 888 is connected to spur add-ons 894 and 896. The type-4 ROADM core devices 886 and 888 can be the same as, for example, the type-4 ROADM core device 164 shown in FIG. 16, although they are not limited thereto. Each of the spur add-ons 890, 892, 894, and 896 can be the same as, for example, any of the spur add-ons 210 (FIG. 21), 220 (FIG. 22), 252 (FIG. 25), 328, 330 (FIG. 29), 366, 368, 372, 374 (FIG. 30), 380 (FIG. 31), 400, 402 (FIG. 32), 424, 426 (FIG. 33), 456, 458 (FIG. 34), 476, 478 (FIG. 35), and 496, 498 (FIG. 36), although they are not limited thereto.

While the invention has been particularly shown and described with respect to various embodiments thereof, it should be understood that the embodiments have been presented by way of example, and not limitation. It will be apparent to persons skilled in the relevant art(s) that various changes in form and detail can be made therein in a computer program product or software, hardware or any combination thereof, without departing from the broader spirit and scope of the invention. Thus, the invention should not be limited by any above-described examples of embodiments of the invention, but should be defined only in accordance with the following claims and their equivalents.

In addition, it should be understood that the figures, which highlight the functionality and advantages of the invention, are presented for example purposes only. The architecture of the invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the invention in any way. It is also to be understood that the steps and processes recited in the claims need not be performed in the order presented.

What is claimed is:

1. An optical node of a network comprising:
a ROADM core, which is a reconfigurable optical add drop multiplexer core device including a bidirectional network node interface configured to receive an optical signal of multiple wavelengths from the network and to transmit an optical signal of multiple wavelengths to the network; and
two different types of add-on devices, each connected to the ROADM core and each configured to a) receive an optical signal from the ROADM core that contains all of the multiple wavelengths and separate the multiple wavelengths therein into single-wavelength optical signals, and b) receive other single-wavelength optical signals, and combine these other single-wavelength optical signals into an optical signal of multiple wavelengths, which is then outputted to the ROADM core.

2. The optical node as set forth in claim 1,
the optical node being a multifunctional and reconfigurable dense wavelength division multiplexing optical node, and
the ROADM core being configured to process a dense wavelength division multiplexed optical signal.

3. An optical network comprising the optical node as set forth in claim 2 and a plurality of other optical nodes, at least two of the optical nodes having a different number of ROADM cores from each other.

4. The optical node as set forth in claim 1,
the ROADM core including a sufficient number of subtending inputs and outputs to connect to the add-on devices, and the ROADM core further including an add port and a drop port.

5. The optical node as set forth in claim 1,
the ROADM core further including a plurality of add and drop ports,
the ROADM core being configured to:
divide an optical signal received from the network into a plurality of optical-power-divided, output optical signals output on a plurality of subtending outputs;
receive first and second multiple-wavelength optical signals from first and second subtending inputs of said ROADM core, respectively, the first and second multiple-wavelength optical signals containing wavelengths in common;
separate the first and second multiple-wavelength optical signals into a first plurality of single-wavelength optical signals originating from the first multiple-wavelength signal and a second plurality of single-wavelength optical signals originating from the second multiple-wavelength optical signal;
for single-wavelength optical signals in the first and second plurality of single-wavelength optical signals having the same wavelength, select for outputting one single-wavelength optical signal from one of the first and second plurality of single-wavelength optical signals;
attenuate each selected single-wavelength optical signal; and
combine the attenuated, selected single-wavelength optical signals into a single primary output optical signal to be output to the another node,
one of the add-on devices including a colorless optical add/drop device configured to add an optical signal of any wavelength to the ROADM core from any of add ports of the one of the add-on devices and to drop an optical signal of any wavelength from the ROADM core from any of drop ports of the one of the add-on devices.

6. The optical node as set forth in claim 5, the colorless optical add/drop device including an optical amplifier.

7. The optical node as set forth in claim 5, the other of the add-on devices including a colored optical add/drop device configured to a) add an optical signal of a predetermined wavelength to a predetermined add port of the other of the add-on devices, to output the added optical signal to the ROADM core, b) receive the optical signal from the ROADM core that contains all of the multiple wavelengths and to demultiplex the optical signal from the ROADM core that contains all of the multiple wavelengths to produce the plurality of single-wavelength optical signals, and c) drop each of the single-wavelength optical signals of a predetermined wavelength from a predetermined drop port of the other of the add-on devices.

8. The optical node as set forth in claim 1,
the ROADM core being configured to:
divide the optical power of an another-node-originating optical signal received from the network node interface between a plurality of optical-power-divided, output optical signals of multiple wavelength at least one of which is output from the ROADM core on a plurality of subtending outputs;
separate one of the plurality of optical-power-divided, output optical signals into a plurality of dropped optical signals each of a single-wavelength output from a plurality of colored drop ports thereof;
receive a first multiple-wavelength optical signal generated by combining optical signals of different wavelengths added to the ROADM core via colored add ports thereof, and receive a second multiple-wavelength optical signal from a subtending input of the ROADM core, the first and second multiple-wavelength optical signals containing at least one wavelength in common;
separate the first and second multiple-wavelength optical signals into a first plurality of single-wavelength optical signals originating from the first multiple-wavelength signal and a second plurality of single-wavelength optical signals originating from the second multiple-wavelength optical signal;
for single-wavelength optical signals in the first and second plurality of single-wavelength optical signals having the same wavelength, select one single-wavelength optical signal from one of the first and second plurality of single-wavelength optical signals for outputting;
attenuate each selected single-wavelength optical signal; and
combine the attenuated, selected single-wavelength optical signals into a single primary output optical signal to be output to another node via the network node interface,
one of the add-on devices including an integrated colored optical add/drop device integrated into the ROADM core and configured to perform the separation of the one of the plurality of optical-power-divided, output optical signals into the plurality of dropped optical signals, each of a single-wavelength output from the plurality of colored drop ports, and to perform the combining of optical signals of different wavelengths added to the ROADM core via colored add ports into the first multiple-wavelength optical signal.

9. The optical node as set forth in claim 8, the other of the add-on devices including a colorless optical add/drop device configured to add an optical signal of any wavelength to the ROADM core from any of the add ports of the other of the add-on devices and to drop an optical signal of any wavelength received from the ROADM core from any of the drop ports of the other of the add-on devices.

10. The optical node as set forth in claim 9, the colorless optical add/drop device including an optical amplifier.

11. The optical node set forth in claim 9,
the colorless optical add/drop device including a ROADM core configured to:
separate one of the optical-power-divided, output optical signals output on one of the plurality of subtending outputs into a plurality of add/drop device, single-wavelength optical signals, change the intensity of at least one of the add/drop device, single-wavelength optical signals, and assign each of the add/drop device, single-wavelength optical signals to one of a plurality of drop ports of the colorless optical add/drop device, each of the add/drop device, single-wavelength optical signals being assignable to any of the plurality of drop ports of the colorless optical add/drop device; and
combine into the second multiple-wavelength optical signal a plurality of single-wavelength optical signals each inputted into one of a plurality of colorless add ports of the colorless optical add/drop device, and output the second multiple-wavelength optical signal to the subtending input of the ROADM core.

12. The optical node set forth in claim 9,
the colorless optical add/drop device including a ROADM core device configured to:
separate one of the optical-power-divided, output optical signals of multiple wavelengths output on one of the plurality of subtending outputs into a plurality of add/drop device, single-wavelength optical signals, change the intensity of at least one of the add/drop device, single-wavelength optical signals, and assign each of the add/drop device, single-wavelength optical signals to one of a plurality of drop ports of the colorless optical add/drop device, each of the add/drop device, single-wavelength optical signals being assignable to any of the plurality of drop ports of the colorless optical add/drop device; and
combine into the second multiple-wavelength optical signal a plurality of single-wavelength optical signals each inputted into one of a plurality of colorless add ports of the colorless optical add/drop device, and output the second multiple-wavelength optical signal to the subtending input of the ROADM core,
the ROADM core of the colorless optical add/drop device including a first amplifier configured to amplify the one of the optical-power-divided, output optical signals output on one of the plurality of subtending outputs and input into the ROADM core of the colorless optical add/drop device, and
the ROADM core of the colorless optical add/drop device also including a second amplifier configured to amplify the second multiple-wavelength optical signal output from the colorless optical add/drop device to the subtending input of the ROADM core.

13. The optical node as set forth in claim 1,
one of the add-on devices including:
a first light combiner configured to combine the other single-wavelength optical signals added thereto from add ports thereof to produce the optical signal of multiple wavelengths that is outputted to the ROADM core; and
a first light distributor configured to divide the optical signal from the ROADM core that contains all of the multiple wavelengths into the single-wavelength optical signals output to drop ports thereof;
the ROADM core further including:
a second light distributor configured to divide the optical signal of multiple wavelengths received from the network node interface into a plurality of optical signals, each containing all of the multiple wavelengths, and to input at least one of the divided optical signals containing all of the multiple wavelengths to the first light distributor; and a second light combiner configured to receive the optical signal outputted from the first light combiner, to combine the optical signal outputted from the first light combiner with another optical signal to produce an output signal, and to output the output signal to the network node interface.

14. The optical node set forth in claim 1,
the ROADM core including:
a first light combiner configured to combine optical signals added thereto from add ports thereof to produce a first combined optical signal; and
a first light distributor configured to divide an optical signal input thereinto into a plurality of optical signals output to drop ports thereof;
a second light distributor configured to divide the optical signal of multiple wavelengths received from the network node interface into first and second optical signals containing all of the multiple wavelengths and to input the first optical signal to the first light distributor; and
a second light combiner configured to receive the first combined optical signal from the first light combiner, to combine the combined optical signal with another optical signal to produce an output signal, and to output the output signal to the network node interface, and
one of the add-on devices including:
a third light distributor configured to receive the second optical signal containing all of the multiple wavelengths and to divide the second optical signal containing all of the multiple wavelengths into a plurality of dropped single-wavelength signals that are directed to drop ports thereof; and
a third light combiner configured to combine optical signals from add ports thereof into a second combined signal of multiple wavelengths and to input the second combined signal of multiple wavelengths into the second light combiner of the ROADM core as the another optical signal for combining with the first combined optical signal to produce the output signal.

15. The optical node as set forth in claim 1, further comprising a plurality of ROADM cores, each connected to each of the other ROADM cores.

16. The optical node as set forth in claim 1, further comprising plural ROADM cores, connected to each other and each of which includes a network node interface permitting connection with a different optical node.

17. The optical node as set forth in claim 16, the add-on devices being connected to different ROADM cores.

18. The optical node as set forth in claim 16, the add-on devices being connected to the same ROADM core.

19. The optical node as set forth in claim 16, further comprising two pairs of add-on devices, each pair of add-on devices including two add-on devices of different types from each other, and each pair of add-on devices being connected to a different ROADM core.

20. The optical node as set forth in claim 16,
the ROADM cores further including a plurality of add and drop ports,
the ROADM cores being each configured to:
divide an optical signal received from the network node interface into a plurality of optical-power-divided, output optical signals output on a plurality of subtending outputs;
receive first and second multiple-wavelength optical signals from first and second subtending inputs thereof, respectively, the first and second multiple-wavelength optical signals containing wavelengths in common;
separate the first and second multiple-wavelength optical signals into a first plurality of single-wavelength optical signals originating from the first multiple-wavelength signal and a second plurality of single-wavelength optical signals originating from the second multiple-wavelength optical signal;
for single-wavelength optical signals in the first and second plurality of single-wavelength optical signals having the same wavelength, select for outputting one single-wavelength optical signal from one of the first and second plurality of single-wavelength optical signals,
attenuate each selected single-wavelength optical signal; and
combine the attenuated, selected single-wavelength optical signals into a single primary output optical signal to be output to the network node interface,
the node further including two pairs of add-on devices,
each pair of add-on devices including two add-on devices of different types from each other, and
each pair of add-on devices being connected to a different ROADM core.

21. The optical node as set forth in claim 20,
one of the add-on devices in each pair including a colorless optical add/drop device configured to add an optical signal of any wavelength to one of the ROADM cores from any of the add ports of the one of the add-on devices and to drop an optical signal of any wavelength output from the one of the ROADM cores from any of the drop ports of the one of the add-on devices, and
the other of the add-on devices in each pair including a colored optical add/drop device configured to add an optical signal of a predetermined wavelength to a predetermined add port of the other of the add-on devices, to output the added optical signal the one of the ROADM cores, to receive the optical signal from the one of the ROADM cores that contains all of the multiple wavelengths of the optical signal received from the network and to demultiplex the received multiple-wavelength optical signal to produce the plurality of single-wavelength optical signals, and to drop each of the single-wavelength optical signals of a predetermined wavelength from a predetermined drop port of the other of the add-on devices.

22. The optical node as set forth in claim 16,
the node including two pairs of add-on devices,
each pair of add-on devices including two add-on devices of different types from each other,
one of the add-on devices within each pair of add-on devices including a colored optical add/drop device configured to add an optical signal of a predetermined wavelength to a predetermined add port thereof, to output the added optical signal to one of the ROADM cores, to receive the multiple-wavelength optical signal from one of the ROADM cores that contains all of the multiple wavelengths in the optical signal received from the network and to demultiplex the received multiple-wavelength optical signal to produce the single-wavelength optical signals, and to drop each of the single-wavelength optical signals of a predetermined wavelength from a predetermined drop port of the one of the add-on devices, each pair of add-on devices being connected to a different ROADM core, and each of the ROADM cores being configured to:
 divide the optical power of an another-node-originating optical signal received from the network node interface between a plurality of optical-power-divided, output optical signals of multiple wavelengths at least one of which is output therefrom on a plurality of subtending outputs;
 separate one of the plurality of optical-power-divided, output optical signals into a plurality of dropped optical signals each of a single-wavelength output from a plurality of colored drop ports thereof;
 receive a first multiple-wavelength optical signal generated by combining optical signals of different wavelengths added thereto via colored add ports thereof, and receive a second multiple-wavelength optical signal from a subtending input thereof, the first and second multiple-wavelength optical signals containing at least one wavelength in common;
 separate the first and second multiple-wavelength optical signals into a first plurality of single-wavelength optical signals originating from the first multiple-wavelength signal and a second plurality of single-wavelength optical signals originating from the second multiple-wavelength optical signal;
 for single-wavelength optical signals in the first and second plurality of single-wavelength optical signals having the same wavelength, select one single-wavelength optical signal from one of the first and second plurality of single-wavelength optical signals for outputting;
 attenuate each selected single-wavelength optical signal; and
 combine the attenuated, selected single-wavelength optical signals into a single primary output optical signal to be output to the network node interface, each colored optical add/drop device including an integrated colored optical add/drop device, each ROADM core having integrated thereinto one of the integrated colored optical add/drop devices, each integrated colored optical add/drop device being configured to perform the separation of the one of the plurality of optical-power-divided, output optical signals into the plurality of dropped optical signals each of a single-wavelength output from the plurality of colored drop ports, and to perform the combining of optical signals of different wavelengths added to the ROADM core via colored add ports into the first multiple-wavelength optical signal.

23. The optical node as set forth in claim 22, the other of the add-on devices in each pair including a colorless optical add/drop device configured to add an optical signal of any wavelength to one of ROADM cores from any of the add ports of the other of the add-on devices and to drop an optical signal of any wavelength from one of the ROADM cores from any of the drop ports of the other of the add-on devices.

24. The optical node set forth in claim 23,
each colorless optical add/drop device including a ROADM core configured to:
 separate one of the optical-power-divided, output optical signals of multiple wavelengths output on one of the plurality of subtending outputs into a plurality of add/drop device, single-wavelength optical signals, change the intensity of at least one of the add/drop device, single-wavelength optical signals, and assign each of the add/drop device, single-wavelength optical signals to one of a plurality of drop ports of the colorless optical add/drop device, each of the plurality of single-wavelength optical signals being assignable to any of the plurality of drop ports of the colorless optical add/drop device; and
 combine into the second multiple-wavelength optical signal a plurality of single-wavelength optical signals each inputted into one of a plurality of colorless add ports of the colorless optical add/drop device, and output the second multiple-wavelength optical signal to the subtending input of the ROADM core.

25. The optical node set forth in claim 16,
each ROADM core including:
 a first light combiner configured to combine optical signals added thereto from add ports thereof to produce a first combined optical signal; and
 a first light distributor configured to divide an optical signal input thereinto into a plurality of optical signals output to drop ports thereof;
 a second light distributor configured to divide the optical signal of multiple wavelengths received from the network node interface into first and second optical signals containing all of the multiple wavelengths and to input the first optical signal to the first light distributor; and
 a second light combiner configured to receive the first combined optical signal from the first light combiner, to combine the combined optical signal with another optical signal to produce an output signal, and to output the output signal to the network node interface, and one of the add-on devices including:
 a third light distributor configured to receive the second optical signal containing all of the multiple wavelengths from a first one of the ROADM cores and to separate the multiple wavelengths therein into the single-wavelength optical signals that are directed to drop ports of the one of the add-on devices; and
 a third light combiner configured to combine optical signals from add ports thereof into a second combined signal of multiple wavelengths and to input the second combined signal of multiple wavelengths into the second light combiner of the first ROADM core as the another optical signal for combining with the first combined optical signal to produce the output signal.

26. The optical node as set forth in claim 1, wherein each of the add-on devices includes an optical element configured to transmit an optical signal of multiple wavelengths to the network node interface.

27. The optical node as set forth in claim 26,
the ROADM core further including a light combiner configured to receive the optical signals containing the multiple wavelengths from the add-on devices and to transmit each optical signal containing the multiple wavelengths received from each add-on device to the network node interface.

28. The optical node as set forth in claim 26,
the ROADM core further including two subtending outputs each of which is connected to one of the add-on devices and a light distributor of the ROADM, and
the two subtending outputs outputting to the two different types of connected add-on devices an optical signal distributed from the light distributor that contains all of the wavelengths received by the ROADM core from the network node interface.

29. An optical node comprising:

a ROADM core, which is a reconfigurable optical add drop multiplexer core device including:

a bidirectional network node interface configured to receive an optical signal of multiple wavelengths input from a network and to transmit an optical signal of multiple wavelengths to the network;

a light distributor configured to divide the input optical signal containing all of the multiple wavelengths received from the network node interface into a plurality of optical signals containing all of the multiple wavelengths; and a light combiner configured to produce a combined signal by combining optical signals input thereinto, and to output the combined signal to the network node interface; and two different types of add-on devices, each connected to the ROADM core, each configured to a) receive one of the plurality of optical signals containing all of the multiple wavelengths from the light distributor and separate the multiple wavelengths therein into single-wavelength optical signals, and b) receive other single-wavelength optical signals, and combine these other single-wavelength optical signals into an optical signal of multiple wavelengths, which is then outputted to the light combiner of the ROADM core.

\* \* \* \* \*

UNITED STATES PATENT AND TRADEMARK OFFICE
CERTIFICATE OF CORRECTION

PATENT NO.       : 8,190,027 B2
APPLICATION NO.  : 11/697527
DATED            : May 29, 2012
INVENTOR(S)      : Mark E. Boduch et al.

It is certified that error appears in the above-identified patent and that said Letters Patent is hereby corrected as shown below:

COLUMN 62:

Line 17, "claim 2" should read --claim 2,--.

COLUMN 63:

Line 15, "wavelength" should read --wavelengths--.

COLUMN 66:

Line 44, "signal" should read --signal to--.

Signed and Sealed this
Fourth Day of September, 2012

David J. Kappos
*Director of the United States Patent and Trademark Office*